(12) United States Patent
Boucher et al.

(10) Patent No.: US 7,284,070 B2
(45) Date of Patent: *Oct. 16, 2007

(54) TCP OFFLOAD NETWORK INTERFACE DEVICE

(75) Inventors: Laurence B. Boucher, Saratoga, CA (US); Stephen E. J. Blightman, San Jose, CA (US); Peter K. Craft, San Francisco, CA (US); David A. Higgen, Saratoga, CA (US); Clive M. Philbrick, San Jose, CA (US); Daryl D. Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 10/246,820

(22) Filed: Sep. 17, 2002

(65) Prior Publication Data

US 2004/0054813 A1 Mar. 18, 2004

Related U.S. Application Data

(63) Continuation-in-part of application No. 10/092,967, filed on Mar. 6, 2002, now Pat. No. 6,591,302, which is a continuation-in-part of application No. 10/023,240, filed on Dec. 17, 2001, now Pat. No. 6,965,941, and a continuation-in-part of application No. 09/464,283, filed on Dec. 15, 1999, now Pat. No. 6,427,173, which is a continuation-in-part of application No. 09/439,603, filed on Nov. 12, 1999, now Pat. No. 6,247,060, which is a continuation-in-part of application No. 09/067,544, filed on Apr. 27, 1998, now Pat. No. 6,226,680.

(60) Provisional application No. 60/061,809, filed on Oct. 14, 1997.

(51) Int. Cl.
G06F 15/16 (2006.01)
(52) U.S. Cl. ........................................... 709/250
(58) Field of Classification Search ................. 709/250
See application file for complete search history.

(56) References Cited

U.S. PATENT DOCUMENTS 4,366,538 A 12/1982 Johnson et al. ............. 364/200

(Continued)

FOREIGN PATENT DOCUMENTS

WO WO/98/19412 5/1998

(Continued)

OTHER PUBLICATIONS

Ito et al. "A Multiprocessor Approach for Meeting the Processing □□Requirements for OSI," IEEE JSAC, v. 11, N.2, Feb. 1993, pp. 220-227.*

(Continued)

*Primary Examiner*—David Wiley
*Assistant Examiner*—J. Bret Dennison
(74) *Attorney, Agent, or Firm*—Mark Lauer; Silicon Edge Law Group LLP

(57) ABSTRACT

A system for protocol processing in a computer network has an intelligent network interface card (INIC) or communication processing device (CPD) associated with a host computer. The INIC provides a fast-path that avoids protocol processing for most large multi-packet messages, greatly accelerating data communication. The INIC also assists the host for those message packets that are chosen for processing by host software layers. A communication control block for a message is defined that allows DMA controllers of the INIC to move data, free of headers, directly to or from a destination or source in the host. The context is stored in the INIC as a communication control block (CCB) that can be passed back to the host for message processing by the host. The INIC contains specialized hardware circuits that are much faster at their specific tasks than a general purpose CPU. A preferred embodiment includes a trio of pipelined processors with separate processors devoted to transmit, receive and management processing, with full duplex communication for four fast Ethernet nodes.

27 Claims, 89 Drawing Sheets

U.S. PATENT DOCUMENTS

| | | | |
|---|---|---|---|
| 4,991,133 A | 2/1991 | Davis et al. | 364/900 |
| 5,056,058 A | 10/1991 | Hirata et al. | 709/230 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/275 |
| 5,412,782 A | 5/1995 | Hausman et al. | 395/250 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,548,730 A | 8/1996 | Young et al. | 395/280 |
| 5,566,170 A | 10/1996 | Bakke et al. | 370/60 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,629,933 A | 5/1997 | Delp et al. | 370/411 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,692,130 A | 11/1997 | Shobu et al. | 395/200.12 |
| 5,699,317 A | 12/1997 | Sartore et al. | 395/230.06 |
| 5,701,434 A | 12/1997 | Nakagawa | 395/484 |
| 5,701,516 A | 12/1997 | Cheng et al. | 395/842 |
| 5,717,691 A * | 2/1998 | Dighe et al. | 370/401 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,771,349 A | 6/1998 | Picazo, Jr. et al. | 395/188.01 |
| 5,790,804 A | 8/1998 | Osborne | 395/200.75 |
| 5,794,061 A | 8/1998 | Hansen et al. | 395/800.01 |
| 5,802,580 A | 9/1998 | McAlpice | 711/149 |
| 5,809,328 A | 9/1998 | Nogales et al. | 395/825 |
| 5,812,775 A | 9/1998 | Van Seeters et al. | 395/200.43 |
| 5,815,646 A | 9/1998 | Purcell et al. | 395/163 |
| 5,878,225 A | 3/1999 | Bilansky et al. | 395/200.57 |
| 5,913,028 A | 6/1999 | Wang et al. | 395/200.33 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,991,299 A | 11/1999 | Radogna et al. | 370/392 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,026,452 A | 2/2000 | Pitts | 710/56 |
| 6,034,963 A | 3/2000 | Minami et al. | 370/401 |
| 6,044,438 A | 3/2000 | Olnowich | 711/130 |
| 6,047,356 A | 4/2000 | Anderson et al. | 711/129 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,094,712 A * | 7/2000 | Follett et al. | 711/203 |
| 6,141,705 A | 10/2000 | Anand et al. | 710/15 |
| 6,173,333 B1 * | 1/2001 | Jolitz et al. | 709/238 |
| 6,208,651 B1 * | 3/2001 | Van Renesse et al. | 370/392 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,247,068 B1 * | 6/2001 | Kyle | 719/328 |
| 6,289,023 B1 * | 9/2001 | Dowling et al. | 370/419 |
| 6,345,301 B1 | 2/2002 | Burns et al. | 709/230 |
| 6,490,631 B1 * | 12/2002 | Teich et al. | 709/250 |
| 2001/0004354 A1 | 6/2001 | Jolitz | |
| 2001/0025315 A1 | 9/2001 | Jolitz | |

FOREIGN PATENT DOCUMENTS

| | | |
|---|---|---|
| WO | WO/98/50852 | 11/1998 |
| WO | WO/99/04343 | 1/1999 |
| WO | WO99/65219 | 12/1999 |
| WO | WO 00/13091 | 3/2000 |
| WO | WO 01/04770 A2 | 1/2001 |
| WO | WO 01/05107 A1 | 1/2001 |
| WO | WO 01/05116 A2 | 1/2001 |
| WO | WO 01/05123 A1 | 1/2001 |
| WO | WO 01/40960 A1 | 6/2001 |

OTHER PUBLICATIONS

Van Renesse et al. "Masking the Overhead of Protocol Layering," Jun. 10, 1997, U.S. Appl. No. 60/049,146.*

Internet pages entitled "Hardware Assisted Protocol Processing", (which Eugene Feinberg is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet, 7 pages, printed May 27, 1997.

Internet pages entitled: A Guide to the Paragon XP/S-A7 Supercomputer at Indiana University, 13 pages, printed Dec. 21, 1998.

Richard Stevens, "TCP/IP Illustrated, vol. 1, The Protocols", pp. 325-326 (1994).

Internet pages entitled: *Northridge/Southbridge vs. Intel Hub Architecture*, 4 pages, printed Feb. 19, 2001.

Gigabit Ethernet Technical Brief, Achieving End-to-End Performance, Alteon Networks, Inc., First Edition, Sep. 1996.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web sitehttp://www.ireadyco.com/products, html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I-1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on Iready Technology," Santa Clara, CA and Chiba, Japan, Oct. 26, 1998, 2 pages, printed Nov. 2, 1998.

NEWSwatch article entitled "iReady internet Tuner to Web Enable Devices", Tuesday, Nov. 5, 1996, printed Nov. 2, 1998.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA-7110C-a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

U.S. Appl. No. 60/053,240, filed Jul. 18, 1997, Jolitz et al.

iSCSI HBA article entitled "FCE-3210/6410 32 and 64-bit PCI-to-Fibre Channel HBA", 6 pages, printed Oct. 1, 2001.

ISCSI.com article entitled "iSCSI Storage", 2 pages, printed Oct. 1, 2001.

"Two-Way TCP Traffic Over Rate Controlled Channels: Effects and Analysis", by Kalampoukas et al., IEEE Transactions on Networking, vol. 6, No. 6, Dec. 1998.

IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998.

U.S. Appl. No. 08/964,304, by Napolitano, et al., entitled "File Array Storage Architecture", filed Nov. 4, 1997.

"File System Design For An NFS File Server Appliance", Article by D. Hitz, et al., 13 pages, date not available.

Adaptec Press Release article entitled "Adaptec Announces EtherStorage Technology", 2 pages, May 4, 2000, printed Jun. 14, 2000.

Adaptec article entitled "EtherStorage Frequently Asked Questions", 5 pages, printed Jul. 19, 2000.

Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start-Up Battles Data Storage Botttleneck", by S. Taylor, dated Mar. 5, 2000, 2 pages, printed Mar. 7, 2000.

Internet-draft article entitled "SCSI/TCP (SCSI over TCP)", by J. Satran et al., 38 pages, dated Feb. 2000, printed May 19, 2000.

Internet pages entitled "Technical White Paper-Xpoint's Disk to LAN Acceleration Solution for Windows NT Server," 16 pages, printed Jun. 5, 1997.

Jato Technologies article entitled "Network Accelerator Chip Architecture," twelve-slide presentation, printed Aug. 19, 1998.

EETimes article entitled "Enterprise System Uses Flexible Spec," dated Aug. 10, 1998, printed Nov. 25, 1998.

Internet pages entitled "Smart Ethernet Network Interface Cards", which Berend Ozceri is developing, printed Nov. 25, 1998.

Internet pages of Xaqti corporation entitled "GigaPower Protocol Processor Product Review," printed Nov. 25, 1999.

Internet pages entitled "DART: Fast Application Level Networking via Data-Copy Avoidance," by Robert J. Walsh, printed Jun. 3, 1999.

Internet pages of InterProphet entitled "Frequently Asked Questions", by Lynne Jolitz, printed Jun. 14, 2000.

Internet pages entitled "iReady Products," printed Nov. 25, 1998.

Andrew S. Tanenbaum, "Computer Networks," Third Edition, 1996, ISBN 0-13-349945-6.

Form 10-K for Exelan, Inc., for the fiscal year ending Dec. 31, 1987 (10 pages).

Form 10-K for Exelan, Inc., for the fiscal year ending Dec. 31, 1988 (10 pages).

"Second Supplemental Information Disclosure Statement per 37 C.F.R. §1.97(i)", dated Jul. 29, 2002 relating to Exelan Inc. as submitted in U.S. Appl. No. 09/464,283.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

\* cited by examiner

| | | |
|---|---|---|
| ISR | 0x0 | Interrupt Status |
| IMR | 0x4 | Interrupt Mask |
| HBAR | 0x8 | Header Buffer Address |
| DBHR | 0xC | Data Buffer Handle |
| DBAR | 0x10 | Data Buffer Address |
| CBAR0 | 0x14 | Command Buffer Address XMT0 |
| CBAR1 | 0x18 | Command Buffer Address XMT1 |
| CBAR2 | 0x1C | Command Buffer Address XMT2 |
| CBAR3 | 0x20 | Command Buffer Address XMT3 |
| CBAR4 | 0x24 | Command Buffer Address RCV |
| RBAR | 0x28 | Response Buffer Address |

Example of incoming TCP pkt

Example of incoming ARP Frame

SRAM requirements for the Receive and Transmit engines:

| | | | |
|---|---|---|---|
| TCB buffers | 256 bytes | * 16 | 4096 |
| Header buffers | 128 bytes | * 16 | 2048 |
| TCB hash index | 16 bytes | * 256 | 4096 |
| Timers | | | 128 |
| DRAM Fifo queues | 128 bytes | * 16 | 2048 |
| | | | ~12K bytes |

Summary of the main loop of Receive:

```
forever {
        while there are any Receive events {
                if (a new event) {
                        if (no new context available)
                                ignore the event;
                }
                call appropriate event handler to service the event;
                this may make a waiting process runnable or set up
                a new process to be run (get free context, hddr buffer,
                TCB buffer, set the context up).
        }
        while any process contexts are runable {
                run them by jumping to the start/resume address;
                if (process complete)
                        free the context;
        }
}
```

FIG. 39

Summary of the main loop of Transmit:

```
forever {
        while there are any Transmit events {
                if (a new event) {
                        if (no new context available)
                                ignore the event;
                }
                call appropriate event handler to service the event;
                this may make a waiting process runnable or set up
                a new process to be run (get free context, hddr buffer,
                TCB buffer, set the context up).
        }
        while any process contexts are runable {
                run them by jumping to the start/resume address;
                if (process complete)
                        free the context;
        }
}
```

FIG. 41

Bit 31 - 24 Byte enable 7 - 0. Only the low order four bits are
valid for 32 bit addressing mode.
Bit 23 -   0 Memory access
           1 Configuration access
Bit 22 -   0 Read (to Host)
           1 Write (to Host)
Bit 21 - 1   Data Valid
Bit 20 - 16 Reserved
Bit 15 -   0 Address

FIG. 42

Configuration Space 1          SRAM Address Offset 00                             00
04                             04
08                             08
0C                             0C
10                             10
3C                             14

Configuration Space 2

00                             00
04                             18
08                             08
0C                             1C
10                             20
3C                             24

All other reads to configuration space will return 00.

FIG. 43

Bit 0 - 0   I/O accesses are not enabled
Bit 1 - 1   Memory accesses are enabled
Bit 2 - 1   Bus master is enabled
Bit 3 - 0   Special Cycle is not enabled
Bit 4 - 1   Memory Write and Invalidate is enabled
Bit 5 - 0   VGA palette snooping is not enabled
Bit 6 - 1   Parity checking is enabled
Bit 7 - 0   Address data stepping is not enabled
Bit 8 - SERR# is enabled
Bit 9 - 0   Fast back to back is not enabled

FIG. 44

Bit 5 - 1   66 MHz capable is enabled. This bit will be set if the INIC
            Detects the system running at 66 MHz on reset
Bit 6 - 0   User Definable Features is not enabled
Bit 7 - 1   Fast Back-to-Back slave transfers enabled
Bit 8 - 1   Parity Error enabled - This bit is initialized to 0
Bit 9,10 - 00 - Fast device select will be set if we are at 33 MHz
          01 - Medium device select will be set if we are at 66 MHz
Bit 11 - 1  Target Abort is implemented. Initialized to 0.
Bit 12 - 1  Target Abort is implemented. Initialized to 0.
Bit 13 - 1  Master Abort is implemented. Initialized to 0.
Bit 14 - 1  SERR# is implemented. Initialized to 0.
Bit 15 - 1  Parity error is implemented. Initialized to 0.

FIG. 45

| MODULE | DESCR | SPEED | AREA |
|---|---|---|---|
| Scratch RAM, | 1Kx128 sport, | 4.37 ns nom., | 06.77 mm$^2$ |
| WCS, | 8Kx49 sport, | 6.40 ns nom., | 18.29 mm$^2$ |
| MAP, | 128x7 sport, | 3.50 ns nom., | 00.24 mm$^2$ |
| ROM, | 1Kx49 32col, | 5.00 ns nom., | 00.45 mm$^2$ |
| REGs, | 512x32 tport, | 6.10 ns nom., | 03.49 mm$^2$ |
| Macs, | .75 mm$^2$ x 4 = | | 03.30 mm$^2$ |
| PLL, | .5 mm$^2$ = | | 00.55 mm$^2$ |
| MISC LOGIC, | 117,260 gates / (5035 gates / mm$^2$) = | | 23.29 mm$^2$ |
| TOTAL CORE | | | 56.22 mm$^2$ |

| | | | |
|---|---|---|---|
| (Core side)$^2$ | | = | 56.22 mm$^2$ |
| Core side | | = | 07.50 mm |
| Die side | = core side + 1.0 mm (I/O cells) | = | 08.50 mm |
| Die area | = 8.5 mm x 8.5 mm | = | 72.25 mm$^2$ |
| Pads needed | = 220 signals x 1.25 (vss, vdd) | = | 275 pins |
| LSI PBGA | | = | 272 pins |

FIG. 47

(10MB/s/100Base) x 2 (full duplex) x 4 connections = 80 MB/s
Average frame size = 512 B
Frame rate = 80MB/s / 512B = 156,250 frames / s
Cpu overhead / frame = (256B context read) + (64B header read) +
                          (128B context write) + (128B misc.) = 512B / frame
Total bandwidth = (512B in) + (512B out) + (512B Cpu) = 1536B / frame
Dram Bandwidth required = (1536B/frame) x (156,250 frames/s) = 240MB/s
Dram Bandwidth @ 60MHz = (32 bytes / 167ns) = 202MB/s
Dram Bandwidth @ 66MHz = (32 bytes / 150ns) = 224MB/s
PCI Bandwidth required = 80MB/s
PCI Bandwidth available @ 30 MHz, 32b, average = 46MB/s
PCI Bandwidth available @ 33 MHz, 32b, average = 50MB/s
PCI Bandwidth available @ 60 MHz, 32b, average = 92MB/s
PCI Bandwidth available @ 66 MHz, 32b, average = 100MB/s
PCI Bandwidth available @ 30 MHz, 64b, average = 92MB/s
PCI Bandwidth available @ 33 MHz, 64b, average = 100MB/s
PCI Bandwidth available @ 60 MHz, 64b, average = 184MB/s
PCI Bandwidth available @ 66 MHz, 64b, average = 200MB/s

FIG. 48

Receive frame interval = 512B / 40MB/s = 12.8us
Instructions / frame @ 60MHz = (12.8us/frame) / (50ns/instruction) = 256
instructions/frame
Instructions / frame @ 66MHz = (12.8us/frame) / (45ns/instruction) = 284
instructions/frame
Required instructions / frame = 250 instructions/frame

FIG. 49

INSTRUCTION-WORD FORMAT

| TYPE | [55:49] | [48:47] | [46:42] | [41:33] | [32:24] | [23:16] | [15:00] |
|---|---|---|---|---|---|---|---|
| Jcc | 0b0000000 | 0b00, | AluOp, | OpdASel, | OpdBSel, | TstSel, | Literal |
| Jmp | 0b0000000 | 0b01, | AluOp, | OpdASel, | OpdBSel, | FlgSel, | Literal |
| Jsr | 0b0000000 | 0b10, | AluOp, | OpdASel, | OpdBSel, | FlgSel, | Literal |
| Rts | 0b0000000 | 0b11, | AluOp, | OpdASel, | OpdBSel, | 0hff, | Literal |
| Nxt | 0b0000000 | 0b11, | AluOp, | OpdASel, | OpdBSel, | FlgSel, | Literal |
| Map | MapAddr | 0bXX, | 0bXXXXX, | 0bXXXXXXXXX, | 0bXXXXXXXXX, | 0hXX, | 0hXXXX |

FIG. 51

SEQUENCER BEHAVIOR

```
if (MapEn & (MapAddr != 0b0000000)){                    //re-map instr
        Stackc = Stackc;
        StackB = StackB;
        StackA = StackA;
        InstrAddr = 0h8000 | Pc[2:0] | (MapAddr << 3);
           Pc = InstrAddr + (Execute & ~DbgMd);
           Fetch = DbgMd ? DbgAddr:InstrAddr;
        DbgAddr = DbgAddr + (Execute & DbgMd);} else if (PgmCtrl == Jcc){                             //conditional jump
        Stackc = Stackc;
        StackB = StackB;
        StackA = StackA;
        InstrAddr = ~Tst@TstSel ? Pc:(AluDst==Pc) ? AluOut:Literal;
           Pc = InstrAddr + (Execute & ~DbgMd)
           Fetch = DbgMd ? DbgAddr:InstrAddr;
        DbgAddr = DbgAddr + (Execute & DbgMd);} else if (PgmCtrl == Jmp){                             //jump
        Stackc = Stackc;
        StackB = StackB;
        StackA = StackA;
        InstrAddr = (AluDst == Pc) ? AluOut:Literal;
           Pc = InstrAddr + (Execute & ~DbgMd)
           Fetch = DbgMd ? DbgAddr:InstrAddr;
        DbgAddr = DbgAddr + (Execute & DbgMd);} else if (PgmCtrl == Jsr){                             //jump subroutine
        Stackc = StackB;
        StackB = StackA;
        StackA = Pc;
        InstrAddr = (AluDst == Pc) ? AluOut:Literal;
           Pc = InstrAddr + (Execute & ~DbgMd)
           Fetch = DbgMd ? DbgAddr:InstrAddr;
        DbgAddr = DbgAddr + (Execute & DbgMd);} else if (FlgSel == Rts){                              //return subroutine
        InstrAddr = StackA;
        StackA = StackB;
        StackB = Stackc;
        Stackc = ErrVec;
           Pc = InstrAddr + (Execute & ~DbgMd)
           Fetch = DbgMd ? DbgAddr:InstrAddr;
        DbgAddr = DbgAddr + (Execute & DbgMd);} else  {
        InstrAddr = Pc;                                 //continue
        StackA = StackA;
        StackB = StackB;
        Stackc = Stackc;
           Pc = InstrAddr + (Execute & ~DbgMd)
           Fetch = DbgMd ? DbgAddr:InstrAddr;
        DbgAddr = DbgAddr + (Execute & DbgMd);}
```

FIG. 52

ALU OPERATIONS

| AluOp | OPERATION | |
|---|---|---|
| 0b00000 | A = (A & ~(1 << B));<br>C = 0; V = (B >= 32) ? 1:0; | //bit clear |
| 0b00001 | A = (A & B);<br>C = 0; V = 0; | //logical and |
| 0b00010 | A = (Literal & B);<br>C = 0; V = 0; | //logical and |
| 0b00011 | A = (~Literal & B);<br>C = 0; V = 0; | //logical and not |
| 0b00100 | A = (A | (1 << B));<br>C = 0; V = (B >= 32) ? 1:0; | //bit set |
| 0b00101 | A = (A | B);<br>C = 0; V = 0; | //logical or |
| 0b00110 | A = (Literal | B);<br>C = 0; V = 0; | //logical or |
| 0b00111 | A = (~Literal | B);<br>C = 0; V = 0; | //logical or not |
| 0b01000 | for (i=31; i>=0; i--) if B[i] continue; A=i;<br>C = 0; V = (B) ? 0:1; | //priority enc |
| 0b01001 | A = (A ^ B);<br>C = 0; V = 0; | //logical xor |
| 0b01010 | A = ({Literal} ^ B);<br>C = 0; V = 0; | //logical xor |
| 0b01011 | A = ({~Literal} ^ B);<br>C = 0; V = 0; | //logical xor not |
| 0b01100 | A = B;<br>C = 0; V = 0; | //move |
| 0b01101 | A = B[31:24] ^ B[23:16] ^ B[15:08] ^ B[07:00];<br>C = 0; V = 0; | //hash |
| 0b01110 | A = {B[23:16],B[31:24],B[07:00],B[15:08]};<br>C = 0; V = 0; | //swap bytes |
| 0b01111 | A = {B[15:00], B[31:16]};<br>C = 0; V = 0; | //swap doublets |

FIG. 53

| AluOp | FUNCTION | |
|---|---|---|
| 0b10000 | A = (A + B);<br>C = (A + B)[32]; V = 0; | //add B |
| 0b10001 | A = (A + B + C);<br>C = (A + B + C)[32]; V = 0; | //add B, carry |
| 0b10010 | A = (Literal + B);<br>C = (Literal + B)[32]; V = 0; | //add constant |
| 0b10011 | A = (-Literal + B);<br>C = (-Literal + B)[32]; V = 0; | //sub constant |
| 0b10100 | A = (A - B);<br>C = (A - B)[32]; V = 0; | //sub B |
| 0b10101 | A = (A - B - ~C);<br>C = (A - B - ~C)[32]; V = 0; | //sub B, borrow |
| 0b10110 | A = (-A + B);<br>C = (-A + B)[32]; V = 0; | //sub A |
| 0b10111 | A = (-A + B - ~C);<br>C = (-A + B - ~C)[32]; V = 0; | //sub A, borrow |
| 0b11000 | A = (A << B);<br>C = A[31]; V = (B >= 32) ? 0:1; | //shift left A |
| 0b11001 | A = (B << Literal);<br>C = B[31]; V = (Literal >= 32) ? 0:1; | //shift left B |
| 0b11010 | A = (B << 1);<br>C = B[31]; V = 0; | //shift left B |
| 0b11011 | n = (A - B);<br>C = (A - B)[32]; V = 0; | //compare |
| 0b11100 | A = (A >> B);<br>C = A[0]; V = (B >= 32) ? 1:0; | //shift right A |
| 0b11101 | A = (B >> Literal);<br>C = A[0]; V = (Literal >= 32) ? 1:0; | //shift right B |
| 0b11110 | A = (B >> 1);<br>C = A[0]; V = 0; | //shift right B |
| 0b11111 | n = (B - A);<br>C = (B - A)[32]; V = 0; | //compare |

FIG. 54

| OpdSel | SELECTED OPERANDs | |
|---|---|---|
| 0b0000aaaaa | File | File@(OpdSel[4:0] \| FileBase);<br>Allows paged access to any part of the register file. |
| 0b0001aaaaa | CpuReg | File@{2'b11, CpuId, OpdSel[4:0]};<br>Allows direct access to Cpu specific registers. |
| 0b001XXXXXX | reserved | Reserved for future expansion. |
| 0b0100000XX | CpuStatus | 0b0000000000000BHD00000000000000CC<br>This is a read-only register providing information about the Cpu executing (OpdSel[1:0]) cycles after the current cycle. "CC" represents a value indicating the Cpu. Currently, only CpuId values of 0, 1 and 2 are returned. "H" represents the current state of Hlt, "D" indicates DbgMd and "B" indicates BigMd. Writing this register has no effect. |
| 0b0100001XX | reserved | Reserved for future expansion. |
| 0b0100010XX | Pc | 0x0000AAAA<br>Writing to this address causes the program control logic to use AluOut as the new Pc value in the event of a Jmp, Jcc or Jsr instruction for the Cpu executing during the current cycle. If the current instruction is Nxt, Map, or Rts, the register write has no effect. Reading this register returns the value in Pc for the Cpu executing (OpdSel[1:0]) cycles after the current cycle. |
| 0b0100011XX | DbgAddr | 0xD000AAAA<br>Writing to this register alters the contents of the debug address register (DbgAddr) for the Cpu executing (OpdSel[1:0]) cycles after the current cycle. DbgAddr provides the fetch address for the control-store when DbgMd has been selected and the Cpu is executing. DbgAddr is also used as the control-store address when performing a WrWcs@DbgAddr or RdWcs@DbgAddr operation. "D" represents bit 31 of the register. It is a general purpose flag that is used for event indication during simulation. Reading this register returns a value of 0x00000000. |
| 0b01001XXXX | reserved | Reserved for future expansion. |
| 0b010100000 | RamAddr | {0b1CCC, 0x000, 0b1, AAAA}<br>RamAddr = AluOut[15] ? AluOut : (AluOut \| RamBase);<br>PrevCC  = AluOut[31] ? CCC    : AluCC;<br><br>A read/write register. When reading this register, the Alu condition codes from the previous instruction are returned together with RamAddr. |

| bit | name | description |
|---|---|---|
| 31 | | Always 1. |
| 30 | PrevC | Previous Alu Carry. |
| 29 | PrevV | Previous Alu Overflow. |
| 28 | PrevZ | Previous Alu Zero. |
| 27:16 | | Always 0. |
| 15 | | Always 1. |
| 14:0 | RamAddr | Contents of last Sram address used. |

When writing this register, if alu_out[31] is set, the previous condition codes will be overwritten with bits 30:28 of AluOut. If AluOut[15] is set, bits 14:0 will be written to the RamAddr. If AluOut [15] is not set, bits 14:0 will be ored with the contents of the RamBase and written to the RamAddr

FIG. 55

| OpdSel | SELECTED OPERANDs |
|---|---|
| 0b010100001 | AddrRegA    0x0000AAAA |

AddrRegA = AluOut;

A read/write operand which loads AddrRegA used to provide the address for read and write operations. When AddrRegA[15] is set, the contents will be presented directly to the ram. When AddrRegA[15] is reset, the contents will first be ored with the contents of the RamBase register before presentation to the ram. Writing to this register takes priority over Literal loads using FlgOp. Reading this register returns the current value of the register.

| | |
|---|---|
| 0b010100010 | AddrRegB  0x0000AAAA |

AddrRegB = AluOut;

A read/write operand which loads AddrRegB used to provide the address for read and write operations.
When AddrRegB[15] is set, the contents will be presented directly to the ram. When AddrRegB[15] is reset, the contents will first be ored with the contents of the RamBase register before presentation to the ram. Writing to this register takes priority over Literal loads using FlgOp. Reading this register returns the current value of the register.

| | |
|---|---|
| 0b010100011 | AddrRegAb    0x0000AAAA |

AddrRegA = AluOut; AddrRegB = AluOut;

A destination only operand which loads AddrRegB and AddrRegA used to provide the address for read and write operations Writing to this register takes priority over Literal loads using FlgOp. Reading this register returns the value 0x00000000.

| | |
|---|---|
| 0b010100100 | RamBase      0x0000AAAA |

RamBase = AluOut;

A read/write register which provides the base address for ram read and write cycles. When RamAddr[15] is set, the contents will not be used. When RamAddr[15] is reset, the contents will first be ored with the contents of the RamBase register before presentation to the ram. Reading this register returns the value for the current Cpu.

| | |
|---|---|
| 0b010100101 | FileBase           0b00000000000000000000000AAAAAAAA |

FileBase = AluOut;
FileAddr = OpdSel[8] ? OpdSel:(OpdSel + FileBase);

A read/write register which provides the base address for file read and write cycles. When OpdSel[8] is set, the contents will not be used and OpdSel will be presented directly to the address lines of the file. When OpdSel[8] is reset, the contents will first be ored with the contents of the FileBase register before presentation to the file. Reading this register returns the value for the current Cpu.

| | |
|---|---|
| 0b010100110 | InstrRegL    0xIIIIIIII |

This is a read-only register which returns the contents of InstrReg[31:0]. Writing to this register has no effect.

| | |
|---|---|
| 0b010100111 | InstrRegH    0x00IIIIII |

This is a read-only register which returns the contents of InstrReg[55:32]. Writing to this register has no effect.

FIG. 56

| OpdSel | SELECTED OPERANDs | |
|---|---|---|
| 0b010101000 | Minus1 | 0xffffffff<br>This is a read-only register which supplies a value 0xffffffff.. Writing to this register has no effect. |
| 0b010101001 | FreeTime | A free-running timer with a resolution of 1.00 microseconds and a maximum count of 71 minutes. This timer is cleared during reset. |
| 0b010101010 | LiteralL | Instr[15:0]<br>A read-only register. Writing to this register has no effect |
| 0b010101011 | LiteralH | Instr[15:0]<<16;<br>A read-only register. Writing to this register has no effect |

0b010101100  MacData - Writing to this address loads the AluOut data into the MacData register for use during Mac operations. The Mac operation, resulting from writing to the MacOp register, determines the definition of the MacData register contents as follows.

| MacOp | MacData definition |
|---|---|
| Mstop | 0bXXXXXXXXXXXXXXXXXXXXXXXXXXXXXXXX<br>MacData is not used for the StopM operation. |
| WrMcfg | hrstl, rsvd, rsvd, crcen, fulld, hrstl, hugen, nopre, paden, prtyl, xdl10, ipgr1[6:0],<br>ipgr2[6:0], ipgt[6:0].<br>Loads the MacCfg register with the contents of the MacData register. Refer to LSI Logic's *Ethernet-110 Core Technical Manual* for detailed definitions of these bits. |
| WrMrng | 0bXXXXXXXXXXXXXXXXXXXXXSSSSSSSSSSS<br>Loads seed[10:0] into the Mac's random number generator. |
| RdPhy | 0bXXXXRRRRXXXXPPPPXXXXXXXXXXXXXXXX<br>Reads register[R] of phy[P]. |
| WrPhy | 0bXXXXRRRRXXXXPPPPDDDDDDDDDDDDDDDD<br>Writes register[R] of phy[P] with MacData[15:0]. |

Reading this register returns prsd[15:0] of Mac0 which contains phy status data returned to the Mac at the completion of a RdPhy command. This data is invalid while MacBsy is asserted as a result of a RdPhy command. Refer to the appropriate phy technical manual for a definition of the phy register contents.

| OpdSel | SELECTED OPERANDs |
|---|---|
| 0b010101101 | MacOp - A write only register. Writing to this address loads the MacSel register and staRts execution of the specified operation as follows. |

| AluOut | description |
|---|---|
| 0xXXXXX0XM | Mstop - Halts execution of a MacOp for Mac[M]. The user must wait for MacBsy to be deasserted before issuing another command or changing the contents of MacData. |
| 0xXXXXX1XM | WrMcfg - Writes the contents of MacData to the MacCfg register of Mac[M]. The user must wait for MacBsy to be deasserted before issuing another command or changing the contents of MacData. |
| 0xXXXXX2XM | WrMrng - Writes the contents of MacData to the seed register of Mac[M]. The user must wait for MacBsy to be deasserted before issuing another command or changing the contents of MacData. |
| 0xXXXXX3XM | RdPhy - Reads the contents of reg[R] for phy[P] on the MII management bus of Mac[M]. The contents may be read from MacData after MacBsy has been deasserted. |
| 0xXXXXX4XM | WrPhy - Writes the contents of MacData[15:0] to e reg[R] of phy[P] on the MII management bus of Mac[M]. The user must wait for MacBsy to be deasserted before issuing another command or changing the contents of MacData. |
| 0xXXXXX8XM | WrAddrAL - Writes the contents of MacData[15:0] to MacAddrA[15:0] for Mac[M]. |
| 0xXXXXX9XM | WrAddrAH - Writes the contents of MacData[11:0] to MacAddrA[47:16] for Mac[M]. |
| 0xXXXXXaXM | WrAddrBL - Writes the contents of MacData[15:0] to MacAddrB[15:0] for Mac[M]. |
| 0xXXXXXbXM | WrAddrBH - Writes the contents of MacData[11:0] to MacAddrB[47:16] for Mac[M]. |

| | | |
|---|---|---|
| b010101110 | ChCmd | A write-only register. |

| bit | name | description |
|---|---|---|
| 31:11 | reserved | Data written to these bits is ignored. |
| 10:8 | command | 0 - Stops execution of the current operation and clears the corresponding event flag.<br>1 - Transfer data from ExtMem to ExtMem.<br>2 - Transfer data from Pci to ExtMem.<br>3 - Transfer data from ExtMem to Pci.<br>4 - Transfer data from Sram to ExtMem.<br>5 - Transfer data from ExtMem to Sram.<br>6 - Transfer data from Pci to Sram.<br>7 - Transfer data from Sram to Pci. |
| 07:05 | reserved | Data written to these bits is ignored. |
| 04:00 | ChId | Provides the channel number for the channel command. |

FIG. 58A

| | | | |
|---|---|---|---|
| 0b010101110 | ChEvnt | | A read-only register. |

| bit | name | description |
|---|---|---|
| 31:00 | ChDn | Each bit represents the done flag for the respective dma channel. These bits are set by a dma sequencer upon completion of the channel command. Cleared when the processor writes 0 to the corresponding ChCmd register. |

| | | | |
|---|---|---|---|
| 0b010101111 | GenEvnt | | A read-only register. |

| bit | name | description |
|---|---|---|
| 31 | PciRdEvnt | Indicates that a PCI initiator is attempting to read a mproc. register. |
| 30 | PciWrEvnt | Indicates that a PCI initiator has posted a write to a mproc. register. |
| 29 | TimeEvnt | An event which occurs once every 2.00 milliseconds. |
| 28:00 | reserved | Reserved for future use. |

| | | | |
|---|---|---|---|
| 0b010110000 | QCtrl | | A write-only register used to select and manipulate a Q. |

| bit | name | description |
|---|---|---|
| 31:11 | reserved | Data written to these bits are ignored. |
| 10:8 | QSz | Used only during InitQ operations to specify the size of the QBdy in Dram.<br>7 – Queue depth is 32K entries (128KB).<br>6 – Queue depth is 16K entries (64KB).<br>5 – Queue depth is 8K entries (32KB).<br>4 – Queue depth is 4K entries (16KB).<br>3 – Queue depth is 2K entries (8KB).<br>2 – Queue depth is 1K entries (4KB).<br>1 – Queue depth is 512 entries (2KB).<br>0 – Queue depth is 256 entries (1KB). |
| 7:5 | QOp | Specifies the queue operation to perform.<br>7 – DblQ    Disables all queues.<br>6 – EnQ      Enables all queues.<br>5 – RdBdy   Increments the QBdyRdPtr and increments the QTlWrPtr.<br>4 – WrBdy  Decrements the QBdyWrPtr and increments the QHdRdPtr.<br>3 – RdQ     Returns a queue entry in register QData..<br>2 – rsvd     Reserved. Not to be used.<br>1 – InitQ    Set the queue status to empty and initializes QSz.<br>0 – SelQ    Selects the QId to be utilized during writes to QData. |

FIG. 58B

| | | |
|---|---|---|
| 4:0 | QId | Specifies the queue on which to perform all operations except DblQ or EnQ. |
| 0b010110001 | QData | A read/write register. Writing this register will result in the data being pushed on to the selected queue. Reading this register fetches queue data popped off during the previous RdQ operation. |
| 0b010110010 | reserved | Reserved for future expansion. |
| 0b010110011 | XcvCtrl | A write-only register used to enable and disable Mac transmit and receive sub-channels. |

| bit | name | description |
|---|---|---|
| 31:09 | reserved | Data written to these bits are ignored. |
| 8 | enable | When set, indicates to the Mac transmit or receive sequencer that the subchannel contains a transmit or receive descriptor. |
| 07:05 | reserved | Data written to these bits is ignored. |
| 04 | RcvCh | Selects a Mac receive subchannel when set. Selects a Mac transmit subchannel when cleared. |
| 03 | reserved | Data written to this bit are ignored. |
| 02 | SubCh | Selects subchannel B when set or A when reset. |
| 01:00 | MacId | Provides the Mac number for the subchannel enable bit. |

| | | |
|---|---|---|
| 0b010110100 | Lru | 0x0000000A |
| | | A read/write operand indicating which of the 16 entries is least recently used. When Reading This register the least recently used entry is returned, after which it is automatically made the most recently used entry. This register should only be read in conjunction with a 'Move' operation of the ALU, else the results are unpredictable. Writing to this register forces the addressed entry to become the least recently used entry. |
| 0b010110101 | Mru | 0x0000000A |
| | | A write only operand forcing the addressed entry to become the most recently used entry. |
| 0b010111000 | QInRdy | A read-only register comprising QHd not full flags for each of the 32 queues. |
| 0b010111001 | QOutRdy | A read-only register comprising QTl not empty flags for each of the 32 queues. |
| 0b010111010 | QEmpty | A read-only register comprising QEmpty flags for each of the 32 queues. |
| 0b010111011 | QFull | A read-only register comprising QFull flags for each of the 32 queues. |
| 0b0101111XX | reserved | Reserved for future expansion. |
| 0b0110XXXXX | Constants | {0b000, OpdSel[4:0]} |
| 0b01110XXXX | reserved | Reserved for future expansion. |

FIG. 58C

| OpdSel | SELECTED OPERANDs |
|---|---|
| 0b01111XXXX | Sram OPERATIONS |

| OpdSel[3] | PostAddrOp |
|---|---|
| 0 | nop |
| 1 | RamAddr = RamAddr + (OpdSel[1:0]); |

| OpdSel[2] | transpose_Ctrl |
|---|---|
| 0 | don't transpose |
| 1 | transpose bytes |

| OpdSel[1:0] | RamOpdSz |
|---|---|
| 0 | quadlet |
| 1 | triplet |
| 2 | doublet |
| 3 | byte |

RAM READ ATTRIBUTES — SOURCE_OPERAND

| endian mode | trans-pose | byte offs | Sram data | sz=Q | sz=T | sz=D | sz=B |
|---|---|---|---|---|---|---|---|
| little | 0 | 0 | abcd | abcd | 0bcd | 00cd | 000d |
| little | 0 | 1 | abcX | trap | 0abc | 00bc | 000c |
| little | 0 | 2 | abXX | trap | trap | 00ab | 000b |
| little | 0 | 3 | aXXX | trap | trap | trap | 000a |
| little | 1 | 0 | abcd | dcba | 0dcb | 00dc | 000d |
| little | 1 | 1 | abcX | trap | 0cba | 00cb | 000c |
| little | 1 | 2 | abXX | trap | trap | 00ba | 000b |
| little | 1 | 3 | aXXX | trap | trap | trap | 000a |
| BIG | 0 | 0 | abcd | abcd | 0abc | 00ab | 000a |
| BIG | 0 | 1 | Xbcd | trap | 0bcd | 00bc | 000b |
| BIG | 0 | 2 | XXcd | trap | trap | 00cd | 000c |
| BIG | 0 | 3 | XXXd | trap | trap | trap | 000d |
| BIG | 1 | 0 | abcd | dcba | 0cba | 00ba | 000a |
| BIG | 1 | 1 | Xbcd | trap | 0dcb | 00cb | 000b |
| BIG | 1 | 2 | XXcd | trap | trap | 00dc | 000c |
| BIG | 1 | 3 | XXXd | trap | trap | trap | 000d |

RAM WRITE ATTRIBUTES — SOURCE_OPERAND

| endian mode | trans-pose | Opd size | Alu out | OF=0 | OF=1 | OF=2 | OF=3 |
|---|---|---|---|---|---|---|---|
| little | 0 | Q | abcd | abcd | trap | trap | trap |
| little | 0 | T | Xbcd | -bcd | bcd- | trap | trap |
| little | 0 | D | XXcd | --cd | -cd- | cd-- | trap |
| little | 0 | B | XXXd | ---d | --d- | -d-- | d--- |
| little | 1 | Q | abcd | dcba | trap | trap | trap |
| little | 1 | T | Xbcd | -dcb | dcb- | trap | trap |
| little | 1 | D | XXcd | --dc | -dc- | dc-- | trap |
| little | 1 | B | XXXd | ---d | --d- | -d-- | d--- |
| big | 0 | Q | abcd | abcd | trap | trap | trap |
| big | 0 | T | Xbcd | bcd- | -bcd | trap | trap |
| big | 0 | D | XXcd | cd-- | -cd- | --cd | trap |
| big | 0 | B | XXXd | d--- | -d-- | --d- | ---d |
| big | 1 | Q | abcd | dcba | trap | trap | trap |
| big | 1 | T | Xbcd | dcb- | -dcb | trap | trap |
| big | 1 | D | XXcd | dc-- | -dc- | --dc | trap |
| big | 1 | B | XXXd | d--- | -d-- | --d- | ---d |

| 0b1aaaaaaaa | File | File@OpdSel[8:0]; |
|---|---|---|
| | | Allows direct, non-paged, access to the top half of the register file. |

FIG. 59

| TstSel | SELECTED TEST | |
|---|---|---|
| 0bX00XXXXX | Tst = TstSel[7] ^ AluOut[TstSel[4:0]] | //Alu bit |
| 0bX0100000 | Tst = TstSel[7] ^ C | //carry |
| 0bX0100001 | Tst = TstSel[7] ^ V | //error |
| 0bX0100010 | Tst = TstSel[7] ^ Z | //zero |
| 0bX0100011 | Tst = TstSel[7] ^ (Z \| ~C) | //less or equal |
| 0bX0100100 | Tst = TstSel[7] ^ PrevC | //previous carry |
| 0bX0100101 | Tst = TstSel[7] ^ PrevV | //previous error |
| 0bX0100110 | Tst = TstSel[7] ^ PrevZ | //previous zero |
| 0bX0100111 | Tst = TstSel[7] ^ (PrevZ & Z) | //64b zero |
| 0bX0101000 | Tst = TstSel[7] ^ QOpDn | //queue op okay |
| 0bX0101001 | Tst = reserved | |
| 0bX010101X | Tst = reserved | |
| 0bX01011XX | Tst = reserved | |
| 0bX0110XXX | Tst = TstSel[7] ^ Lock[TstSel[2:0]]<br>Lock(TstSel[2:0]) = 1; | //tests the current value of<br>//the Lock then set it. |
| 0bX0111XXX | Tst = TstSel[7] ^ Lock[TstSel[2:0]] | //tests the value of Lock. |
| 0bX01XXXXX | Tst = reserved | |
| 0bX1XXXXXX | Tst = reserved | |

FIG. 60

| FlgSel | FLAG OPERATION | |
|---|---|---|
| 0b00000000 | No operation. | |
| 0b00000001 | SelfRst | Forces a self reset for the entire chip excluding the PCI configuration registers |
| 0b00000010 | SelBigEnd | Selects big-endian mode for ram accesses for the current Cpu. |
| 0b00000011 | SelLitEnd | Selects little-endian mode for ram accesses for the current Cpu. |
| 0b00000100 | DblMap | Disable instruction re-mapping for the current Cpu. |
| 0b00000101 | EnbMap | Enable instruction re-mapping for the current Cpu |
| 0b0000011X | reserved | |
| 0b00001XXX | reserved | |
| 0b00010XXX | ClrLck | Lock[FlgSel[2:0]] = 0; Clears the semaphore register bit for the current Cpu only. |
| 0b00011XXX | reserved | |
| 0b0010XXXX | AddrOp | |

| FlgSel[3:2] | AddrSelect | | |
|---|---|---|---|
| 0 | RamAddr = Literal[15] | ? Literal | (Literal | RamBase), |
| 1 | RamAddr = AddrRegA[15] | ? AddrRegA | (AddrRegA | RamBase); |
| 2 | RamAddr = AddrRegB[15] | ? AddrRegB | (AddrRegB | RamBase), |
| 3 | if (OpdA == RamAddr) RamAddr = AluOut[15] | ? AluOut | (AluOut | RamBase), |
|   | else if (OpdA == ram) RamAddr = AddrRegB[15] | ? AddrRegB | (AddrRegB | RamBase), |
|   | else RamAddr = AddrRegA[15] | ? AddrRegA | (AddrRegA | RamBase), |

| FlgSel[1:0] | addr reg load | |
|---|---|---|
| 0 | nop | |
| 1 | AddrRegA = Literal, | |
| 2 | AddrRegB = Literal, | |
| 3 | AddrRegA = Literal, | AddrRegB = Literal, | note: When specifying the same register for both the load and select fields, the current value of the register, before it is loaded with the new value, will be used for the ram address.

| FlgSel | Operation | Description |
|---|---|---|
| 0b0011XXXX | reserved | |
| 0b01000000 | WrWcsL@Dbg | Causes the bits [31:0] of the control-store at address DbgAddr to be written with the current AluOut data. |
| 0b01000001 | WrWcsH@Dbg | Causes the bits [63:32] of the control-store at address DbgAddr to be written with the current AluOut data then increments DbgAddr. |
| 0b01000010 | RdWcsL@Dbg | Causes the bits [31:0] of the control-store at address DbgAddr to be moved to file address 0x1ff. |
| 0b01000011 | RdWcsH@Dbg | Causes the bits [63:32] of the control-store at address DbgAddr to be moved to file address 0x1ff then increments DbgAddr. |
| 0b01000100 | reserved | |
| 0b010001XX | Step | Allows the Cpu (FlgSel[1:0]) cycles after the current cycle to execute a single instruction. There is no effect if the Cpu is not halted. An offset of 0 is not allowed. |
| 0b010010XX | PcMd | Selects the Pc as the address source for the control-store during instruction fetches for the Cpu (FlgSel[1:0]) cycles after the current cycle. |
| 0b010011XX | DbgMd | Selects the DbgAddr address register as the address source for the control-store during instruction fetches for the Cpu (FlgSel[1:0]) cycles after the current cycle. |
| 0b010100XX | Hlt | Halts the Cpu (FlgSel[1:0]) cycles after the current cycle. |
| 0b010101XX | Run | Clears Halt for the Cpu (FlgSel[1:0]) cycles after the current cycle. |
| 0b010011XXX | reserved | |
| 0b011XXXXX | reserved | |
| 0b1XXXXXXX | reserved | |

FIG. 61

RECEIVE BUFFER DESCRIPTOR

| bit | name | description |
|---|---|---|
| 31:30 | reserved | |
| 29:28 | size | A copy of the bits in the FreeBufDscr. |
| 27:00 | address | Represents the last address +1 to which frame data was transferred. The address wraps around at the boundary dictated by the S bits. This can be used to determine the size of the frame received. |

FIG. 89

TIME STAMP    OFFSET 0x0008:0x000B

| bit | name | description |
|---|---|---|
| 31:00 | RcvTime | The contents of FreeClk at the completion of the frame receive operation. |

FIG. 90

CHECKSUM    OFFSET 0x000C:0x000F

| bit | name | description |
|---|---|---|
| 31:16 | IpChksum | Reflects the value of the IP header checksum at frame completion or IP header completion. If an IP datagram was not detected, the checksum provides a total for the entire data portion of the received frame. The data area is defined as those bytes received after the type field of an ethernet frame, the LLC header of an 802.3 frame or the SNAP header of an 802.3-SNAP frame. |
| 15:00 | TcpChksum | Reflects the value of the transport checksum at IP completion or frame completion. If IP was detected but session was unknown, the checksum will not include the psuedo-header. If IP was not detected, the checksum will be 0x0000. |

RESERVED    OFFSET 0x0010:0x0011

FRAME Data    OFFSET 0x0012:END OF BUFFER

FIG. 91

RECEIVE BUFFER FORMAT

FRAME Status A  OFFSET 0x0000:0x0003

| bit | name | description |
|---|---|---|
| 31 | attention | Indicates one or more of the following: CompositeErr, !IpDn, !MacADet & !MacBDet, IpMcst, IpBcst, !ethernet & !802.3Snap, !Ip4, !Tcp . |
| 30 | CompositeErr | Set when any of the error bits of ErrStatus are set or if frame processing stops while receiving a Tcp or Udp header. |
| 29 | CtrlFrame | A control frame was received at our unicast or special MltCst address. |
| 28 | IpDn | Frame processing Hlted due to exhaustion of the IP4 length counter. |
| 27 | 802.3Dn | Frame processing Hlted due to exhaustion of the 802.3 length counter. |
| 26 | MacADet | Frame's destination address matched the contents of MacAddrA. |
| 25 | MacBDet | Frame's destination address matched the contents of MacAddrB. |
| 24 | MacMcst | The Mac detected a MltCst address. |
| 23 | MacBcst | The Mac detected a BrdCst address. |
| 22 | IpMcst | The frame processor detected an IP MltCst address. |
| 21 | IpBcst | The frame processor detected an IP BrdCst address. |
| 20 | Frag | The frame processor detected a Frag IP datagram. |
| 19 | IpOffst | The frame processor detected a non-zero IP datagram offset. |
| 18 | IpFlgs | The frame processor detected flags within the IP datagram. |
| 17 | IpOpts | The frame processor detected a header length greater than 20 for the IP datagram. |
| 16 | TcpFlgs | The frame processor detected an abnormal header flag for the TCP segment. |
| 15 | TcpOpts | The frame processor detected a header length greater than 20 for the TCP segment. |
| 14 | TcpUrg | The frame processor detected a non-zero urgent pointer for the TCP segment. |
| 13 | CarrierEvnt | Refer to *E110 Technical Manual*. |
| 12 | LongEvnt | Refer to *E110 Technical Manual*. |
| 11 | FrameLost | Set when an incoming frame could not be processed as a result of an outstanding frame completion event not yet serviced by the utility processor. |
| 10 | reserved | |
| 10 | NoAck | |
| 09:08 | FrameTyp | The frame processor detected a<br>00 - Reserved.  01- ethernet.  10 - 802.3.  11 - 802.3 Snap. |
| 07:06 | NwkTyp | 00 - Unknown.  01- Ip4.  10 - Ip6  11 - ip other. |
| 05:04 | TrnsptTyp | 00 - Unknown.  01- reserved.  10 - Tcp  11 - Udp |
| 03 | NetBios | A NetBios frame was detected. |
| 02 | reserved | |
| 01:00 | channel | The Mac on which this frame was received. |

FRAME Status B  OFFSET 0x0004:0x0007

| bit | name | description |
|---|---|---|
| 31 | 802.3Shrt | End of frame was encountered before the 802.3 length count was exhausted. |
| 30 | BufOvr | The frame length exceded the buffer space available. |
| 29 | BadPkt | Refer to *E110 Technical Manual*. |
| 28 | InvldPrmbl | Refer to *E110 Technical Manual*. |
| 27 | CrcErr | Refer to *E110 Technical Manual*. |
| 26 | DrblNbbl | Refer to *E110 Technical Manual*. |
| 25 | CodeErr | Refer to *E110 Technical Manual*. |
| 24 | IpHdrShrt | The IP4 header length field contained a value less than 0x5. |
| 23 | IpIncmplt | The frame terminated before the IP length counter was exhausted. |
| 22 | IpSumErr | The IP header checksum was not 0xffff at the completion of the IP header read. |
| 21 | TcpSumErr | The session checksum was not 0xffff at the termination of session processing. |
| 20 | TcpHdrShrt | The TCP header length field contained a value less than 0x5. |
| 19:16 | PrcssCd | The state of the frame processor at the time the frame processing terminated.<br>0b0000 Processing Mac header.<br>0b0001 Processing 802.3 LLC header.<br>0b0010 Processing 802.3 SNAP header.<br>0b0011 Processing unknown network data.<br>0b0100 Processing IP header.<br>0b0101 Processing IP data (unknown transport).<br>0b0110 Processing transport header (IP data).<br>0b0111 Processing transport data (IP data).<br>0b1000 Processing IP processing complete.<br>0b1001 Reserved.<br>0b101x Reserved.<br>0b11xx Reserved. |
| 15:08 | MacHsh | The Mac destination-address hash. Refer to *E110 Technical Manual*. |
| 07:00 | CtxHsh | The 8-bit context-hash generated by exclusive-oring all bytes of the IP source address, IP destination-address, transport source port and the transport destination port. |

FIG. 92

TRANSMIT BUFFER DESCRIPTOR

| bit   | name     | description |
|-------|----------|-------------|
| 31    | ChksumEn | When set, XmtSeq will insert a calculated checksum. When reset, XmtSeq will not alter the outgoing data stream. |
| 30    | reserved | |
| 29:28 | size     | Represents the size of the buffer by indicating at what boundary the buffer should start and terminate. This is used in combination with EndAddr to determine the starting address of the buffer : <br><br> S = 0    256B boundary. A[7:0] ignored. <br> S = 1    2KB boundary. A[10:0] ignored. <br> S = 2    4KB boundary. A[11:0] ignored. <br> S = 3    32KB boundary. A[14:0] ignored. |
| 27:00 | EndAddr  | The address of the last byte to transmit plus one. |

FIG. 95

TRANSMIT BUFFER FORMAT

CHECKSUM PRIMER    OFFSET 0x0000:0x0003

| bit   | name   | description |
|-------|--------|-------------|
| 31:00 | Primer | A value to be added during checksum accumulation. For IPV4, this should include the psuedo-header values, protocol and Tcp-length. |

RESERVED            OFFSET 0x0004:0x0005

FRAME Data       OFFSET 0x0006:END OF BUFFER

FIG. 96

TRANSMIT Status VECTOR

| bit   | name          | description |
|-------|---------------|-------------|
| 31    | LnkErr        | Indicates that a link status error occured before or during transmit. |
| 30:15 | reserved      | |
| 14    | ExcessDeferral| Refer to *E110 Technical Manual*. |
| 13    | LateAbort     | Refer to *E110 Technical Manual*. |
| 12    | ExcessColl    | Refer to *E110 Technical Manual*. |
| 11    | UnderRun      | Refer to *E110 Technical Manual*. |
| 10    | ExcessLgth    | Refer to *E110 Technical Manual*. |
| 09    | Okay          | Refer to *E110 Technical Manual*. |
| 08    | deferred      | Refer to *E110 Technical Manual*. |
| 07    | BrdCst        | Refer to *E110 Technical Manual*. |
| 06    | MltCst        | Refer to *E110 Technical Manual*. |
| 05    | CrcErr        | Refer to *E110 Technical Manual*. |
| 04    | LateColl      | Refer to *E110 Technical Manual*. |
| 03:00 | CollCnt       | Refer to *E110 Technical Manual*. |

FIG. 97

DMA OPERATIONS

| dma seq # | name | description |
|---|---|---|
| 0 | none | This is a no operation address. |
| 1 | D2dSeq | Moves data from ExtMem to ExtMem. |
| 2 | D2sSeq | Moves data from ExtMem bus to sram. |
| 3 | D2pSeq | Moves data from ExtMem to Pci bus. |
| 4 | S2dSeq | Moves data from sram to ExtMem. |
| 5 | S2pSeq | Moves data from sram to Pci bus. |
| 6 | P2dSeq | Moves data from Pci bus to ExtMem. |
| 7 | P2sSeq | Moves data from Pci bus to sram. |

FIG. 100

| bit | name | description |
|---|---|---|
| 31:11 | reserved | Data written to these bits is ignored. |
| 10:8 | ChCmd | 0 - Stops execution of the current operation and clears the corresponding event flag.<br>1 - Transfer data from ExtMem to ExtMem.<br>2 - Transfer data from ExtMem bus to sram.<br>3 - Transfer data from ExtMem to Pci bus.<br>4 - Transfer data from sram to ExtMem.<br>5 - Transfer data from sram to Pci bus.<br>6 - Transfer data from Pci bus to ExtMem.<br>7 - Transfer data from Pci bus to Sram. |
| 07:05 | reserved | Data written to these bits is ignored. |
| 04:00 | ChId | Provides the channel number for the channel command. |

FIG. 101

| bit | name | description |
|---|---|---|
| 127:96 | PciAddrH | Bits [63:32] of the Pci address. |
| 95:64 | PciAddrL | Bits [31:00] of the Pci address. |
| 59:32 | MemAddr | Bits [27:00] of the ExtMem address or bits [15:00] of the Sram address. |
| 31 | PciEndian | When set, selects big endian mode for Pci transfers. |
| 30 | WideDbl | When set, disables Pci 64-bit mode. |
| 22 | DstFlash | Selects Flash for the external memory destination of P2d. |
| 15:00 | XfrSz | Bits [15:00] of the requested dma size expressed in bytes. |

FIG. 102

| bit | name | description |
|---|---|---|
| 123:96 | MemAddr | Bits [27:00] of the ExtMem address or bits [15:00] of the Sram address. |
| 95:64 | PciAddrH | Bits [63:32] of the Pci address. |
| 63:32 | PciAddrL | Bits [31:00] of the Pci address. |
| 30 | SrcFlash | Selects Flash for the external memory source of D2p. |
| 23 | PciEndian | When set, selects big endian mode for Pci transfers. |
| 22 | WideDbl | When set, disables Pci 64-bit mode. |
| 15:00 | XfrSz | Bits [15:00] of the requested dma size expressed in bytes. |

FIG. 103

| bit | name | description |
|---|---|---|
| 127:124 | reserved | Reserved for future use. |
| 123:96 | SrcAddr | Bits [27:00] of the ExtMem address or bits [15:00] of the Sram address. |
| 95:60 | reserved | Reserved for future use. |
| 59:32 | DstAddr | Bits [27:00] of the ExtMem address or bits [15:00] of the Sram address. |
| 30 | FlashSel | Selects Flash for the external memory source of D2d or D2s. |
| 22 | FlashSel | Selects Flash for the external memory destination of S2p or D2d. |
| 15:00 | XfrSz | Bits [15:00] of the requested dma size expressed in bytes. |

FIG. 104

| bit | name | description |
|---|---|---|
| 127:64 | reserved | Not used. |
| 63:32 | ChkSum | Represents the 1's compliment sum of all halfwords transferred during a P2d or D2d operation only. |
| 31:24 | reserved | Reserved for future use. |
| 23:20 | SrcStatus | TBD. |
| 19:16 | DstStatus | TBD. |
| 15:00 | XfrSz | Bits [15:00] of the residual dma size expressed in bytes. This value will be zero if the dma operation was successful |

FIG. 105

| bit | name | description |
|---|---|---|
| 31:00 | ChDn | Each bit represents the done flag for the respective dma channel. These bits are set by a dma sequencer upon completion of the channel command. Cleared when the processor writes 0 to the corresponding ChCmd register ChCmdOp field. |

FIG. 106

TCP OFFLOAD NETWORK INTERFACE DEVICE

CROSS-REFERENCE TO RELATED APPLICATIONS

This application claims the benefit under 35 U.S.C. §120 of (is a continuation-in-part of) U.S. patent application Ser. No. 10/092,967, entitled "FAST-PATH APPARATUS FOR RECEIVING DATA CORRESPONDING TO A TCP CONNECTION," filed Mar. 6, 2002 now U.S. Pat. No. 6,591,302, by Laurence B. Boucher et al., which in turn claims the benefit under 35 U.S.C. §120 of (is a continuation-in-part of) U.S. patent application Ser. No. 10/023,240, entitled "TRANSMIT FAST-PATH PROCESSING ON TCP/IP OFFLOAD NETWORK INTERFACE DEVICE," filed Dec. 17, 2001 now U.S. Pat. No. 6,965,941, by Laurence B. Boucher et al., which in turn claims the benefit under 35 U.S.C. §120 of (is a continuation-in-part of) U.S. patent application Ser. No. 09/464,283, now U.S. Pat. No. 6,427,173, entitled "INTELLIGENT NETWORK INTERFACE DEVICE AND SYSTEM FOR ACCELERATED COMMUNICATION", filed Dec. 15, 1999, by Laurence B. Boucher et al., which in turn claims the benefit under 35 U.S.C. §120 of (is a continuation-in-part of) U.S. patent application Ser. No. 09/439,603, now U.S. Pat. No. 6,247,060, entitled "INTELLIGENT NETWORK INTERFACE SYSTEM AND METHOD FOR ACCELERATED PROTOCOL PROCESSING", filed Nov. 12, 1999, by Laurence B. Boucher et al., which in turn claims the benefit under 35 U.S.C. §120 of (is a continuation-in-part of) U.S. patent application Ser. No. 09/067,544, now U.S. Pat. No. 6,226,680, entitled "INTELLIGENT NETWORK INTERFACE SYSTEM AND METHOD FOR ACCELERATED PROTOCOL PROCESSING", filed Apr. 27, 1998, which in turn claims the benefit under 35 U.S.C. §119(e)(1) of the Provisional Application filed under 35 U.S.C. §111(b) entitled "INTELLIGENT NETWORK INTERFACE CARD AND SYSTEM FOR PROTOCOL PROCESSING," Ser. No. 60/061,809, filed on Oct. 14, 1997.

This application also claims the benefit under 35 U.S.C. §120 of (is a continuation-in-part of) U.S. patent application Ser. No. 09/384,792, now U.S. Pat. No. 6,434,620, entitled "TCP OFFLOAD NETWORK INTERFACE DEVICE," filed Aug. 27, 1999, which in turn claims the benefit under 35 U.S.C. §120 of (is a continuation-in-part of) U.S. patent application Ser. No. 09/141,713, now U.S. Pat. No. 6,389,479, entitled "INTELLIGENT NETWORK INTERFACE DEVICE AND SYSTEM FOR ACCELERATED PROTOCOL PROCESSING", filed Aug. 28, 1998, which both claim the benefit under 35 U.S.C. § 119(e)(1) of the Provisional Application filed under 35 U.S.C. §111(b) entitled "INTELLIGENT NETWORK INTERFACE DEVICE AND SYSTEM FOR ACCELERATED COMMUNICATION," Ser. No. 60/098,296, filed Aug. 27, 1998.

This application also claims the benefit under 35 U.S.C. §120 of (is a continuation-in-part of) U.S. patent application Ser. No. 09/416,925, now U.S. Pat. No. 6,470,415, entitled "QUEUE SYSTEM FOR MICROPROCESSORS," filed Oct. 13, 1999, (is a continuation-in-part of) U.S. patent application Ser. No. 09/514,425, now U.S. Pat. No. 6,427,171, entitled "PROTOCOL PROCESSING STACK FOR USE WITH INTELLIGENT NETWORK INTERFACE CARD," filed Feb. 28, 2000, (is a continuation-in-part of) U.S. patent application Ser. No. 09/675,484, now U.S. Pat. No. 6,807,581, entitled "INTELLIGENT NETWORK STORAGE INTERFACE SYSTEM," filed Sep. 29, 2000, (is a continuation-in-part of) U.S. patent application Ser. No. 09/675,700, entitled "INTELLIGENT NETWORK STORAGE INTERFACE DEVICE," filed Sep. 29, 2000, (is a continuation-in-part of) U.S. patent application Ser. No. 09/789,366, now U.S. Pat. No. 6,757,746, entitled "OBTAINING A DESTINATION ADDRESS SO THAT A NETWORK INTERFACE DEVICE CAN WRITE NETWORK DATA WITHOUT HEADERS DIRECTLY INTO HOST MEMORY," filed Feb. 20, 2001, (is a continuation-in-part of) U.S. patent application Ser. No. 09/801,488, now U.S. Pat. No. 6,687,758, entitled "PORT AGGREGATION FOR NETWORK CONNECTIONS THAT ARE OFFLOADED TO NETWORK INTERFACE DEVICES," filed Mar. 7, 2001, (is a continuation-in-part of) U.S. patent application Ser. No. 09/802,551, entitled "INTELLIGENT NETWORK STORAGE INTERFACE SYSTEM," filed Mar. 9, 2001, (is a continuation-in-part of) U.S. patent application Ser. No. 09/802,426, entitled "REDUCING DELAYS ASSOCIATED WITH INSERTING A CHECKSUM INTO A NETWORK MESSAGE," filed Mar. 9, 2001, (is a continuation-in-part of) U.S. patent application Ser. No. 09/802,550, now U.S. Pat. No. 6,658,480, entitled "INTELLIGENT NETWORK INTERFACE SYSTEM AND METHOD FOR ACCELERATED PROTOCOL PROCESSING," filed Mar. 9, 2001, (is a continuation-in-part of) U.S. patent application Ser. No. 09/855,979, entitled "NETWORK INTERFACE DEVICE EMPLOYING DMA COMMAND QUEUE," filed Mar. 14, 2001, (is a continuation-in-part of) U.S. patent application Ser. No. 09/970,124, entitled "NETWORK INTERFACE DEVICE THAT FAST-PATH PROCESSES SOLICITED SESSION LAYER READ COMMANDS," filed Oct. 2, 2001.

The subject matter of all of the above-identified patent applications (including the subject matter in the Microfiche Appendix of U.S. application Ser. No. 09/464,283), and of the two above-identified provisional applications, is incorporated by reference herein.

REFERENCE TO COMPACT DISC APPENDIX

The Compact Disc Appendix (CD Appendix), which is a part of the present disclosure, includes three folders, designated CD Appendix A, CD Appendix B, and CD Appendix C on the compact disc. CD Appendix A contains a hardware description language (verilog code) description of an embodiment of a receive sequencer. CD Appendix B contains microcode executed by a processor that operates in conjunction with the receive sequencer of CD Appendix A. CD Appendix C contains a device driver executable on the host as well as ATCP code executable on the host. A portion of the disclosure of this patent document contains material (other than any portion of the "free BSD" stack included in CD Appendix C) which is subject to copyright protection. The copyright owner of that material has no objection to the facsimile reproduction by anyone of the patent document or the patent disclosure, as it appears in the Patent and Trademark Office patent files or records, but otherwise reserves all copyright rights.

TECHNICAL FIELD

The present invention relates generally to computer or other networks, and more particularly to processing of information communicated between hosts such as computers connected to a network.

BACKGROUND

The advantages of network computing are increasingly evident. The convenience and efficiency of providing information, communication or computational power to individuals at their personal computer or other end user devices has led to rapid growth of such network computing, including internet as well as intranet devices and applications.

As is well known, most network computer communication is accomplished with the aid of a layered software architecture for moving information between host computers connected to the network. The layers help to segregate information into manageable segments, the general functions of each layer often based on an international standard called Open Systems Interconnection (OSI). OSI sets forth seven processing layers through which information may pass when received by a host in order to be presentable to an end user. Similarly, transmission of information from a host to the network may pass through those seven processing layers in reverse order. Each step of processing and service by a layer may include copying the processed information. Another reference model that is widely implemented, called TCP/IP (TCP stands for transport control protocol, while IP denotes internet protocol) essentially employs five of the seven layers of OSI.

Networks may include, for instance, a high-speed bus such as an Ethernet connection or an internet connection between disparate local area networks (LANs), each of which includes multiple hosts, or any of a variety of other known means for data transfer between hosts. According to the OSI standard, physical layers are connected to the network at respective hosts, the physical layers providing transmission and receipt of raw data bits via the network. A data link layer is serviced by the physical layer of each host, the data link layers providing frame division and error correction to the data received from the physical layers, as well as processing acknowledgment frames sent by the receiving host. A network layer of each host is serviced by respective data link layers, the network layers primarily controlling size and coordination of subnets of packets of data.

A transport layer is serviced by each network layer and a session layer is serviced by each transport layer within each host. Transport layers accept data from their respective session layers and split the data into smaller units for transmission to the other host's transport layer, which concatenates the data for presentation to respective presentation layers. Session layers allow for enhanced communication control between the hosts. Presentation layers are serviced by their respective session layers, the presentation layers translating between data semantics and syntax which may be peculiar to each host and standardized structures of data representation. Compression and/or encryption of data may also be accomplished at the presentation level. Application layers are serviced by respective presentation layers, the application layers translating between programs particular to individual hosts and standardized programs for presentation to either an application or an end user. The TCP/IP standard includes the lower four layers and application layers, but integrates the functions of session layers and presentation layers into adjacent layers. Generally speaking, application, presentation and session layers are defined as upper layers, while transport, network and data link layers are defined as lower layers.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, devices and programs commonly employed, each layer is necessary to insure that the data can make it to the intended destination in the appropriate form, regardless of variations in hardware and software that may intervene.

In preparing data for transmission from a first to a second host, some control data is added at each layer of the first host regarding the protocol of that layer, the control data being indistinguishable from the original (payload) data for all lower layers of that host. Thus an application layer attaches an application header to the payload data and sends the combined data to the presentation layer of the sending host, which receives the combined data, operates on it and adds a presentation header to the data, resulting in another combined data packet. The data resulting from combination of payload data, application header and presentation header is then passed to the session layer, which performs required operations including attaching a session header to the data and presenting the resulting combination of data to the transport layer. This process continues as the information moves to lower layers, with a transport header, network header and data link header and trailer attached to the data at each of those layers, with each step typically including data moving and copying, before sending the data as bit packets over the network to the second host.

The receiving host generally performs the converse of the above-described process, beginning with receiving the bits from the network, as headers are removed and data processed in order from the lowest (physical) layer to the highest (application) layer before transmission to a destination of the receiving host. Each layer of the receiving host recognizes and manipulates only the headers associated with that layer, since to that layer the higher layer control data is included with and indistinguishable from the payload data. Multiple interrupts, valuable central processing unit (CPU) processing time and repeated data copies may also be necessary for the receiving host to place the data in an appropriate form at its intended destination.

The above description of layered protocol processing is simplified, as college-level textbooks devoted primarily to this subject are available, such as Computer Networks, Third Edition (1996) by Andrew S. Tanenbaum, which is incorporated herein by reference. As defined in that book, a computer network is an interconnected collection of autonomous computers, such as internet and intranet devices, including local area networks (LANs), wide area networks (WANs), asynchronous transfer mode (ATM), ring or token ring, wired, wireless, satellite or other means for providing communication capability between separate processors. A computer is defined herein to include a device having both logic and memory functions for processing data, while computers or hosts connected to a network are said to be heterogeneous if they function according to different operating devices or communicate via different architectures.

As networks grow increasingly popular and the information communicated thereby becomes increasingly complex and copious, the need for such protocol processing has increased. It is estimated that a large fraction of the processing power of a host CPU may be devoted to controlling protocol processes, diminishing the ability of that CPU to perform other tasks. Network interface cards have been developed to help with the lowest layers, such as the physical and data link layers. It is also possible to increase protocol processing speed by simply adding more processing power or CPUs according to conventional arrangements. This solution, however, is both awkward and expensive. But the complexities presented by various networks, protocols, architectures, operating devices and applications generally require extensive processing to afford communication capability between various network hosts.

SUMMARY OF THE INVENTION

The current invention provides a device for processing network communication that greatly increases the speed of that processing and the efficiency of transferring data being communicated. The invention has been achieved by questioning the long-standing practice of performing multilayered protocol processing on a general-purpose processor. The protocol processing method and architecture that results effectively collapses the layers of a connection-based, layered architecture such as TCP/IP into a single wider layer which is able to send network data more directly to and from a desired location or buffer on a host. This accelerated processing is provided to a host for both transmitting and receiving data, and so improves performance whether one or both hosts involved in an exchange of information have such a feature.

The accelerated processing includes employing representative control instructions for a given message that allow data from the message to be processed via a fast-path which accesses message data directly at its source or delivers it directly to its intended destination. This fast-path bypasses conventional protocol processing of headers that accompany the data. The fast-path employs a specialized microprocessor designed for processing network communication, avoiding the delays and pitfalls of conventional software layer processing, such as repeated copying and interrupts to the CPU. In effect, the fast-path replaces the states that are traditionally found in several layers of a conventional network stack with a single state machine encompassing all those layers, in contrast to conventional rules that require rigorous differentiation and separation of protocol layers. The host retains a sequential protocol processing stack which can be employed for setting up a fast-path connection or processing message exceptions. The specialized microprocessor and the host intelligently choose whether a given message or portion of a message is processed by the microprocessor or the host stack.

One embodiment is a method of generating a fast-path response to a packet received onto a network interface device where the packet is received over a TCP/IP network connection and where the TCP/IP network connection is identified at least in part by a TCP source port, a TCP destination port, an IP source address, and an IP destination address. The method comprises: 1) Examining the packet and determining from the packet the TCP source port, the TCP destination port, the IP source address, and the IP destination address; 2) Accessing an appropriate template header stored on the network interface device. The template header has TCP fields and IP fields; 3) Employing a finite state machine that implements both TCP protocol processing and IP protocol processing to fill in the TCP fields and IP fields of the template header; and 4) Transmitting the fast-path response from the network interface device. The fast-path response includes the filled in template header and a payload. The finite state machine does not entail a TCP protocol processing layer and a discrete IP protocol processing layer where the TCP and IP layers are executed one after another in sequence. Rather, the finite state machine covers both TCP and IP protocol processing layers.

In one embodiment, buffer descriptors that point to packets to be transmitted are pushed onto a plurality of transmit queues. A transmit sequencer pops the transmit queues and obtains the buffer descriptors. The buffer descriptors are then used to retrieve the packets from buffers where the packets are stored. The retrieved packets are then transmitted from the network interface device. In one embodiment, there are two transmit queues, one having a higher transmission priority than the other. Packets identified by buffer descriptors on the higher priority transmit queue are transmitted from the network interface device before packets identified by the lower priority transmit queue.

Other structures and methods are disclosed in the detailed description below. This summary does not purport to define the invention. The invention is defined by the claims.

BRIEF DESCRIPTION OF THE DRAWINGS

FIGS. 24-33, 34A-A, 35-57, 58A-C, and 59-107 are associated with the description below entitled "Disclosure From Provisional Application No. 60/061,809."

DETAILED DESCRIPTION

Figure 1:
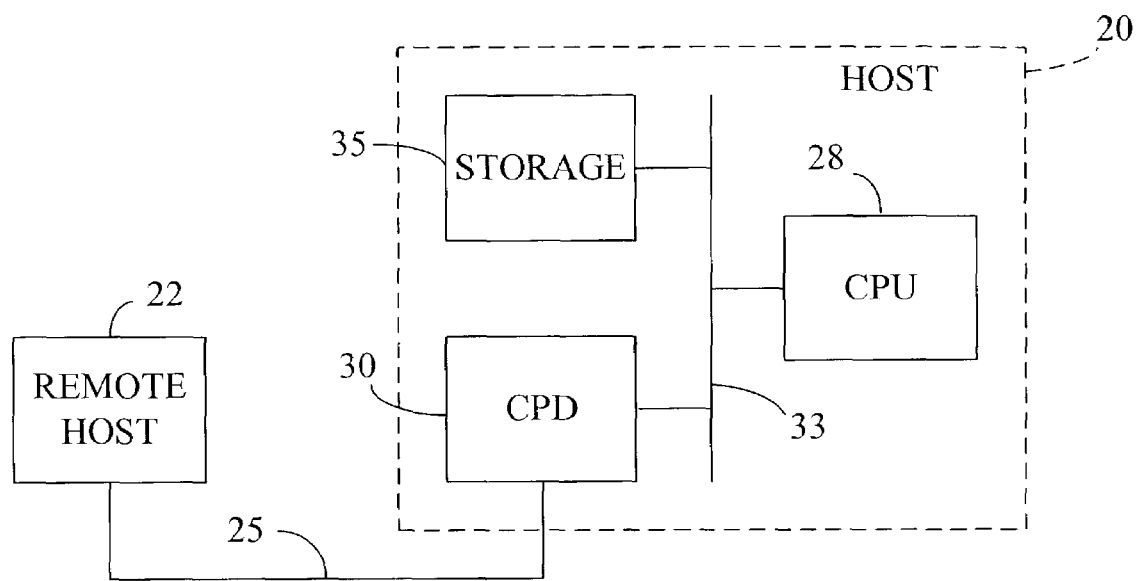
FIG. 1 is a plan view diagram of a device of the present invention, including a host computer having a communication-processing device for accelerating network communication.

FIG. 1 shows a host 20 of the present invention connected by a network 25 to a remote host 22. The increase in processing speed achieved by the present invention can be provided with an intelligent network interface card (INIC) that is easily and affordably added to an existing host, or with a communication processing device (CPD) that is integrated into a host, in either case freeing the host CPU from most protocol processing and allowing improvements in other tasks performed by that CPU. The host 20 in a first embodiment contains a CPU 28 and a CPD 30 connected by a host bus 33. The CPD 30 includes a microprocessor designed for processing communication data and memory buffers controlled by a direct memory access (DMA) unit. Also connected to the host bus 33 is a storage device 35, such as a semiconductor memory or disk drive, along with any related controls.

Figure 2:
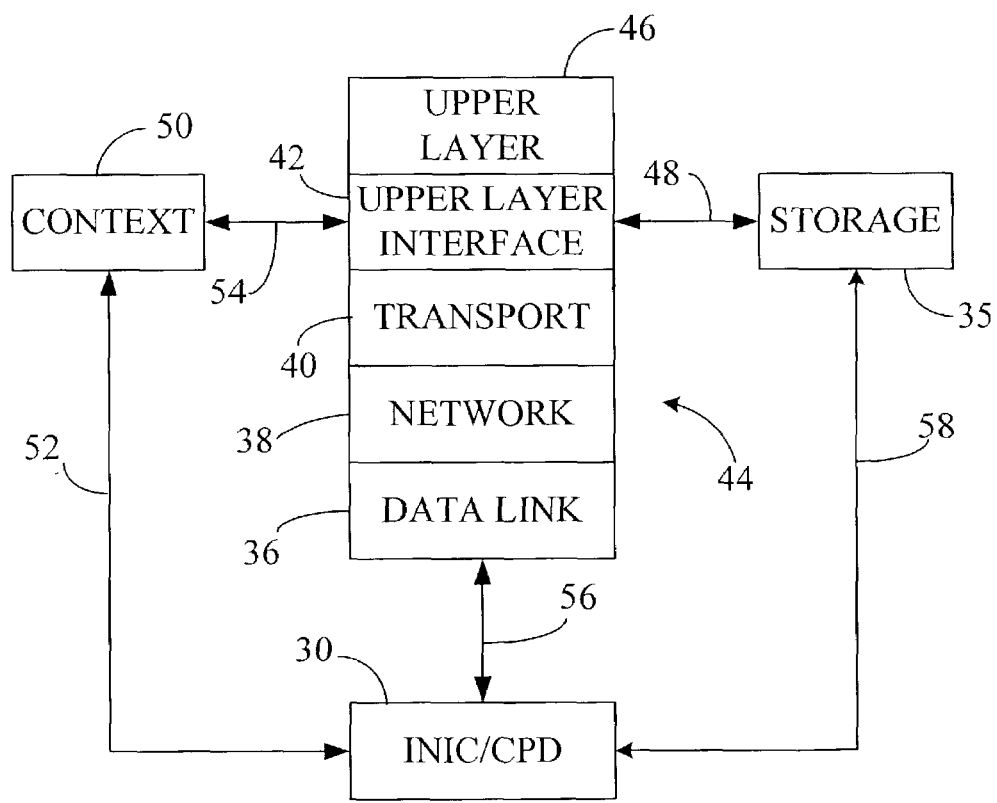
FIG. 2 is a diagram of information flow for the host of FIG. 1 in processing network communication, including a fast-path, a slow-path and a transfer of connection context between the fast and slow-paths.

Referring additionally to FIG. 2, the host CPU 28 controls a protocol processing stack 44 housed in storage 35, the stack including a data link layer 36, network layer 38, transport layer 40, upper layer 46 and an upper layer interface 42. The upper layer 46 may represent a session, presentation and/or application layer, depending upon the particular protocol being employed and message communicated. The upper layer interface 42, along with the CPU 28 and any related controls can send or retrieve a file to or from the upper layer 46 or storage 35, as shown by arrow 48. A connection context 50 has been created, as will be explained below, the context summarizing various features of the connection, such as protocol type and source and destination addresses for each protocol layer. The context may be passed between an interface for the session layer 42 and the CPD 30, as shown by arrows 52 and 54, and stored as a communication control block (CCB) at either CPD 30 or storage 35.

When the CPD 30 holds a CCB defining a particular connection, data received by the CPD from the network and pertaining to the connection is referenced to that CCB and can then be sent directly to storage 35 according to a fast-path 58, bypassing sequential protocol processing by the data link 36, network 38 and transport 40 layers. Transmitting a message, such as sending a file from storage 35 to remote host 22, can also occur via the fast-path 58, in which case the context for the file data is added by the CPD 30 referencing a CCB, rather than by sequentially adding headers during processing by the transport 40, network 38 and data link 36 layers. The DMA controllers of the CPD 30 perform these transfers between CPD and storage 35.

The CPD 30 collapses multiple protocol stacks each having possible separate states into a single state machine for fast-path processing. As a result, exception conditions may occur that are not provided for in the single state machine, primarily because such conditions occur infrequently and to deal with them on the CPD would provide little or no performance benefit to the host. Such exceptions can be CPD 30 or CPU 28 initiated. An advantage of the invention includes the manner in which unexpected situations that occur on a fast-path CCB are handled. The CPD 30 deals with these rare situations by passing back or flushing to the host protocol stack 44 the CCB and any associated message frames involved, via a control negotiation. The exception condition is then processed in a conventional manner by the host protocol stack 44. At some later time, usually directly after the handling of the exception condition has completed and fast-path processing can resume, the host stack 44 hands the CCB back to the CPD.

This fallback capability enables the performance-impacting functions of the host protocols to be handled by the CPD network microprocessor, while the exceptions are dealt with by the host stacks, the exceptions being so rare as to negligibly effect overall performance. The custom designed network microprocessor can have independent processors for transmitting and receiving network information, and further processors for assisting and queuing. A preferred microprocessor embodiment includes a pipelined trio of receive, transmit and utility processors. DMA controllers are integrated into the implementation and work in close concert with the network microprocessor to quickly move data between buffers adjacent to the controllers and other locations such as long term storage. Providing buffers logically adjacent to the DMA controllers avoids unnecessary loads on the PCI bus.

Figure 3:
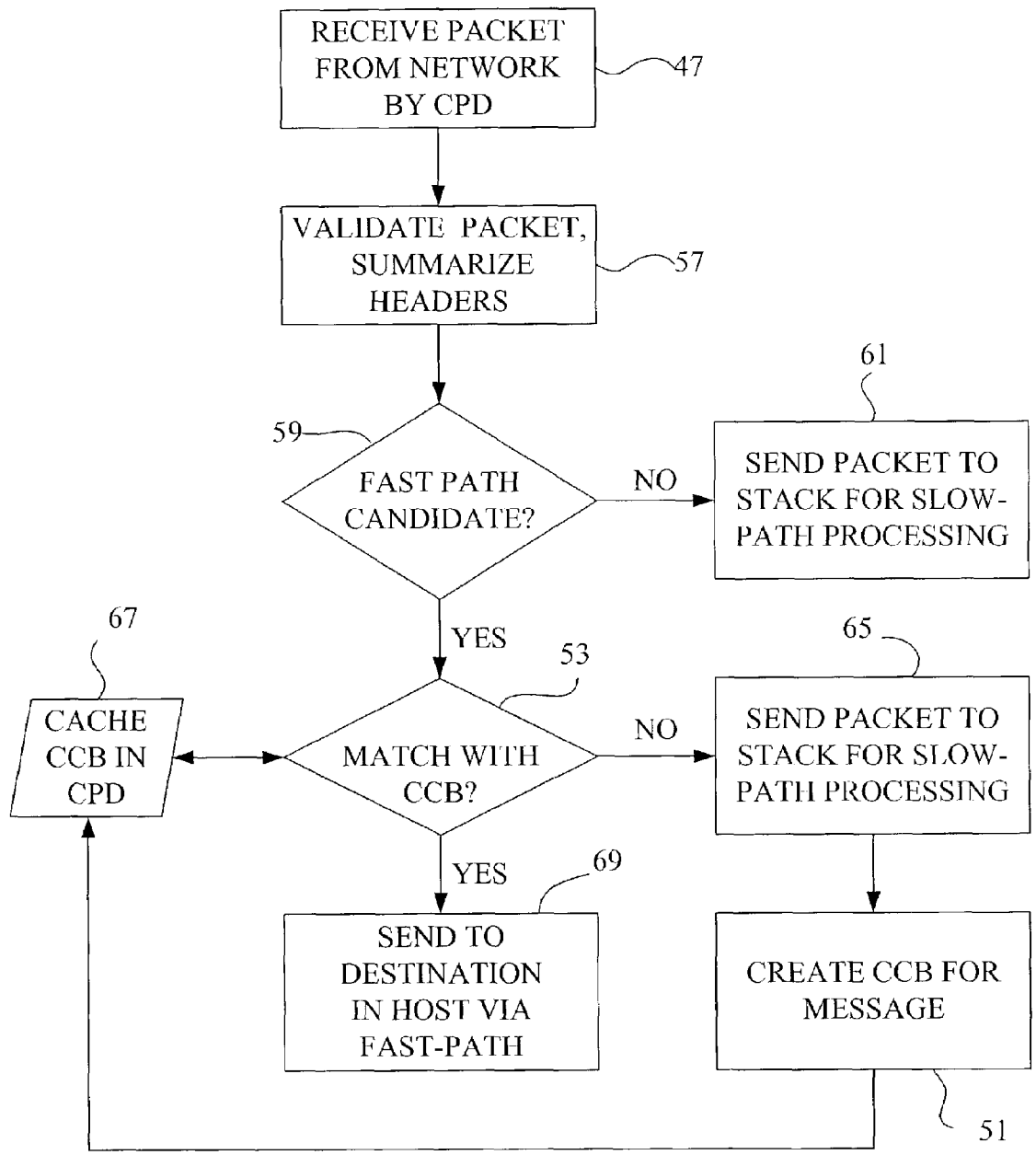
FIG. 3 is a flow chart of message receiving according to the present invention.

FIG. 3 diagrams the general flow of messages received according to the current invention. A large TCP/IP message such as a file transfer may be received by the host from the network in a number of separate, approximately 64 KB transfers, each of which may be split into many, approximately 1.5 KB frames or packets for transmission over a network. Novell NetWare protocol suites running Sequenced Packet Exchange Protocol (SPX) or NetWare Core Protocol (NCP) over Internetwork Packet Exchange (IPX) work in a similar fashion. Another form of data communication which can be handled by the fast-path is Transaction TCP (hereinafter T/TCP or TTCP), a version of TCP which initiates a connection with an initial transaction request after which a reply containing data may be sent according to the connection, rather than initiating a connection via a several-message initialization dialogue and then transferring data with later messages. In any of the transfers typified by these protocols, each packet conventionally includes a portion of the data being transferred, as well as headers for each of the protocol layers and markers for positioning the packet relative to the rest of the packets of this message.

When a message packet or frame is received 47 from a network by the CPD, it is first validated by a hardware assist. This includes determining the protocol types of the various layers, verifying relevant checksums, and summarizing 57 these findings into a status word or words. Included in these words is an indication whether or not the frame is a candidate for fast-path data flow. Selection 59 of fast-path candidates is based on whether the host may benefit from this message connection being handled by the CPD, which includes determining whether the packet has header bytes indicating particular protocols, such as TCP/IP or SPX/IPX for example. The small percent of frames that are not fast-path candidates are sent 61 to the host protocol stacks for slow-path protocol processing. Subsequent network microprocessor work with each fast-path candidate determines whether a fast-path connection such as a TCP or SPX CCB is already extant for that candidate, or whether that candidate may be used to set up a new fast-path connection, such as for a TTCP/IP transaction. The validation provided by the CPD provides acceleration whether a frame is processed by the fast-path or a slow-path, as only error free, validated frames are processed by the host CPU even for the slow-path processing.

All received message frames which have been determined by the CPD hardware assist to be fast-path candidates are examined 53 by the network microprocessor or INIC comparator circuits to determine whether they match a CCB held by the CPD. Upon confirming such a match, the CPD removes lower layer headers and sends 69 the remaining application data from the frame directly into its final destination in the host using direct memory access (DMA) units of the CPD. This operation may occur immediately upon receipt of a message packet, for example when a TCP connection already exists and destination buffers have been negotiated, or it may first be necessary to process an initial header to acquire a new set of final destination addresses for this transfer. In this latter case, the CPD will queue subsequent message packets while waiting for the destination address, and then DMA the queued application data to that destination.

A fast-path candidate that does not match a CCB may be used to set up a new fast-path connection, by sending 65 the frame to the host for sequential protocol processing. In this case, the host uses this frame to create 51 a CCB, which is then passed to the CPD to control subsequent frames on that connection. The CCB, which is cached 67 in the CPD, includes control and state information pertinent to all protocols that would have been processed had conventional software layer processing been employed. The CCB also contains storage space for per-transfer information used to facilitate moving application-level data contained within subsequent related message packets directly to a host application in a form available for immediate usage. The CPD takes command of connection processing upon receiving a CCB for that connection from the host.

Figure 4A:
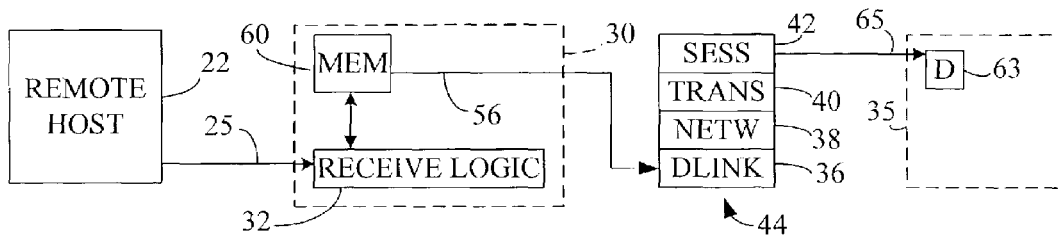
FIG. 4A is a diagram of information flow for the host of FIG. 1 receiving a message packet processed by the slow-path.

As shown more specifically in FIG. 4A, when a message packet is received from the remote host 22 via network 25, the packet enters hardware receive logic 32 of the CPD 30, which checksums headers and data, and parses the headers, creating a word or words which identify the message packet and status, storing the headers, data and word temporarily in memory 60. As well as validating the packet, the receive logic 32 indicates with the word whether this packet is a candidate for fast-path processing. FIG. 4A depicts the case in which the packet is not a fast-path candidate, in which case the CPD 30 sends the validated headers and data from memory 60 to data link layer 36 along an internal bus for processing by the host CPU, as shown by arrow 56. The packet is processed by the host protocol stack 44 of data link 36, network 38, transport 40 and session 42 layers, and data (D) 63 from the packet may then be sent to storage 35, as shown by arrow 65.

Figure 4B:
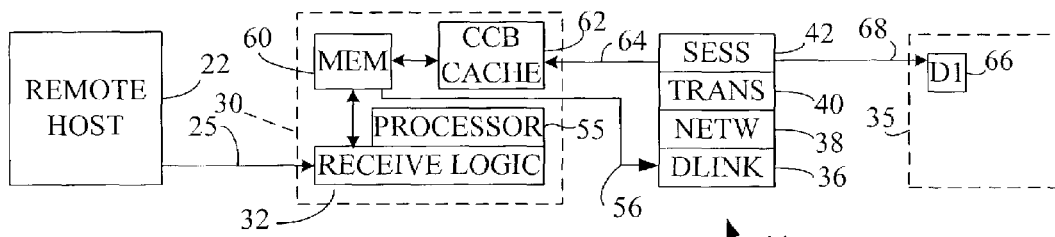
FIG. 4B is a diagram of information flow for the host of FIG. 1 receiving an initial message packet processed by the fast-path.

FIG. 4B, depicts the case in which the receive logic 32 of the CPD determines that a message packet is a candidate for fast-path processing, for example by deriving from the packet's headers that the packet belongs to a TCP/IP, TTCP/IP or SPX/IPX message. A processor 55 in the CPD 30 then checks to see whether the word that summarizes the fast-path candidate matches a CCB held in a cache 62. Upon finding no match for this packet, the CPD sends the validated packet from memory 60 to the host protocol stack 44 for processing. Host stack 44 may use this packet to create a connection context for the message, including finding and reserving a destination for data from the message associated with the packet, the context taking the form of a CCB. The present embodiment employs a single specialized host stack 44 for processing both fast-path and non-fast-path candidates, while in an embodiment described below fast-path candidates are processed by a different host stack than non-fast-path candidates. Some data (D1) 66 from that initial packet may optionally be sent to the destination in storage 35, as shown by arrow 68. The CCB is then sent to the CPD 30 to be saved in cache 62, as shown by arrow 64. For a traditional connection-based message such as typified by TCP/IP, the initial packet may be part of a connection initialization dialogue that transpires between hosts before the CCB is created and passed to the CPD 30.

Figure 4C:
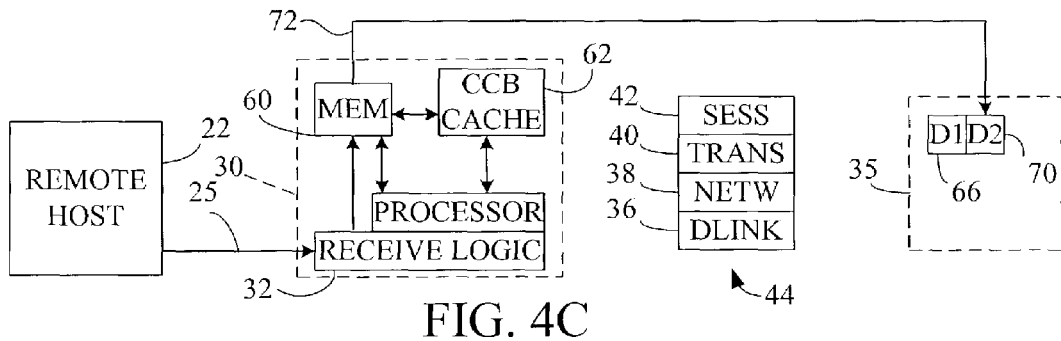
FIG. 4C is a diagram of information flow for the host of FIG. 4B receiving a subsequent message packet processed by the fast-path.

Referring now to FIG. 4C, when a subsequent packet from the same connection as the initial packet is received from the network 25 by CPD 30, the packet headers and data are validated by the receive logic 32, and the headers are parsed to create a summary of the message packet and a hash for finding a corresponding CCB, the summary and hash contained in a word or words. The word or words are temporarily stored in memory 60 along with the packet. The processor 55 checks for a match between the hash and each CCB that is stored in the cache 62 and, finding a match, sends the data (D2) 70 via a fast-path directly to the destination in storage 35, as shown by arrow 72, bypassing the session layer 42, transport layer 40, network layer 38 and data link layer 36. The remaining data packets from the message can also be sent by DMA directly to storage, avoiding the relatively slow protocol layer processing and repeated copying by the CPU stack 44.

Figure 4D:
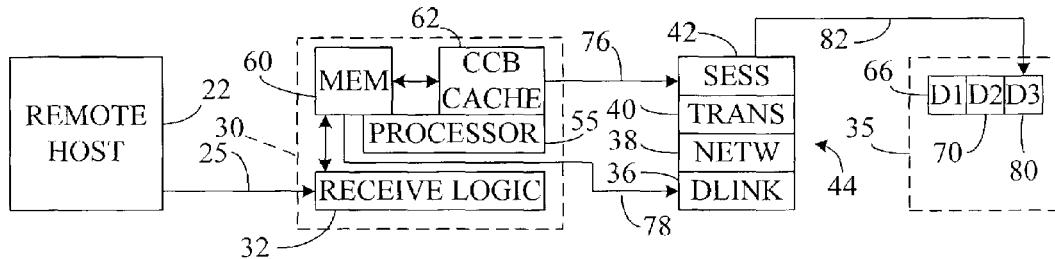
FIG. 4D is a diagram of information flow for the host of FIG. 4C receiving a message packet having an error that causes processing to revert to the slow-path.

FIG. 4D shows the procedure for handling the rare instance when a message for which a fast-path connection has been established, such as shown in FIG. 4C, has a packet that is not easily handled by the CPD. In this case the packet is sent to be processed by the protocol stack 44, which is handed the CCB for that message from cache 62 via a control dialogue with the CPD, as shown by arrow 76, signaling to the CPU to take over processing of that message. Slow-path processing by the protocol stack then results in data (D3) 80 from the packet being sent, as shown by arrow 82, to storage 35. Once the packet has been processed and the error situation corrected, the CCB can be handed back via a control dialogue to the cache 62, so that payload data from subsequent packets of that message can again be sent via the fast-path of the CPD 30. Thus the CPU and CPD together decide whether a given message is to be processed according to fast-path hardware processing or more conventional software processing by the CPU.

Figure 5:
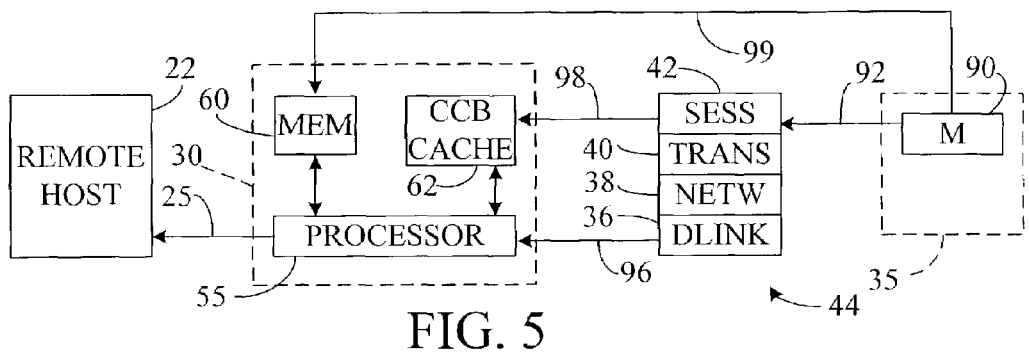
FIG. 5 is a diagram of information flow for the host of FIG. 1 transmitting a message by either the fast or slow-paths.

Transmission of a message from the host 20 to the network 25 for delivery to remote host 22 also can be processed by either sequential protocol software processing via the CPU or accelerated hardware processing via the CPD 30, as shown in FIG. 5. A message (M) 90 that is selected by CPU 28 from storage 35 can be sent to session layer 42 for processing by stack 44, as shown by arrows 92 and 96. For the situation in which a connection exists and the CPD 30 already has an appropriate CCB for the message, however, data packets can bypass host stack 44 and be sent by DMA directly to memory 60, with the processor 55 adding to each data packet a single header containing all the appropriate protocol layers, and sending the resulting packets to the network 25 for transmission to remote host 22. This fast-path transmission can greatly accelerate processing for even a single packet, with the acceleration multiplied for a larger message.

A message for which a fast-path connection is not extant thus may benefit from creation of a CCB with appropriate control and state information for guiding fast-path transmission. For a traditional connection-based message, such as typified by TCP/IP or SPX/IPX, the CCB is created during connection initialization dialogue. For a quick-connection message, such as typified by TTCP/IP, the CCB can be created with the same transaction that transmits payload data. In this case, the transmission of payload data may be a reply to a request that was used to set up the fast-path connection. In any case, the CCB provides protocol and status information regarding each of the protocol layers, including which user is involved and storage space for per-transfer information. The CCB is created by protocol stack 44, which then passes the CCB to the CPD 30 by writing to a command register of the CPD, as shown by arrow 98. Guided by the CCB, the processor 55 moves network frame-sized portions of the data from the source in host memory 35 into its own memory 60 using DMA, as depicted by arrow 99. The processor 55 then prepends appropriate headers and checksums to the data portions, and transmits the resulting frames to the network 25, consistent with the restrictions of the associated protocols. After the CPD 30 has received an acknowledgement that all the data has reached its destination, the CPD will then notify the host 35 by writing to a response buffer. Thus, fast-path transmission of data communications also relieves the host CPU of per-frame processing. A vast majority of data transmissions can be sent to the network by the fast-path. Both the input and output fast-paths attain a huge reduction in interrupts by functioning at an upper layer level, i.e., session level or higher, and interactions between the network microprocessor and the host occur using the full transfer sizes which that upper layer wishes to make. For fast-path communications, an interrupt only occurs (at the most) at the beginning and end of an entire upper-layer message transaction, and there are no interrupts for the sending or receiving of each lower layer portion or packet of that transaction.

Figure 6:
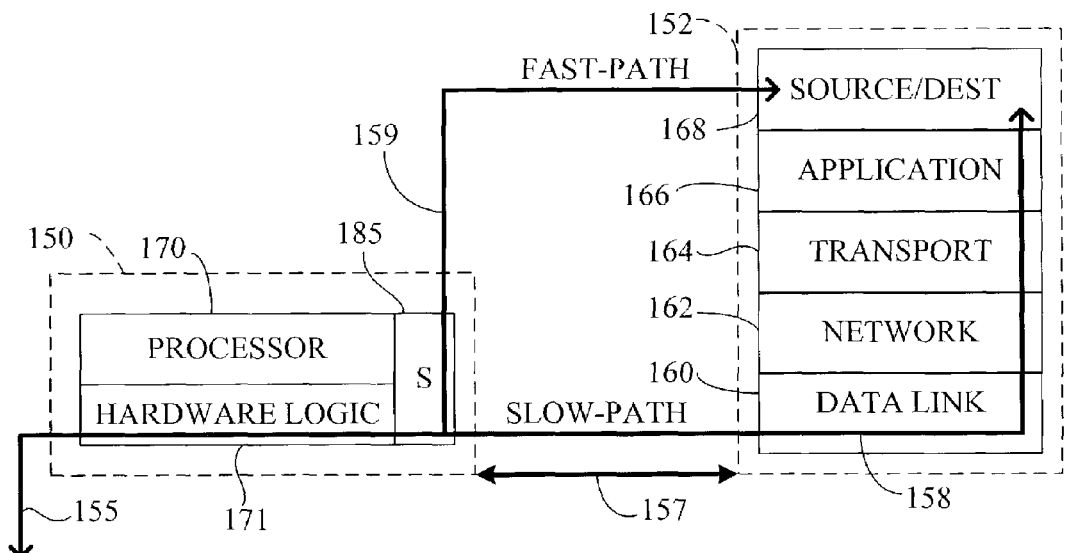
FIG. 6 is a diagram of information flow for a first embodiment of an intelligent network interface card (INIC) associated with a client having a TCP/IP processing stack.

A simplified intelligent network interface card (INIC) 150 is shown in FIG. 6 to provide a network interface for a host 152. Hardware logic 171 of the INIC 150 is connected to a network 155, with a peripheral bus (PCI) 157 connecting the INIC and host. The host 152 in this embodiment has a TCP/IP protocol stack, which provides a slow-path 158 for sequential software processing of message frames received from the network 155. The host 152 protocol stack includes a data link layer 160, network layer 162, a transport layer 164 and an application layer 166, which provides a source or destination 168 for the communication data in the host 152. Other layers which are not shown, such as session and presentation layers, may also be included in the host stack 152, and the source or destination may vary depending upon the nature of the data and may actually be the application layer.

The INIC 150 has a network processor 170 which chooses between processing messages along a slow-path 158 that includes the protocol stack of the host, or along a fast-path 159 that bypasses the protocol stack of the host. Each received packet is processed on the fly by hardware logic 171 contained in INIC 150, so that all of the protocol headers for a packet can be processed without copying, moving or storing the data between protocol layers. The hardware logic 171 processes the headers of a given packet at one time as packet bytes pass through the hardware, by categorizing selected header bytes. Results of processing the selected bytes help to determine which other bytes of the packet are categorized, until a summary of the packet has been created, including checksum validations. The processed headers and data from the received packet are then stored in INIC storage 185, as well as the word or words summarizing the headers and status of the packet. For a network storage configuration, the INIC 150 may be connected to a peripheral storage device such as a disk drive which has an IDE, SCSI or similar interface, with a file cache for the storage device residing on the memory 185 of the INIC 150. Several such network interfaces may exist for a host, with each interface having an associated storage device.

Figure 7:
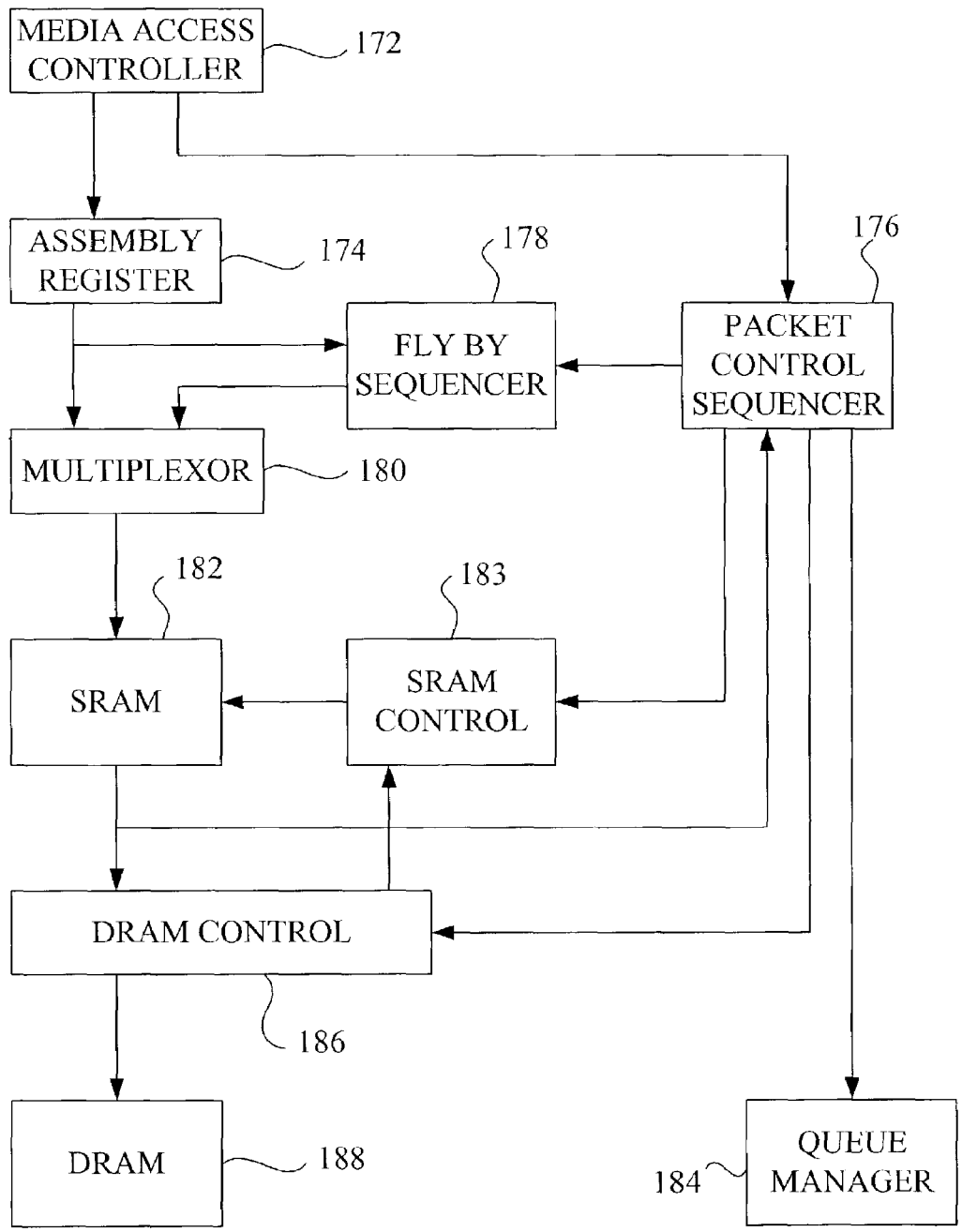
FIG. 7 is a diagram of hardware logic for the INIC embodiment shown in FIG. 6, including a packet control sequencer and a fly-by sequencer.

The hardware processing of message packets received by INIC 150 from network 155 is shown in more detail in FIG. 7. A received message packet first enters a media access controller 172, which controls INIC access to the network and receipt of packets and can provide statistical information for network protocol management. From there, data flows one byte at a time into an assembly register 174, which in this example is 128 bits wide. The data is categorized by a fly-by sequencer 178, as will be explained in more detail with regard to FIG. 8, which examines the bytes of a packet as they fly by, and generates status from those bytes that will be used to summarize the packet. The status thus created is merged with the data by a multiplexor 180 and the resulting data stored in SRAM 182. A packet control sequencer 176 oversees the fly-by sequencer 178, examines information from the media access controller 172, counts the bytes of data, generates addresses, moves status and manages the movement of data from the assembly register 174 to SRAM 182 and eventually DRAM 188. The packet control sequencer 176 manages a buffer in SRAM 182 via SRAM controller 183, and also indicates to a DRAM controller 186 when data needs to be moved from SRAM 182 to a buffer in DRAM 188. Once data movement for the packet has been completed and all the data has been moved to the buffer in DRAM 188, the packet control sequencer 176 will move the status that has been generated in the fly-by sequencer 178 out to the SRAM 182 and to the beginning of the DRAM 188 buffer to be prepended to the packet data. The packet control sequencer 176 then requests a queue manager 184 to enter a receive buffer descriptor into a receive queue, which in turn notifies the processor 170 that the packet has been processed by hardware logic 171 and its status summarized.

Figure 8:
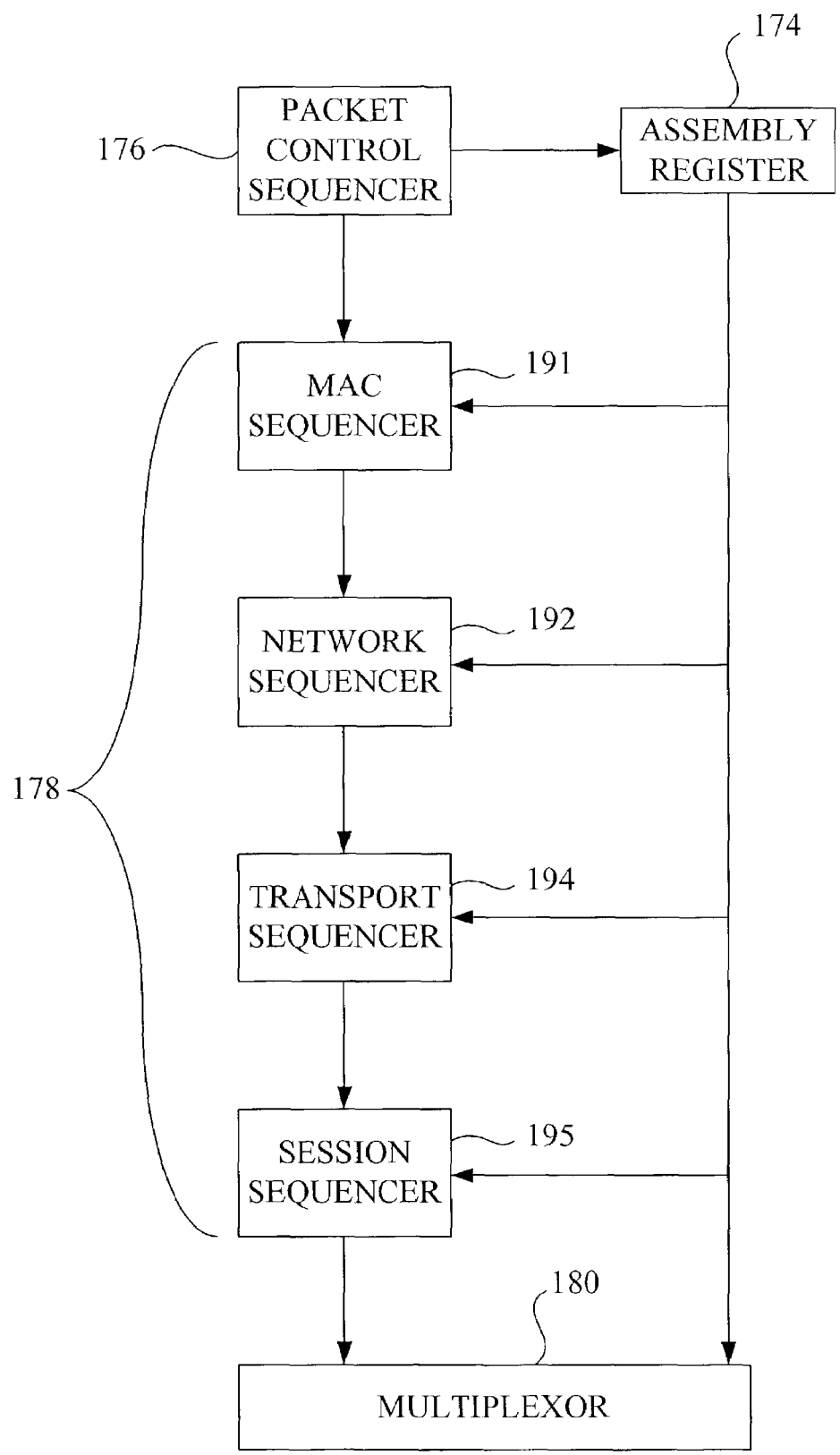
FIG. 8 is a diagram of the fly-by sequencer of FIG. 7 for analyzing header bytes as they are received by the INIC.

FIG. 8 shows that the fly-by sequencer 178 has several tiers, with each tier generally focusing on a particular portion of the packet header and thus on a particular protocol layer, for generating status pertaining to that layer. The fly-by sequencer 178 in this embodiment includes a media access control sequencer 191, a network sequencer 192, a transport sequencer 194 and a session sequencer 195. Sequencers pertaining to higher protocol layers can additionally be provided. The fly-by sequencer 178 is reset by the packet control sequencer 176 and given pointers by the packet control sequencer that tell the fly-by sequencer whether a given byte is available from the assembly register 174. The media access control sequencer 191 determines, by looking at bytes 0-5, that a packet is addressed to host 152 rather than or in addition to another host. Offsets 12 and 13 of the packet are also processed by the media access control sequencer 191 to determine the type field, for example whether the packet is Ethernet or 802.3. If the type field is Ethernet those bytes also tell the media access control sequencer 191 the packet's network protocol type. For the 802.3 case, those bytes instead indicate the length of the entire frame, and the media access control sequencer 191 will check eight bytes further into the packet to determine the network layer type.

For most packets the network sequencer 192 validates that the header length received has the correct length, and checksums the network layer header. For fast-path candidates the network layer header is known to be IP or IPX from analysis done by the media access control sequencer 191. Assuming for example that the type field is 802.3 and the network protocol is IP, the network sequencer 192 analyzes the first bytes of the network layer header, which will begin at byte 22, in order to determine IP type. The first bytes of the IP header will be processed by the network sequencer 192 to determine what IP type the packet involves. Determining that the packet involves, for example, IP version 4, directs further processing by the network sequencer 192, which also looks at the protocol type located ten bytes into the IP header for an indication of the transport header protocol of the packet. For example, for IP over Ethernet, the IP header begins at offset 14, and the protocol type byte is offset 23, which will be processed by network logic to determine whether the transport layer protocol is TCP, for example. From the length of the network layer header, which is typically 20-40 bytes, network sequencer 192 determines the beginning of the packet's transport layer header for validating the transport layer header. Transport sequencer 194 may generate checksums for the transport layer header and data, which may include information from the IP header in the case of TCP at least.

Continuing with the example of a TCP packet, transport sequencer 194 also analyzes the first few bytes in the transport layer portion of the header to determine, in part, the TCP source and destination ports for the message, such as whether the packet is NetBios or other protocols. Byte 12 of the TCP header is processed by the transport sequencer 194 to determine and validate the TCP header length. Byte 13 of the TCP header contains flags that may, aside from ack flags and push flags, indicate unexpected options, such as reset and fin, that may cause the processor to categorize this packet as an exception. TCP offset bytes 16 and 17 are the checksum, which is pulled out and stored by the hardware logic 171 while the rest of the frame is validated against the checksum.

Session sequencer 195 determines the length of the session layer header, which in the case of NetBios is only four bytes, two of which tell the length of the NetBios payload data, but which can be much larger for other protocols. The session sequencer 195 can also be used to categorize the type of message as read or write, for example, for which the fast-path may be particularly beneficial. Further upper layer logic processing, depending upon the message type, can be performed by the hardware logic 171 of packet control sequencer 176 and fly-by sequencer 178. Thus hardware logic 171 intelligently directs hardware processing of the headers by categorization of selected bytes from a single stream of bytes, with the status of the packet being built from classifications determined on the fly. Once the packet control sequencer 176 detects that all of the packet has been processed by the fly-by sequencer 178, the packet control sequencer 176 adds the status information generated by the fly-by sequencer 178 and any status information generated by the packet control sequencer 176, and prepends (adds to the front) that status information to the packet, for convenience in handling the packet by the processor 170. The additional status information generated by the packet control sequencer 176 includes media access controller 172 status information and any errors discovered, or data overflow in either the assembly register or DRAM buffer, or other miscellaneous information regarding the packet. The packet control sequencer 176 also stores entries into a receive buffer queue and a receive statistics queue via the queue manager 184. An advantage of processing a packet by hardware logic 171 is that the packet does not, in contrast with conventional sequential software protocol processing, have to be stored, moved, copied or pulled from storage for processing each protocol layer header, offering dramatic increases in processing efficiency and savings in processing time for each packet. The packets can be processed at the rate bits are received from the network, for example 100 megabits/second for a 100 baseT connection. The time for categorizing a packet received at this rate and having a length of sixty bytes is thus about 5 microseconds. The total time for processing this packet with the hardware logic 171 and sending packet data to its host destination via the fast-path may be about 16 microseconds or less, assuming a 66 MHz PCI bus, whereas conventional software protocol processing by a 300 MHz Pentium II® processor may take as much as 200 microseconds in a busy device. More than an order of magnitude decrease in processing time can thus be achieved with fast-path 159 in comparison with a high-speed CPU employing conventional sequential software protocol processing, demonstrating the dramatic acceleration provided by processing the protocol headers by the hardware logic 171 and processor 170, without even considering the additional time savings afforded by the reduction in CPU interrupts and host bus bandwidth savings.

The processor 170 chooses, for each received message packet held in storage 185, whether that packet is a candidate for the fast-path 159 and, if so, checks to see whether a fast-path has already been set up for the connection that the packet belongs to. To do this, the processor 170 first checks the header status summary to determine whether the packet headers are of a protocol defined for fast-path candidates. If not, the processor 170 commands DMA controllers in the INIC 150 to send the packet to the host for slow-path 158 processing. Even for a slow-path 158 processing of a message, the INIC 150 thus performs initial procedures such as validation and determination of message type, and passes the validated message at least to the data link layer 160 of the host.

For fast-path 159 candidates, the processor 170 checks to see whether the header status summary matches a CCB held by the INIC. If so, the data from the packet is sent along fast-path 159 to the destination 168 in the host. If the fast-path 159 candidate's packet summary does not match a CCB held by the INIC, the packet may be sent to the host 152 for slow-path processing to create a CCB for the message. Employment of the fast-path 159 may also not be needed or desirable for the case of fragmented messages or other complexities. For the vast majority of messages, however, the INIC fast-path 159 can greatly accelerate message processing. The INIC 150 thus provides a single state machine processor 170 that decides whether to send data directly to its destination, based upon information gleaned on the fly, as opposed to the conventional employment of a state machine in each of several protocol layers for determining the destiny of a given packet.

In processing an indication or packet received at the host 152, a protocol driver of the host selects the processing route based upon whether the indication is fast-path or slow-path. A TCP/IP or SPX/IPX message has a connection that is set up from which a CCB is formed by the driver and passed to the INIC for matching with and guiding the fast-path packet to the connection destination 168. For a TTCP/IP message, the driver can create a connection context for the transaction from processing an initial request packet, including locating the message destination 168, and then passing that context to the INIC in the form of a CCB for providing a fast-path for a reply from that destination. A CCB includes connection and state information regarding the protocol layers and packets of the message. Thus a CCB can include source and destination media access control (MAC) addresses, source and destination IP or IPX addresses, source and destination TCP or SPX ports, TCP variables such as timers, receive and transmit windows for sliding window protocols, and information indicating the session layer protocol.

Caching the CCBs in a hash table in the INIC provides quick comparisons with words summarizing incoming packets to determine whether the packets can be processed via the fast-path 159, while the full CCBs are also held in the INIC for processing. Other ways to accelerate this comparison include software processes such as a B-tree or hardware assists such as a content addressable memory (CAM). When INIC microcode or comparator circuits detect a match with the CCB, a DMA controller places the data from the packet in the destination 168, without any interrupt by the CPU, protocol processing or copying. Depending upon the type of message received, the destination of the data may be the session, presentation or application layers, or a file buffer cache in the host 152.

Figure 9:
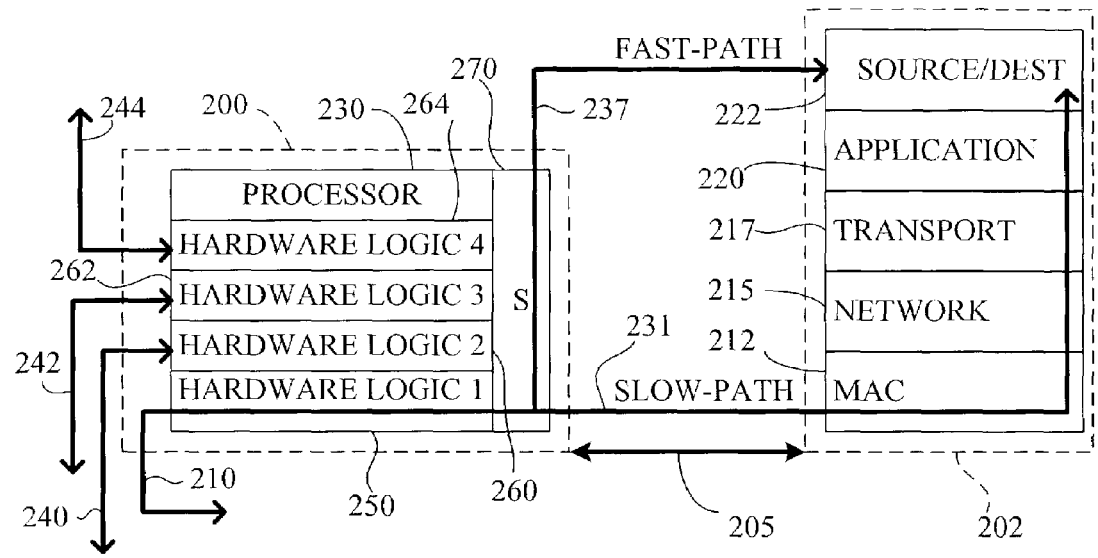
FIG. 9 is a diagram of information flow for a second embodiment of an INIC associated with a server having a TCP/IP processing stack.

FIG. 9 shows an INIC 200 connected to a host 202 that is employed as a file server. This INIC provides a network interface for several network connections employing the 802.3u standard, commonly known as Fast Ethernet. The INIC 200 is connected by a PCI bus 205 to the server 202, which maintains a TCP/IP or SPX/IPX protocol stack including MAC layer 212, network layer 215, transport layer 217 and application layer 220, with a source/destination 222 shown above the application layer, although as mentioned earlier the application layer can be the source or destination. The INIC is also connected to network lines 210, 240, 242 and 244, which are preferably Fast Ethernet, twisted pair, fiber optic, coaxial cable or other lines each allowing data transmission of 100 Mb/s, while faster and slower data rates are also possible. Network lines 210, 240, 242 and 244 are each connected to a dedicated row of hardware circuits which can each validate and summarize message packets received from their respective network line. Thus line 210 is connected with a first horizontal row of sequencers 250, line 240 is connected with a second horizontal row of sequencers 260, line 242 is connected with a third horizontal row of sequencers 262 and line 244 is connected with a fourth horizontal row of sequencers 264. After a packet has been validated and summarized by one of the horizontal hardware rows it is stored along with its status summary in storage 270.

A network processor 230 determines, based on that summary and a comparison with any CCBs stored in the INIC 200, whether to send a packet along a slow-path 231 for processing by the host. A large majority of packets can avoid such sequential processing and have their data portions sent by DMA along a fast-path 237 directly to the data destination 222 in the server according to a matching CCB. Similarly, the fast-path 237 provides an avenue to send data directly from the source 222 to any of the network lines by processor 230 division of the data into packets and addition of full headers for network transmission, again minimizing CPU processing and interrupts. For clarity only horizontal sequencer 250 is shown active; in actuality each of the sequencer rows 250, 260, 262 and 264 offers full duplex communication, concurrently with all other sequencer rows. The specialized INIC 200 is much faster at working with message packets than even advanced general-purpose host CPUs that processes those headers sequentially according to the software protocol stack.

One of the most commonly used network protocols for large messages such as file transfers is server message block (SMB) over TCP/IP. SMB can operate in conjunction with redirector software that determines whether a required resource for a particular operation, such as a printer or a disk upon which a file is to be written, resides in or is associated with the host from which the operation was generated or is located at another host connected to the network, such as a file server. SMB and server/redirector are conventionally serviced by the transport layer; in the present invention SMB and redirector can instead be serviced by the INIC. In this case, sending data by the DMA controllers from the INIC buffers when receiving a large SMB transaction may greatly reduce interrupts that the host must handle. Moreover, this DMA generally moves the data to its final destination in the file device cache. An SMB transmission of the present invention follows essentially the reverse of the above described SMB receive, with data transferred from the host to the INIC and stored in buffers, while the associated protocol headers are prepended to the data in the INIC, for transmission via a network line to a remote host. Processing by the INIC of the multiple packets and multiple TCP, IP, NetBios and SMB protocol layers via custom hardware and without repeated interrupts of the host can greatly increase the speed of transmitting an SMB message to a network line.

Figure 10:
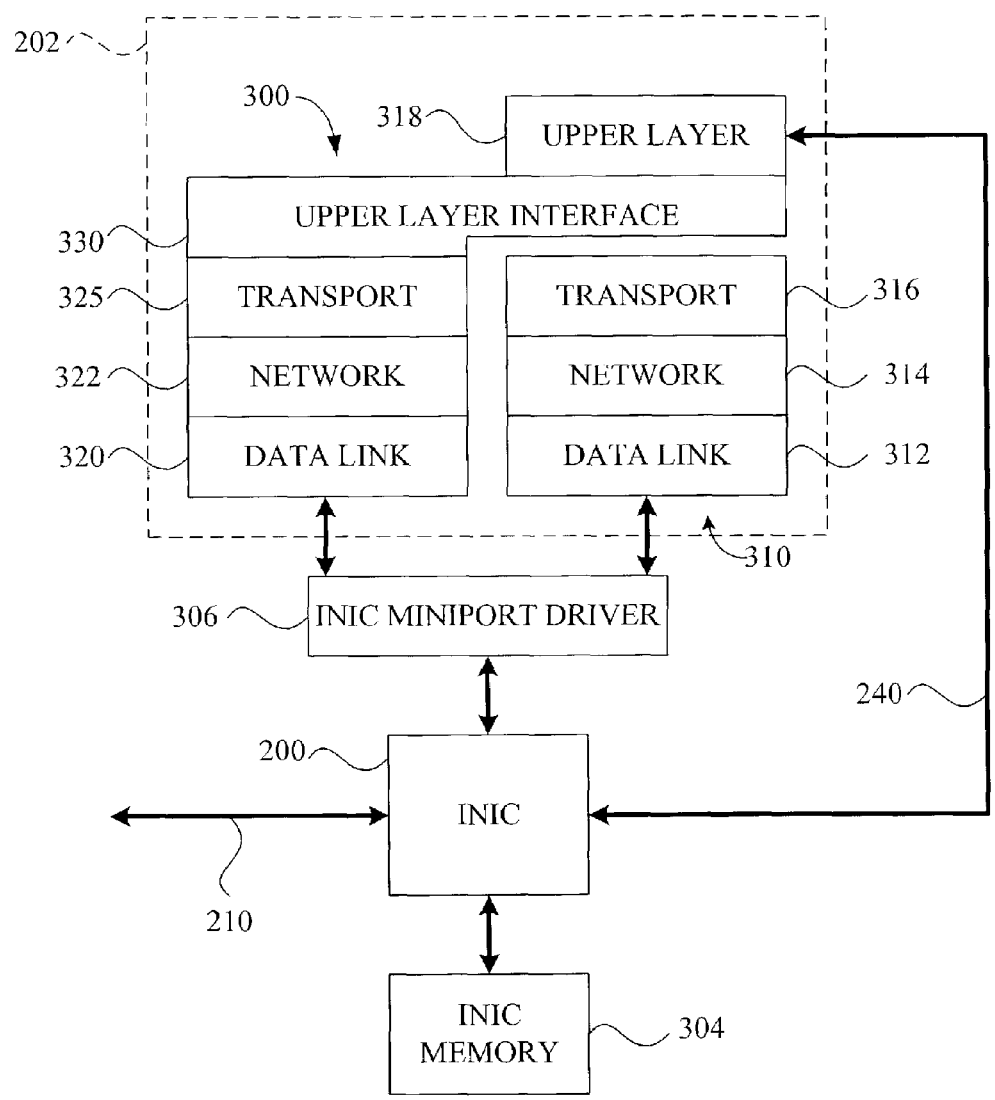
FIG. 10 is a diagram of a command driver installed in the host of FIG. 9 for creating and controlling a communication control block for the fast-path.

As shown in FIG. 10, for controlling whether a given message is processed by the host 202 or by the INIC 200, a message command driver 300 may be installed in host 202 to work in concert with a host protocol stack 310. The command driver 300 can intervene in message reception or transmittal, create CCBs and send or receive CCBs from the INIC 200, so that functioning of the INIC, aside from improved performance, is transparent to a user. Also shown is an INIC memory 304 and an INIC miniport driver 306, which can direct message packets received from network 210 to either the conventional protocol stack 310 or the command protocol stack 300, depending upon whether a packet has been labeled as a fast-path candidate. The conventional protocol stack 310 has a data link layer 312, a network layer 314 and a transport layer 316 for conventional, lower layer processing of messages that are not labeled as fast-path candidates and therefore not processed by the command stack 300. Residing above the lower layer stack 310 is an upper layer 318, which represents a session, presentation and/or application layer, depending upon the message communicated. The command driver 300 similarly has a data link layer 320, a network layer 322 and a transport layer 325.

The driver 300 includes an upper layer interface 330 that determines, for transmission of messages to the network 210, whether a message transmitted from the upper layer 318 is to be processed by the command stack 300 and subsequently the INIC fast-path, or by the conventional stack 310. When the upper layer interface 330 receives an appropriate message from the upper layer 318 that would conventionally be intended for transmission to the network after protocol processing by the protocol stack of the host, the message is passed to driver 300. The INIC then acquires network-sized portions of the message data for that transmission via INIC DMA units, prepends headers to the data portions and sends the resulting message packets down the wire. Conversely, in receiving a TCP, TTCP, SPX or similar message packet from the network 210 to be used in setting up a fast-path connection, miniport driver 306 diverts that message packet to command driver 300 for processing. The driver 300 processes the message packet to create a context for that message, with the driver 302 passing the context and command instructions back to the INIC 200 as a CCB for sending data of subsequent messages for the same connection along a fast-path. Hundreds of TCP, TTCP, SPX or similar CCB connections may be held indefinitely by the INIC, although a least recently used (LRU) algorithm is employed for the case when the INIC cache is full. The driver 300 can also create a connection context for a TTCP request which is passed to the INIC 200 as a CCB, allowing fast-path transmission of a TTCP reply to the request. A message having a protocol that is not accelerated can be processed conventionally by protocol stack 310.

Figure 11:
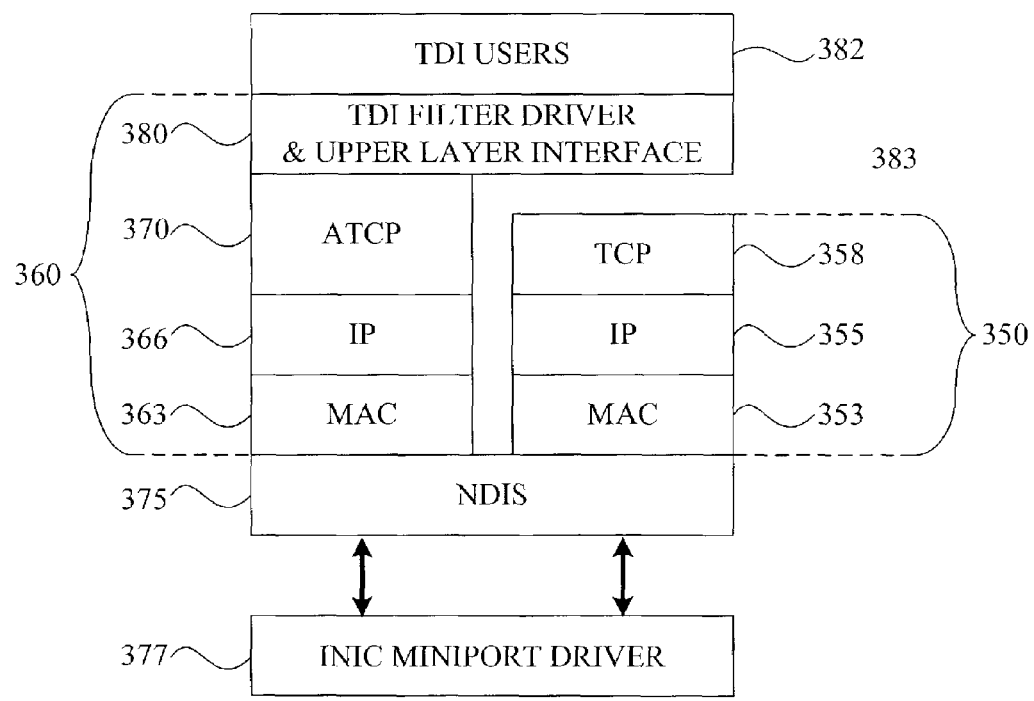
FIG. 11 is a diagram of the TCP/IP stack and command driver of FIG. 10 configured for NetBios communications.

FIG. 11 shows a TCP/IP implementation of command driver software for Microsoft® protocol messages. A conventional host protocol stack 350 includes MAC layer 353, IP layer 355 and TCP layer 358. A command driver 360 works in concert with the host stack 350 to process network messages. The command driver 360 includes a MAC layer 363, an IP layer 366 and an Alacritech TCP (ATCP) layer 373. The conventional stack 350 and command driver 360 share a network driver interface specification (NDIS) layer 375, which interacts with the INIC miniport driver 306. The INIC miniport driver 306 sorts receive indications for processing by either the conventional host stack 350 or the ATCP driver 360. A TDI filter driver and upper layer interface 380 similarly determines whether messages sent from a TDI user 382 to the network are diverted to the command driver and perhaps to the fast-path of the INIC, or processed by the host stack.

Figure 12:
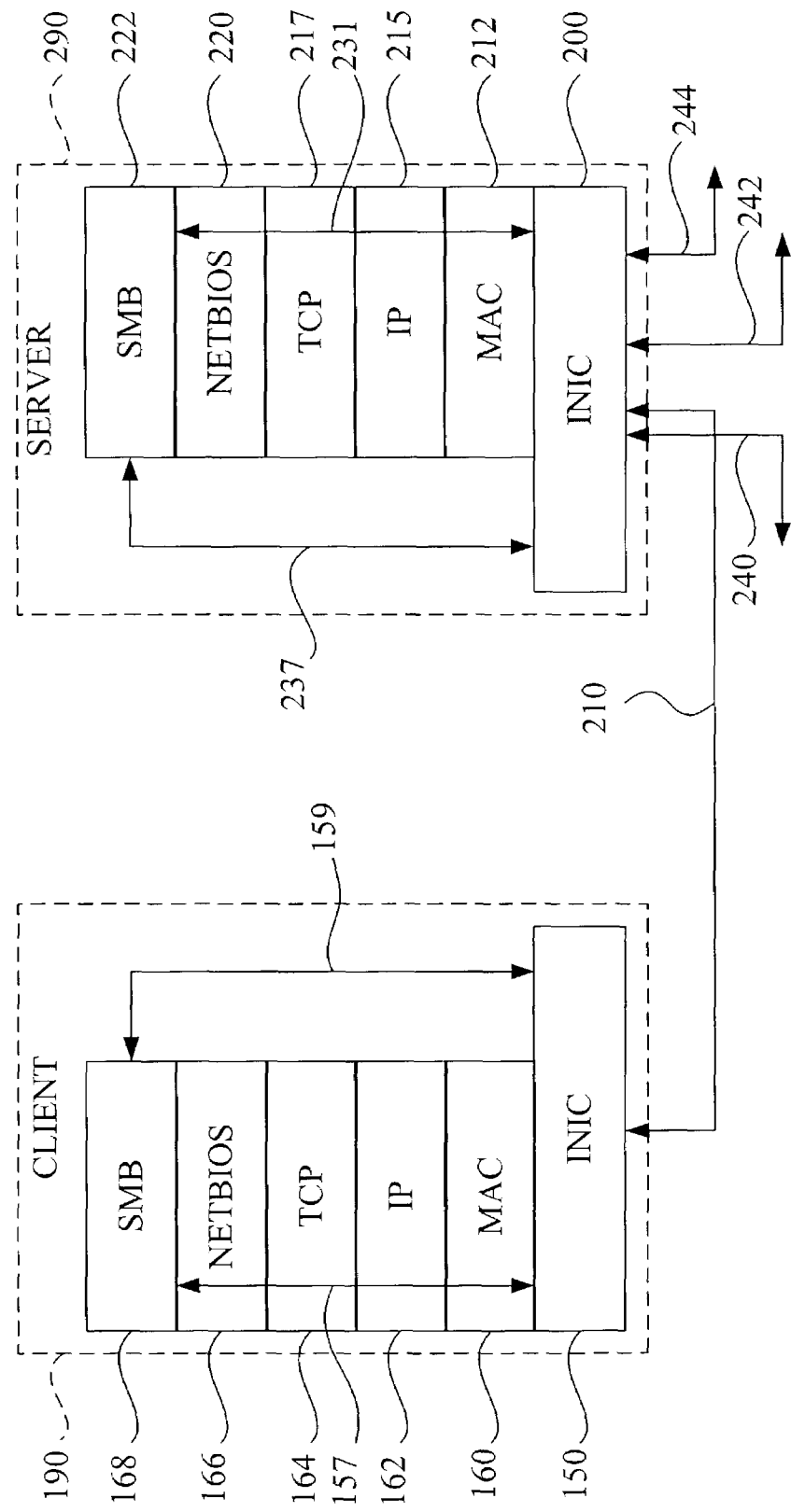
FIG. 12 is a diagram of a communication exchange between the client of FIG. 6 and the server of FIG. 9.

FIG. 12 depicts a typical SMB exchange between a client 190 and server 290, both of which have communication devices of the present invention, the communication devices each holding a CCB defining their connection for fast-path movement of data. The client 190 includes INIC 150, 802.3 compliant data link layer 160, IP layer 162, TCP layer 164, NetBios layer 166, and SMB layer 168. The client has a slow-path 157 and fast-path 159 for communication processing. Similarly, the server 290 includes INIC 200, 802.3 compliant data link layer 212, IP layer 215, TCP layer 217, NetBios layer 220, and SMB 222. The server is connected to network lines 240, 242 and 244, as well as line 210 which is connected to client 190. The server also has a slow-path 231 and fast-path 237 for communication processing. Assuming that the client 190 wishes to read a 100 KB file on the server 290, the client may begin by sending a Read Block Raw (RBR) SMB command across network 210 requesting the first 64 KB of that file on the server 290. The RBR command may be only 76 bytes, for example, so the INIC 200 on the server will recognize the message type (SMB) and relatively small message size, and send the 76 bytes directly via the fast-path to NetBios of the server. NetBios will give the data to SMB, which processes the Read request and fetches the 64 KB of data into server data buffers. SMB then calls NetBios to send the data, and NetBios outputs the data for the client. In a conventional host, NetBios would call TCP output and pass 64 KB to TCP, which would divide the data into 1460 byte segments and output each segment via IP and eventually MAC (slow-path 231). In the present case, the 64 KB data goes to the ATCP driver along with an indication regarding the client-server SMB connection, which indicates a CCB held by the INIC. The INIC 200 then proceeds to DMA 1460 byte segments from the host buffers, add the appropriate headers for TCP, IP and MAC at one time, and send the completed packets on the network 210 (fast-path 237). The INIC 200 will repeat this until the whole 64 KB transfer has been sent. Usually after receiving acknowledgement from the client that the 64 KB has been received, the INIC will then send the remaining 36 KB also by the fast-path 237.

With INIC 150 operating on the client 190 when this reply arrives, the INIC 150 recognizes from the first frame received that this connection is receiving fast-path 159 processing (TCP/IP, NetBios, matching a CCB), and the ATCP may use this first frame to acquire buffer space for the message. This latter case is done by passing the first 128 bytes of the NetBios portion of the frame via the ATCP fast-path directly to the host NetBios; that will give NetBios/SMB all of the frame's headers. NetBios/SMB will analyze these headers, realize by matching with a request ID that this is a reply to the original RawRead connection, and give the ATCP a 64K list of buffers into which to place the data. At this stage only one frame has arrived, although more may arrive while this processing is occurring. As soon as the client buffer list is given to the ATCP, it passes that transfer information to the INIC 150, and the INIC 150 starts DMAing any frame data that has accumulated into those buffers.

Figure 13:
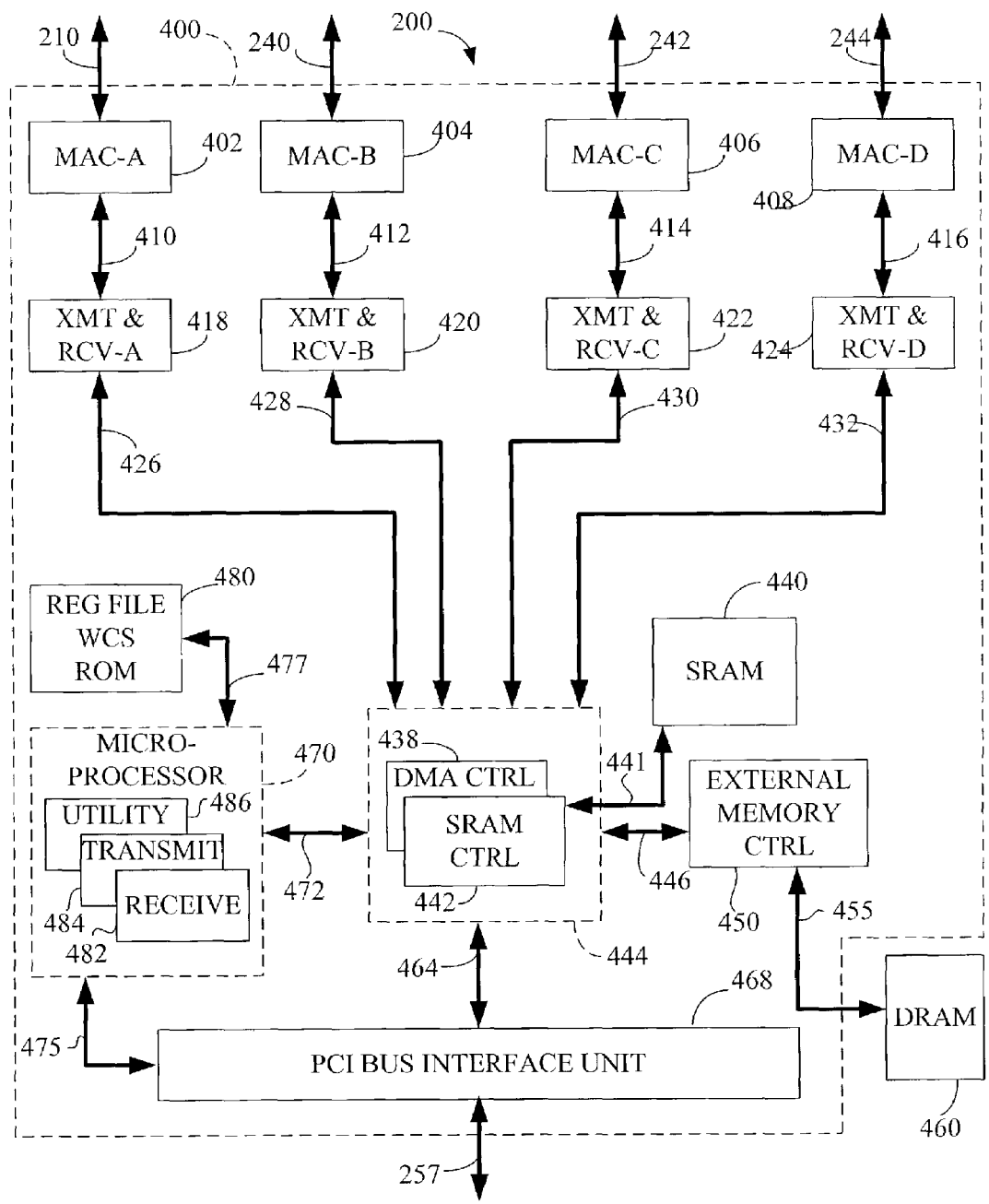
FIG. 13 is a diagram of hardware functions included in the INIC of FIG. 9.

FIG. 13 provides a simplified diagram of the INIC 200, which combines the functions of a network interface controller and a protocol processor in a single ASIC chip 400. The INIC 200 in this embodiment offers a full-duplex, four channel, 10/100-Megabit per second (Mbps) intelligent network interface controller that is designed for high speed protocol processing for server applications. Although designed specifically for server applications, the INIC 200 can be connected to personal computers, workstations, routers or other hosts anywhere that TCP/IP, TTCP/IP or SPX/IPX protocols are being utilized.

The INIC 200 is connected with four network lines 210, 240, 242 and 244, which may transport data along a number of different conduits, such as twisted pair, coaxial cable or optical fiber, each of the connections providing a media independent interface (MII) via commercially available physical layer chips, such as model 80220/80221 Ethernet Media Interface Adapter from SEEQ Technology Incorporated, 47200 Bayside Parkway, Fremont, Calif. 94538. The lines preferably are 802.3 compliant and in connection with the INIC constitute four complete Ethernet nodes, the INIC supporting 10 Base-T, 10 Base-T2, 100 Base-TX, 100 Base-FX and 100 Base-T4 as well as future interface standards. Physical layer identification and initialization is accomplished through host driver initialization routines. The connection between the network lines 210, 240, 242 and 244 and the INIC 200 is controlled by MAC units MAC-A 402, MAC-B 404, MAC-C 406 and MAC-D 408 which contain logic circuits for performing the basic functions of the MAC sublayer, essentially controlling when the INIC accesses the network lines 210, 240, 242 and 244. The MAC units 402-408 may act in promiscuous, multicast or unicast modes, allowing the INIC to function as a network monitor, receive broadcast and multicast packets and implement multiple MAC addresses for each node. The MAC units 402-408 also provide statistical information that can be used for simple network management protocol (SNMP).

The MAC units 402, 404, 406 and 408 are each connected to a transmit and receive sequencer, XMT & RCV-A 418, XMT & RCV-B 420, XMT & RCV-C 422 and XMT & RCV-D 424, by wires 410, 412, 414 and 416, respectively. Each of the transmit and receive sequencers can perform several protocol processing steps on the fly as message frames pass through that sequencer. In combination with the MAC units, the transmit and receive sequencers 418-422 can compile the packet status for the data link, network, transport, session and, if appropriate, presentation and application layer protocols in hardware, greatly reducing the time for such protocol processing compared to conventional sequential software engines. The transmit and receive sequencers 410-414 are connected, by lines 426, 428, 430 and 432 to an SRAM and DMA controller 444, which includes DMA controllers 438 and SRAM controller 442. Static random access memory (SRAM) buffers 440 are coupled with SRAM controller 442 by line 441. The SRAM and DMA controllers 444 interact across line 446 with external memory control 450 to send and receive frames via external memory bus 455 to and from dynamic random access memory (DRAM) buffers 460, which is located adjacent to the IC chip 400. The DRAM buffers 460 may be configured as 4 MB, 8 MB, 16 MB or 32 MB, and may optionally be disposed on the chip. The SRAM and DMA controllers 444 are connected via line 464 to a PCI Bus Interface Unit (BIU) 468, which manages the interface between the INIC 200 and the PCI interface bus 257. The 64-bit, multiplexed BIU 468 provides a direct interface to the PCI bus 257 for both slave and master functions. The INIC 200 is capable of operating in either a 64-bit or 32-bit PCI environment, while supporting 64-bit addressing in either configuration.

A microprocessor 470 is connected by line 472 to the SRAM and DMA controllers 444, and connected via line 475 to the PCI BIU 468. Microprocessor 470 instructions and register files reside in an on chip control store 480, which includes a writable on-chip control store (WCS) of SRAM and a read only memory (ROM), and is connected to the microprocessor by line 477. The microprocessor 470 offers a programmable state machine which is capable of processing incoming frames, processing host commands, directing network traffic and directing PCI bus traffic. Three processors are implemented using shared hardware in a three level pipelined architecture that launches and completes a single instruction for every clock cycle. A receive processor 482 is primarily used for receiving communications while a transmit processor 484 is primarily used for transmitting communications in order to facilitate full duplex communication, while a utility processor 486 offers various functions including overseeing and controlling PCI register access.

The instructions for the three processors 482, 484 and 486 reside in the on-chip control-store 480. Thus the functions of the three processors can be easily redefined, so that the microprocessor 470 can adapted for a given environment. For instance, the amount of processing required for receive functions may outweigh that required for either transmit or utility functions. In this situation, some receive functions may be performed by the transmit processor 484 and/or the utility processor 486. Alternatively, an additional level of pipelining can be created to yield four or more virtual processors instead of three, with the additional level devoted to receive functions.

The INIC 200 in this embodiment can support up to 256 CCBs which are maintained in a table in the DRAM 460. There is also, however, a CCB index in hash order in the SRAM 440 to save sequential searching. Once a hash has been generated, the CCB is cached in SRAM, with up to sixteen cached CCBs in SRAM in this example. Allocation of the sixteen CCBs cached in SRAM is handled by a least recently used register, described below. These cache locations are shared between the transmit 484 and receive 486 processors so that the processor with the heavier load is able to use more cache buffers. There are also eight header buffers and eight command buffers to be shared between the sequencers. A given header or command buffer is not statically linked to a specific CCB buffer, as the link is dynamic on a per-frame basis.

Figure 14:
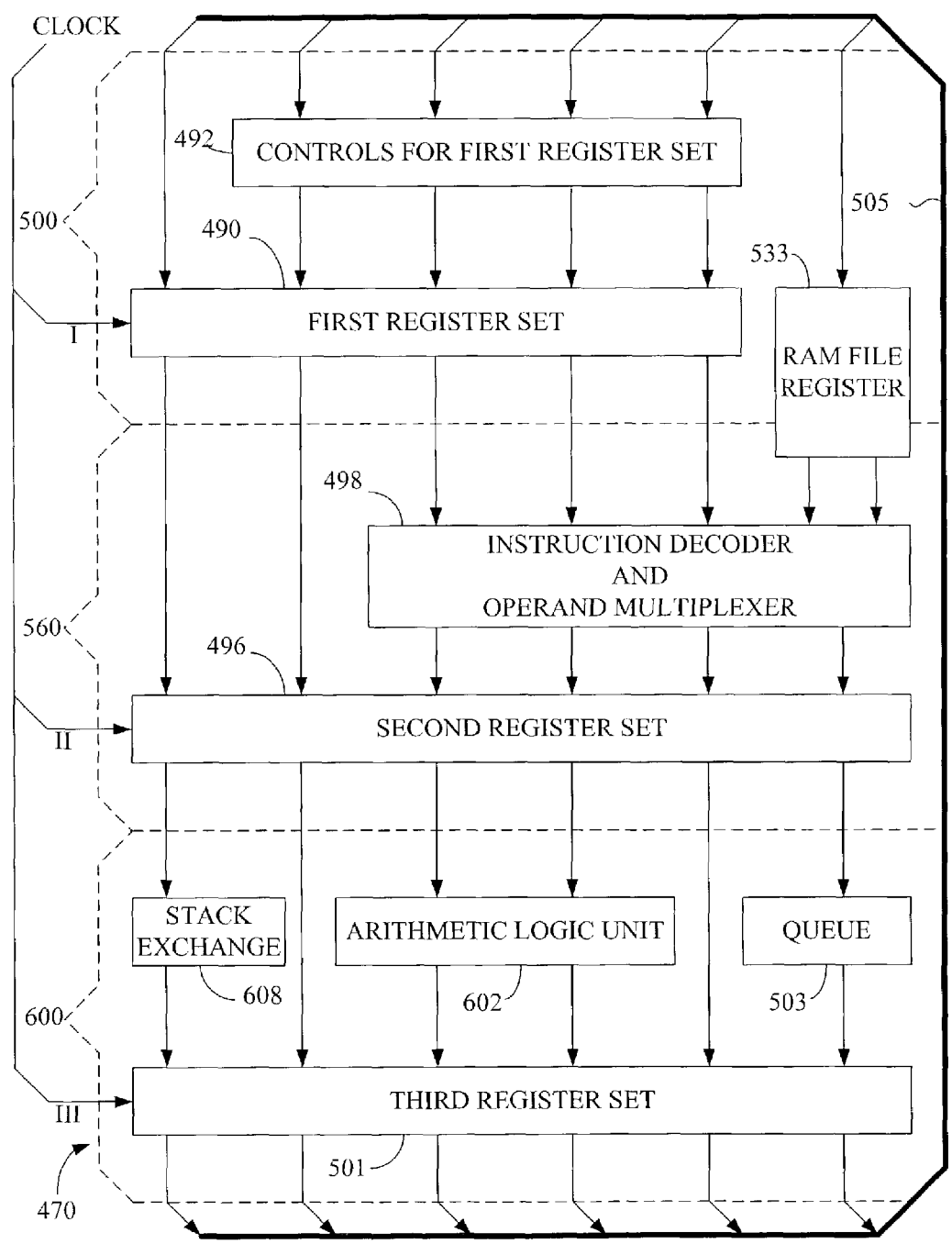
FIG. 14 is a diagram of a trio of pipelined microprocessors included in the INIC of FIG. 13, including three phases with a processor in each phase.

FIG. 14 shows an overview of the pipelined microprocessor 470, in which instructions for the receive, transmit and utility processors are executed in three alternating phases according to Clock increments I, II and III, the phases corresponding to each of the pipeline stages. Each phase is responsible for different functions, and each of the three processors occupies a different phase during each Clock increment. Each processor usually operates upon a different instruction stream from the control store 480, and each carries its own program counter and status through each of the phases.

In general, a first instruction phase 500 of the pipelined microprocessors completes an instruction and stores the result in a destination operand, fetches the next instruction, and stores that next instruction in an instruction register. A first register set 490 provides a number of registers including the instruction register, and a set of controls 492 for first register set provides the controls for storage to the first register set 490. Some items pass through the first phase without modification by the controls 492, and instead are simply copied into the first register set 490 or a RAM file register 533. A second instruction phase 560 has an instruction decoder and operand multiplexer 498 that generally decodes the instruction that was stored in the instruction register of the first register set 490 and gathers any operands which have been generated, which are then stored in a decode register of a second register set 496. The first register set 490, second register set 496 and a third register set 501, which is employed in a third instruction phase 600, include many of the same registers, as will be seen in the more detailed views of FIGS. 15A-C. The instruction decoder and operand multiplexer 498 can read from two address and data ports of the RAM file register 533, which operates in both the first phase 500 and second phase 560. A third phase 600 of the processor 470 has an arithmetic logic unit (ALU) 602 which generally performs any ALU operations on the operands from the second register set, storing the results in a results register included in the third register set 501. A stack exchange 608 can reorder register stacks, and a queue manager 503 can arrange queues for the processor 470, the results of which are stored in the third register set. The instructions continue with the first phase then following the third phase, as depicted by a circular pipeline 505. Note that various functions have been distributed across the three phases of the instruction execution in order to minimize the combinatorial delays within any given phase. With a frequency in this embodiment of 66 MHz, each Clock increment takes 15 nanoseconds to complete, for a total of 45 nanoseconds to complete one instruction for each of the three processors. The rotating instruction phases are depicted in more detail in FIGS. 15A-C, in which each phase is shown in a different figure.

Figure 15A:
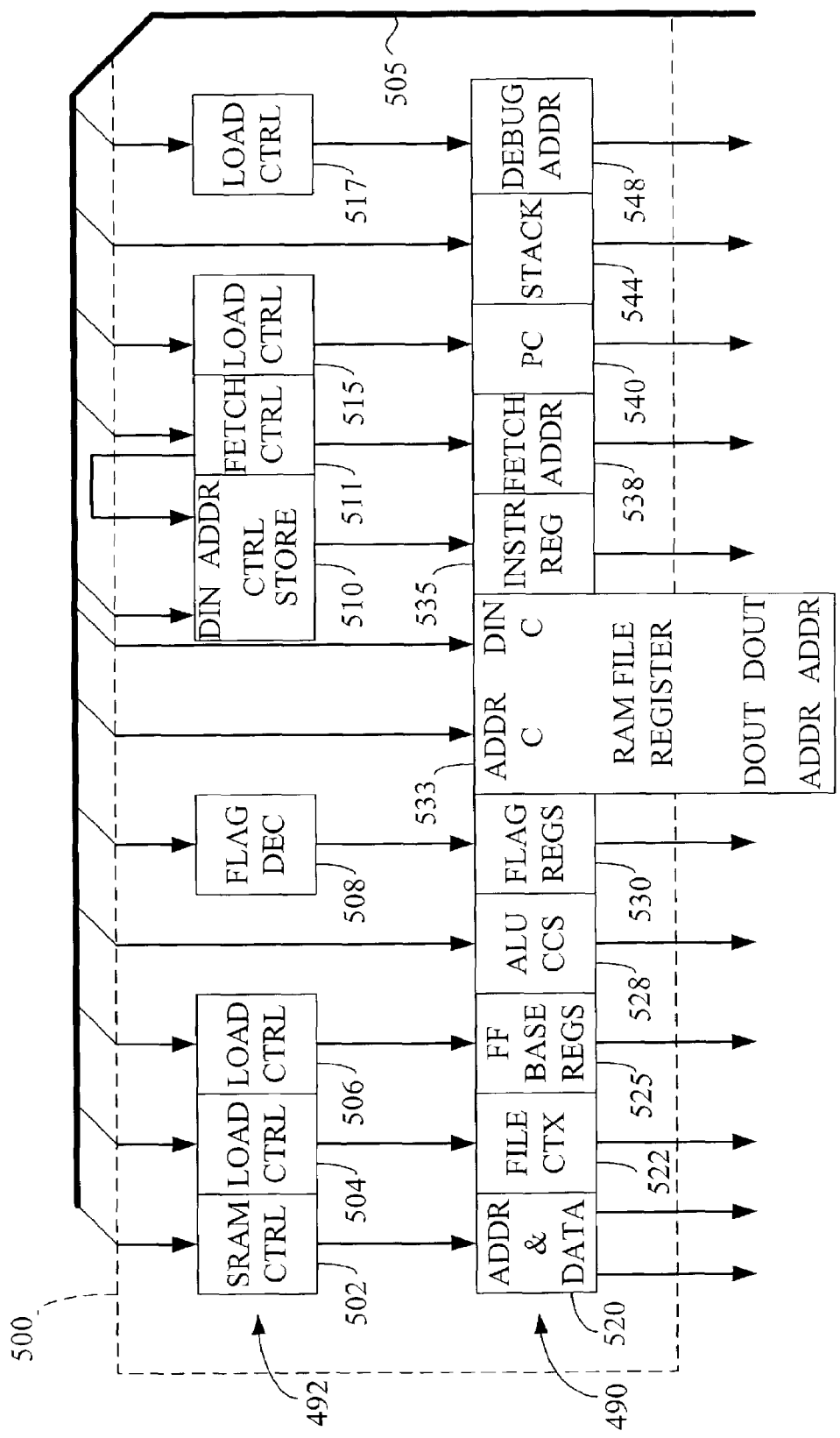
FIG. 15A is a diagram of a first phase of the pipelined microprocessor of FIG. 14.

More particularly, FIG. 15A shows some specific hardware functions of the first phase 500, which generally includes the first register set 490 and related controls 492. The controls for the first register set 492 includes an SRAM control 502, which is a logical control for loading address and write data into SRAM address and data registers 520. Thus the output of the ALU 602 from the third phase 600 may be placed by SRAM control 502 into an address register or data register of SRAM address and data registers 520. A load control 504 similarly provides controls for writing a context for a file to file context register 522, and another load control 506 provides controls for storing a variety of miscellaneous data to flip-flop registers 525. ALU condition codes, such as whether a carried bit is set, get clocked into ALU condition codes register 528 without an operation performed in the first phase 500. Flag decodes 508 can perform various functions, such as setting locks, that get stored in flag registers 530.

The RAM file register 533 has a single write port for addresses and data and two read ports for addresses and data, so that more than one register can be read from at one time. As noted above, the RAM file register 533 essentially straddles the first and second phases, as it is written in the first phase 500 and read from in the second phase 560. A control store instruction 510 allows the reprogramming of the processors due to new data in from the control store 480, not shown in this figure, the instructions stored in an instruction register 535. The address for this is generated in a fetch control register 511, which determines which address to fetch, the address stored in fetch address register 538. Load control 515 provides instructions for a program counter 540, which operates much like the fetch address for the control store. A last-in first-out stack 544 of three registers is copied to the first register set without undergoing other operations in this phase. Finally, a load control 517 for a debug address 548 is optionally included, which allows correction of errors that may occur.

Figure 15B:
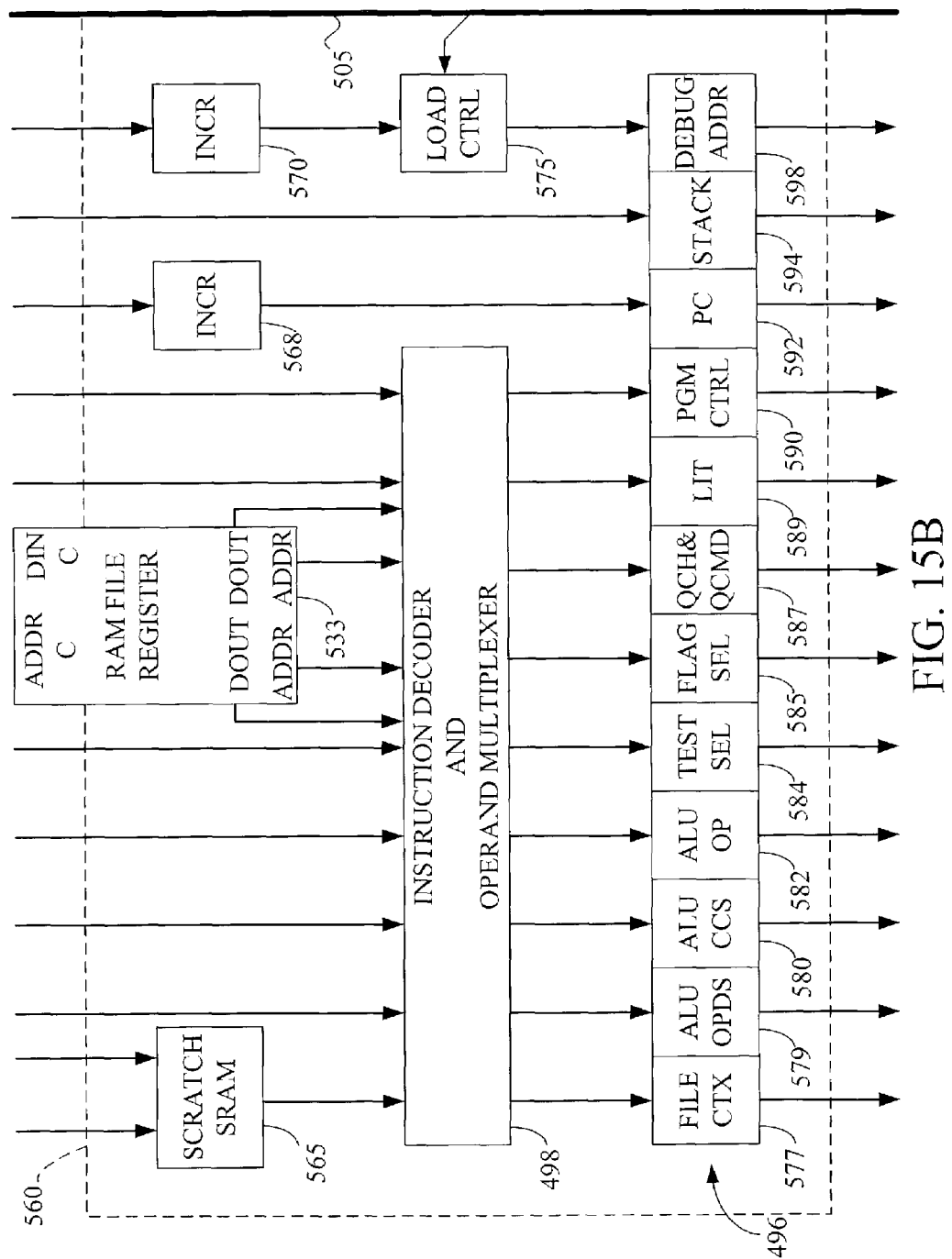
FIG. 15B is a diagram of a second phase of the pipelined microprocessor of FIG. 14.

FIG. 15B depicts the second microprocessor phase 560, which includes reading addresses and data out of the RAM file register 533. A scratch SRAM 565 is written from SRAM address and data register 520 of the first register set, which includes a register that passes through the first two phases to be incremented in the third. The scratch SRAM 565 is read by the instruction decoder and operand multiplexer 498, as are most of the registers from the first register set, with the exception of the stack 544, debug address 548 and SRAM address and data register mentioned above. The instruction decoder and operand multiplexer 498 looks at the various registers of set 490 and SRAM 565, decodes the instructions and gathers the operands for operation in the next phase, in particular determining the operands to provide to the ALU 602 below. The outcome of the instruction decoder and operand multiplexer 498 is stored to a number of registers in the second register set 496, including ALU operands 579 and 582, ALU condition code register 580, and a queue channel and command 587 register, which in this embodiment can control thirty-two queues. Several of the registers in set 496 are loaded fairly directly from the instruction register 535 above without substantial decoding by the decoder 498, including a program control 590, a literal field 589, a test select 584 and a flag select 585. Other registers such as the file context 522 of the first phase 500 are always stored in a file context 577 of the second phase 560, but may also be treated as an operand that is gathered by the multiplexer 572. The stack registers 544 are simply copied in stack register 594. The program counter 540 is incremented 568 in this phase and stored in register 592. Also incremented 570 is the optional debug address 548, and a load control 575 may be fed from the pipeline 505 at this point in order to allow error control in each phase, the result stored in debug address 598.

Figure 15C:
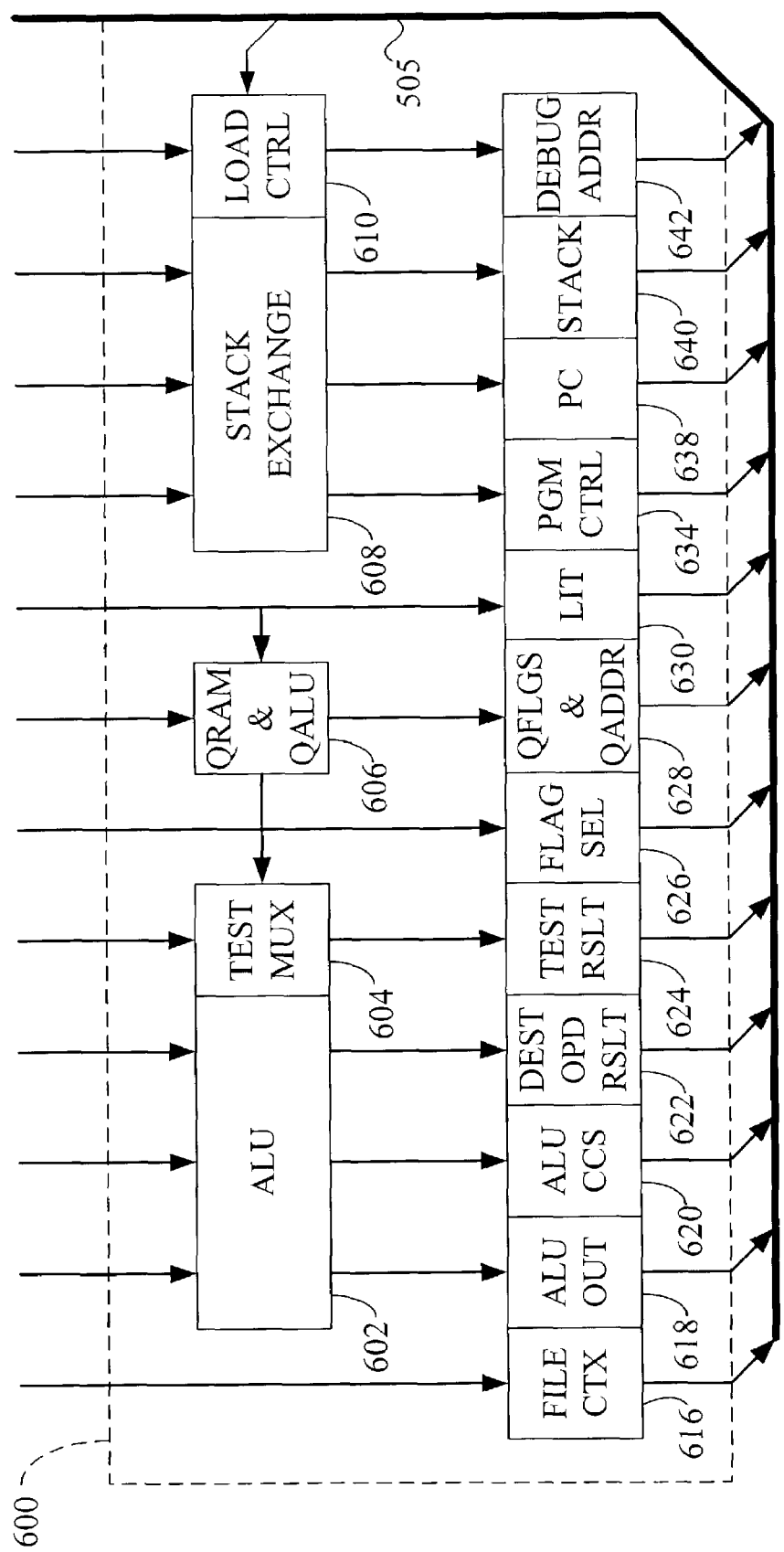
FIG. 15C is a diagram of a third phase of the pipelined microprocessor of FIG. 14.

FIG. 15C depicts the third microprocessor phase 600, which includes ALU and queue operations. The ALU 602 includes an adder, priority encoders and other standard logic functions. Results of the ALU are stored in registers ALU output 618, ALU condition codes 620 and destination operand results 622. A file context register 616, flag select register 626 and literal field register 630 are simply copied from the previous phase 560. A test multiplexer 604 is provided to determine whether a conditional jump results in a jump, with the results stored in a test results register 624. The test multiplexer 604 may instead be performed in the first phase 500 along with similar decisions such as fetch control 511. A stack exchange 608 shifts a stack up or down by fetching a program counter from stack 594 or putting a program counter onto that stack, results of which are stored in program control 634, program counter 638 and stack 640 registers. The SRAM address may optionally be incremented in this phase 600. Another load control 610 for another debug address 642 may be forced from the pipeline 505 at this point in order to allow error control in this phase also. A QRAM & QALU 606, shown together in this figure, read from the queue channel and command register 587, store in SRAM and rearrange queues, adding or removing data and pointers as needed to manage the queues of data, sending results to the test multiplexer 604 and a queue flags and queue address register 628. Thus the QRAM & QALU 606 assume the duties of managing queues for the three processors, a task conventionally performed sequentially by software on a CPU, the queue manager 606 instead providing accelerated and substantially parallel hardware queuing.

Figure 16:
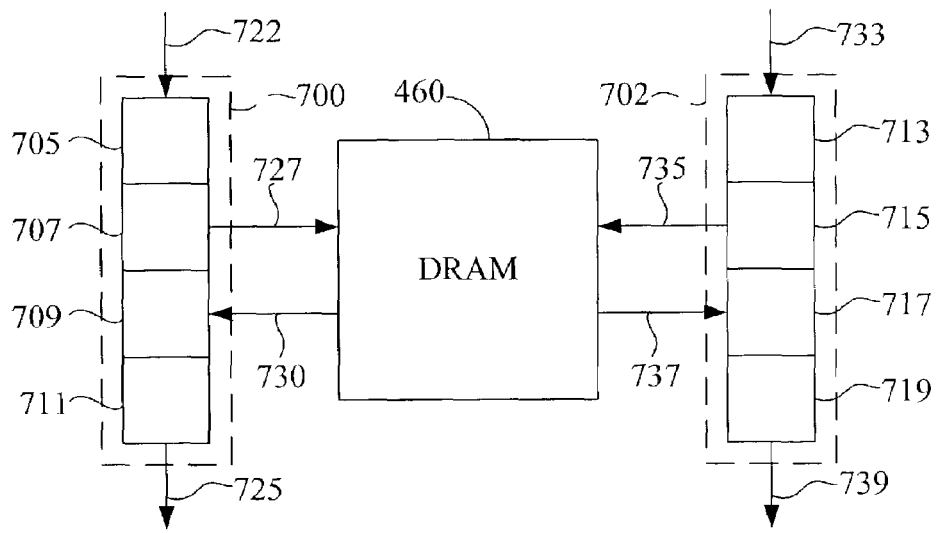
FIG. 16 is a diagram of a plurality of queue storage units that interact with the microprocessor of FIG. 14 and include SRAM and DRAM.

FIG. 16 depicts two of the thirty-two hardware queues that are managed by the queue manager 606, with each of the queues having an SRAM head, an SRAM tail and the ability to queue information in a DRAM body as well, allowing expansion and individual configuration of each queue. Thus FIFO 700 has SRAM storage units, 705, 707, 709 and 711, each containing eight bytes for a total of thirty-two bytes, although the number and capacity of these units may vary in other embodiments. Similarly, FIFO 702 has SRAM storage units 713, 715, 717 and 719. SRAM units 705 and 707 are the head of FIFO 700 and units 709 and 711 are the tail of that FIFO, while units 713 and 715 are the head of FIFO 702 and units 717 and 719 are the tail of that FIFO. Information for FIFO 700 may be written into head units 705 or 707, as shown by arrow 722, and read from tail units 711 or 709, as shown by arrow 725. A particular entry, however, may be both written to and read from head units 705 or 707, or may be both written to and read from tail units 709 or 711, minimizing data movement and latency. Similarly, information for FIFO 702 is typically written into head units 713 or 715, as shown by arrow 733, and read from tail units 717 or 719, as shown by arrow 739, but may instead be read from the same head or tail unit to which it was written.

The SRAM FIFOS 700 and 702 are both connected to DRAM 460, which allows virtually unlimited expansion of those FIFOS to handle situations in which the SRAM head and tail are full. For example a first of the thirty-two queues, labeled Q-zero, may queue an entry in DRAM 460, as shown by arrow 727, by DMA units acting under direction of the queue manager, instead of being queued in the head or tail of FIFO 700. Entries stored in DRAM 460 return to SRAM unit 709, as shown by arrow 730, extending the length and fall-through time of that FIFO. Diversion from SRAM to DRAM is typically reserved for when the SRAM is fill, since DRAM is slower and DMA movement causes additional latency. Thus Q-zero may comprise the entries stored by queue manager 606 in both the FIFO 700 and the DRAM 460. Likewise, information bound for FIFO 702, which may correspond to Q-twenty-seven, for example, can be moved by DMA into DRAM 460, as shown by arrow 735. The capacity for queuing in cost-effective albeit slower DRAM 460 is user-definable during initialization, allowing the queues to change in size as desired. Information queued in DRAM 460 is returned to SRAM unit 717, as shown by arrow 737.

Figure 17:
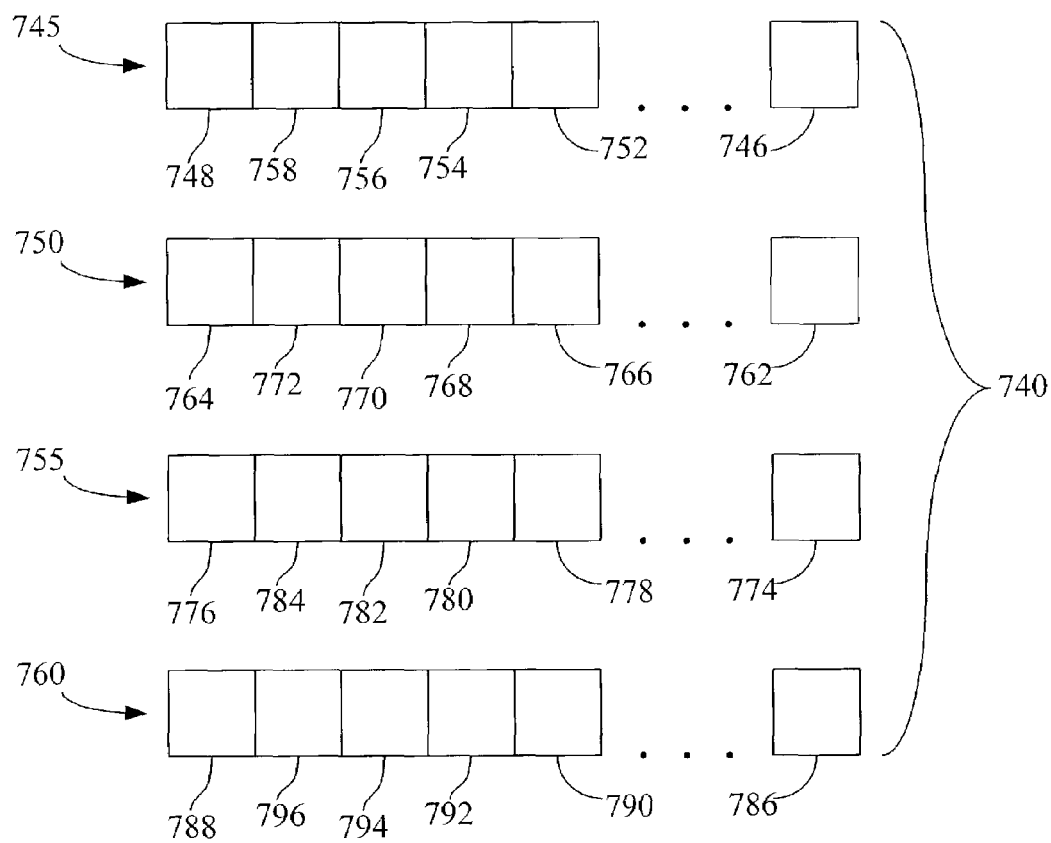
FIG. 17 is a diagram of a set of status registers for the queues storage units of FIG. 16.

Status for each of the thirty-two hardware queues is conveniently maintained in and accessed from a set 740 of four, thirty-two bit registers, as shown in FIG. 17, in which a specific bit in each register corresponds to a specific queue. The registers are labeled Q-Out_Ready 745, Q-In_Ready 750, Q-Empty 755 and Q-Full 760. If a particular bit is set in the Q-Out Ready register 750, the queue corresponding to that bit contains information that is ready to be read, while the setting of the same bit in the Q-In_Ready 752 register means that the queue is ready to be written. Similarly, a positive setting of a specific bit in the Q-Empty register 755 means that the queue corresponding to that bit is empty, while a positive setting of a particular bit in the Q-Full register 760 means that the queue corresponding to that bit is full. Thus Q-Out_Ready 745 contains bits zero 746 through thirty-one 748, including bits twenty-seven 752, twenty-eight 754, twenty-nine 756 and thirty 758. Q-In_Ready 750 contains bits zero 762 through thirty-one 764, including bits twenty-seven 766, twenty-eight 768, twenty-nine 770 and thirty 772. Q-Empty 755 contains bits zero 774 through thirty-one 776, including bits twenty-seven 778, twenty-eight 780, twenty-nine 782 and thirty 784, and Q-full 760 contains bits zero 786 through thirty-one 788, including bits twenty-seven 790, twenty-eight 792, twenty-nine 794 and thirty 796.

Q-zero, corresponding to FIFO 700, is a free buffer queue, which holds a list of addresses for all available buffers. This queue is addressed when the microprocessor or other devices need a free buffer address, and so commonly includes appreciable DRAM 460. Thus a device needing a free buffer address would check with Q-zero to obtain that address. Q-twenty-seven, corresponding to FIFO 702, is a receive buffer descriptor queue. After processing a received frame by the receive sequencer the sequencer looks to store a descriptor for the frame in Q-twenty-seven. If a location for such a descriptor is immediately available in SRAM, bit twenty-seven 766 of Q-In_Ready 750 will be set. If not, the sequencer must wait for the queue manager to initiate a DMA move from SRAM to DRAM, thereby freeing space to store the receive descriptor.

Figure 18:
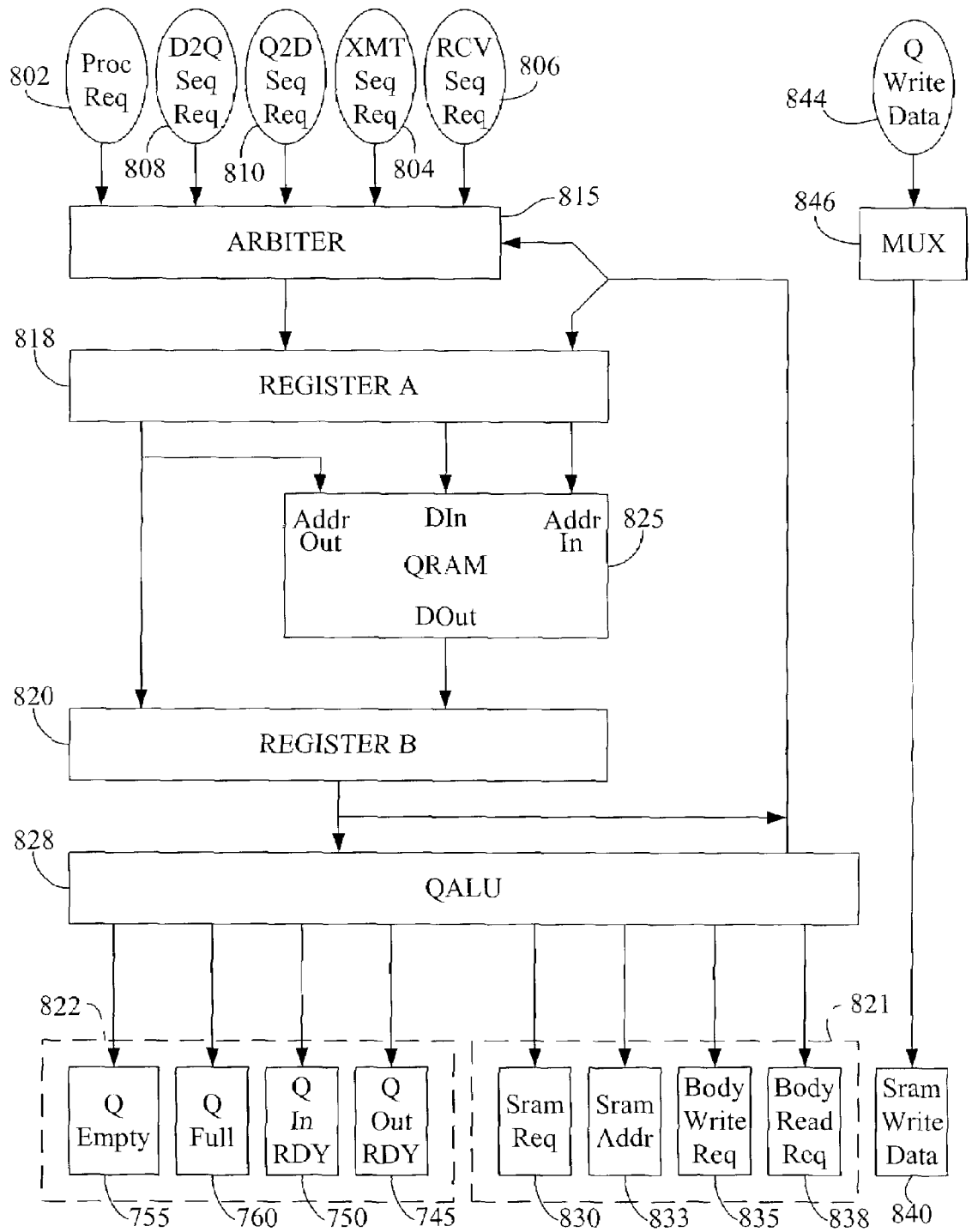
FIG. 18 is a diagram of a queue manager, which interacts, with the queue storage units and status registers of FIG. 16 and FIG. 17.

Operation of the queue manager, which manages movement of queue entries between SRAM and the processor, the transmit and receive sequencers, and also between SRAM and DRAM, is shown in more detail in FIG. 18. Requests which utilize the queues include Processor Request 802, Transmit Sequencer Request 804, and Receive Sequencer Request 806. Other requests for the queues are DRAM to SRAM Request 808 and SRAM to DRAM Request 810, which operate on behalf of the queue manager in moving data back and forth between the DRAM and the SRAM head or tail of the queues. Determining which of these various requests will get to use the queue manager in the next cycle is handled by priority logic Arbiter 815. To enable high frequency operation the queue manager is pipelined, with Register A 818 and Register B 820 providing temporary storage, while Status Register 822 maintains status until the next update. The queue manager reserves even cycles for DMA, receive and transmit sequencer requests and odd cycles for processor requests. Dual ported QRAM 825 stores variables regarding each of the queues, the variables for each queue including a Head Write Pointer, Head Read Pointer, Tail Write Pointer and Tail Read Pointer corresponding to the queue's SRAM condition, and a Body Write Pointer and Body Read Pointer corresponding to the queue's DRAM condition and the queue's size.

After Arbiter 815 has selected the next operation to be performed, the variables of QRAM 825 are fetched and modified according to the selected operation by a QALU 828, and an SRAM Read Request 830 or an SRAM Write Request 840 may be generated. The variables are updated and the updated status is stored in Status Register 822 as well as QRAM 825. The status is also fed to Arbiter 815 to signal that the operation previously requested has been fulfilled, inhibiting duplication of requests. The Status Register 822 updates the four queue registers Q-Out_Ready 745, Q-In_Ready 750, Q-Empty 755 and Q-Full 760 to reflect the new status of the queue that was accessed. Similarly updated are SRAM Addresses 833, Body Write Request 835 and Body Read Requests 838, which are accessed via DMA to and from SRAM head and tails for that queue. Alternatively, various processes may wish to write to a queue, as shown by Q Write Data 844, which are selected by multiplexor 846, and pipelined to SRAM Write Request 840. The SRAM controller services the read and write requests by writing the tail or reading the head of the accessed queue and returning an acknowledge. In this manner the various queues are utilized and their status updated.

Figure 19A:
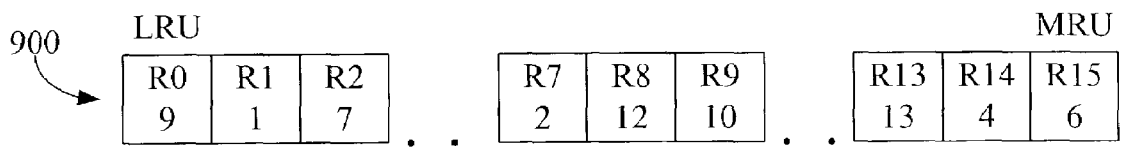
FIGS. 19A-D are diagrams of various stages of a least-recently-used register that is employed for allocating cache memory.
Figure 19B:
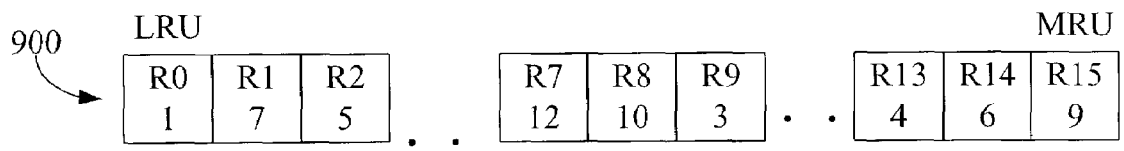
Figure 19C:
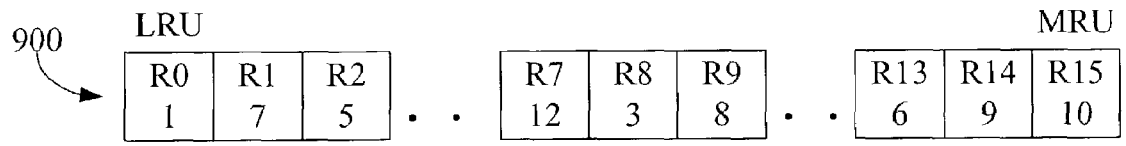

FIGS. 19A-C show a least-recently-used register 900 that is employed for choosing which contexts or CCBs to maintain in INIC cache memory. The INIC in this embodiment can cache up to sixteen CCBs in SRAM at a given time, and so when a new CCB is cached an old one must often be discarded, the discarded CCB usually chosen according to this register 900 to be the CCB that has been used least recently. In this embodiment, a hash table for up to two hundred fifty-six CCBs is also maintained in SRAM, while up to two hundred fifty-six full CCBs are held in DRAM. The least-recently-used register 900 contains sixteen four-bit blocks labeled R0-R15, each of which corresponds to an SRAM cache unit. Upon initialization, the blocks are numbered 0-15, with number 0 arbitrarily stored in the block representing the least recently used (LRU) cache unit and number 15 stored in the block representing the most recently used (MRU) cache unit. FIG. 19A shows the register 900 at an arbitrary time when the LRU block R0 holds the number 9 and the MRU block R15 holds the number 6.

When a different CCB than is currently being held in SRAM is to be cached, the LRU block R0 is read, which in FIG. 19A holds the number 9, and the new CCB is stored in the SRAM cache unit corresponding to number 9. Since the new CCB corresponding to number 9 is now the most recently used CCB, the number 9 is stored in the MRU block, as shown in FIG. 19B. The other numbers are all shifted one register block to the left, leaving the number 1 in the LRU block. The CCB that had previously been cached in the SRAM unit corresponding to number 9 has been moved to slower but more cost-effective DRAM.

FIG. 19C shows the result when the next CCB used had already been cached in SRAM. In this example, the CCB was cached in an SRAM unit corresponding to number 10, and so after employment of that CCB, number 10 is stored in the MRU block. Only those numbers which had previously been more recently used than number 10 (register blocks R9-R15) are shifted to the left, leaving the number 1 in the LRU block. In this manner the INIC maintains the most active CCBs in SRAM cache.

Figure 19D:
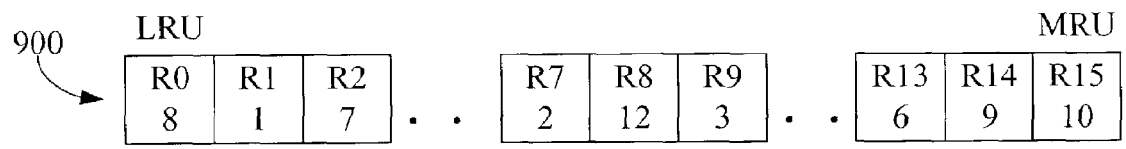

In some cases a CCB being used is one that is not desirable to hold in the limited cache memory. For example, it is preferable not to cache a CCB for a context that is known to be closing, so that other cached CCBs can remain in SRAM longer. In this case, the number representing the cache unit holding the decacheable CCB is stored in the LRU block R0 rather than the MRU block R15, so that the decacheable CCB will be replaced immediately upon employment of a new CCB that is cached in the SRAM unit corresponding to the number held in the LRU block R0. FIG. 19D shows the case for which number 8 (which had been in block R9 in FIG. 19C) corresponds to a CCB that will be used and then closed. In this case number 8 has been removed from block R9 and stored in the LRU block R0. All the numbers that had previously been stored to the left of block R9 (R1-R8) are then shifted one block to the right.

Figure 20:
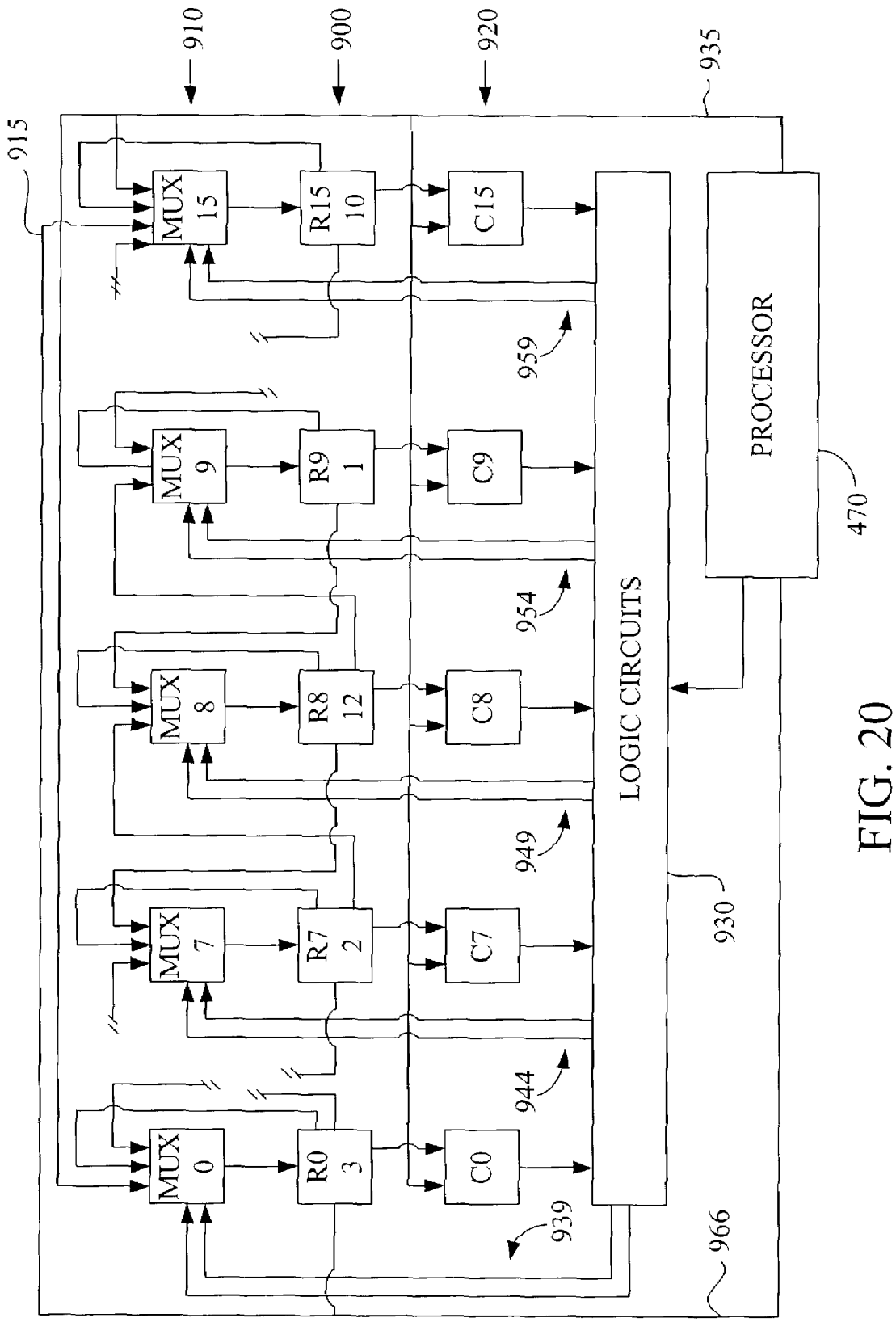
FIG. 20 is a diagram of the devices used to operate the least-recently-used register of FIGS. 19A-D.

FIG. 20 shows some of the logical units employed to operate the least-recently-used register 900. An array of sixteen, three or four input multiplexors 910, of which only multiplexors MUX0, MUX7, MUX8, MUX9 and MUX15 are shown for clarity, have outputs fed into the corresponding sixteen blocks of least-recently-used register 900. For example, the output of MUX0 is stored in block R0, the output of MUX7 is stored in block R7, etc. The value of each of the register blocks is connected to an input for its corresponding multiplexor and also into inputs for both adjacent multiplexors, for use in shifting the block numbers. For instance, the number stored in R8 is fed into inputs for MUX7, MUX8 and MUX9. MUX0 and MUX15 each have only one adjacent block, and the extra input for those multiplexors is used for the selection of LRU and MRU blocks, respectively. MUX15 is shown as a four-input multiplexor, with input 915 providing the number stored on R0.

An array of sixteen comparators 920 each receives the value stored in the corresponding block of the least-recently-used register 900. Each comparator also receives a signal from processor 470 along line 935 so that the register block having a number matching that sent by processor 470 outputs true to logic circuits 930 while the other fifteen comparators output false. Logic circuits 930 control a pair of select lines leading to each of the multiplexors, for selecting inputs to the multiplexors and therefore controlling shifting of the register block numbers. Thus select lines 939 control MUX0, select lines 944 control MUX7, select lines 949 control MUX8, select lines 954 control MUX9 and select lines 959 control MUX15.

When a CCB is to be used, processor 470 checks to see whether the CCB matches a CCB currently held in one of the sixteen cache units. If a match is found, the processor sends a signal along line 935 with the block number corresponding to that cache unit, for example number 12. Comparators 920 compare the signal from that line 935 with the block numbers and comparator C8 provides a true output for the block R8 that matches the signal, while all the other comparators output false. Logic circuits 930, under control from the processor 470, use select lines 959 to choose the input from line 935 for MUX15, storing the number 12 in the MRU block R15. Logic circuits 930 also send signals along the pairs of select lines for MUX8 and higher multiplexors, aside from MUX15, to shift their output one block to the left, by selecting as inputs to each multiplexor MUX8 and higher the value that had been stored in register blocks one block to the right (R9-R15). The outputs of multiplexors that are to the left of MUX8 are selected to be constant.

If processor 470 does not find a match for the CCB among the sixteen cache units, on the other hand, the processor reads from LRU block R0 along line 966 to identify the cache corresponding to the LRU block, and writes the data stored in that cache to DRAM. The number that was stored in R0, in this case number 3, is chosen by select lines 959 as input 915 to MUX15 for storage in MRU block R15. The other fifteen multiplexors output to their respective register blocks the numbers that had been stored each register block immediately to the right.

For the situation in which the processor wishes to remove a CCB from the cache after use, the LRU block R0 rather than the MRU block MUX15 is selected for placement of the number corresponding to the cache unit holding that CCB. The number corresponding to the CCB to be placed in the LRU block R0 for removal from SRAM (for example number 1, held in block R9) is sent by processor 470 along line 935, which is matched by comparator C9. The processor instructs logic circuits 930 to input the number 1 to R0, by selecting with lines 939 input 935 to MUX0. Select lines 954 to MUX9 choose as input the number held in register block R8, so that the number from R8 is stored in R9. The numbers held by the other register blocks between R0 and R9 are similarly shifted to the right, whereas the numbers in register blocks to the right of R9 are left constant. This frees scarce cache memory from maintaining closed CCBs for many cycles while their identifying numbers move through register blocks from the MRU to the LRU blocks.

Figure 21:
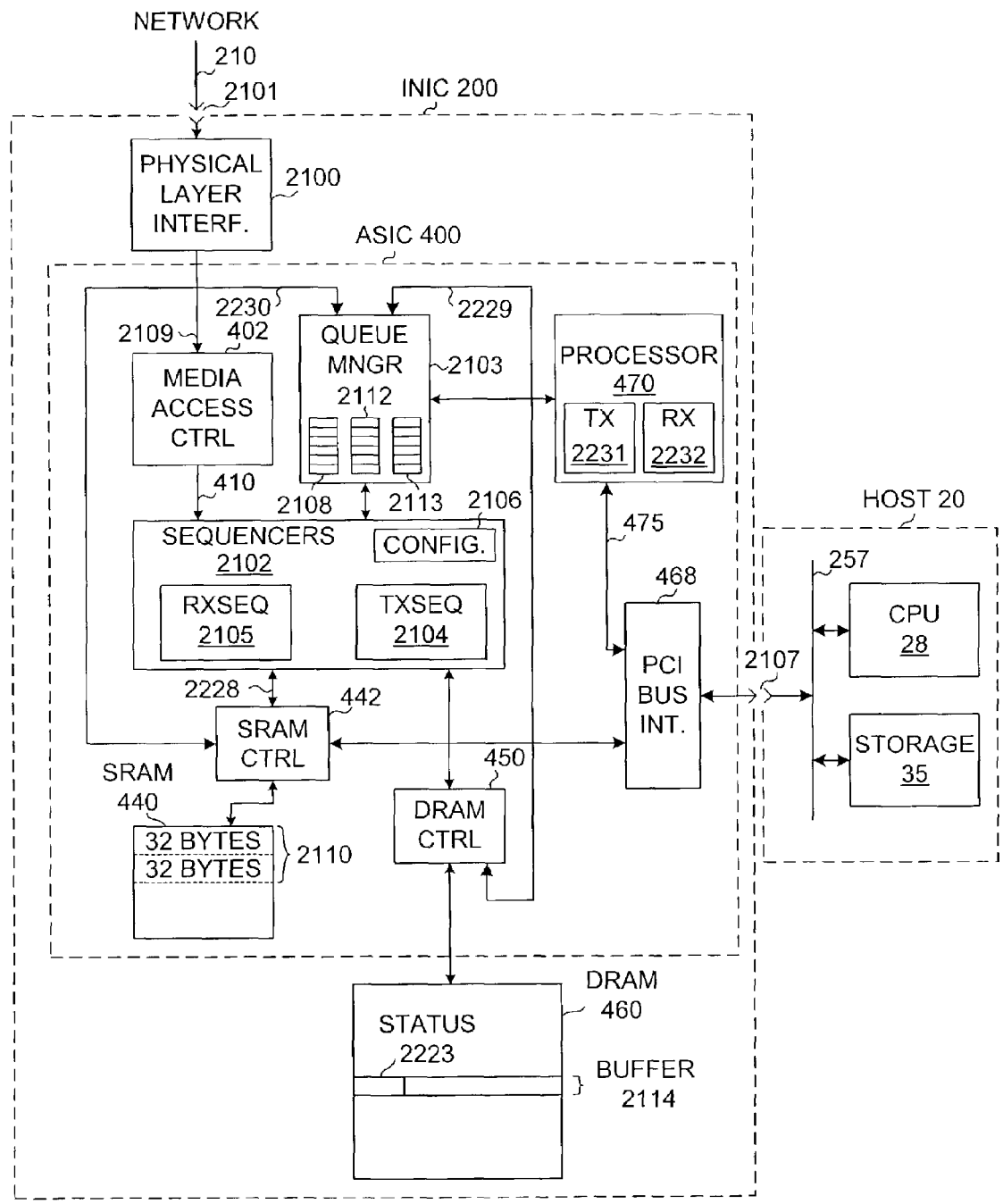
FIG. 21 is another diagram of Intelligent Network Interface Card (INIC) 200 of FIG. 13.

FIG. 21 is another diagram of Intelligent Network Interface Card (INIC) 200 of FIG. 13. INIC card 200 includes a Physical Layer Interface (PHY) chip 2100, ASIC chip 400 and Dynamic Random Access Memory (DRAM) 460. PHY chip 2100 couples INIC card 200 to network line 210 via a network connector 2101. INIC card 200 is coupled to the CPU of the host (for example, CPU 28 of host 20 of FIG. 1) via card edge connector 2107 and PCI bus 257. ASIC chip 400 includes a Media Access Control (MAC) unit 402, a sequencers block 2103, SRAM control 442, SRAM 440, DRAM control 450, a queue manager 2103, a processor 470, and a PCI bus interface unit 468. Structure and operation of queue manager 2103 is described above in connection with FIG. 18 and in U.S. patent application Ser. No. 09/416,925, entitled "Queue System For Microprocessors", filed Oct. 13, 1999, by Daryl D. Starr and Clive M. Philbrick (the subject matter of which is incorporated herein by reference). Sequencers block 2102 includes a transmit sequencer 2104, a receive sequencer 2105, and configuration registers 2106. A MAC destination address is stored in configuration register 2106. Part of the program code executed by processor 470 is contained in ROM (not shown) and part is located in a writeable control store SRAM (not shown). The program is downloaded into the writeable control store SRAM at initialization from the host 20.

Figure 22:
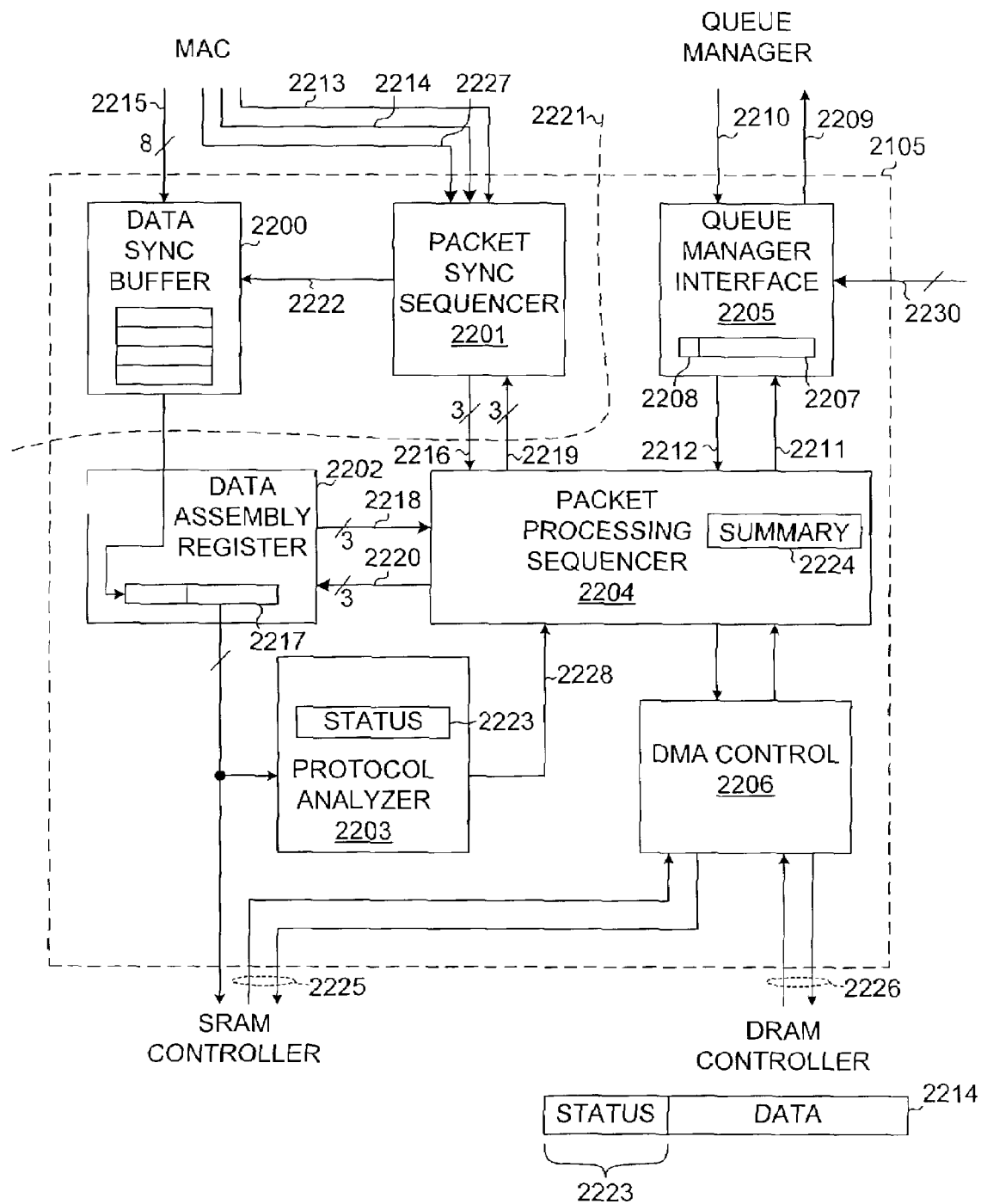
FIG. 22 is a diagram of the receive sequencer of FIG. 21.

FIG. 22 is a more detailed diagram of receive sequencer 2105. Receive sequencer 2105 includes a data synchronization buffer 2200, a packet synchronization sequencer 2201, a data assembly register 2202, a protocol analyzer 2203, a packet processing sequencer 2204, a queue manager interface 2205, and a Direct Memory Access (DMA) control block 2206. The packet synchronization sequencer 2201 and data synchronization buffer 2200 utilize a network-synchronized clock of MAC 402, whereas the remainder of the receive sequencer 2105 utilizes a fixed-frequency clock. Dashed line 2221 indicates the clock domain boundary.

CD Appendix A contains a complete hardware description (verilog code) of an embodiment of receive sequencer 2105. Signals in the verilog code are named to designate their functions. Individual sections of the verilog code are identified and labeled with comment lines. Each of these sections describes hardware in a block of the receive sequencer 2105 as set forth below in Table 1.

TABLE 1

| SECTION OF VERILOG CODE | BLOCK OF FIG. 22 |
| --- | --- |
| Synchronization Interface | 2201 |
| Sync-Buffer Read-Ptr Synchronizers | 2201 |
| Packet-Synchronization Sequencer | 2201 |
| Data Synchronization Buffer | 2201 and 2200 |
| Synchronized Status for Link-Destination-Address | 2201 |
| Synchronized Status-Vector | 2201 |
| Synchronization Interface | 2204 |
| Receive Packet Control and Status | 2204 |
| Buffer-Descriptor | 2201 |
| Ending Packet Status | 2201 |
| AssyReg shift-in. Mac -> AssyReg. | 2202 and 2204 |
| Fifo shift-in. AssyReg -> Sram Fifo | 2206 |
| Fifo ShiftOut Burst. SramFifo -> DramBuffer | 2206 |
| Fly-By Protocol Analyzer; Frame, Network and Transport Layers | 2203 |
| Link Pointer | 2203 |
| Mac address detection | 2203 |
| Magic pattern detection | 2203 |
| Link layer and network layer detection | 2203 |
| Network counter | 2203 |
| Control Packet analysis | 2203 |
| Network header analysis | 2203 |
| Transport layer counter | 2203 |
| Transport header analysis | 2203 |
| Pseudo-header stuff | 2203 |
| Free-Descriptor Fetch | 2205 |
| Receive-Descriptor Store | 2205 |
| Receive-Vector Store | 2205 |
| Queue-manager interface-mux | 2205 |
| Pause Clock Generator | 2201 |
| Pause Timer | 2204 |

Operation of receive sequencer 2105 of FIGS. 21 and 22 is now described in connection with the receipt onto INIC card 200 of a TCP/IP packet from network line 210. At initialization time, processor 470 partitions DRAM 460 into buffers. Receive sequencer 2105 uses the buffers in DRAM 460 to store incoming network packet data as well as status information for the packet. Processor 470 creates a 32-bit buffer descriptor for each buffer. A buffer descriptor indicates the size and location in DRAM of its associated buffer. Processor 470 places these buffer descriptors on a "free-buffer queue" 2108 by writing the descriptors to the queue manager 2103. Queue manager 2103 maintains multiple queues including the "free-buffer queue" 2108. In this implementation, the heads and tails of the various queues are located in SRAM 440, whereas the middle portion of the queues are located in DRAM 460.

Lines 2229 comprise a request mechanism involving a request line and address lines. Similarly, lines 2230 comprise a request mechanism involving a request line and address lines. Queue manager 2103 uses lines 2229 and 2230 to issue requests to transfer queue information from DRAM to SRAM or from SRAM to DRAM.

The queue manager interface 2205 of the receive sequencer always attempts to maintain a free buffer descriptor 2207 for use by the packet processing sequencer 2204. Bit 2208 is a ready bit that indicates that free-buffer descriptor 2207 is available for use by the packet processing sequencer 2204. If queue manager interface 2205 does not have a free buffer descriptor (bit 2208 is not set), then queue manager interface 2205 requests one from queue manager 2103 via request line 2209. (Request line 2209 is actually a bus which communicates the request, a queue ID, a read/write signal and data if the operation is a write to the queue.)

In response, queue manager 2103 retrieves a free buffer descriptor from the tail of the "free buffer queue" 2108 and then alerts the queue manager interface 2205 via an acknowledge signal on acknowledge line 2210. When queue manager interface 2205 receives the acknowledge signal, the queue manager interface 2205 loads the free buffer descriptor 2207 and sets the ready bit 2208. Because the free buffer descriptor was in the tail of the free buffer queue in SRAM 440, the queue manager interface 2205 actually receives the free buffer descriptor 2207 from the read data bus 2228 of the SRAM control block 442. Packet processing sequencer 2204 requests a free buffer descriptor 2207 via request line 2211. When the queue manager interface 2205 retrieves the free buffer descriptor 2207 and the free buffer descriptor 2207 is available for use by the packet processing sequencer, the queue manager interface 2205 informs the packet processing sequencer 2204 via grant line 2212. By this process, a free buffer descriptor is made available for use by the packet processing sequencer 2204 and the receive sequencer 2105 is ready to processes an incoming packet.

Next, a TCP/IP packet is received from the network line 210 via network connector 2101 and Physical Layer Interface (PHY) 2100. PHY 2100 supplies the packet to MAC 402 via a Media Independent Interface (MII) parallel bus 2109. MAC 402 begins processing the packet and asserts a "start of packet" signal on line 2213 indicating that the beginning of a packet is being received. When a byte of data is received in the MAC and is available at the MAC outputs 2215, MAC 402 asserts a "data valid" signal on line 2214. Upon receiving the "data valid" signal, the packet synchronization sequencer 2201 instructs the data synchronization buffer 2200 via load signal line 2222 to load the received byte from data lines 2215. Data synchronization buffer 2200 is four bytes deep. The packet synchronization sequencer 2201 then increments a data synchronization buffer write pointer. This data synchronization buffer write pointer is made available to the packet processing sequencer 2204 via lines 2216. Consecutive bytes of data from data lines 2215 are clocked into the data synchronization buffer 2200 in this way.

A data synchronization buffer read pointer available on lines 2219 is maintained by the packet processing sequencer 2204. The packet processing sequencer 2204 determines that data is available in data synchronization buffer 2200 by comparing the data synchronization buffer write pointer on lines 2216 with the data synchronization buffer read pointer on lines 2219.

Data assembly register 2202 contains a sixteen-byte long shift register 2217. This register 2217 is loaded serially a single byte at a time and is unloaded in parallel. When data is loaded into register 2217, a write pointer is incremented. This write pointer is made available to the packet processing sequencer 2204 via lines 2218. Similarly, when data is unloaded from register 2217, a read pointer maintained by packet processing sequencer 2204 is incremented. This read pointer is available to the data assembly register 2202 via lines 2220. The packet processing sequencer 2204 can therefore determine whether room is available in register 2217 by comparing the write pointer on lines 2218 to the read pointer on lines 2220.

If the packet processing sequencer 2204 determines that room is available in register 2217, then packet processing sequencer 2204 instructs data assembly register 2202 to load a byte of data from data synchronization buffer 2200. The data assembly register 2202 increments the data assembly register write pointer on lines 2218 and the packet processing sequencer 2204 increments the data synchronization buffer read pointer on lines 2219. Data shifted into register 2217 is examined at the register outputs by protocol analyzer 2203 which verifies checksums, and generates "status" information 2223.

DMA control block 2206 is responsible for moving information from register 2217 to buffer 2114 via a sixty-four byte receive FIFO 2110. DMA control block 2206 implements receive FIFO 2110 as two thirty-two byte ping-pong buffers using sixty-four bytes of SRAM 440. DMA control block 2206 implements the receive FIFO using a write-pointer and a read-pointer. When data to be transferred is available in register 2217 and space is available in FIFO 2110, DMA control block 2206 asserts an SRAM write request to SRAM controller 442 via lines 2225. SRAM controller 442 in turn moves data from register 2217 to FIFO 2110 and asserts an acknowledge signal back to DMA control block 2206 via lines 2225. DMA control block 2206 then increments the receive FIFO write pointer and causes the data assembly register read pointer to be incremented.

When thirty-two bytes of data has been deposited into receive FIFO 2110, DMA control block 2206 presents a DRAM write request to DRAM controller 450 via lines 2226. This write request consists of the free buffer descriptor 2207 ORed with a "buffer load count" for the DRAM request address, and the receive FIFO read pointer for the SRAM read address. Using the receive FIFO read pointer, the DRAM controller 450 asserts a read request to SRAM controller 442. SRAM controller 442 responds to DRAM controller 450 by returning the indicated data from the receive FIFO 2110 in SRAM 440 and asserting an acknowledge signal. DRAM controller 450 stores the data in a DRAM write data register, stores a DRAM request address in a DRAM address register, and asserts an acknowledge to DMA control block 2206. The DMA control block 2206 then decrements the receive FIFO read pointer. Then the DRAM controller 450 moves the data from the DRAM write data register to buffer 2114. In this way, as consecutive thirty-two byte chunks of data are stored in SRAM 440, DRAM control block 2206 moves those thirty-two byte chunks of data one at a time from SRAM 440 to buffer 2214 in DRAM 460. Transferring thirty-two byte chunks of data to the DRAM 460 in this fashion allows data to be written into the DRAM using the relatively efficient burst mode of the DRAM.

Packet data continues to flow from network line 210 to buffer 2114 until all packet data has been received. MAC 402 then indicates that the incoming packet has completed by asserting an "end of frame" (i.e., end of packet) signal on line 2227 and by presenting final packet status (MAC packet status) to packet synchronization sequencer 2204. The packet processing sequencer 2204 then moves the status 2223 (also called "protocol analyzer status") and the MAC packet status to register 2217 for eventual transfer to buffer 2114. After all the data of the packet has been placed in buffer 2214, status 2223 and the MAC packet status is transferred to buffer 2214 so that it is stored prepended to the associated data as shown in FIG. 22.

After all data and status has been transferred to buffer 2114, packet processing sequencer 2204 creates a summary 2224 (also called a "receive packet descriptor") by concatenating the free buffer descriptor 2207, the buffer load-count, the MAC ID, and a status bit (also called an "attention bit"). If the attention bit is a one, then the packet is not a "fast-path candidate"; whereas if the attention bit is a zero, then the packet is a "fast-path candidate". The value of the attention bit represents the result of a significant amount of processing that processor 470 would otherwise have to do to determine whether the packet is a "fast-path candidate". For example, the attention bit being a zero indicates that the packet employs both TCP protocol and IP protocol. By carrying out this significant amount of processing in hardware beforehand and then encoding the result in the attention bit, subsequent decision making by processor 470 as to whether the packet is an actual "fast-path packet" is accelerated. A complete logical description of the attention bit in verilog code is set forth in CD Appendix A in the lines following the heading "Ending Packet Status".

Packet processing sequencer 2204 then sets a ready bit (not shown) associated with summary 2224 and presents summary 2224 to queue manager interface 2205. Queue manager interface 2205 then requests a write to the head of a "summary queue" 2112 (also called the "receive descriptor queue"). The queue manager 2103 receives the request, writes the summary 2224 to the head of the summary queue 2212, and asserts an acknowledge signal back to queue manager interface via line 2210. When queue manager interface 2205 receives the acknowledge, queue manager interface 2205 informs packet processing sequencer 2204 that the summary 2224 is in summary queue 2212 by clearing the ready bit associated with the summary. Packet processing sequencer 2204 also generates additional status information (also called a "vector") for the packet by concatenating the MAC packet status and the MAC ID. Packet processing sequencer 2204 sets a ready bit (not shown) associated with this vector and presents this vector to the queue manager interface 2205. The queue manager interface 2205 and the queue manager 2103 then cooperate to write this vector to the head of a "vector queue" 2113 in similar fashion to the way summary 2224 was written to the head of summary queue 2112 as described above. When the vector for the packet has been written to vector queue 2113, queue manager interface 2205 resets the ready bit associated with the vector.

Once summary 2224 (including a buffer descriptor that points to buffer 2114) has been placed in summary queue 2112 and the packet data has been placed in buffer 2144, processor 470 can retrieve summary 2224 from summary queue 2112 and examine the "attention bit".

If the attention bit from summary 2224 is a digital one, then processor 470 determines that the packet is not a "fast-path candidate" and processor 470 need not examine the packet headers. Only the status 2223 (first sixteen bytes) from buffer 2114 are DMA transferred to SRAM so processor 470 can examine it. If the status 2223 indicates that the packet is a type of packet that is not to be transferred to the host (for example, a multicast frame that the host is not registered to receive), then the packet is discarded (i.e., not passed to the host). If status 2223 does not indicate that the packet is the type of packet that is not to be transferred to the host, then the entire packet (headers and data) is passed to a buffer on host 20 for "slow-path" transport and network layer processing by the protocol stack of host 20.

If, on the other hand, the attention bit is a zero, then processor 470 determines that the packet is a "fast-path candidate". If processor 470 determines that the packet is a "fast-path candidate", then processor 470 uses the buffer descriptor from the summary to DMA transfer the first approximately 96 bytes of information from buffer 2114 from DRAM 460 into a portion of SRAM 440 so processor 470 can examine it. This first approximately 96 bytes contains status 2223 as well as the IP source address of the IP header, the IP destination address of the IP header, the TCP source address of the TCP header, and the TCP destination address of the TCP header. The IP source address of the IP header, the IP destination address of the IP header, the TCP source address of the TCP header, and the TCP destination address of the TCP header together uniquely define a single connection context (TCB) with which the packet is associated. Processor 470 examines these addresses of the TCP and IP headers and determines the connection context of the packet. Processor 470 then checks a list of connection contexts that are under the control of INIC card 200 and determines whether the packet is associated with a connection context (TCB) under the control of INIC card 200.

If the connection context is not in the list, then the "fast-path candidate" packet is determined not to be a "fast-path packet." In such a case, the entire packet (headers and data) is transferred to a buffer in host 20 for "slow-path" processing by the protocol stack of host 20.

If, on the other hand, the connection context is in the list, then software executed by processor 470 including software state machines 2231 and 2232 checks for one of numerous exception conditions and determines whether the packet is a "fast-path packet" or is not a "fast-path packet". These exception conditions include: 1) IP fragmentation is detected; 2) an IP option is detected; 3) an unexpected TCP flag (urgent bit set, reset bit set, SYN bit set or FIN bit set) is detected; 4) the ACK field in the TCP header is before the TCP window, or the ACK field in the TCP header is after the TCP window, or the ACK field in the TCP header shrinks the TCP window; 5) the ACK field in the TCP header is a duplicate ACK and the ACK field exceeds the duplicate ACK count (the duplicate ACK count is a user settable value); and 6) the sequence number of the TCP header is out of order (packet is received out of sequence). If the software executed by processor 470 detects one of these exception conditions, then processor 470 determines that the "fast-path candidate" is not a "fast-path packet." In such a case, the connection context for the packet is "flushed" (the connection context is passed back to the host) so that the connection context is no longer present in the list of connection contexts under control of INIC card 200. The entire packet (headers and data) is transferred to a buffer in host 20 for "slow-path" transport layer and network layer processing by the protocol stack of host 20.

If, on the other hand, processor 470 finds no such exception condition, then the "fast-path candidate" packet is determined to be an actual "fast-path packet". The receive state machine 2232 then processes of the packet through TCP. The data portion of the packet in buffer 2114 is then transferred by another DMA controller (not shown in FIG. 21) from buffer 2114 to a host-allocated file cache in storage 35 of host 20. In one embodiment, host 20 does no analysis of the TCP and IP headers of a "fast-path packet". All analysis of the TCP and IP headers of a "fast-path packet" is done on INIC card 20.

Figure 23:
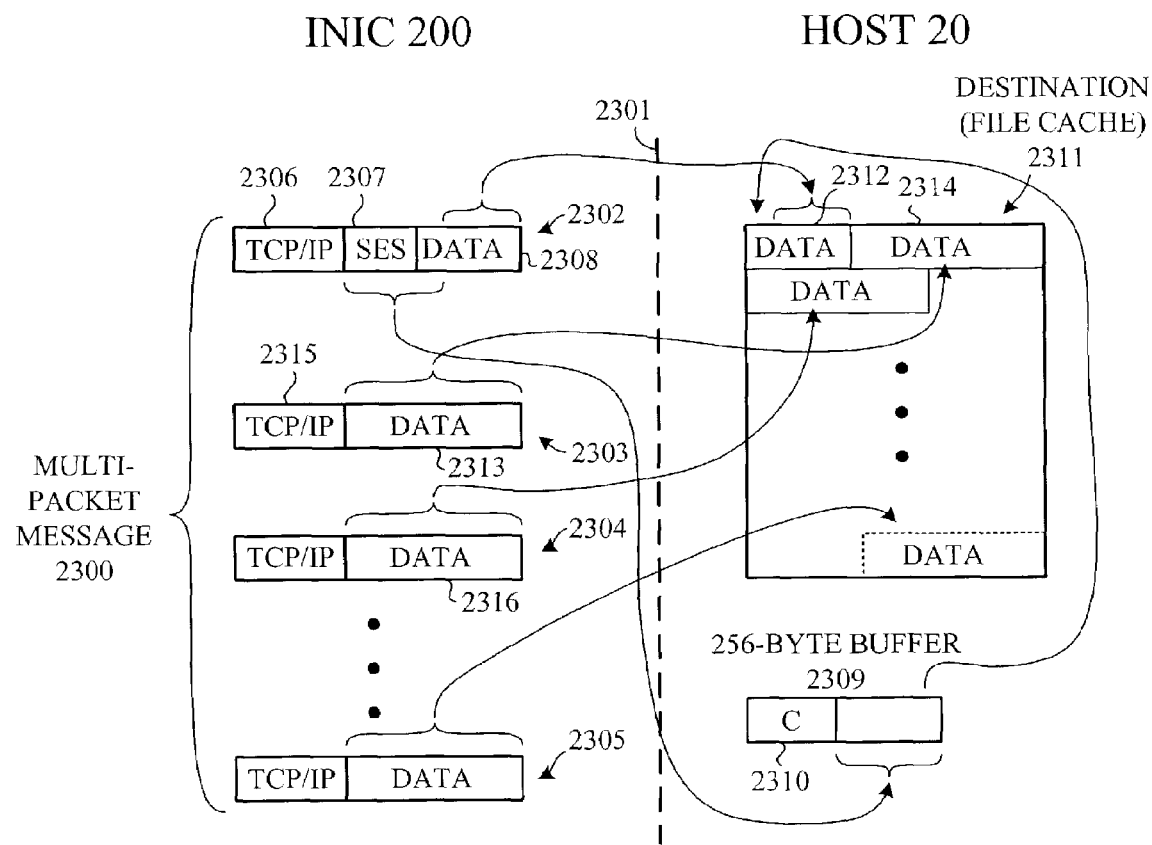
FIG. 23 is a diagram illustrating a "fast-path" transfer of data of a multi-packet message from INIC 200 to a destination 2311 in host 20.

FIG. 23 is a diagram illustrating the transfer of data of "fast-path packets" (packets of a 64 k-byte session layer message 2300) from INIC 200 to host 20. The portion of the diagram to the left of the dashed line 2301 represents INIC 200, whereas the portion of the diagram to the right of the dashed line 2301 represents host 20. The 64 k-byte session layer message 2300 includes approximately forty-five packets, four of which (2302, 2303, 2304 and 2305) are labeled on FIG. 23. The first packet 2302 includes a portion 2306 containing transport and network layer headers (for example, TCP and IP headers), a portion 2307 containing a session layer header, and a portion 2308 containing data. In a first step, portion 2307, the first few bytes of data from portion 2308, and the connection context identifier 2310 of the packet 2300 are transferred from INIC 200 to a 256-byte buffer 2309 in host 20. In a second step, host 20 examines this information and returns to INIC 200 a destination (for example, the location of a file cache 2311 in storage 35) for the data. Host 20 also copies the first few bytes of the data from buffer 2309 to the beginning of a first part 2312 of file cache 2311. In a third step, INIC 200 transfers the remainder of the data from portion 2308 to host 20 such that the remainder of the data is stored in the remainder of first part 2312 of file cache 2311. No network, transport, or session layer headers are stored in first part 2312 of file cache 2311. Next, the data portion 2313 of the second packet 2303 is transferred to host 20 such that the data portion 2313 of the second packet 2303 is stored in a second part 2314 of file cache 2311. The transport layer and network layer header portion 2315 of second packet 2303 is not transferred to host 20. There is no network, transport, or session layer header stored in file cache 2311 between the data portion of first packet 2302 and the data portion of second packet 2303. Similarly, the data portion 2316 of the next packet 2304 of the session layer message is transferred to file cache 2311 so that there is no network, transport, or session layer headers between the data portion of the second packet 2303 and the data portion of the third packet 2304 in file cache 2311. In this way, only the data portions of the packets of the session layer message are placed in the file cache 2311. The data from the session layer message 2300 is present in file cache 2311 as a block such that this block contains no network, transport, or session layer headers.

In the case of a shorter, single-packet session layer message, portions 2307 and 2308 of the session layer message are transferred to 256-byte buffer 2309 of host 20 along with the connection context identifier 2310 as in the case of the longer session layer message described above. In the case of a single-packet session layer message, however, the transfer is completed at this point. Host 20 does not return a destination to INIC 200 and INIC 200 does not transfer subsequent data to such a destination.

CD Appendix B includes a listing of software executed by processor 470 that determines whether a "fast-path candidate" packet is or is not a "fast-path packet". An example of the instruction set of processor 470 is found starting on page 79 of the Provisional U.S. Patent Application Ser. No. 60/061,809, entitled "Intelligent Network Interface Card And System For Protocol Processing", filed Oct. 14, 1997 (the subject matter of this provisional application is incorporated herein by reference).

CD Appendix C includes device driver software executable on host 20 that interfaces the host 20 to INIC card 200. There is also ATCP code that executes on host 20. This ATCP code includes: 1) a "free BSD" stack (available from the University of California, Berkeley) that has been modified slightly to make it run on the NT4 operating system (the "free BSD" stack normally runs on a UNIX machine), and 2) code added to the free BSD stack between the session layer above and the device driver below that enables the BSD stack to carry out "fast-path" processing in conjunction with INIC 200.

TRANSMIT FAST-PATH PROCESSING: The following is an overview of one embodiment of a transmit fast-path flow once a command has been posted (for additional information, see provisional application No. 60/098,296, filed Aug. 27, 1998). The transmit request may be a segment that is less than the MSS, or it may be as much as a full 64K session layer packet. The former request will go out as one segment, the latter as a number of MSS-sized segments. The transmitting CCB must hold on to the request until all data in it has been transmitted and ACKed. Appropriate pointers to do this are kept in the CCB. To create an output TCP/IP segment, a large DRAM buffer is acquired from the Q_FREEL queue. Then data is DMAd from host memory into the DRAM buffer to create an MSS-sized segment. This DMA also checksums the data. The TCP/IP header is created in SRAM and DMAd to the front of the payload data. It is quicker and simpler to keep a basic frame header (i.e., template header) permanently in the CCB and DMA this directly from the SRAM CCB buffer into the DRAM buffer each time. Thus the payload checksum is adjusted for the pseudo-header (i.e., the template header) and placed into the TCP header prior to DMAing the header from SRAM. Then the DRAM buffer is queued to the appropriate Q_UXMT transmit queue. The final step is to update various window fields etc in the CCB. Eventually either the entire request will have been sent and ACKed, or a retransmission timer will expire in which case the context is flushed to the host. In either case, the INIC will place a command response in the response queue containing the command buffer from the original transmit command and appropriate status.

The above discussion has dealt with how an actual transmit occurs. However the real challenge in the transmit processor is to determine whether it is appropriate to transmit at the time a transmit request arrives, and then to continue to transmit for as long as the transport protocol permits. There are many reasons not to transmit: the receiver's window size is less than or equal to zero, the persist timer has expired, the amount to send is less than a full segment and an ACK is expected/outstanding, the receiver's window is not half-open, etc. Much of transmit processing will be in determining these conditions.

The fast-path is implemented as a finite state machine (FSM) that covers at least three layers of the protocol stack, i.e., IP, TCP, and Session. The following summarizes the steps involved in normal fast-path transmit command processing: 1) get control of the associated CCB (gotten from the command): this involves locking the CCB to stop other processing (e.g. Receive) from altering it while this transmit processing is taking place. 2) Get the CCB into an SRAM CCB buffer. There are sixteen of these buffers in SRAM and they are not flushed to DRAM until the buffer space is needed by other CCBs. Acquisition and flushing of these CCB buffers is controlled by a hardware LRU mechanism. Thus getting into a buffer may involve flushing another CCB from its SRAM buffer. 3) Process the send command (EX_SCMD) event against the CCB's FSM.

Each event and state intersection provides an action to be executed and a new state. The following is an example of the state/event transition, the action to be executed and the new state for the SEND command while in transmit state IDLE (SX_IDLE). The action from this state/event intersection is AX_NUCMD and the next state is XMIT COMMAND ACTIVE (SX_XMIT). To summarize, a command to transmit data has been received while transmit is currently idle. The action performs the following steps: 1) Store details of the command into the CCB. 2) Check that it is okay to transmit now (e.g. send window is not zero). 3) If output is not possible, send the Check Output event to Q_EVENT1 queue for the Transmit CCB's FSM and exit. 4) Get a DRAM 2K-byte buffer from the Q-FREEL queue into which to move the payload data. 5) DMA payload data from the addresses in the scatter/gather lists in the command into an offset in the DRAM buffer that leaves space for the frame header. These DMAs will provide the checksum of the payload data. 6) Concurrently with the above DMA, fill out variable details in the frame header template in the CCB. Also get the IP and TCP header checksums while doing this. Note that base IP and TCP headers checksums are kept in the CCB, and these are simply updated for fields that vary per frame, viz. IP Id, IP length, IP checksum, TCP sequence and ACK numbers, TCP window size, TCP flags and TCP checksum. 7) When the payload is complete, DMA the frame header from the CCB to the front of the DRAM buffer. 8) Queue the DRAM buffer (i.e., queue a buffer descriptor that points to the DRAM buffer) to the appropriate Q UXMT queue for the interface for this CCB. 9) Determine if there is more payload in the command. If so, save the current command transfer address details in the CCB and send a CHECK OUTPUT event via the Q_EVENT1 queue to the Transmit CCB. If not, send the ALL COMMAND DATA SENT (EX_ACDS) event to the Transmit CCB. 10) Exit from Transmit FSM processing.

Code that implements an embodiment of the Transmit FSM (transmit software state machine 2231 of FIG. 21) is found in CD Appendix B. In one embodiment, fast-path transmit processing is controlled using write only transmit configuration register (XmtCfg). Register XmtCfg has the following portions: 1) Bit 31 (name: Reset). Writing a one (1) will force reset asserted to the transmit sequencer of the channel selected by XcvSel. 2) Bit 30 (name: XmtEn). Writing a one (1) allows the transmit sequencer to run. Writing a zero (0) causes the transmit sequencer to halt after completion of the current packet. 3) Bit 29 (name: PauseEn). Writing a one (1) allows the transmit sequencer to stop packet transmission, after completion of the current packet, whenever the receive sequencer detects an 802.3X pause command packet. 4) Bit 28 (name: LoadRng). Writing a one (1) causes the data in RcvAddrB[10:00] to be loaded in to the Mac's random number register for use during collision back-offs. 5) Bits 27:20 (name: Reserved). 6) Bits 19:15 (name: FreeQId). Selects the queue to which the freed buffer descriptors will be written once the packet transmission has been terminated, either successfully or unsuccessfully. 7) Bits 14:10 (name: XmtQId). Selects the queue from which the transmit buffer descriptors will be fetched for data packets. 8) Bits 09:05 (name: CtrlQId). Selects the queue from which the transmit buffer descriptors will be fetched for control packets. These packets have transmission priority over the data packets and will be exhausted before data packets will be transmitted. 9) Bits 04:00 (name: VectQId). Selects the queue to which the transmit vector data is written after the completion of each packet transmit. In some embodiments, transmit sequencer 2104 of FIG. 21 retrieves buffer descriptors from two transmit queues, one of the queues having a higher transmission priority than the other. The higher transmission priority transmit queue is used for the transmission of TCP ACKs, whereas the lower transmission priority transmit queue is used for the transmission of other types of packets. ACKs may be transmitted in accordance with techniques set forth in U.S. patent application Ser. No. 09/802,426 (the subject matter of which is incorporated herein by reference). In some embodiments, the processor that executes the Transmit FSM, the receive and transmit sequencers, and the host processor that executes the protocol stack are all realized on the same printed circuit board. The printed circuit board may, for example, be a card adapted for coupling to another computer.

All told, the above-described devices and systems for processing of data communication result in dramatic reductions in the time and host resources required for processing large, connection-based messages. Protocol processing speed and efficiency is tremendously accelerated by specially designed protocol processing hardware as compared with a general purpose CPU running conventional protocol software, and interrupts to the host CPU are also substantially reduced. These advantages can be provided to an existing host by addition of an intelligent network interface card (INIC), or the protocol processing hardware may be integrated with the CPU. In either case, the protocol processing hardware and CPU intelligently decide which device processes a given message, and can change the allocation of that processing based upon conditions of the message.

Disclosure From Provisional Application No. 60/061,809

BACKGROUND OF THE INVENTION

Network processing as it exists today is a costly and inefficient use of system resources. A 200 MHz Pentium-Pro is typically consumed simply processing network data from a 100 Mb/second-network connection. The reasons that this processing is so costly are described here.

Too Many Data Moves.

When network packet arrives at a typical network interface card (NIC), the NIC moves the data into pre-allocated network buffers in system main memory. From there the data is read into the CPU cache so that it can be checksummed (assuming of course that the protocol in use requires checksums. Some, like IPX, do not.). Once the data has been fully processed by the protocol stack, it can then be moved into its final destination in memory. Since the CPU is moving the data, and must read the destination cache line in before it can fill it and write it back out, this involves at a minimum two more trips across the system memory bus. In short, the best one can hope for is that the data will get moved across the system memory bus four times before it arrives in its final destination. It can, and does, get worse. If the data happens to get invalidated from system cache after it has been checksummed, then it must get pulled back across the memory bus before it can be moved to its final destination. Finally, on some systems, including Windows NT 4.0, the data gets copied yet another time while being moved up the protocol stack. In NT 4.0, this occurs between the miniport driver interface and the protocol driver interface. This can add up to a whopping eight trips across the system memory bus (the four trips described above, plus the move to replenish the cache, plus three more to copy from the miniport to the protocol driver). That's enough to bring even today's advanced memory busses to their knees.

Too Much Processing by the CPU.

In all but the original move from the NIC to system memory, the system CPU is responsible for moving the data. This is particularly expensive because while the CPU is moving this data it can do nothing else. While moving the data the CPU is typically stalled waiting for the relatively slow memory to satisfy its read and write requests. A CPU, which can execute an instruction every 5 nanoseconds, must now wait as long as several hundred nanoseconds for the memory controller to respond before it can begin its next instruction. Even today's advanced pipelining technology doesn't help in these situations because that relies on the CPU being able to do useful work while it waits for the memory controller to respond. If the only thing the CPU has to look forward to for the next several hundred instructions is more data moves, then the CPU ultimately gets reduced to the speed of the memory controller.

Moving all this data with the CPU slows the system down even after the data has been moved. Since both the source and destination cache lines must be pulled into the CPU cache when the data is moved, more than 3 k of instructions and or data resident in the CPU cache must be flushed or invalidated for every 1500 byte frame. This is of course assuming a combined instruction and data second level cache, as is the case with the Pentium processors. After the data has been moved, the former resident of the cache will likely need to be pulled back in, stalling the CPU even when we are not performing network processing. Ideally a system would never have to bring network frames into the CPU cache, instead reserving that precious commodity for instructions and data that are referenced repeatedly and frequently.

But the data movement is not the only drain on the CPU. There is also a fair amount of processing that must be done by the protocol stack software. The most obvious expense is calculating the checksum for each TCP segment (or UDP datagram). Beyond this, however, there is other processing to be done as well. The TCP connection object must be located when a given TCP segment arrives, IP header checksums must be calculated, there are buffer and memory management issues, and finally there is also the significant expense of interrupt processing which we will discuss in the following section.

Too Many Interrupts.

A 64 k SMB request (write or read-reply) is typically made up of 44 TCP segments when running over Ethernet (1500 byte MTU). Each of these segments may result in an interrupt to the CPU. Furthermore, since TCP must acknowledge all of this incoming data, it's possible to get another 44 transmit-complete interrupts as a result of sending out the TCP acknowledgements. While this is possible, it is not terribly likely. Delayed ACK timers allow us to acknowledge more than one segment at a time. And delays in interrupt processing may mean that we are able to process more than one incoming network frame per interrupt. Nevertheless, even if we assume four incoming frames per input, and an acknowledgement for every two segments (as is typical per the ACK-every-other-segment property of TCP), we are still left with 33 interrupts per 64 k SMB request.

Interrupts tend to be very costly to the system. Often when a system is interrupted, important information must be flushed or invalidated from the system cache so that the interrupt routine instructions, and needed data can be pulled into the cache. Since the CPU will return to its prior location after the interrupt, it is likely that the information flushed from the cache will immediately need to be pulled back into the cache.

What's more, interrupts force a pipeline flush in today's advanced processors. While the processor pipeline is an extremely efficient way of improving CPU performance, it can be expensive to get going after it has been flushed.

Finally, each of these interrupts results in expensive register accesses across the peripheral bus (PCI). This is discussed more in the following section.

Inefficient Use of the Peripheral Bus (PCI).

We noted earlier that when the CPU has to access system memory, it may be stalled for several hundred nanoseconds. When it has to read from PCI, it may be stalled for many microseconds. This happens every time the CPU takes an interrupt from a standard NIC. The first thing the CPU must do when it receives one of these interrupts is to read the NIC Interrupt Status Register (ISR) from PCI to determine the cause of the interrupt. The most troubling thing about this is that since interrupt lines are shared on PC-based systems, we may have to perform this expensive PCI read even when the interrupt is not meant for us.

There are other peripheral bus inefficiencies as well. Typical NICs operate using descriptor rings. When a frame arrives, the NIC reads a receive descriptor from system memory to determine where to place the data. Once the data has been moved to main memory, the descriptor is then written back out to system memory with status about the received frame. Transmit operates in a similar fashion. The CPU must notify that NIC that it has a new transmit. The NIC will read the descriptor to locate the data, read the data itself, and then write the descriptor back with status about the send. Typically on transmits the NIC will then read the next expected descriptor to see if any more data needs to be sent. In short, each receive or transmit frame results in 3 or 4 separate PCI reads or writes (not counting the status register read).

SUMMARY OF THE INVENTION

Alacritech was formed with the idea that the network processing described above could be offloaded onto a cost-effective Intelligent Network Interface Card (INIC). With the Alacritech INIC, we address each of the above problems, resulting in the following advancements:

1. The vast majority of the data is moved directly from the INIC into its final destination. A single trip across the system memory bus.

2. There is no header processing, little data copying, and no checksumming required by the CPU. Because of this, the data is never moved into the CPU cache, allowing the system to keep important instructions and data resident in the CPU cache.

3. Interrupts are reduced to as little as 4 interrupts per 64 k SMB read and 2 per 64 k SMB write.

4. There are no CPU reads over PCI and there are fewer PCI operations per receive or transmit transaction.

In the remainder of this document we will describe how we accomplish the above.

Perform Transport Level Processing on the INIC.

In order to keep the system CPU from having to process the packet headers or checksum the packet, we must perform this task on the INIC. This is a daunting task. There are more than 20,000 lines of C code that make up the FreeBSD TCP/IP protocol stack. Clearly this is more code than could be efficiently handled by a competitively priced network card. Furthermore, as noted above, the TCP/IP protocol stack is complicated enough to consume a 200 MHz Pentium-Pro. Clearly in order to perform this function on an inexpensive card, we need special network processing hardware as opposed to simply using a general purpose CPU.

Only Support TCP/IP.

In this section we introduce the notion of a "context". A context is required to keep track of information that spans many, possibly discontiguous, pieces of information. When processing TCP/IP data, there are actually two contexts that must be maintained. The first context is required to reassemble IP fragments. It holds information about the status of the IP reassembly as well as any checksum information being calculated across the IP datagram (UDP or TCP). This context is identified by the IP_ID of the datagram as well as the source and destination IP addresses. The second context is required to handle the sliding window protocol of TCP. It holds information about which segments have been sent or received, and which segments have been acknowledged, and is identified by the IP source and destination addresses and TCP source and destination ports.

If we were to choose to handle both contexts in hardware, we would have to potentially keep track of many pieces of information. One such example is a case in which a single 64 k SMB write is broken down into 44 1500 byte TCP segments, which are in turn broken down into 131 576 byte IP fragments, all of which can come in any order (though the maximum window size is likely to restrict the number of outstanding segments considerably).

Fortunately, TCP performs a Maximum Segment Size negotiation at connection establishment time, which should prevent IP fragmentation in nearly all TCP connections. The only time that we should end up with fragmented TCP connections is when there is a router in the middle of a connection which must fragment the segments to support a smaller MTU. The only networks that use a smaller MTU than Ethernet are serial line interfaces such as SLIP and PPP. At the moment, the fastest of these connections only run at 128 k (ISDN) so even if we had 256 of these connections, we would still only need to support 34 Mb/sec, or a little over three 10 bT connections worth of data. This is not enough to justify any performance enhancements that the INIC offers. If this becomes an issue at some point, we may decide to implement the MTU discovery algorithm, which should prevent TCP fragmentation on all connections (unless an ICMP redirect changes the connection route while the connection is established).

With this in mind, it seems a worthy sacrifice to not attempt to handle fragmented TCP segments on the INIC. UDP is another matter. Since UDP does not support the notion of a Maximum Segment Size, it is the responsibility of IP to break down a UDP datagram into MTU sized packets. Thus, fragmented UDP datagrams are very common. The most common UDP application running today is NFSV2 over UDP. While this is also the most common version of NFS running today, the current version of Solaris being sold by Sun Microsystems runs NFSV3 over TCP by default. We can expect to see the NFSV2/UDP traffic start to decrease over the coming years. In summary, we will only offer assistance to non-fragmented TCP connections on the INIC.

Don't Handle TCP "Exceptions".

As noted above, we won't provide support for fragmented TCP segments on the INIC. We have also opted to not handle TCP connection and breakdown. Here is a list of other TCP "exceptions" which we have elected to not handle on the INIC:

Fragmented Segments—Discussed above.

Retransmission Timeout—Occurs when we do not get an acknowledgement for previously sent data within the expected time period.

Out of order segments—Occurs when we receive a segment with a sequence number other than the next expected sequence number.

FIN segment—Signals the close of the connection.

Since we have now eliminated support for so many different code paths, it might seem hardly worth the trouble to provide any assistance by the card at all. This is not the case. According to W. Richard Stevens and Gary Write in their book "TCP/IP Illustrated Volume 2", TCP operates without experiencing any exceptions between 97 and 100 percent of the time in local area networks. As network, router, and switch reliability improve this number is likely to only improve with time.

Two Modes of Operation.

Figure 24:
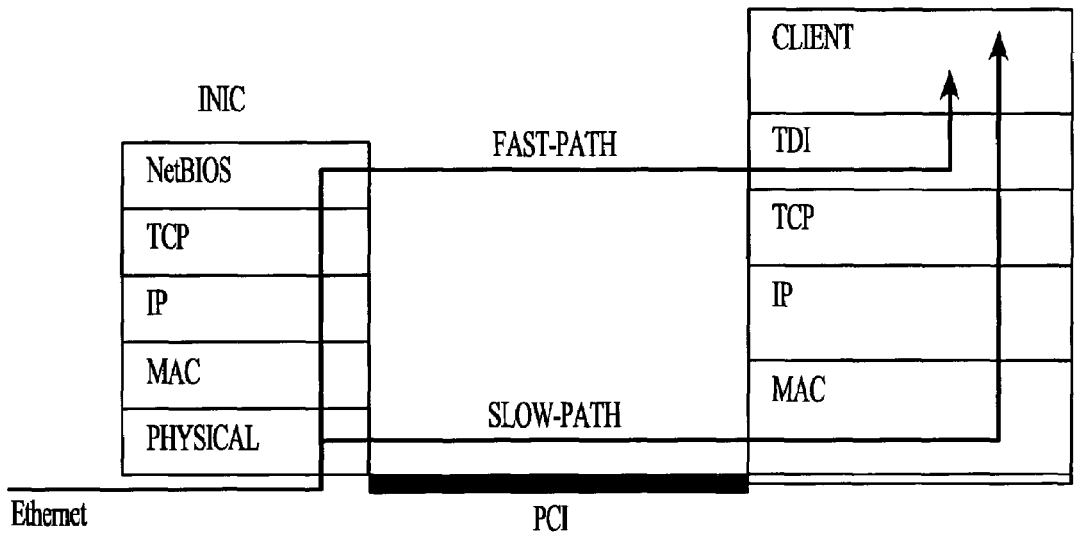

So the next question is what to do about the network packets that do not fit our criteria. The answer shown in FIG. 24 is to use two modes of operation: One in which the network frames are processed on the INIC through TCP and one in which the card operates like a typical dumb NIC. We call these two modes fast-path, and slow-path. In the slow-path case, network frames are handed to the system at the MAC layer and passed up through the host protocol stack like any other network frame. In the fast path case, network data is given to the host after the headers have been processed and stripped.

The transmit case works in much the same fashion. In slow-path mode the packets are given to the INIC with all of the headers attached. The INIC simply sends these packets out as if it were a dumb NIC. In fast-path mode, the host gives raw data to the INIC which it must carve into MSS sized segments, add headers to the data, perform checksums on the segment, and then send it out on the wire.

The TCB Cache.

Consider a situation in which a TCP connection is being handled by the card and a fragmented TCP segment for that connection arrives. In this situation, it will be necessary for the card to turn control of this connection over to the host.

This introduces the notion of a Transmit Control Block (TCB) cache. A TCB is a structure that contains the entire context associated with a connection. This includes the source and destination IP addresses and source and destination TCP ports that define the connection. It also contains information about the connection itself such as the current send and receive sequence numbers, and the first-hop MAC address, etc. The complete set of TCBs exists in host memory, but a subset of these may be "owned" by the card at any given time. This subset is the TCB cache. The INIC can own up to 256 TCBs at any given time.

TCBs are initialized by the host during TCP connection setup. Once the connection has achieved a "steady-state" of operation, its associated TCB can then be turned over to the INIC, putting us into fast-path mode. From this point on, the INIC owns the connection until either a FIN arrives signaling that the connection is being closed, or until an exception occurs which the INIC is not designed to handle (such as an out of order segment). When any of these conditions occur, the INIC will then flush the TCB back to host memory, and issue a message to the host telling it that it has relinquished control of the connection, thus putting the connection back into slow-path mode. From this point on, the INIC simply hands incoming segments that are destined for this TCB off to the host with all of the headers intact.

Note that when a connection is owned by the INIC, the host is not allowed to reference the corresponding TCB in host memory as it will contain invalid information about the state of the connection.

TCP Hardware Assistance.

When a frame is received by the INIC, it must verify it completely before it even determines whether it belongs to one of its TCBs or not. This includes all header validation (is it IP, IPV4 or V6, is the IP header checksum correct, is the TCP checksum correct, etc). Once this is done it must compare the source and destination IP address and the source and destination TCP port with those in each of its TCBs to determine if it is associated with one of its TCBs. This is an expensive process. To expedite this, we have added several features in hardware to assist us. The header is fully parsed by hardware and its type is summarized in a single status word. The checksum is also verified automatically in hardware, and a hash key is created out of the IP addresses and TCP ports to expedite TCB lookup. For full details on these and other hardware optimizations, refer to the INIC Hardware Specification sections (Heading 8).

With the aid of these and other hardware features, much of the work associated with TCP is done essentially for free. Since the card will automatically calculate the checksum for TCP segments, we can pass this on to the host, even when the segment is for a TCB that the INIC does not own.

TCP Summary.

By moving TCP processing down to the INIC we have offloaded the host of a large amount of work. The host no longer has to pull the data into its cache to calculate the TCP checksum. It does not have to process the packet headers, and it does not have to generate TCP ACKs. We have achieved most of the goals outlined above, but we are not done yet.

Transport Layer Interface.

This section defines the INIC's relation to the hosts transport layer interface (Called TDI or Transport Driver Interface in Windows NT). For full details on this interface, refer to the Alacritech TCP (ATCP) driver specification (Heading 4).

Receive.

Simply implementing TCP on the INIC does not allow us to achieve our goal of landing the data in its final destination. Somehow the host has to tell the INIC where to put the data. This is a problem in that the host cannot do this without knowing what the data actually is. Fortunately, NT has provided a mechanism by which a transport driver can "indicate" a small amount of data to a client above it while telling it that it has more data to come. The client, having then received enough of the data to know what it is, is then responsible for allocating a block of memory and passing the memory address or addresses back down to the transport driver, which is in turn responsible for moving the data into the provided location.

We will make use of this feature by providing a small amount of any received data to the host, with a notification that we have more data pending. When this small amount of data is passed up to the client, and it returns with the address in which to put the remainder of the data, our host transport driver will pass that address to the INIC which will DMA the remainder of the data into its final destination.

Clearly there are circumstances in which this does not make sense. When a small amount of data (500 bytes for example), with a push flag set indicating that the data must be delivered to the client immediately, it does not make sense to deliver some of the data directly while waiting for the list of addresses to DMA the rest. Under these circumstances, it makes more sense to deliver the 500 bytes directly to the host, and allow the host to copy it into its final destination. While various ranges are feasible, it is currently preferred that anything less than a segment's (1500 bytes) worth of data will be delivered directly to the host, while anything more will be delivered as a small piece which may be 128 bytes, while waiting until receiving the destination memory address before moving the rest.

The trick then is knowing when the data should be delivered to the client or not. As we've noted, a push flag indicates that the data should be delivered to the client immediately, but this alone is not sufficient. Fortunately, in the case of NetBIOS transactions (such as SMB), we are explicitly told the length of the session message in the NetBIOS header itself. With this we can simply indicate a small amount of data to the host immediately upon receiving the first segment. The client will then allocate enough memory for the entire NetBIOS transaction, which we can then use to DMA the remainder of the data into as it arrives. In the case of a large (56 k for example) NetBIOS session message, all but the first couple hundred bytes will be DMA'd to their final destination in memory.

But what about applications that do not reside above NetBIOS? In this case we can not rely on a session level protocol to tell us the length of the transaction. Under these circumstances we will buffer the data as it arrives until A) we have receive some predetermined number of bytes such as 8 k, or B) some predetermined period of time passes between segments or C) we get a push flag. If after any of these conditions occur we will then indicate some or all of the data to the host depending on the amount of data buffered. If the data buffered is greater than about 1500 bytes we must then also wait for the memory address to be returned from the host so that we may then DMA the remainder of the data.

Transmit.

The transmit case is much simpler. In this case the client (NetBIOS for example) issues a TDI Send with a list of memory addresses which contain data that it wishes to send along with the length. The host can then pass this list of addresses and length off to the INIC. The INIC will then pull the data from its source location in host memory, as it needs it, until the complete TDI request is satisfied.

Affects on Interrupts.

Note that when we receive a large SMB transaction, for example, that there are two interactions between the INIC and the host. The first in which the INIC indicates a small amount of the transaction to the host, and the second in which the host provides the memory location(s) in which the INIC places the remainder of the data. This results in only two interrupts from the INIC. The first when it indicates the small amount of data and the second after it has finished filling in the host memory given to it. A drastic reduction from the 33/64 k SMB request that we estimate at the beginning of this section. On transmit, we actually only receive a single interrupt when the send command that has been given to the INIC completes.

Transport Layer Interface Summary.

Having now established our interaction with Microsoft's TDI interface, we have achieved our goal of landing most of our data directly into its final destination in host memory. We have also managed to transmit all data from its original location on host memory. And finally, we have reduced our interrupts to 2 per 64 k SMB read and 1 per 64 k SMB write. The only thing that remains in our list of objectives is to design an efficient host (PCI) interface.

Host (PCI) Interface.

In this section we define the host interface. For a more detailed description, refer to the "Host Interface Strategy for the Alacritech INIC" section (Heading 3).

Avoid PCI Reads.

One of our primary objectives in designing the host interface of the INIC was to eliminate PCI reads in either direction. PCI reads are particularly inefficient in that they completely stall the reader until the transaction completes. As noted above, this could hold a CPU up for several microseconds, a thousand times the time typically required to execute a single instruction. PCI writes on the other hand, are usually buffered by the memory-bus⇔PCI-bridge allowing the writer to continue on with other instructions. This technique is known as "posting".

Memory-Based Status Register.

The only PCI read that is required by most NICs is the read of the interrupt status register. This register gives the host CPU information about what event has caused an interrupt (if any). In the design of our INIC we have elected to place this necessary status register into host memory. Thus, when an event occurs on the INIC, it writes the status register to an agreed upon location in host memory. The corresponding driver on the host reads this local register to determine the cause of the interrupt. The interrupt lines are held high until the host clears the interrupt by writing to the INIC's Interrupt Clear Register. Shadow registers are maintained on the INIC to ensure that events are not lost.

Buffer Addresses are Pushed to the INIC.

Since it is imperative that our INIC operate as efficiently as possible, we must also avoid PCI reads from the INIC. We do this by pushing our receive buffer addresses to the INIC. As mentioned at the beginning of this section, most NICs work on a descriptor queue algorithm in which the NIC reads a descriptor from main memory in order to determine where to place the next frame. We will instead write receive buffer addresses to the INIC as receive buffers are filled. In order to avoid having to write to the INIC for every receive frame, we instead allow the host to pass off a pages worth (4 k) of buffers in a single write.

Support Small and Large Buffers on Receive.

In order to reduce further the number of writes to the INIC, and to reduce the amount of memory being used by the host, we support two different buffer sizes. A small buffer contains roughly 200 bytes of data payload, as well as extra fields containing status about the received data bringing the total size to 256 bytes. We can therefore pass 16 of these small buffers at a time to the INIC. Large buffers are 2 k in size. They are used to contain any fast or slow-path data that does not fit in a small buffer. Note that when we have a large fast-path receive, a small buffer will be used to indicate a small piece of the data, while the remainder of the data will be DMA'd directly into memory. Large buffers are never passed to the host by themselves, instead they are always accompanied by a small buffer which contains status about the receive along with the large buffer address. By operating in the manner, the driver must only maintain and process the small buffer queue. Large buffers are returned to the host by virtue of being attached to small buffers. Since large buffers are 2 k in size they are passed to the INIC 2 buffers at a time.

Command and Response Buffers.

In addition to needing a manner by which the TNIC can pass incoming data to us, we also need a manner by which we can instruct the INIC to send data. Plus, when the INIC indicates a small amount of data in a large fast-path receive, we need a method of passing back the address or addresses in which to put the remainder of the data. We accomplish both of these with the use of a command buffer. Sadly, the command buffer is the only place in which we must violate our rule of only pushing data across PCI. For the command buffer, we write the address of command buffer to the INIC. The INIC then reads the contents of the command buffer into its memory so that it can execute the desired command. Since a command may take a relatively long time to complete, it is unlikely that command buffers will complete in order. For this reason we also maintain a response buffer queue. Like the small and large receive buffers, a page worth of response buffers is passed to the INIC at a time. Response buffers are only 32 bytes, so we have to replenish the INIC's supply of them relatively infrequently. The response buffers only purpose is to indicate the completion of the designated command buffer, and to pass status about the completion.

EXAMPLES

In this section we will provide a couple of examples describing some of the differing data flows that we might see on the Alacritech INIC.

Fast-Path 56 K NetBIOS Session Message.

Let's say a 56 k NetBIOS session message is received on the INIC. The first segment will contain the NetBIOS header, which contains the total NetBIOS length. A small chunk of this first segment is provided to the host by filling in a small receive buffer, modifying the interrupt status register on the host, and raising the appropriate interrupt line. Upon receiving the interrupt, the host will read the ISR, clear it by writing back to the INIC's Interrupt Clear Register, and will then process its small receive buffer queue looking for receive buffers to be processed. Upon finding the small buffer, it will indicate the small amount of data up to the client to be processed by NetBIOS. It will also, if necessary, replenish the receive buffer pool on the INIC by passing off a pages worth of small buffers. Meanwhile, the NetBIOS client will allocate a memory pool large enough to hold the entire NetBIOS message, and will pass this address or set of addresses down to the transport driver. The transport driver will allocate an INIC command buffer, fill it in with the list of addresses, set the command type to tell the INIC that this is where to put the receive data, and then pass the command off to the INIC by writing to the command register. When the INIC receives the command buffer, it will DMA the remainder of the NetBIOS data, as it is received, into the memory address or addresses designated by the host. Once the entire NetBIOS transaction is complete, the INIC will complete the command by writing to the response buffer with the appropriate status and command buffer identifier.

In this example, we have two interrupts, and all but a couple hundred bytes are DMA'd directly to their final destination. On PCI we have two interrupt status register writes, two interrupt clear register writes, a command register write, a command read, and a response buffer write.

With a standard NIC this would result in an estimated 30 interrupts, 30 interrupt register reads, 30 interrupt clear writes, and 58 descriptor reads and writes. Plus the data will get moved anywhere from 4 to 8 times across the system memory bus.

Slow-Path Receive.

If the INIC receives a frame that does not contain a TCP segment for one of its TCB's, it simply passes it to the host as if it were a dumb NIC. If the frame fits into a small buffer (~200 bytes or less), then it simply fills in the small buffer with the data and notifies the host. Otherwise it places the data in a large buffer, writes the address of the large buffer into a small buffer, and again notifies the host. The host, having received the interrupt and found the completed small buffer, checks to see if the data is contained in the small buffer, and if not, locates the large buffer. Having found the data, the host will then pass the frame upstream to be processed by the standard protocol stack. It must also replenish the INIC's small and large receive buffer pool if necessary.

With the INIC, this will result in one interrupt, one interrupt status register write and one interrupt clear register write as well as a possible small and or large receive buffer register write. The data will go through the normal path although if it is TCP data then the host will not have to perform the checksum.

With a standard NIC this will result in a single interrupt, an interrupt status register read, an interrupt clear register write, and a descriptor read and write. The data will get processed as it would by the INIC, except for a possible extra checksum.

Fast-Path 400 Byte Send.

In this example, lets assume that the client has a small amount of data to send. It will issue the TDI Send to the transport driver which will allocate a command buffer, fill it in with the address of the 400 byte send, and set the command to indicate that it is a transmit. It will then pass the command off to the INIC by writing to the command register. The INIC will then DMA the 400 bytes into its own memory, prepare a frame with the appropriate checksums and headers, and send the frame out on the wire. After it has received the acknowledgement it will then notify the host of the completion by writing to a response buffer.

With the INIC, this will result in one interrupt, one interrupt status register write, one interrupt clear register write, a command buffer register write a command buffer read, and a response buffer write. The data is DMA'd directly from the system memory.

With a standard NIC this will result in a single interrupt, an interrupt status register read, an interrupt clear register write, and a descriptor read and write. The data would get moved across the system bus a minimum of 4 times. The resulting TCP ACK of the data, however, would add yet another interrupt, another interrupt status register read, interrupt clear register write, a descriptor read and write, and yet more processing by the host protocol stack.

Host Interface Strategy for the Alacritech INIC.

This section describes the host interface strategy for the Alacritech Intelligent Network Interface Card (INIC). The goal of the Alacritech INIC is to not only process network data through TCP, but also to provide zero-copy support for the SMP upper-layer protocol. It achieves this by supporting two paths for sending and receiving data, the fast-path and the slow-path. The fast path data flow corresponds to connections that are maintained on the NIC, while slow-path traffic corresponds to network data for which the NIC does not have a connection. The fast-path flow works by passing a header to the host and subsequently holding further data for that connection on the card until the host responds via an INIC command with a set of buffers into which to place the accumulated data. In the slow-path data flow, the INIC will be operating as a "dumb" NIC, so that these packets are simply dumped into frame buffers on the host as they arrive. To do either path requires a pool of smaller buffers to be used for headers and a pool of data buffers for frames/data that are too large for the header buffer, with both pools being managed by the INIC. This section discusses how these two pools of data are managed as well as how buffers are associated with a given context.

Receive Interface.

The varying requirements of the fast and slow paths and a desire to save PCI bandwidth are the driving forces behind the host interface that is described herein. As mentioned above, the fast-path flow puts a header into a header buffer that is then forwarded to the host. The host uses the header to determine what further data is following, allocates the necessary host buffers, and these are passed back to the INIC via a command to the INIC. The INIC then fills these buffers from data it was accumulating on the card and notifies the host by sending a response to the command. Alternatively, the fast-path may receive a header and data that is a complete request, but that is also too large for a header buffer. This results in a header and data buffer being passed to the host. This latter flow is identical to the slow-path flow, which also puts all the data into the header buffer or, if the header is too small, uses a large (2K) host buffer for all the data. This means that on the unsolicited receive path, the host will only see either a header buffer or a header and at most, one data buffer. Note that data is never split between a header and a data buffer.

Figure 25:
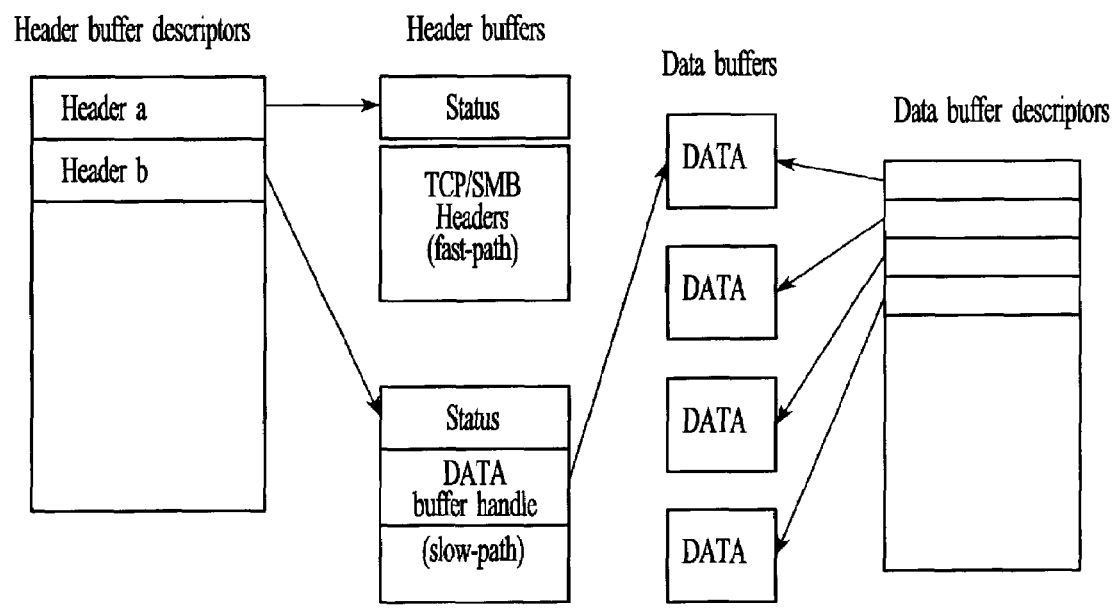

FIG. 25 illustrates both situations. Since we want to fill in the header buffer with a single DMA, the header must be the last piece of data to be written to the host for any received transaction.

Receive Interface Details.

Header Buffers.

Header buffers in host memory are 256 bytes long, and are aligned on 256 byte boundaries. There will be a field in the header buffer indicating it has valid data. This field will initially be reset by the host before passing the buffer descriptor to the INIC. A set of header buffers are passed from the host to the INIC by the host writing to the "Header Buffer Address Register" on the INIC. This register is defined as follows:

Bits 31-8 Physical address in host memory of the first of a set of contiguous header buffers.

Bits 7-0 Number of header buffers passed.

In this way the host can, say, allocate 16 buffers in a 4K page, and pass all 16 buffers to the INIC with one register write. The INIC will maintain a queue of these header descriptors in the SmallHType queue in it's own local memory, adding to the end of the queue every time the host writes to the Header Buffer Address Register. Note that the single entry is added to the queue; the eventual dequeuer will use the count after extracting that entry.

The header buffers, will be used and returned to the host in the same order that they were given to the INIC. The valid field will be set by the INIC before returning the buffer to the host. In this way a PCI interrupt, with a single bit in the interrupt register, may be generated to indicate that there is a header buffer for the host to process. When servicing this interrupt, the host will look at its queue of header buffers, reading the valid field to determine how many header buffers are to be processed.

Receive Data Buffers.

Receive data buffers in host memory are aligned to page boundaries, assumed here to be 2 K bytes long and aligned on 4 K page boundaries, 2 buffers per page. In order to pass receive data buffers to the INIC, the host must write to two registers on the INIC. The first register to be written is the "Data Buffer Handle Register." The buffer handle is not significant to the INIC, but will be copied back to the host to return the buffer to the host. The second register written is the Data Buffer Address Register. This is the physical address of the data buffer. When both registers have been written, the INIC will add the contents of these two registers to FreeType queue of data buffer descriptors. Note that the INIC host driver sets the handle register first, then the address register. There needs to be some mechanism put in place to ensure the reading of these registers does not get out of sync with writing them. Effectively the INIC can read the address register first and save its contents, then read the handle register. It can then lock the register pair in some manner such that another write to the handle register is not permitted until the current contents have been saved. Both addresses extracted from the registers are to be written to the FreeType queue. The INIC will extract 2 entries each time when dequeuing.

Data buffers will be allocated and used by the INIC as needed. For each data buffer used by a slow-path transaction, the data buffer handle will be copied into a header buffer. Then the header buffer will be returned to the host.

Transmit Interface.

Transmit Interface Overview.

Figure 26:
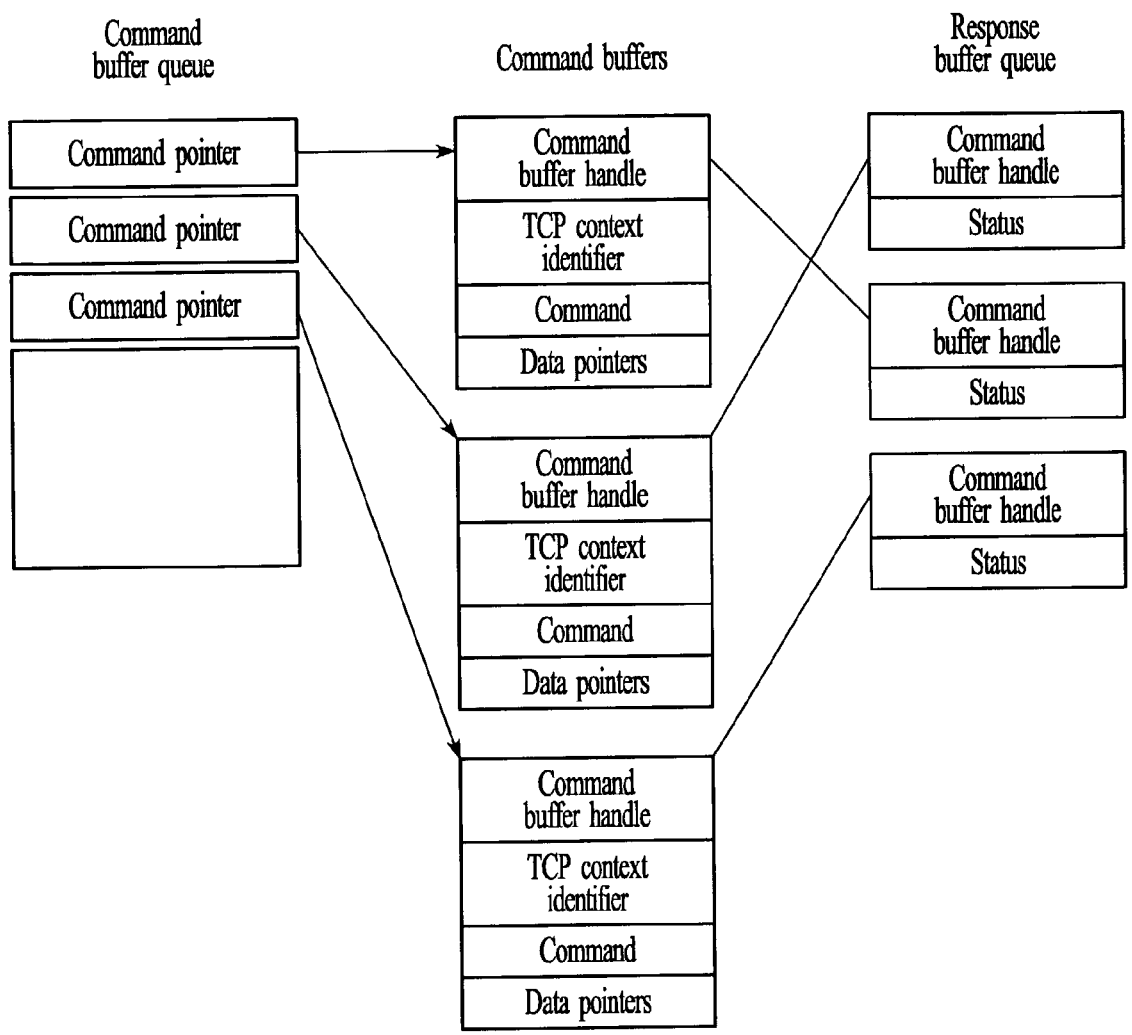

The transmit interface shown in FIG. 26, like the receive interface, has been designed to minimize the amount of PCI bandwidth and latencies. In order to transmit data, the host will transfer a command buffer to the INIC. This command buffer will include a command buffer handle, a command field, possibly a TCP context identification, and a list of physical data pointers. The command buffer handle is defined to be the first word of the command buffer and is used by the host to identify the command. This word will be passed back to the host in a response buffer, since commands may complete out of order, and the host will need to know which command is complete. Commands will be used for many reasons, but primarily to cause the INIC to transmit data, or to pass a set of buffers to the INIC for input data on the fast-path as previously discussed.

Response buffers are physical buffers in host memory. They are used by the INIC in the same order as they were given to it by the host. This enables the host to know which response buffer(s) to next look at when the INIC signals a command completion.

Transmit Interface Details.

Command Buffers.

Command buffers in host memory are a multiple of 32 bytes, up to a maximum of 1K bytes, and are aligned on 32 byte boundaries. A command buffer is passed to the INIC by writing to one of five "Command Buffer Address Registers." These registers are defined as follows:

Bits 31-5 Physical address in host memory of the command buffer.

Bits 4-0 Length of command buffer in bytes/32 (i.e. number of multiples of 32 bytes).

This is the physical address of the command buffer. The register to which the command is written predetermines the XMT interface number, or if the command is for the RCV CPU; hence there will be 5 of them, 0-3 for XMT and 4 for RCV. When one of these registers has been written, the INIC will add the contents of the register to it's own internal queue of command buffer descriptors. The first word of all command buffers is defined to be the command buffer handle. It is the job of the utility CPU to extract a command from its local queue, DMA the command into a small INIC buffer (from the FreeSType queue), and queue that buffer into the Xmit#Type queue, where # is 0-3 depending on the interface, or the appropriate RCV queue. The receiving CPU will service the queues to perform the commands. When that CPU has completed a command, it extracts the command buffer handle and passes it back to the host via a response buffer.

Response Buffers.

Response buffers in host memory are 32 bytes long and aligned on 32 byte boundaries. They are handled in a very similar fashion to header buffers. There will be a field in the response buffer indicating it has valid data. This field will initially be reset by the host before passing the buffer descriptor to the INIC. A set of response buffers are passed from the host to the INIC by the host writing to the "Response Buffer Address Register" on the INIC. This register is defined as follows:

Bits 31-8 Physical address in host memory of the first of a set of contiguous response buffers.

Bits 7-0 Number of response buffers passed.

In this way the host can, say, allocate 128 buffers in a 4 K page, and pass all 128 buffers to the INIC with one register write. The INIC will maintain a queue of these header descriptors in it's ResponseType queue, adding to the end of the queue every time the host writes to the "Response Buffer Address Register". The INIC writes the extracted contents including the count, to the queue in exactly the same manner as for the header buffers.

The response buffers can be used and returned to the host in the same order that they were given to the INIC. The valid field will be set by the INIC before returning the buffer to the host. In this way a PCI interrupt, with a single bit in the interrupt register, may be generated to indicate that there is a response buffer for the host to process. When servicing this interrupt, the host will look at its queue of response buffers, reading the valid field to determine how many response buffers are to be processed.

Interrupt Status Register/Interrupt Mask Register.

Figures 27, 28:
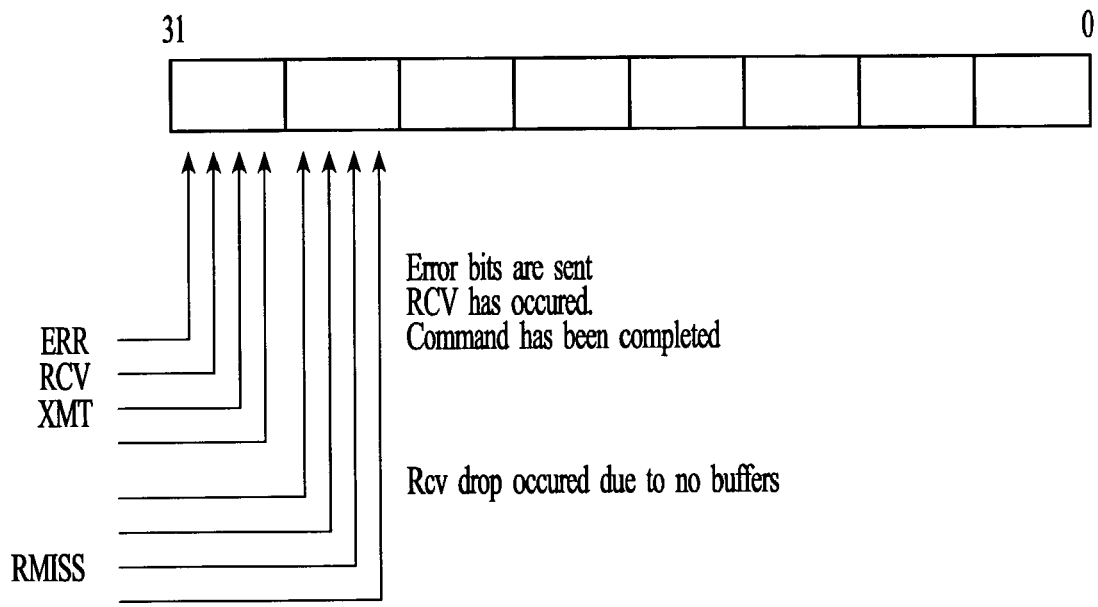

FIG. 27 shows the general format of this register. The setting of any bits in the ISR will cause an interrupt, provided the corresponding bit in the Interrupt Mask Register is set. The default setting for the IMR is 0.

The INIC is configured so that the host should never need to directly read the ISR from the INIC. To support this, it is important for the host/INIC to arrange a buffer area in host memory into which the ISR is dumped. The address and size of that area ca be passed to the INIC via a command on the XMT interface. That command will also specify the setting for the IMR. Until the INIC receives this command, it will not DMA the ISR to host memory, and no events will cause an interrupt. The host could if necessary, read the ISR directly from the INIC in this case.

For the host to never have to actually read the register from the INIC itself, it is necessary for the INIC to update this host copy of the register whenever anything in it changes. The host will Ack (or deassert) events in the register by writing the register with 0's in appropriate bit fields. So that the host does not miss events, the following scheme has been developed:

The INIC keeps a local copy of the register whenever it DMAs it to the host i.e. after some event(s). Call this COPYA Then the INIC starts accumulating any new events not reflected in the host copy in a separate word. Call this NEWA. As the host clears bits by writing the register back with those bits set to zero, the INIC clears these bits in COPYA (or the host write-back goes directly to COPYA). If there are new events in NEWA, it ORs them with COPYA, and DMAs this new ISR to the host. This new ISR then replaces COPYA, NEWA is cleared and the cycle then repeats.

Register Address.

For the sake of simplicity, in this example of FIG. 28 the registers are at 4-byte increments from whatever the base address is.

Alacritech TCP (ATCP) Design Specification.

This section outlines the design specification for the Alacritech TCP (ATCP) transport driver. The ATCP driver consists of three components:

1. The bulk of the protocol stack is based on the FreeBSD TCP/IP protocol stack. This code performs the Ethernet, ARP, IP, ICMP, and (slow path) TCP processing for the driver.

2. At the top of the protocol stack we introduce an NT filter driver used to intercept TDI requests destined for the Microsoft TCP driver.

3. At the bottom of the protocol stack we include an NDIS protocol-driver interface which allows us to communicate with the INIC miniport NDIS driver beneath the ATCP driver.

This section covers each of these topics, as well as issues common to the entire ATCP driver.

Coding Style.

In order to ensure that our ATCP driver is written in a consistent manner, we have adopted a set of coding guidelines. These guidelines are introduced with the philosophy that we should write code in a Microsoft style since we are introducing an NT-based product. The guidelines below apply to all code that we introduce into our driver. Since a very large portion of our ATCP driver will be based on FreeBSD, and since we are somewhat time-constrained on our driver development, the ported FreeBSD code will be exempt from these guidelines.

1. Global symbols—All function names and global variables in the ATCP driver should begin with the "ATK" prefix (ATKSendo for instance).

2. Variable names—Microsoft seems to use capital letters to separate multi-word variable names instead of underscores (VariableName instead of variable_name). We should adhere to this style.

3. Structure pointers—Microsoft typedefs all of their structures. The structure types are always capitals and they typedef a pointer to the structure as "P" <name>as follows:
    typedef struct_FOO {
        INT bar;
    } FOO, *PFOO;
    We will adhere to this style.

4. Function calls—Microsoft separates function call arguments on separate lines:
    X=foobar(
        argument1,
        argument2,
        );
    We will adhere to this style.

5. Comments—While Microsoft seems to alternatively use // and /* */ comment notation, we will exclusively use the /* */ notation.

6. Function comments—Microsoft includes comments with each function that describe the function, its arguments, and its return value. We will also include these comments, but will move them from within the function itself to just prior to the function for better readability.

7. Function arguments—Microsoft includes the keywords IN and OUT when defining function arguments. These keywords denote whether the function argument is used as an input parameter, or alternatively as a placeholder for an output parameter. We will include these keywords.

8. Function prototypes—We will include function prototypes in the most logical header file corresponding to the .c file. For example, the prototype for function foo() found in foo.c will be placed in foo.h.

9. Indentation—Microsoft code fairly consistently uses a tabstop of 4. We will do likewise.

10. Header file #ifndef—each header file should contain a #ifndef/#define/#endif which is used to prevent recursive header file includes. For example, foo.h would include:
ifndef_FOO_H_
define_FOO_H_
<foo.h contents.>
endif/*_FOO_H_*/
Note the _NAME_H_format.

11. Each file must contain a comment at the beginning which includes the $Id$ as follows:
/*
$Id$
*/
CVS (RCS) will expand this keyword to denote RCS revision, timestamps, author, etc.

SMP

This section describes the process by which we will make the ATCP driver SMP safe. The basic rule for SMP kernel code is that any access to a memory variable must be protected by a lock that prevents a competing access by code running on another processor. Spinlocks are the normal locking method for code paths which do not take a long time to execute (and which do not sleep.)

In general each instance of a structure will include a spinlock, which must be acquired before members of that structure are accessed, and held while a function is accessing that instance of the structure. Structures which are logically grouped together may be protected by a single spinlock: for example, the 'in_pcb' structure, 'tcpcb' structure, and 'socket' structure which together constitute the administrative information for a TCP connection will probably be collectively managed by a single spinlock in the 'socket' structure.

In addition, every global data structure such as a list or hash table must also have a protecting spinlock which must be held while the structure is being accessed or modified. The NT DDK in fact provides a number of convenient primitives for SMP-safe list manipulation, and it is recommended that these be used for any new lists. Existing list manipulations in the FreeBSD code can probably be left as-is to minimize code disturbance, except of course that the necessary spinlock acquisition and release must be added around them.

Spinlocks should not be held for long periods of time, and most especially, must not be held during a sleep, since this will lead to deadlocks. There is a significant deficiency in the NT kernel support for SMP systems: it does not provide an operation which allows a spinlock to be exchanged atomically for a sleep lock. This would be a serious problem in a UNIX environment where much of the processing occurs in the context of the user process which initiated the operation. (The spinlock would have to be explicitly released, followed by a separate acquisition of the sleep lock: creating an unsafe window.)

The NT approach is more asynchronous, however: IRPs are simply marked as 'PENDING' when an operation cannot be completed immediately. The calling thread does NOT sleep at that point: it returns, and may go on with other processing. Pending IRPs are later completed, not by waking up the thread which initiated them, but by an "IoCompleteRequest" call which typically runs at DISPATCH level in an arbitrary context.

Thus we have not in fact used sleep locks anywhere in the design of the ATCP driver, hoping the above issue will not arise.

Data Flow Overview.

The ATCP driver supports two paths for sending and receiving data, the fast-path and the slow-path. The fast-path data flow corresponds to connections that are maintained on the INIC, while slow-path traffic corresponds to network data for which the INIC does not have a connection. In order to set some groundwork for the rest of this section, these two data paths are summarized here.

Fast-Path Input Data Flow.

There are 2 different cases to consider:
1. NETBIOS traffic (identifiable by port number.)
2. Everything else.

NetBIOS Input.

As soon as the INIC has received a segment containing a NETBIOS header, it will forward it up to the TCP driver, along with the NETBIOS length from the header. (In principle the host could get this from the header itself, but since the INIC has already done the decode, it seem reasonable to just pass it.)

From the TDI spec, the amount of data in the buffer actually sent must be at least 128 bytes. For small SMBs, all of the received SMB should be forwarded; it will be absorbed directly by the TDI client without any further MDL exchange. Experiments tracing the TDI data flow show that the NETBIOS client directly absorbs up to 1460 bytes: the amount of payload data in a single Ethernet frame. Thus the initial system specifies that the INIC will indicate anything up to a complete segment to the ATCP driver. [See note (1)].

Once the INIC has passed up an indication with an NETBIOS length greater than the amount of data in the packet it passed, it will continue to accumulate further incoming data in DRAM on the INIC. Overflow of INIC DRAM buffers will be avoided by using a receive window on the INIC at this point, which can be 8K.

On receiving the indicated packet, the ATCP driver will call the receive handler registered by the TDI client for the connection, passing the actual size of the data in the packet from the INIC as "bytes indicated" and the NETBIOS length as "bytes available." [See note (2)].

In the "large data input" case, where "bytes available" exceeds the packet length, the TDI client will then provide an MDL, associated with an IRP, which must be completed when this MDL is filled. (This IRP/MDL may come back either in the response to TCP's call of the receive handler, or as an explicit TDI_RECEIVE request.)

The ATCP driver will build a "receive request" from the MDL information, and pass this to the INIC. This request will contain:

1) The TCP context identifier; 2) Size and offset information; 3) A list of physical addresses corresponding to the MDL pages; 4) A context field to allow the ATCP driver to identify the request on completion; and 5) "Piggybacked" window update information.

Note: the ATCP driver must copy any remaining data (which was not taken by the receive handler) from the segment indicated by the INIC to the start of the MDL, and must adjust the size & offset information in the request passed to the INIC to account for this.

The INIC will fill the given page(s) with incoming data up to the requested amount, and respond to the ATCP driver when this is done [See note (3)]. If the MDL is large, the INIC may open up its advertised receive window for improved throughput while filling the MDL. On receiving the response from the INIC, the ATCP driver will complete the IRP associated with this MDL, to tell the TDI client that the data is available. At this point the cycle of events is complete, and the ATCP driver is now waiting for the next header indication.

Other TCP Input.

In the general case we do not have a higher-level protocol header to enable us to predict that more data is coming. So on non-NETBIOS connections, the INIC will just accumulate incoming data in INIC DRAM up to a quantity of 8 K in this example. Again, a maximum advertised window size, which may be 16 K, will be used to prevent overflow of INIC DRAM buffers.

When the prescribed amount has been accumulated, or when a PSH flag is seen, the INIC will indicate a small packet which may be 128 bytes of the data to the ATCP driver, along with the total length of the data accumulated in INIC DRAM.

On receiving the indicated packet, the ATCP driver will call the receive handler registered by the TDI client for the connection, passing the actual size of the data in the packet from the INIC as "bytes indicated" and the total INIC-buffer length as "bytes available."

As in the NETBIOS case, if "bytes available" exceeds "bytes indicated", the TDI client will provide an IRP with an MDL. The ATCP driver will pass the MDL to the INIC to be filled, as before. The INIC will reply to the ATCP driver, which in turn will complete the IRP to the TDI client.

Using an MDL from the client avoids a copy step. However, if we can only buffer 8K and delay indicating to the ATCP driver until we have done so, a question arises regarding further segments coming in, since INIC DRAM is a scarce resource. We do not want to ACK with a zero-size window advertisement: this would cause the transmitting end to go into persist state, which is bad for throughput. If the transmitting end is also our INIC, this results in having to implement the persist timer on the INIC, which we do not wish to do. Instead for large transfers (i.e. no PSH flag seen) we will not send an ACK until the host has provided the MDL, and also, to avoid stopping the transmitting end, we will use a receive window of twice the amount we will buffer before calling the host. Since the host comes back with the MDL quite quickly (measured at <100 microseconds), we do not expect to experience significant overruns.

INIC Receive Window Updates.

If the INIC "owns" an MDL provided by the TDI client (sent by ATCP as a receive request), it will treat this as a "promise" by the TDI client to accept the data placed in it, and may therefore ACK incoming data as it is filling the pages.

However, for small requests, there will be no MDL returned by the TDI client: it absorbs all of the data directly in the receive callback function. We need to update the INIC's view of data which has been accepted, so that it can update its receive window. In order to be able to do this, the ATCP driver will accumulate a count of data which has been accepted by the TDI client receive callback function for a connection.

From the INIC's point of view, though, segments sent up to the ATCP driver are just "thrown over the wall"; there is no explicit reply path. We will therefore "piggyback" the update on requests sent out to the INIC. Whenever the ATCP driver has outgoing data for that connection, it will place this count in a field in the send request (and then clear the counter.) Any receive request (passing a receive MDL to the INIC) may also be used to transport window update info in the same way.

Note: we will probably also need to design a message path whereby the ATCP driver can explicitly send an update of this "bytes consumed" information (either when it exceeds a preset threshold or if there are no requests going out to the INIC for more than a given time interval), to allow for possible scenarios in which the data stream is entirely one-way.

NOTES.

1) The PSH flag can help to identify small SMB requests that fit into one segment.

2) Actually, the observed "bytes available" from the NT TCP driver to its client's callback in this case is always 1460. The NETBIOS-aware TDI client presumably calculates the size of the MDL it will return from the NETBIOS header. So strictly speaking we do not need the NETBIOS header length at this point: just an indication that this is a header for a "large" size. However, we *do* need an actual "bytes available" value for the non-NETBIOS case, so we may as well pass it.

3) We observe that the PSH flag is set in the segment completing each NETBIOS transfer. The INIC can use this to determine when the current transfer is complete and the MDL should be returned. It can, at least in a debug mode, sanity check the amount of received data against what is expected, though.

Fast-Path Output Data Flow.

The fast-path output data flow is similar to the input data-flow, but simpler. In this case the TDI client will provide a MDL to the ATCP driver along with an IRP to be completed when the data is sent. The ATCP driver will then give a request (corresponding to the MDL) to the INIC. This request will contain:

1) The TCP context identifier; 2) Size and offset information; 3) A list of physical addresses corresponding to the MDL pages; 4) A context field to allow the ATCP driver to identify the request on completion; 5) "Piggybacked" window update information (as discussed in section 6.1.3.)

The INIC will copy the data from the given physical location(s) as it sends the corresponding network frames onto the network. When all of the data is sent, the INIC will notify the host of the completion, and the ATCP driver will complete the IRP.

Note that there may be multiple output requests pending at any given time, since SMB allows multiple SMB requests to be simultaneously outstanding.

Slow-Path Data Flow.

For data for which there is no connection being maintained on the INIC, we will have to perform all of the TCP, IP, and Ethernet processing ourselves. To accomplish this we will port the FreeBSD protocol stack. In this mode, the INIC will be operating as a "dumb NIC"; the packets which pass over the NDIS interface will just contain MAC-layer frames.

The MBUFs in the incoming direction will in fact be managing NDIS-allocated packets. In the outgoing direction, we need protocol-allocated MBUFs in which to assemble the data and headers. The MFREE macro must be cognizant of the various types of MBUFs, and "do the right thing" for each type.

We will retain a (modified) socket structure for each connection, containing the socket buffer fields expected by the FreeBSD code. The TCP code that operates on socket buffers (adding/removing MBUFs to & from queues, indicating acknowledged & received data etc) will remain essentially unchanged from the FreeBSD base (though most of the socket functions & macros used to do this will need to be modified; these are the functions in kern/uipc_socket2.c)

The upper socket layer (kern/uipc_socket.c), where the overlying OS moves data in and out of socket buffers, must be entirely re-implemented to work in TDI terms. Thus, instead of sosend(), there will be a function that copies data from the MDL provided in a TDI_SEND call into socket buffer MBUFs. Instead of soreceive(), there will be a handler that calls the TDI client receive callback function, and also copies data from socket buffer MBUFs into any MDL provided by the TDI client (either explicitly with the callback response or as a separate TDI_RECEIVE call.)

We must note that there is a semantic difference between TDI_SEND and a write() on a BSD socket. The latter may complete back to its caller as soon as the data has been copied into the socket buffer. The completion of a TDI_SEND, however, implies that the data has actually been sent on the connection. Thus we will need to keep the TDI_SEND IRPs (and associated MDLs) in a queue on the socket until the TCP code indicates that the data from them has been ACK'd.

Data Path Notes:

1. There might be input data on a connection object for which there is no receive handler function registered. This has not been observed, but we can probably just ASSERT for a missing handler for the moment. If it should happen, however, we must assume that the TDI client will be doing TDI_RECEIVE calls on the connection. If we can't make a callup at the time that the indication from the INIC appears, we can queue the data and handle it when a TDI_RECEIVE does appear.

2. NT has a notion of "canceling" IRPs. It is possible for us to get a "cancel" on an IRP corresponding to an MDL which has been "handed" to the INIC by a send or receive request. We can handle this by being able to force the context back off the INIC, since IRPs will only get cancelled when the connection is being aborted.

Context Passing Between ATCP and INIC.

From ATCP to INIC.

There is a synchronization problem that must be addressed here. The ATCP driver will make a decision on a given connection that this connection should now be passed to the INIC. It builds and sends a command identifying this connection to the INIC.

Before doing so, it must ensure that no slow-path outgoing data is outstanding. This is not difficult; it simply pends and queues any new TDI_SEND requests and waits for any unacknowledged slow path output data to be acknowledged before initiating the context pass operation.

The problem arises with incoming slow-path data. If we attempt to do the context-pass in a single command handshake, there is a window during which the ATCP driver has send the context command, but the INIC has not yet seen this (or has not yet completed setting up its context.) During this time, slow-path input data frames could arrive and be fed into the slow-path ATCP processing code. Should that happen, the context information which the ATCP driver passed to the INIC is no longer correct. We can simply abort the outward pass of the context in this event, but it seems better to have a reliable handshake.

Therefore, the command to pass context from ATCP driver to INIC will be split into two halves, and there will be a two-exchange handshake.

The initial command from ATCP to INIC expresses an "intention" to hand out the context. It will include the source and destination IP addresses and ports, which will allow the INIC to establish a "provisional" context. Once it has this "provisional" context in place, the INIC will not send any more slow-path input frames for that src/dest IP/port combination (it will queue them, if any are received.)

When the ATCP driver receives the response to this initial "intent" command, it knows that the INIC will send no more slow-path input. The ATCP driver then waits for any remaining unconsumed slow-path input data for this connection to be consumed by the client. (Generally speaking there will be none, since the ATCP driver will not initiate a context pass while there is unconsumed slow-path input data; the handshake is simply to close the crossover window.)

Once any such data has been consumed, we know things are in a quiescent state. The ATCP driver can then send the second, "commit" command to hand out the context, with confidence that the TCB values it is handing out (sequence numbers etc) are reliable.

Note 1: it is conceivable that there might be situations in which the ATCP driver decides, after having sent the original "intention" command, that the context is not to be passed after all. (E.g. the local client issues a close.) So we must allow for the possibility that the second command may be a "abort", which should cause the INIC to deallocate and clear up its "provisional" context.

Note 2: to simplify the logic, the ATCP driver will guarantee that only one context may be in process of being handed out at a time: in other words, it will never issue another initial "intention" command until it has completed the second half of the handshake for the first one.

From INIC to ATCP.

There are two possible cases for this: a context transfer may be initiated either by the ATCP driver or by the INIC. However the machinery will be very similar in the two cases. If the ATCP driver wishes to cause context to be flushed from INIC to host, it will send a "flush" message to the INIC specifying the context number to be flushed. Once the INIC receives this, it will proceed with the same steps as for the case where the flush is initiated by the INIC itself:

1) The INIC will send an error response to any current outstanding receive request it is working on (corresponding to an MDL into which data is being placed.) Before sending the response, it updates the receive command "length" field to reflect the amount of data which has actually been placed in the MDL buffers at the time of the flush.

2) Likewise it will send an error response for any current send request, again reporting the amount of data actually sent from the request.

3) The INIC will DMA the TCB for the context back to the host. (Note: part of the information provided with a context must be the address of the TCB in the host.)

4) The INIC will send a "flush" indication to the host (very preferably via the regular input path as a special type of frame) identifying the context which is being flushed. Sending this indication via the regular input path ensures that it will arrive before any following slow-path frames.

At this point, the INIC is no longer doing fast-path processing, and any further incoming frames for the connection will simply be sent to the host as raw frames for the slow input path. The ATCP driver may not be able to complete the cleanup operations needed to resume normal slow path processing immediately on receipt of the "flush frame", since there may be outstanding send and receive requests to which it has not yet received a response. If this is the case, the ATCP driver must set a "pend incoming TCP frames" flag in its per-connection context. The effect of this is to change the behavior of tcp_input( ). This runs as a function call in the context of ip_input(), and normally returns only when incoming frames have been processed as far as possible (queued on the socket receive buffer or out-of-sequence reassembly queue.) However, if there is a flush pending and we have not yet completed resynchronization, we cannot do TCP processing and must instead queue input frames for TCP on a "holding queue" for the connection, to be picked up later when context flush is complete and normal slow path processing resumes. (This is why we want to send the "flush" indication via the normal input path: so that we can ensure it is seen before any following frames of slow-path input.)

Next we need to wait for any outstanding "send" requests to be errored off:

1) The INIC maintains its context for the connection in a "zombie" state. As "send" requests for this connection come out of the INIC queue, it sends error responses for them back to the ATCP driver. (It is apparently difficult for the INIC to identify all command requests for a given context; simpler for it to just continue processing them in order, detecting ones that are for a "zombie" context as they appear.)

2) The ATCP driver has a count of the number of outstanding requests it has sent to the INIC. As error responses for these are received, it decrements this count, and when it reaches zero, the ATCP driver sends a "flush complete" message to the INIC.

3) When the INIC receives the "flush complete" message, it dismantles its "zombie" context. From the INIC perspective, the flush is now completed.

4) When the ATCP driver has received error responses for all outstanding requests, it has all the information needed to complete its cleanup. This involves completing any IRPs corresponding to requests which have entirely completed and adjusting fields in partially-completed requests so that send and receive of slow path data will resume at the right point in the byte streams.

5) Once all this cleanup is complete, the ATCP driver will loop pulling any "pended" TCP input frames off the "pending queue" mentioned above and feeding them into the normal TCP input processing. Once all input frames on this queue have been cleared off, the "pend incoming TCP frames" flag can be cleared for the connection, and we are back to normal slow-path processing.

FreeBSD Porting Specification.

The largest portion of the ATCP driver is either derived, or directly taken from the FreeBSD TCP/IP protocol stack. This section defines the issues associated with porting this code, the FreeBSD code itself, and the modifications required for it to suit our needs.

Porting Philosophy.

FreeBSD TCP/IP (current version referred to as Net/3) is a general purpose TCP/IP driver. It contains code to handle a variety of interface types and many different kinds of protocols. To meet this requirement the code is often written in a sometimes confusing, over-complex manner. General-purpose structures are overlaid with other interface-specific structures so that different interface types can coexist using the same general-purpose code. For our purposes much of this complexity is unnecessary since we are only supporting a single interface type and a few specific protocols. It is therefore tempting to modify the code and data structures in an effort to make it more readable, and perhaps a bit more efficient. There are, however, some problems with doing this. First, the more we modify the original FreeBSD, the more changes we will have to make. This is especially true with regard to data structures. If we collapse two data structures into one we might improve the cleanliness of the code a bit, but we will then have to modify every reference to that data structure in the entire protocol stack. Another problem with attempting to "clean up" the code is that we might later discover that we need something that we had previously thrown away. Finally, while we might gain a small performance advantage in cleaning up the FreeBSD code, the FreeBSD TCP code will mostly only run in the slow-path connections, which are not our primary focus. Our priority is to get the slow-path code functional and reliable as quickly as possible.

For the reasons above we have adopted the philosophy that we should initially keep the data structures and code at close to the original FreeBSD implementation as possible. The code will be modified for the following reasons:

1) As required for NT interaction—Obviously we can't expect to simply "drop-in" the FreeBSD code as is. The interface of this code to the NT system will require some significant code modifications. This will mostly occur at the topmost and bottommost portions of the protocol stack, as well as the "ioctl" sections of the code. Modifications for SMP issues are also needed.

2) Unnecessary code can be removed—While we will keep the code as close to the original FreeBSD as possible, we will nonetheless remove code that will never be used (UDP is a good example of this).

Unix⇆NT Conversion.

The FreeBSD TCP/IP protocol stack makes use of many Unix system services. These include bcopy to copy memory, malloc to allocate memory, timestamp functions, etc. These will not be itemized in detail since the conversion to the corresponding NT calls is a fairly trivial and mechanical operation.

An area which will need non-trivial support redesign is MBUFs.

Network Buffers.

Figure 29:
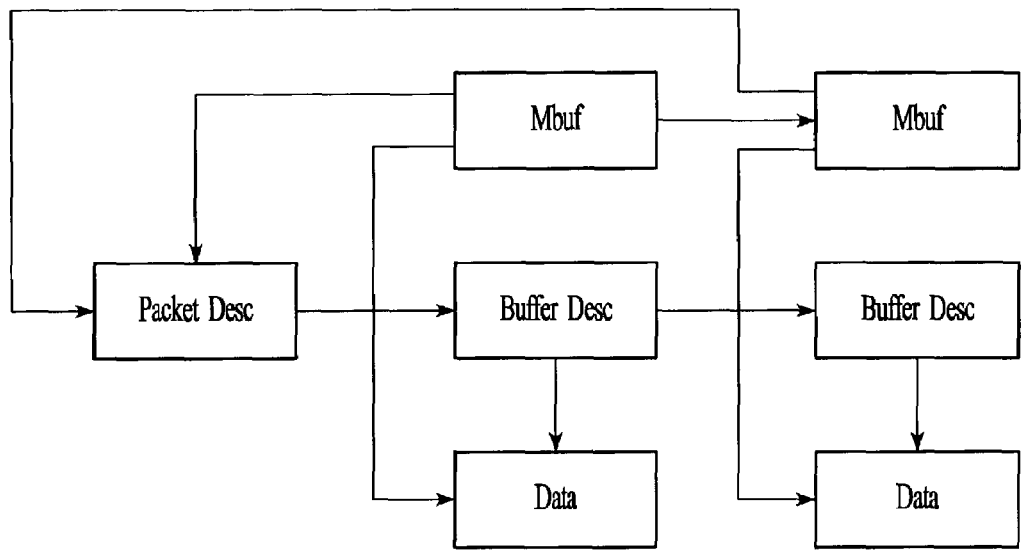

Under FreeBSD, network buffers are mapped using mbufs. Under NT network buffers are mapped using a combination of packet descriptors and buffer descriptors (the buffer descriptors are really MDLs). There are a couple of problems with the Microsoft method. First it does not provide the necessary fields which allow us to easily strip off protocol headers. Second, converting all of the FreeBSD protocol code to speak in terms of buffer descriptors is an unnecessary amount of overhead. Instead, in our port we will allocate our own mbuf structures and remap the NT packets as shown in FIG. 29.

The mbuf structure will provide the standard fields provided in the FreeBSD mbuf including the data pointer, which points to the current location of the data, data length fields and flags. In addition each mbuf will point to the packet descriptor which is associated with the data being mapped.

Once an NT packet is mapped, our transport driver should never have to refer to the packet or buffer descriptors for any information except when we are finished and are preparing to return the packet.

There are a couple of things to note here. We have designed our INIC such that a packet header should never be split across multiple buffers. Thus, we should never require the equivalent of the "m_pullup" routine included in Unix. Also note that there are circumstances in which we will be accepting data that will also be accepted by the Microsoft TCP/IP. One such example of this is ARP frames. We will need to build our own ARP cache by looking at ARP replies as they come off the network. Under these circumstances, it is absolutely imperative that we do not modify the data, or the packet and buffer descriptors. We will discuss this further in the following sections.

We will allocate a pool of mbuf headers at ATCP initialization time. It is important to remember that unlike other NICs, we can not simply drop data if we run out of the system resources required to manage/map the data. The reason for this is that we will be receiving data from the card that has already been acknowledged by TCP. Because of this it is essential that we never run out of mbuf headers. To solve this problem we will statically allocate mbuf headers for the maximum number of buffers that we will ever allow to be outstanding. By doing so, the card will run out of buffers in which to put the data before we will run out of mbufs, and as a result, the card will be forced to drop data at the link layer instead of us dropping it at the transport layer. DhXXX: as we've discussed, I don't think this is really true anymore. The INIC won't ACK data until either it's gotten a window update from ATCP to tell it the data's been accepted, or it's got an MDL. Thus it seems workable, though undesirable, if we can't accept a frame from the INIC & return an error to it saying it was not taken.

We will also require a pool of actual mbufs (not just headers). These mbufs are required in order to build transmit protocol headers for the slow-path data path, as well as other miscellaneous purposes such as for building ARP requests. We will allocate a pool of these at initialization time and we will add to this pool dynamically as needed. Unlike the mbuf headers described above, which will be used to map acknowledged TCP data coming from the card, the full mbufs will contain data that can be dropped if we can not get an mbuf.

The Code.

In this section we describe each section of the FreeBSD TCP/IP port. These sections include Interface Initialization, ARP, Route, IP, ICMP, and TCP.

Interface Initialization.

Structures.

Figure 30:
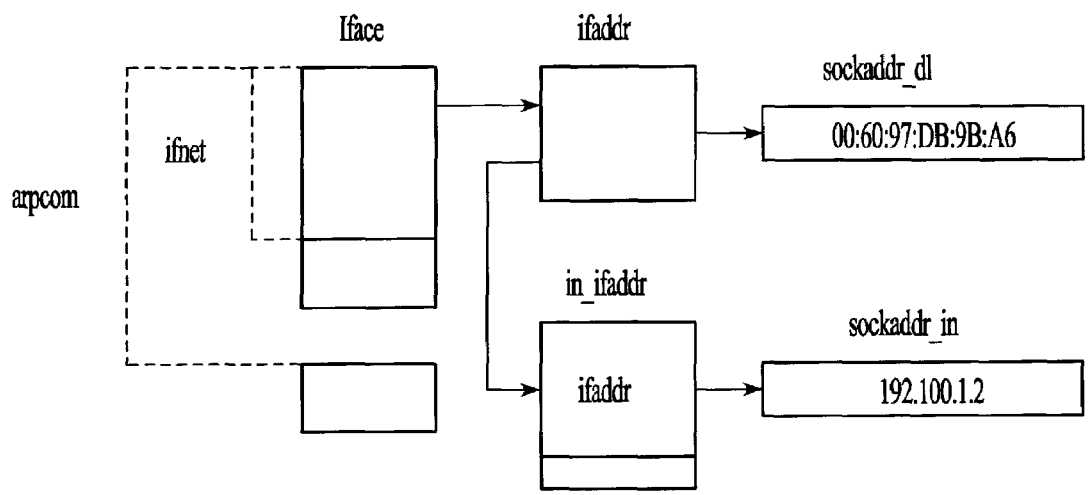

There are a variety of structures, which represent a single interface in FreeBSD. These structures include: ifnet, arpcom, ifaddr, in_ifaddr, sockaddr, sockaddr_in, and sockaddr_dl. FIG. 30 shows the relationship between all of these structures:

In the example of FIG. 30 we show a single interface with a MAC address of 00:60:97:DB:9B:A6 configured with an IP address of 192.100.1.2. As illustrated above, the in_ifaddr is actually an ifaddr structure with some extra fields tacked on to the end. Thus the ifaddr structure is used to represent both a MAC address and an IP address. Similarly the sockaddr structure is recast as a sockaddr_dl or a sockaddr_in depending on its address type. An interface can be configured to multiple IP addresses by simply chaining in_ifaddr structures after the in ifaddr structure shown in FIG. 30.

As mentioned in the Porting Philosophy section, many of the above structures could likely be collapsed into fewer structures. In order to avoid making unnecessary modifications to FreeBSD, for the time being we will leave these structures mostly as is. We will however eliminate the fields from the structure that will never be used. These structure modifications are discussed below.

We also show above a structure called iface. This is a structure that we define. It contains the arpcom structure, which in turn contains the ifnet structure. It also contains fields that enable us to blend our FreeBSD implementation with NT NDIS requirements. One such example is the NDIS binding handle used to call down to NDIS with requests (such as send).

The Functions.

FreeBSD initializes the above structures in two phases. First when a network interface is found, the ifnet, arpcom, and first ifaddr structures are initialized first by the network layer driver, and then via a call to the if_attach routine. The subsequent in_ifaddr structure(s) are initialized when a user dynamically configures the interface. This occurs in the in_ioctl and the in_ifinit routines. Since NT allows dynamic configuration of a network interface we will continue to perform the interface initialization in two phases, but we will consolidate these two phases as described below:

Ifinit.

The IfInit routine will be called from the ATKProtocolBindAdapter function. The IfInit function will initialize the Iface structure and associated arpcom and ifnet structures. It will then allocate and initialize an ifaddr structure in which to contain link-level information about the interface, and a sockaddr_dl structure to contain the interface name and MAC address. Finally it will add a pointer to the ifaddr structure into the ifnet_addrs array (using the if_index field of the ifnet structure) contained in the extended device object. Ifinit will then call IfConfig for each IP address that it finds in the registry entry for the interface.

IfConfig.

IfConfig is called to configure an IP address for a given interface. It is passed a pointer to the ifnet structure for that interface along with all the information required to configure an IP address for that interface (such as IP address, netmask and broadcast info, etc). IfConfig will allocate an in_ifaddr structure to be used to configure the interface. It will chain it to the total chain of in_ifaddr structures contained in the extended device object, and will then configure the structure with the information given to it. After that it will add a static route for the newly configured network and then broadcast a gratuitous ARP request to notify others of our Mac/IP address and to detect duplicate IP addresses on the net. ARP.

We will port the FreeBSD ARP code to NT mostly as-is. For some reason, the FreeBSD ARP code is located in a file called if_ether.c. While the functionality of this file will remain the same, we will rename it to a more logical arp.c. The main structures used by ARP are the Ilinfo_arp structure and the rtentry structure (actually part of route). These structures will not require major modifications. The functions that will require modification are defined here.

IN_ARPINPUT.

This function is called to process an incoming ARP frame. An ARP frame can either be an ARP request or an ARP reply. ARP requests are broadcast, so we will see every ARP request on the network, while ARP replies are directed so we should only see ARP replies that are sent to us. This introduces the following possible cases for an incoming ARP frame:

1. ARP request trying to resolve our IP address—Under normal circumstances, ARP would reply to this ARP request with an ARP reply containing our MAC address. Since ARP requests will also be passed up to the Microsoft TCP/IP driver, we need not reply. Note however, that FreeBSD also creates or updates an ARP cache entry with the information derived from the ARP request. It does this in anticipation of the fact that any host that wishes to know our MAC address is likely to wish to talk to us soon. Since we will need to know his MAC address in order to talk back, we might as well add the ARP information now rather than issuing our own ARP request later.

2. ARP request trying to resolve someone else's IP address—Since ARP requests are broadcast, we see every one on the network. When we receive an ARP request of this type, we simply check to see if we have an entry for the host that sent the request in our ARP cache. If we do, we check to see if we still have the correct MAC address associated with that host. If it is incorrect, we update our ARP cache entry. Note that we do not create a new ARP cache entry in this case.

3. ARP reply—In this case we add the new ARP entry to our ARP cache. Having resolved the address, we check to see if there is any transmit requests pending for the resolve IP address, and if so, transmit them.

Given the above three possibilities, the only major change to the in_arpinput code is that we will remove the code which generates an ARP reply for ARP requests that are meant for our interface.

ARPINTR.

This is the FreeBSD code that delivers an incoming ARP frame to in_arpinput. We will be calling in_arpinput directly from our ProtocolReceiveDPC routine (discussed in the NDIS section below) so this function is not needed.

ARPWHOHAS.

This is a single line function that serves only as a wrapper around arprequest. We will remove it and replace all calls to it with direct calls to arprequest.

ARPREQUEST.

This code simply allocates a mbuf, fills it in with an ARP header, and then passes it down to the ethernet output routine to be transmitted. For us, the code remains essentially the same except for the obvious changes related to how we allocate a network buffer, and how we send the filled in request.

ARP_IFINIT.

This is simply called when an interface is initialized to broadcast a gratuitous ARP request (described in the interface initialization section) and to set some ARP related fields in the ifaddr structure for the interface. We will simply move this functionality into the interface initialization code and remove this function.

ARPTIMER.

This is a timer-based function that is called every 5 minutes to walk through the ARP table looking for entries that have timed out. Although the time-out period for FreeBSD is 20 minutes, RFC 826 does not specify any timer requirements with regard to ARP so we can modify this value or delete the timer altogether to suit our needs. Either way the function won't require any major changes. All other functions in if_ether.c will not require any major changes.

Route.

On first thought, it might seem that we have no need for routing support since our ATCP driver will only receive IP datagrams whose destination IP address matches that of one of our own interfaces. Therefore, we will not "route" from one interface to another. Instead, the MICROSOFT TCP/IP driver will provide that service. We will, however, need to maintain an up-to-date routing table so that we know a) whether an outgoing connection belongs to one of our interfaces, b) to which interface it belongs, and c) what the first-hop IP address (gateway) is if the destination is not on the local network. We discuss four aspects on the subject of routing in this section. They are as follows:

1. The mechanics of how routing information is stored.
2. The manner in which routes are added or deleted from the route table.
3. When and how route information is retrieved from the route table.
4. Notification of route table changes to interested parties.

The Route Table.

In FreeBSD, the route table is maintained using an algorithm known as PATRICIA (Practical Algorithm To Retrieve Information Coded in Alphanumeric). This is a complicated algorithm that is a bit costly to set up, but is very efficient to reference. Since the routing table should contain the same information for both NT and FreeBSD, and since the key used to search for an entry in the routing table will be the same for each (the destination IP address), we should be able to port the routing table software to NT without any major changes.

The software which implements the route table (via the PATRICIA algorithm) is located in the FreeBSD file, radix.c. This file will be ported directly to the ATCP driver with no significant changes required.

Adding and Deleting Routes.

Routes can be added or deleted in a number of different ways. The kernel adds or deletes routes when the state of an interface changes or when an ICMP redirect is received. User space programs such as the RIP daemon, or the route command also modify the route table.

For kernel-based route changes, the changes can be made by a direct call to the routing software. The FreeBSD software that is responsible for the modification of route table entries is found in route.c. The primary routine for all route table changes is called rtrequest(). It takes as its arguments, the request type (ADD, RESOLVE, DELETE), the destination IP address for the route, the gateway for the route, the netmask for the route, the flags for the route, and a pointer to the route structure (struct rtentry) in which we will place the added or resolved route. Other routines in the route.c file include rtinit(), which is called during interface initialization time to add a static route to the network, rtredirect, which is called by ICMP when we receive a ICMP redirect, and an assortment of support routines used for the modification of route table entries. All of these routines found in route.c will be ported with no major modifications.

For user-space-based changes, we will have to be a bit more clever. In FreeBSD, route changes are sent down to the kernel from user-space applications via a special route socket. This code is found in the FreeBSD file, rtsock.c. Obviously this will not work for our ATCP driver. Instead the filter driver portion of our driver will intercept route changes destined for the Microsoft TCP driver and will apply those modifications to our own route table via the rtrequest routine described above. In order to do this, it will have to do some format translation to put the data into the format (sockaddr_in) expected by the rtrequest routine. Obviously, none of the code from rtsock.c will be ported to the ATCP driver. This same procedure will be-used to intercept and process explicit ARP cache modifications.

Consulting the Route Table.

In FreeBSD, the route table is consulted in ip_output when an IP datagram is being sent. In order to avoid a complete route table search for every outgoing datagram, the route is stored into the in_pcb for the connection. For subsequent calls to ip_output, the route entry is then simply checked to ensure validity. While we will keep this basic operation as is, we will require a slight modification to allow us to coexist with the Microsoft TCP driver. When an active connection is being set up, our filter driver will have to determine whether the connection is going to be handled by one of the INIC interfaces. To do this, we will have to consult the route table from the filter driver portion of our driver. This is done via a call to the rtallocl function (found in route.c). If a valid route table entry is found, then we will take control of the connection and set a pointer to the rtentry structure returned by rtallocl in our in_pcb structure.

What to Do When a Route Changes.

When a route table entry changes, there may be connections that have pointers to a stale route table entry. These connections will need to be notified of the new route. FreeBSD solves this by checking the validity of a route entry during every call to ip_output. If the entry is no longer valid, its reference to the stale route table entry is removed, and an attempt is made to allocate a new route to the destination. For our slow path, this will work fine. Unfortunately, since our IP processing is handled by the INIC for our fast path, this sanity check method will not be sufficient. Instead, we will need to perform a review of all of our fast path connections during every route table modification. If the route table change affects our connection, we will need to advise the INIC with a new first-hop address, or if the destination is no longer reachable, close the connection entirely.

ICMP.

Like the ARP code above, we will need to process certain types of incoming ICMP frames. Of the 10 possible ICMP message types, there are only three that we need to support. These include ICMP_REDIRECT, ICMP_UNREACH, and ICMP_SOURCEQUENCH. Any FreeBSD code to deal with other types of ICMP traffic will be removed. Instead, we will simply return NDIS_STATUS_NOT_ACCEPTED for all but the above ICMP frame types. This section describes how we will handle these ICMP frames.

ICMP_REDIRECT.

Under FreeBSD, an ICMP_REDIRECT causes two things to occur. First, it causes the route table to be updated with the route given in the redirect. Second, it results in a call back to TCP to cause TCP to flush the route entry attached to its associated in_pcb structures. By doing this, it forces ip_output to search for a new route. As mentioned in the Route section above, we will also require a call to a routine which will review all of the TCP fast-path connections, and update the route entries as needed (in this case because the route entry has been zeroed). The INIC will then be notified of the route changes. ICMP_UNREACH.

In both FreeBSD and Microsoft TCP, the ICMP_UNREACH results in no more than a simple statistic update. We will do the same.

ICMP_Sourcequench.

A source quench is sent to cause a TCP sender to close its congestion window to a single segment, thereby putting the sender into slow-start mode. We will keep the FreeBSD code as-is for slow-path connections. For fast path connections we will send a notification to the card that the congestion window for the given connection has been reduced. The INIC will then be responsible for the slow-start algorithm.

IP.

The FreeBSD IP code should require few modifications when porting to the ATCP driver. What few modifications will be required will be discussed in this section.

IP Initialization.

During initialization time, ip_init is called to initialize the array of protosw structures. These structures contain all the information needed by IP to be able to pass incoming data to the correct protocol above it. For example, when a UDP datagram arrives, IP locates the protosw entry corresponding to the UDP protocol type value (0x11) and calls the input routine specified in that protosw entry. We will keep the array of protosw structures intact, but since we are only handling the TCP and ICMP protocols above IP, we will strip the protosw array down substantially.

IP Input.

Following are the changes required for IP input (function ip_intr()).

No IP Forwarding.

Since we will only be handling datagrams for which we are the final destination, we should never be required to forward an IP datagram. All references to IP forwarding, and the ip_forward function itself, can be removed.

IP Options.

The only options supported by FreeBSD at this time include record route, strict and loose source and record route, and timestamp. For the timestamp option, FreeBSD only logs the current time into the IP header so that before it is forwarded. Since we will not be forwarding IP datagrams, this seems to be of little use to us. While FreeBSD supports the remaining options, NT essentially does nothing useful with them. For the moment, we will not bother dealing with IP options. They will be added in later if needed.

IP Reassembly.

There is a small problem with the FreeBSD IP reassembly code. The reassembly code reuses the IP header portion of the IP datagram to contain IP reassembly queue information. It can do this because it no longer requires the original IP header. This is an absolute no-no with the NDIS 4.0 method of handling network packets. The NT DDK explicitly states that we must not modify packets given to us by NDIS. This is not the only place in which the FreeBSD code modifies the contents of a network buffer. It also does this when performing endian conversions. At the moment we will leave this code as is and violate the DDK rules. We believe we can do this because we are going to ensure that no other transport driver looks at these frames. If this becomes a problem we will have to modify this code substantially by moving the IP reassembly fields into the mbuf header.

IP Output.

There are only two modifications required for IP output. The first is that since, for the moment, we are not dealing with IP options, there is no need for the code that inserts the IP options into the IP header. Second, we may discover that it is impossible for us to ever receive an output request that requires fragmentation. Since TCP performs Maximum Segment Size negotiation, we should theoretically never attempt to send a TCP segment larger than the MTU.

NDIS Protocol Driver.

This section defines protocol driver portion of the ATCP driver. The protocol driver portion of the ATCP driver is defined by the set of routines registered with NDIS via a call to NdisRegisterProtocol. These routines are limited to those that are called (indirectly) by the INIC miniport driver beneath us. For example, we register a ProtocolReceivePacket routine so that when the INIC driver calls NdisMIndicateReceivePacket it will result in a call from NDIS to our driver. Strictly speaking, the protocol driver portion of our driver does not include the method by which our driver calls down to the miniport (for example, the method by which we send network packets). Nevertheless, we will describe that method here for lack of a better place to put it. That said, we cover the following topics in this section of the document: 1) Initialization; 2) Receive; 3) Transmit; 4) Query/Set Information; 5) Status indications; 6) Reset; and 7) Halt.

Initialization.

The protocol driver initialization occurs in two phases. The first phase occurs when the ATCP DriverEntry routine calls ATKProtoSetup. The ATKProtoSetup routine performs the following:

1. Allocate resources—We attempt to allocate many of the required resources as soon as possible so that we are more likely to get the memory we want. This mostly applies to allocating and initializing our mbuf and mbuf header pools.

2. Register Protocol—We call NdisRegisterProtocol to register our set of protocol driver routines.

3. Locate and initialize bound NICs—We read the Linkage parameters of the registry to determine which NIC devices we are bound to. For each of these devices we allocate and initialize a IFACE structure (defined above). We then read the TCP parameters out of the registry for each bound device and set the corresponding fields in the IFACE structure.

After the underlying INIC devices have completed their initialization, NDIS will call our driver's ATKBindAdapter function for each underlying device. It will perform the following:

1. Open the device specified in the call the ATKBindAdapter.

2. Find the IFACE structure that was created in ATKProtoSetup for this device.

3. Query the miniport for adapter information. This includes such things as link speed and MAC address. Save relevant information in the IFACE structure.

4. Perform the interface initialization as specified in the section on Interface Initialization.

Receive.

Receive is handled by the protocol driver routine ATKReceivePacket. Before we describe this routine, it is important to consider each possible receive type and how it will be handled.

Receive Overview.

Figure 31:
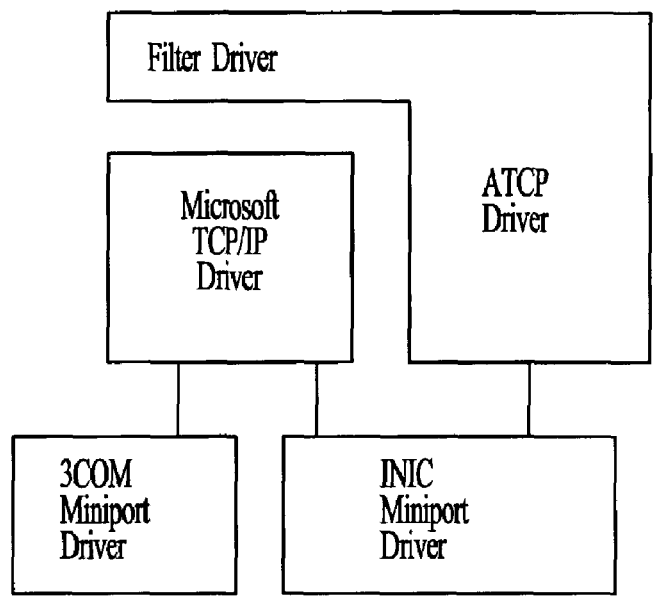

Our INIC miniport driver will be bound to our transport driver as well as the generic Microsoft TCP driver (and possibly others). The ATCP driver will be bound exclusively to INIC devices, while the Microsoft TCP driver will be bound to INIC devices as well as other types of NICs. This is illustrated in FIG. 31. By binding the driver in this fashion, we can choose to direct incoming network data to our own ATCP transport driver, the Microsoft TCP driver, or both. We do this by playing with the ethernet "type" field as follows.

To NDIS and the transport drivers above it, our card is going to be registered as a normal ethernet card. When a transport driver receives a packet from our driver, it will expect the data to start with an ethernet header, and consequently, expects the protocol type field to be in byte offset 12. If Microsoft TCP finds that the protocol type field is not equal to either IP, or ARP, it will not accept the packet. So, to deliver an incoming packet to our driver, we must simply map the data such that byte 12 contains a non-recognized ethernet type field. Note that we must choose a value that is greater than 1500 bytes so that the transport drivers do not confuse it with an 802.3 frame. We must also choose a value that will not be accepted by other transport driver such as Appletalk or IPX. Similarly, if we want to direct the data to Microsoft TCP, we can then simply leave the ethernet type field set to IP (or ARP). Note that since we will also see these frames we can choose to accept or not-accept them as necessary. Incoming packets are delivered as follows:

A. Packets delivered to ATCP only (not accepted by MSTCP):

1. All TCP packets destined for one of our IP addresses. This includes both slow-path frames and fast-path frames. In the slow-path case, the TCP frames are given in there entirety (headers included). In the fast-path case, the ATKReceivePacket is given a header buffer that contains status information and data with no headers (except those above TCP). More on this later.

B. Packets delivered to Microsoft TCP only (not accepted by ATCP):

1. All non-TCP packets.

2. All packets that are not destined for one of our interfaces (packets that will be routed). Continuing the above example, if there is an IP address 144.48.252.4 associated with the 3com interface, and we receive a TCP connect with a destination IP address of 144.48.252.4, we will actually want to send that request up to the ATCP driver so that we create a fast-path connection for it. This means that we will need to know every IP address in the system and filter frames based on the destination IP address in a given TCP datagram. This can be done in the INIC miniport driver. Since it will be the ATCP driver that learns of dynamic IP address changes in the system, we will need a method to notify the INIC miniport of all the IP addresses in the system. More on this later.

C. Packets delivered to both:

1. All ARP frames.

2. All ICMP frames.

Two Types of Receive Packets.

Figure 32:
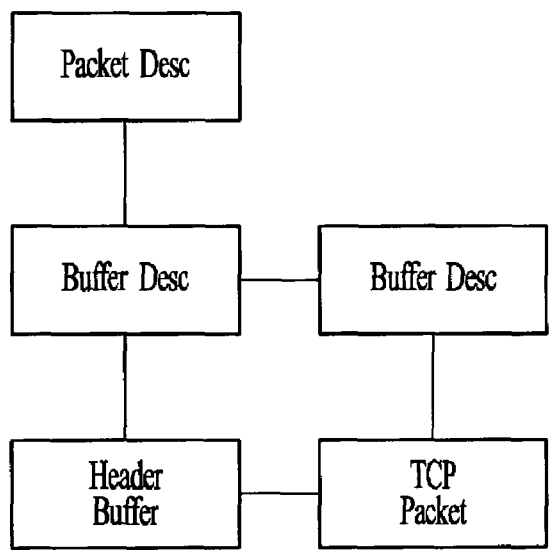
Figure 33:
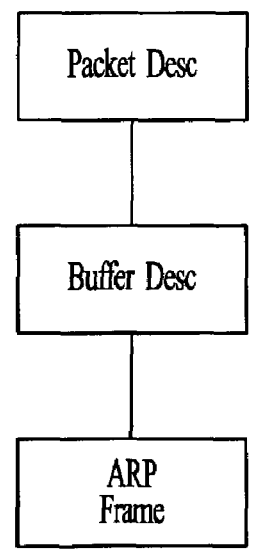

There are several circumstances in which the INIC will need to indicate extra information about a receive packet to the ATCP driver. One such example is a fast path receive in which the ATCP driver will need to be notified of how much data the card has buffered. To accomplish this, the first (and sometimes only) buffer in a received packet will actually be an INIC header buffer. The header buffer contains status information about the receive packet, and may or may not contain network data as well. The ATCP driver will recognize a header buffer by mapping it to an ethernet frame and inspecting the type field found in byte 12. We will indicate all TCP frames destined for us in this fashion, while frames that are destined for both our driver and the Microsoft TCP driver (ARP, ICMP) will be indicated without a header buffer. FIG. 32 shows an example of an incoming TCP packet. FIG. 33 shows an example of an incoming ARP frame.

NDIS 4 Protocolreceivepacket Operation.

NDIS has been designed such that all packets indicated via NdisMIndicateReceivePacket by an underlying miniport are delivered to the ProtocolReceivePacket routine for all protocol drivers bound to it. These protocol drivers can choose to accept or not accept the data. They can either accept the data by copying the data out of the packet indicated to it, or alternatively they can keep the packet and return it later via a call to NdisReturnPackets. By implementing it in this fashion, NDIS allows more than one protocol driver to accept a given packet. For this reason, when a packet is delivered to a protocol driver, the contents of the packet descriptor, buffer descriptors and data must all be treated as read-only. At the moment, we intend to violate this rule. We choose to violate this because much of the FreeBSD code modifies the packet headers as it examines them (mostly for endian conversion purposes). Rather than modify all of the FreeBSD code, we will instead ensure that no other transport driver accepts the data by making sure that the ethernet type field is unique to us (no one else will want it). Obviously this only works with data that is only delivered to our ATCP driver. For ARP and ICMP frames we will instead copy the data out of the packet into our own buffer and return the packet to NDIS directly. While this is less efficient than keeping the data and returning it later, ARP and ICMP traffic should be small enough, and infrequent enough, that it doesn't matter.

The DDK specifies that when a protocol driver chooses to keep a packet, it should return a value of 1 (or more) to NDIS in its ProtocolReceivePacket routine. The packet is then later returned to NDIS via the call to NdisReturnPackets. This can only happen after the ProtocolReceivePacket has returned control to NDIS. This requires that the call to NdisReturnPackets must occur in a different execution context. We can accomplish this by scheduling a DPC, scheduling a system thread, or scheduling a kernel thread of our own. For brevity in this section, we will assume it is a done through a DPC. In any case, we will require a queue of pending receive buffers on which to place and fetch receive packets.

After a receive packet is dequeued by the DPC it is then either passed to TCP directly for fast-path processing, or it is sent through the FreeBSD path for slow-path processing. Note that in the case of slow-path processing, we may be working on data that needs to be returned to NDIS (TCP data) or we may be working on our own copy of the data (ARP and ICMP). When we finish with the data we will need to figure out whether or not to return the data to NDIS or not. This will be done via fields in the mbuf header used to map the data. When the mfreem routine is called to free a chain of mbufs, the fields in the mbuf will be checked and, if required, the packet descriptor pointed to by the mbuf will be returned to NDIS.

MBUF⇋Packet Mapping.

Figure 34C:
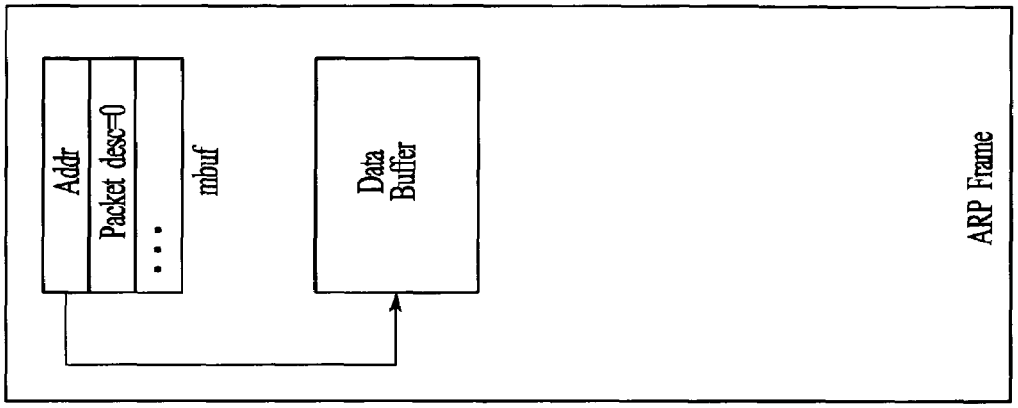
Figure 34B:
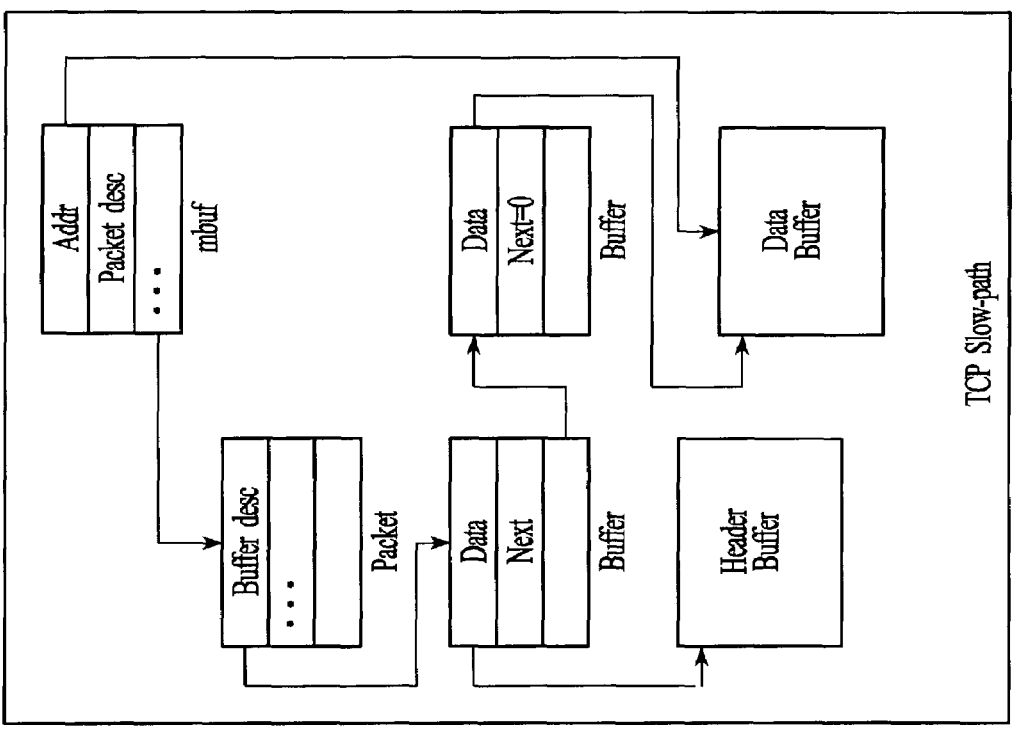
Figure 34A:
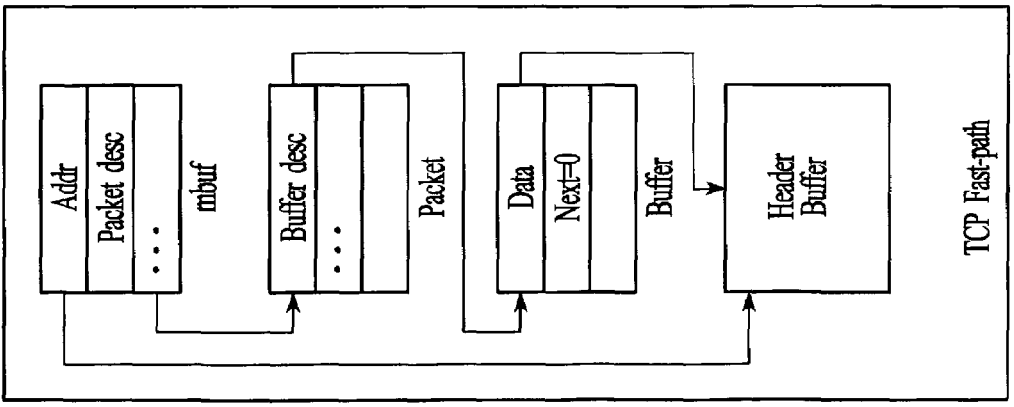

As noted in the section on mbufs above, we will map incoming data to mbufs so that our FreeBSD port requires fewer modifications. Depending on the type of data received, this mapping will appear differently. Here are some examples:

In FIG. 34A, we show incoming data for a TCP fast-path connection. In this example, the TCP data is fully contained in the header buffer. The header buffer is mapped by the mbuf and sent upstream for fast-path TCP processing. In this case it is required that the header buffer be mapped and sent upstream because the fast-path TCP code will need information contained in the header buffer in order to perform the processing. When the mbuf in this example is freed, the mfreem routine will determine that the mbuf maps a packet that is owned by NDIS and will then free the mbuf header only and call NdisReturnPackets to free the data.

In FIG. 34B, we show incoming data for a TCP slow-path connection. In this example the mbuf points to the start of the TCP data directly instead of the header buffer. Since this buffer will be sent up for slow-path FreeBSD processing, we can not have the mbuf pointing to a header buffer (FreeBSD would get awfully confused). Again, when mfreem is called to free the mbuf, it will discover the mapped packet, free the mbuf header, and call NDIS to free the packet and return the underlying buffers. Note that even though we do not directly map the header buffer with the mbuf we do not lose it because of the link from the packet descriptor. Note also that we could alternatively have the INIC miniport driver only pass us the TCP data buffer when it receives a slow-path receive. This would work fine except that we have determined that even in the case of slow-path connections we are going to attempt to offer some assistance to the host TCP driver (most likely by checksum processing only). In this case there may be some special fields that we need to pass up to the ATCP driver from the INIC driver. Leaving the header buffer connected seems the most logical way to do this.

Finally, in FIG. 34C, we show a received ARP frame. Recall that for incoming ARP and ICMP frames we are going to copy the incoming data out of the packet and return it directly to NDIS. In this case the mbuf simply points to our data, with no corresponding packet descriptor. When we free this mbuf, mfreem will discover this and free not only the mbuf header, but the data as well.

Other Receive Packets.

We use this receive mechanism for other purposes besides the reception of network data. It is also used as a method of communication between the ATCP driver and the INIC. One such example is a TCP context flush from the INIC. When the INIC determines, for whatever reason, that it can no longer manage a TCP connection, it must flush that connection to the ATCP driver. It will do this by filling in a header buffer with appropriate status and delivering it to the INIC driver. The INIC driver will in turn deliver it to the protocol driver which will treat it essentially like a fast-path TCP connection by mapping the header buffer with an mbuf header and delivering it to TCP for fast-path processing. There are two advantages to communicating in this manner. First, it is already an established path, so no extra coding or testing is required. Second, since a context flush comes in, in the same manner as received frames, it will prevent us from getting a slow-path frame before the context has been flushed.

SUMMARY

Having covered all of the various types of receive data, following are the steps that are taken by the ATKProtocolReceivePacket routine.

1. Map incoming data to an ethernet frame and check the type field;
2. If the type field contains our custom INIC type then it should be TCP;
3. If the header buffer specifies a fast-path connection, allocate one or more mbufs headers to map the header and possibly data buffers. Set the packet descriptor field of the mbuf to point to the packet descriptor, set the mbuf flags appropriately, queue the mbuf, and return 1;

4. If the header buffer specifies a slow-path connection, allocate a single mbuf header to map the network data, set the mbuf fields to map the packet, queue the mbuf and return 1. Note that we design the INIC such that we will never get a TCP segment split across more than one buffer;
5. If the type field of the frame indicates ARP or ICMP;
6. Allocate a mbuf with a data buffer. Copy the contents of the packet into the mbuf. Queue the mbuf, and return 0 (not accepted); and
7. If the type field is not either the INIC type, ARP or ICMP, we don't want it. Return 0.

The receive processing will continue when the mbufs are dequeued. At the moment this is done by a routine called ATKProtocolReceiveDPC. It will do the following:

1. Dequeue a mbuf from the queue; and
2. Inspect the mbuf flags. If the mbuf is meant for fast-path TCP, it will call the fast-path routine directly. Otherwise it will call the ethernet input routine for slow-path processing.

TRANSMIT.

In this section we discuss the ATCP transmit path.

NDIS 4 Send Operation.

The NDIS 4 send operation works as follows. When a transport/protocol driver wishes to send one or more packets down to an NDIS 4 miniport driver, it calls NdisSendPackets with an array of packet descriptors to send. As soon as this routine is called, the transport/protocol driver relinquishes ownership of the packets until they are returned, one by one in any order, via a NDIS call to the ProtocolSendComplete routine. Since this routine is called asynchronously, our ATCP driver must save any required context into the packet descriptor header so that the appropriate resources can be freed. This is discussed further in the following sections.

Types of "Sends".

Like the Receive path described above, the transmit path is used not only to send network data, but is also used as a communication mechanism between the host and the INIC. Here are some examples of the types of sends performed by the ATCP driver.

Fast-Path TCP Send.

Figure 35:
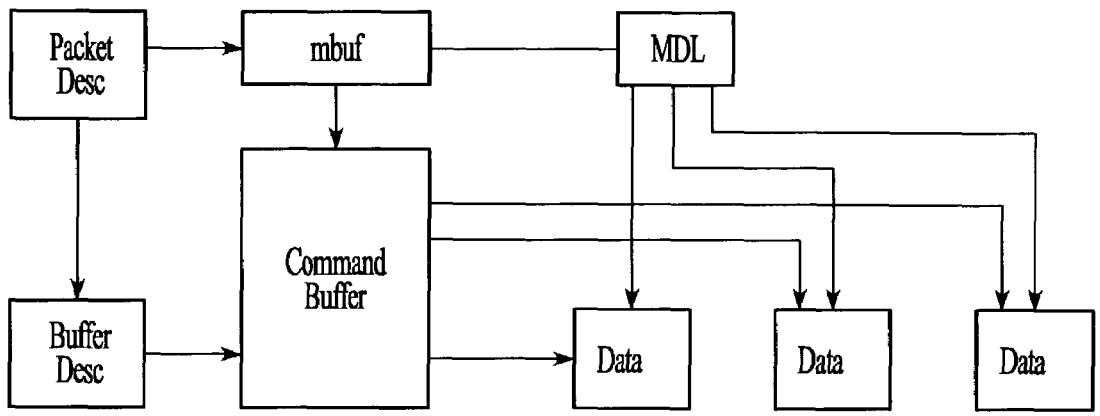

When the ATCP driver receives a transmit request with an associated MDL, it will package up the MDL physical addresses into a command buffer, map the command buffer with a buffer and packet descriptor, and call NdisSendPackets with the corresponding packet. The underlying INIC driver will issue the command buffer to the INIC. When the corresponding response buffer is given back to the host, the INIC miniport will call NdisMSendComplete which will result in a call to the ATCP ProtocolSendComplete (ATKSendComplete) routine, at which point the resources associated with the send can be freed. We will allocate and use a mbuf to hold the command buffer. By doing this we can store the context necessary in order to clean up after the send completes. This context includes a pointer to the MDL and presumably some other connection context as well. The other advantage to using a mbuf to hold the command buffer is that it eliminates having another special set of code to allocate and return command buffer. We will store a pointer to the mbuf in the reserved section of the packet descriptor so we can locate it when the send is complete. FIG. 35 illustrates the relationship between the client's MDL, the command buffer, and the buffer and packet descriptors.

Fast-Path TCP Receive.

As described in the Fast-Path Input Data Flow section above, the receive process typically occurs in two phases. First the INIC fills in a host receive buffer with a relatively small amount of data, but notifies the host of a large amount of pending data (either through a large amount of buffered data on the card, or through a large amount of expected NetBios data). This small amount of data is delivered to the client through the TDI interface. The client will then respond with a MDL in which the data should be placed. Like the Fast-path TCP send process, the receive portion of the ATCP driver will then fill in a command buffer with the MDL information from the client, map the buffer with packet and buffer descriptors and send it to the INIC via a call to NdisSendPackets. Again, when the response buffer is returned to the INIC miniport, the ATKSendComplete routine will be called and the receive will complete. This relationship between the MDL, command buffer and buffer and packet descriptors are the same as shown in the Fast-path send section above.

Slow-Path (FreeBSD).

Figure 36:
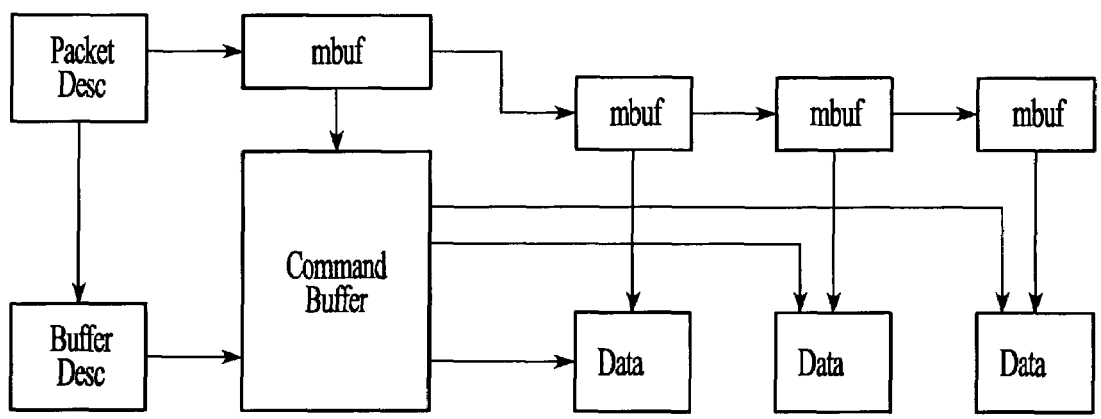

Slow-path sends pass through the FreeBSD stack until the ethernet header is prepended in ether_output and the packet is ready to be sent. At this point a command buffer will be filled with pointers to the ethernet frame, the command buffer will be mapped with a packet and buffer descriptor and NdisSendPackets will be called to hand the packet off to the miniport. FIG. 36 shows the relationship between the mbufs, command buffer, and buffer and packet descriptors. Since we will use a mbuf to map the command buffer, we can simply link the data mbufs directly off of the command buffer mbuf. This will make the freeing of resources much simpler.

Non-Data Command Buffer.

Figures 37, 38:
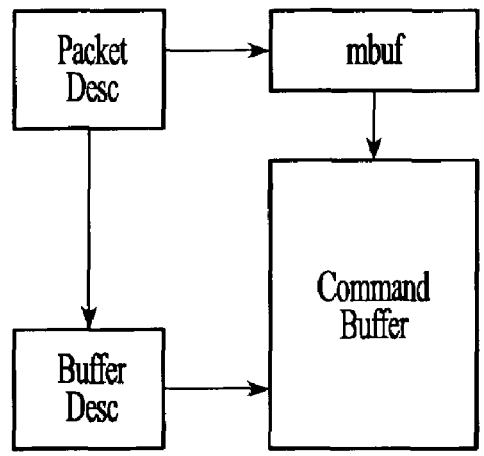

The transmit path is also used to send non-data commands to the card. As shown in FIG. 37, for example, the ATCP driver gives a context to the INIC by filling in a command buffer, mapping it with a packet and buffer descriptor, and calling NdisSendPackets.

ATKProtocolSendComplete.

Given the above different types of sends, the ATKProtocolSendComplete routine will perform various types of actions when it is called from NDIS. First it must examine the reserved area of the packet descriptor to determine what type of request has completed. In the case of a slow-path completion, it can simply free the mbufs, command buffer, and descriptors and return. In the case of a fast-path completion, it will need to notify the TCP fast path routines of the completion so TCP can in turn complete the client's IRP. Similarly, when a non-data command buffer completes, TCP will again be notified that the command sent to the INIC has completed.

TDI Filter Driver.

In a first embodiment of the product, the INIC handles only simple-case data transfer operations on a TCP connection. (These of course constitute the large majority of CPU cycles consumed by TCP processing in a conventional driver.)

There are many other complexities of the TCP protocol which must still be handled by host driver software: connection setup and breakdown, out-of-order data, nonstandard flags, etc.

The NT OS contains a fully functional TCP/IP driver, and one solution would be to enhance this so that it is able to detect our INIC and take advantage of it by "handing off" data-path processing where appropriate.

Unfortunately, we do not have access to NT source, let alone permission to modify NT. Thus the solution above, while a goal, cannot be done immediately. We instead provide our own custom driver software on the host for those parts of TCP processing which are not handled by the INIC.

This presents a challenge. The NT network driver framework does make provision for multiple types of protocol driver: but it does not easily allow for multiple instances of drivers handling the SAME protocol.

For example, there are no "hooks" into the Microsoft TCP/IP driver which would allow for routing of IP packets between our driver (handling our INICs) and the Microsoft driver (handling other NICs).

Our approach to this is to retain the Microsoft driver for all non-TCP network processing (even for traffic on our INICs), but to invisibly "steal" TCP traffic on our connections and handle it via our own (BSD-derived) driver. The Microsoft TCP/IP driver is unaware of TCP connections on interfaces we handle.

The network "bottom end" of this artifice is described earlier in the document. In this section we will discuss the "top end": the TDI interface to higher-level NT network client software.

We make use of an NT facility called a filter driver. NT allows a special type of driver ("filter driver") to attach itself "on top" of another driver in the system. The NT I/O manager then arranges that all requests directed to the attached driver are sent first to the filter driver; this arrangement is invisible to the rest of the system.

The filter driver may then either handle these requests itself, or pass them down to the underlying driver it is attached to. Provided the filter driver completely replicates the (externally visible) behavior of the underlying driver when it handles requests itself, the existence of the filter driver is invisible to higher-level software.

The filter driver attaches itself on top of the Microsoft TCP/IP driver; this gives us the basic mechanism whereby we can intercept requests for TCP operations and handle them in our driver instead of the Microsoft driver.

However, while the filter driver concept gives us a framework for what we want to achieve, there are some significant technical problems to be solved. The basic issue is that setting up a TCP connection involves a sequence of several requests from higher-level software, and it is not always possible to tell, for requests early in this sequence, whether the connection should be handled by our driver or by the Microsoft driver.

Thus for many requests, we store information about the request in case we need it later, but also allow the request to be passed down to the Microsoft TCP/IP driver in case the connection ultimately turns out to be one which that driver should handle.

Let us look at this in more detail, which will involve some examination of the TDI interface: the NT interface into the top end of NT network protocol drivers. Higher-level TDI client software which requires services from a protocol driver proceeds by creating various types of NT FILE_OBJECTs, and then making various DEVICE_IO_CONTROL requests on these FILE_OBJECTs.

There are two types of FILE_OBJECT of interest here. Local IP addresses that are represented by ADDRESS objects, and TCP connections that are represented by CONNECTION objects. The steps involved in setting up a TCP connection (from the "active" client side, for a CONNECTION object) are:

1) Create an ADDRESS object; 2) Create a CONNECTION object; 3) Issue a TDI_ASSOCIATE_ADDRESS io-control to associate the CONNECTION object with the ADDRESS object; and 4) Issue a TDI_CONNECT io-control on the CONNECTION object, specifying the remote address and port for the connection.

Initial thoughts were that handling this would be straightforward: we would tell, on the basis of the address given when creating the ADDRESS object, whether the connection is for one of our interfaces or not. After which, it would be easy to arrange for handling entirely by our code, or entirely by the Microsoft code: we would simply examine the ADDRESS object to see if it was "one of ours" or not.

There are two main difficulties, however. First, when the CONNECTION object is created, no address is specified: it acquires a local address only later when the TDI_ASSOCIATE_ADDRESS is done. Also, when a CONNECTION object is created, the caller supplies an opaque "context cookie" which will be needed for later communications with that caller. Storage of this cookie is the responsibility of the protocol driver: it is not directly derivable just by examination of the CONNECTION object itself. If we simply passed the "create" call down to the Microsoft TCP/IP driver, we would have no way of obtaining this cookie later if it turns out that we need to handle the connection. Therefore, for every CONNECTION object which is created we allocate a structure to keep track of information about it, and store this structure in a hash table keyed by the address of the CONNECTION object itself, so that we can locate it if we later need to process requests on this object. We refer to this as a "shadow" object: it replicates information about the object stored in the Microsoft driver. (We must, of course, also pass the create request down to the Microsoft driver too, to allow it to set up its own administrative information about the object.)

A second major difficulty arises with ADDRESS objects. These are often created with the TCP/IP "wildcard" address (all zeros); the actual local address is assigned only later during connection setup (by the protocol driver itself.) Of course, a "wildcard" address does not allow us to determine whether connections that will be associated with this ADDRESS object should be handled by our driver or by the Microsoft one. Also, as with CONNECTION objects, there is "opaque" data associated with ADDRESS objects that cannot be derived just from examination of the object itself. (In this case addresses of callback functions set on the object by TDI_SET_EVENT io-controls.)

Thus, as in the CONNECTION object case, we create a "shadow" object for each ADDRESS object which is created with a wildcard address. In this we store information (principally addresses of callback functions) which we will need if we are handling connections on CONNECTION objects associated with this ADDRESS object. We store similar information, of course, for any ADDRESS object which is explicitly for one of our interface addresses; in this case we don't need to also pass the create request down to the Microsoft driver.

With this concept of "shadow" objects in place, let us revisit the steps involved in setting up a connection, and look at the processing required in our driver.

First, the TDI client makes a call to create the ADDRESS object. Assuming that this is a "wildcard" address, we create a "shadow" object before passing the call down to the Microsoft driver.

The next step (omitted in the earlier list for brevity) is normally that the client makes a number of TDI_S-ET_EVENT io-control calls to associate various callback functions with the ADDRESS object. These are functions that should be called to notify the TDI client when certain events (such arrival of data or disconnection requests etc) occur. We store these callback function pointers in our "shadow" address object, before passing the call down to the Microsoft driver.

Next, the TDI client makes a call to create a CONNECTION object. Again, we create our "shadow" of this object.

Next, the client issues the TDI_ASSOCIATE_ADDRESS io-control to bind the CONNECTION object to the ADDRESS object. We note the association in our "shadow" objects, and also pass the call down to the Microsoft driver.

Finally the TDI client issues a TDI_CONNECT io-control on the CONNECTION object, specifying the remote IP address (and port) for the desired connection. At this point, we examine our routing tables to determine if this connection should be handled by one of our interfaces, or by some other NIC. If it is ours, we mark the CONNECTION object as "one of ours" for future reference (using an opaque field which NT FILE_OBJECTS provide for driver use.) We then proceed with connection setup and handling in our driver, using information stored in our "shadow" objects. The Microsoft driver does not see the connection request or any subsequent traffic on the connection.

If the connection request is NOT for one of our interfaces, we pass it down to the Microsoft driver. Note carefully, however, that we can not simply discard our "shadow" objects at this point. The TDI interface allows re-use of CONNECTION objects: on termination of a connection, it is legal for the TDI client to dissociate the CONNECTION object from its current. Thus our "shadow" objects must be retained for the lifetime ADDRESS object, re-associate it with another, and use it for another connection of the NT FILE_OBJECTS: the subsequent connection could turn out to be via one of our interfaces.

Timers.

Keepalive Timer.

We don't want to implement keepalive timers on the INIC. It would in any case be a very poor use of resources to have an INIC context sitting idle for two hours.

Idle Timer.

We will keep an idle timer in the ATCP driver for connections that are managed by the INIC (resetting it whenever we see activity on the connection), and cause a flush of context back to the host if this timer expires. We may want to make the threshold substantially lower than 2 hours, to reclaim INIC context slots for useful work sooner. May also want to make that dependent on the number of contexts which have actually been handed out: don't need to reclaim them if we haven't handed out the max.

Receive and Transmit Microcode Design.

This section provides a general description of the design of the microcode that will execute on two of the sequencers of the Protocol Processor on the INIC. The overall philosophy of the INIC is discussed in other sections. This section will discuss the INIC microcode in detail.

Design Overview.

As specified in other sections, the INIC supplies a set of 3 custom processors that will provide considerable hardware-assist to the microcode running thereon. The paragraphs immediately following list the main hardware-assist features:

1) Header processing with specialized DMA engines to validate an input header and generate a context hash, move the header into fast memory and do header comparisons on a DRAM-based TCP control block;

2) DRAM fifos for free buffer queues (large & small), receive-frame queues, event queues etc.;

3) Header compare logic;

4) Checksum generation;

5) Multiple register contexts with register access controlled by simply setting a context register. The Protocol Processor will provide 512 SRAM-based registers to be shared among the 3 sequencers;

6) Automatic movement of input frames into DRAM buffers from the MAC Fifos;

7) Run receive processing on one sequencer and transmit processing on the other. This was chosen as opposed to letting both sequencers run receive and transmit. One of the main reasons for this is that the header-processing hardware can not be shared and interlocks would be needed to do this. Another reason is that interlocks would be needed on the resources used exclusively by receive and by transmit;

8) The INIC will support up to 256 TCP connections (TCB's). A TCB is associated with an input frame when the frame's source and destination IP addresses and source and destination ports match that of the TCB. For speed of access, the TCB's will be maintained in a hash table in NIC DRAM to save sequential searching. There will however, be an index in hash order in SRAM. Once a hash has been generated, the TCB will be cached in SRAM. There will be up to 8 cached TCBs in SRAM. These cache locations can be shared between both sequencers so that the sequencer with the heavier load will be able to use more cache buffers. There will also be 8 header buffers to be shared between the sequencers. Note that each header buffer is not statically linked to a specific TCB buffer. In fact the link is dynamic on a per-frame basis. The need for this dynamic linking will be explained in later sections. Suffice to say here that if there is a free header buffer, then somewhere there is also a free TCB SRAM buffer;

9) There were 2 basic implementation options considered here. The first was single-stack and the second was a process model. The process model was chosen here because the custom processor design is providing zero-cost overhead for context switching through the use of a context base register, and because there will be more than enough process slots (or contexts) available for the peak load. It is also expected that all "local" variables will be held permanently in registers whilst an event is being processed;

10) The features that provide this are 256 of the 512 SRAM-based registers that will be used for the register contexts. This can be divided up into 16 contexts (or processes) of 16 registers each. Then 8 of these will be reserved for receive and 8 for transmit. A Little's Law analysis has shown that in order to support 512 byte frames at maximum arrival rate of 4*100 Mbits, requires more than 8 jobs to be in process in the NIC. However each job requires an SRAM buffer for a TCB context and at present, there are only 8 of these currently specified due to SRAM space limits. So more contexts (e.g. 32*8 regs each) do not seem worthwhile. Refer to the section entitled "LOAD CALCULATIONS" for more details of this analysis. A context switch simply involves reloading the context base register based on the context to be restarted, and jumping to the appropriate address for resumption;

11) To better support the process model chosen, the code will lock an active TCB into an SRAM buffer while either sequencer is operating on it. This implies there will be no swapping to and from DRAM of a TCB once it is in SRAM and an operation is started on it. More specifically, the TCB will not be swapped after requesting that a DMA be performed for it. Instead, the system will switch to another active "process". Then it will resume the former process at the point directly after where the DMA was requested. This constitutes a zero-cost switch as mentioned above;

12) Individual TCB state machines will be run from within a "process". There will be a state machine for the receive side and one for the transmit side. The current TCB states will be stored in the SRAM TCB index table entry;

13) The INIC will have 16 MB of DRAM. The current specification calls for dividing a large portion of this into 2K buffers and control allocation/deallocation of these buffers through one of the DRAM fifos mentioned above. These fifos will also be used to control small host buffers, large host buffers, command buffers and command response buffers;

14) For events from one sequencer to the other (i.e. RCV⇌XMT), the current specification calls for using simple SRAM CIO buffers, one for each direction;

15) Each sequencer handles its own timers independently of the others;

16) Contexts will be passed to the INIC through the Transmit command and response buffers. INIC-initiated TCB releases will be handled through the Receive small buffers. Host-initiated releases will use the Command buffers. There needs to be strict handling of the acquisition and release of contexts to avoid windows where for example, a frame is received on a context just after the context was passed to the INIC, but before the INIC has "accepted" it; and 17) T/TCP (Transaction TCP): the initial INIC will not handle T/TCP connections. This is because they are typically used for the HTTP protocol and the client for that protocol typically connects, sends a request and disconnects in one segment. The server sends the connect confirm, reply and disconnect in his first segment. Then the client confirms the disconnect. This is a total of 3 segments for the life of a context. Typical data lengths are on the order of 300 bytes from the client and 3K from the server. The INIC will provide as good an assist as seems necessary here by checksumming the frame and splitting headers and data. The latter is only likely when data is forwarded with a request such as when a filled-in form is sent by the client.

SRAM Requirements.

SRAM requirements for the Receive and Transmit engines are shown in FIG. 38. Depending upon the available space, the number of TCB buffers may be increased to 16.

General Philosophy.

The basic plan is to have the host determine when a TCP connection is able to be handed to the INIC, setup the TCB and pass it to the card via a command in the Transmit queue. TCBs that the INIC owns can be handed back to the host via a request from the Receive or Transmit sequencers or from the host itself at any time.

When the INIC receives a frame, one of its immediate tasks is to determine if the frame is for a TCB that it controls. If not, the frame is passed to the host on a generic interface TCB. On transmit, the transmit request will specify a TCB hash number if the request is on a INIC-controlled TCB. Thus the initial state for the INIC will be transparent mode in which all received frames will be directly passed through and all transmit requests will be simply thrown on the appropriate wire. This state is maintained until the host passes TCBs to the INIC to control. Note that frames received for which the INIC has no TCB (or it is with the host) will still have the TCP checksum verified if TCP/IP, and may split the TCPIP header off into a separate buffer.

Register Usage.

There will be 512 registers available. The first 256 will be used for process contexts. The remaining 256 will be split between the three sequencers as follows: 1) 257-320:64 for RCV general processing/main loop; 2) 321-384:64 for XMT general processing/main loop; and 3) 385-512:128 for three sequencer use.

Receive Processing.

Main Loop.

FIG. 39 is a summary of the main loop of Receive.

Receive Events.

The events that will be processed on a given context are:
1) accept a context;
2) release a context command (from the host via Transmit);
3) release a context request (from Transmit);
4) receive a valid frame; this will actually become 2 events based on the received frame—receive an ACK, receive a segment;
5) receive an "invalid" frame i.e. one that causes the TCB to be flushed to the host;
6) a valid ACK needs to be sent (delayed ACK timer expiry); and
7) There are expected to be the following sources of events: a) Receive input queue: it is expected that hardware will automatically DMA arriving frames into frame buffers and queue an event into a RCV-event queue; b) Timer event queue: expiration of a timer will queue an event into this queue; and c) Transmit sequencer queue: for requests from the transmit processor.

For the sake of brevity the following only discusses receive-frame processing.

Receive Details—Valid Context.

The base for the receive processing done by the INIC on an existing context is the fast-path or "header prediction" code in the FreeBSD release. Thus the processing is divided into three parts: header validation and checksumming, TCP processing and subsequent SMB processing.

Header Validation.

There is considerable hardware assist here. The first step in receive processing is to DMA the frame header into an SRAM header buffer. It is useful for header validation to be implemented in conjunction with this DMA by scanning the data as it flies by. The following tests need to be "passed":
1) MAC header: destination address is our MAC address (not MC or BC too), the Ethertype is IP; 2) IP header: header checksum is valid, header length=5, IP length> header length, protocol=TCP, no fragmentation, destination IP is our IP address; and 3) TCP header: checksum is valid (incl. pseudo-header), header length=5 or 8 (timestamp option), length is valid, dest port=SMB or FTP data, no FIN/SYN/URG/PSH/RST bits set, timestamp option is valid if present, segment is in sequence, the window size did not change, this is not a retransmission, it is a pure ACK or a pure receive segment, and most important, a valid context exists. The valid-context test is non-trivial in the amount of work involved to determine it. Also note that for pure ACKs, the window-size test will be relaxed. This is because initially the output PERSIST state is to be handled on the INIC.

Many but perhaps not all of these tests will be performed in hardware—depending upon the embodiment.

TCP Processing.

Once a frame has passed the header validation tests, processing splits based on whether the frame is a pure ACK or a pure received segment.

Pure RCV Packet.

The design is to split off headers into a small header buffer and pass the aligned data in separate large buffers. Since a frame has been received, eventually some receiver process on the host will need to be informed. In the case of FTP, the frame is pure data and it is passed to the host immediately. This involves getting large buffers and DMAing the data into them, then setting the appropriate details in a small buffer that is used to notify the host. However for SMB, the INIC is performing reassembly of data when the frame consists of headers and data. So there may not yet be a complete SMB to pass to the host. In this case, a small buffer will be acquired and the header moved into it. If the received segment completes an SMB, then the procedures are pretty much as for FTP. If it does not, then the scheme is to at least move the received data (not the headers) to the host to free the INIC buffers and to save latency. The list of in-progress host buffers is maintained in the TCB and moved to the header buffer when the SMB is complete.

The final part of pure-receive processing is to fire off the delayed ACK timer for this segment.

Pure ACk.

Pure ACK processing implies this TCB is the sender, so there may be transmit buffers that can be returned to the host. If so, send an event to the Transmit processor (or do the processing here). If there is more output available, send an event to the transmit processor. Then appropriate actions need to be taken with the retransmission timer.

SMB Processing.

Figure 40:
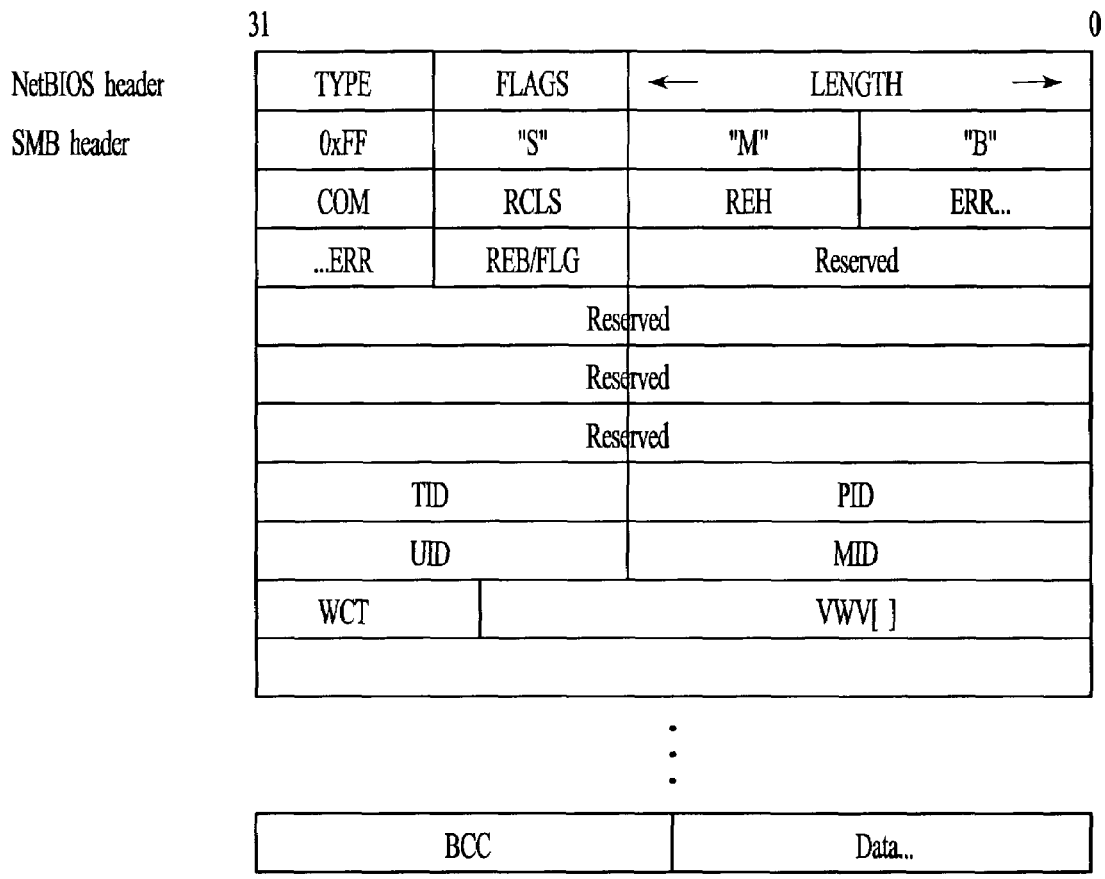

FIG. 40 shows the format of the SMB header of an SMB frame. The LENGTH field of the NetBIOS header will be used to determine when a complete SMB has been received and the header buffer with appropriate details can be posted to the host. The interesting commands are the write commands: SMBwrite (0xB), SMBwriteBraw (0x1D), SMBwriteBmpx (0x1E), SMBwriteBs (0x1F), SMBwriteclose (0x2C), SMBwriteX (0x2F), SMBwriteunlock (0x14). These are interesting because they will have data to be aligned in host memory. The point to note about these commands is that they each have a different WCT field, so that the start offset of the data depends on the command type. SMB processing will thus need to be cognizant of these types.

Receive Details—No Valid Context.

The design here is to provide as much assist as possible. Frames will be checksummed and the TCPIP headers may be split off.

Receive Notes.

1. PRU_RCVD or the equivalent in Microsoft language: the host application has to tell the INIC when he has accepted the received data that has been queued. This is so that the INIC can update the receive window. It is an advantage for this mechanism to be efficient. This may be accomplished by piggybacking these on transmit requests (not necessarily for the same TCB).

2. Keepalive Timer: for a INIC-controlled TCB, the INIC will not maintain this timer. This leaves the host with the job of determining that the TCB is still active.

3. Timestamp option: it is useful to support this option in the fast path because the BSD implementation does. Also, it can be very helpful in getting a much better estimate of the round-trip time (RTT) which TCP needs to use.

4. Idle timer: the INIC will not maintain this timer (see Note 2 above).

5. Frame with no valid context: The INIC may split TCP/IP headers into a separate header buffer.

Transmit Processing.

Main Loop.

FIG. 41 is a summary of the main loop of Transmit.

Transmit Events.

The events that will be processed on a given context and their sources are: 1) accept a context (from the Host); 2) release a context command (from the Host); 3) release a context command (from Receive); 4) valid send request and window>0 (from host or RCV sequencer); 5) valid send request and window=0 (from host or RCV sequencer); 6) send a window update (host has accepted data); 7) persist timer expiration (persist timer); 8) context-release event e.g. window shrank (XMT processing or retransmission timer); and 9) receive-release request ACK (from RCV sequencer).

Transmit Details—Valid Context.

The following is an overview of the transmit flow: The host posts a transmit request to the INIC by filling in a command buffer with appropriate data pointers etc and posting it to the INIC via the Command Buffer Address register. Note that there is one host command buffer queue, but there are four physical transmit lines. So each request needs to include an interface number as well as the context number. The INIC microcode will DMA the command in and place it in one of four internal command queues which the transmit sequencer will work on. This is so that transmit processing can round-robin service these four queues to keep all four interfaces busy, and not let a highly-active interface lock out the others (which would happen with a single queue). The transmit request may be a segment that is less than the MSS, or it may be as much as a full 64K SMB READ. Obviously the former request will go out as one segment, the latter as a number of MSS-sized segments. The transmitting TCB must hold on to the request until all data in it has been transmitted and acked. Appropriate pointers to do this will be kept in the TCB. A large buffer is acquired from the free buffer fifo, and the MAC and TCP/IP headers are created in it. It may be quicker/simpler to keep a basic frame header set up in the TCB and either DMA directly this into the frame each time. Then data is DMA'd from host memory into the frame to create an MSS-sized segment. This DMA also checksums the data. Then the checksum is adjusted for the pseudo-header and placed into the TCP header, and the frame is queued to the MAC transmit interface which may be controlled by the third sequencer. The final step is to update various window fields etc in the TCB. Eventually either the entire request will have been sent and acked, or a retransmission timer will expire in which case the context is flushed to the host. In either case, the INIC will place a command response in the Response queue containing the command buffer handle from the original transmit command and appropriate status.

The above discussion has dealt how an actual transmit occurs. However the real challenge in the transmit processor is to determine whether it is appropriate to transmit at the time a transmit request arrives. There are many reasons not to transmit: the receiver's window size is <=0, the Persist timer has expired, the amount to send is less than a full segment and an ACK is expected/outstanding, the receiver's window is not half-open etc. Much of the transmit processing will be in determining these conditions.

Transmit Details—No Valid Context.

The main difference between this and a context-based transmit is that the queued request here will already have the appropriate MAC and TCP/IP (or whatever) headers in the frame to be output. Also the request is guaranteed not to be greater than MSS-sized in length. So the processing is fairly simple. A large buffer is acquired and the frame is DMAed into it, at which time the checksum is also calculated. If the frame is TCP/IP, the checksum will be appropriately adjusted if necessary (pseudo-header etc) and placed in the TCP header. The frame is then queued to the appropriate MAC transmit interface. Then the command is immediately responded to with appropriate status through the Response queue.

Transmit Notes.

1) Slow-start: the INIC will handle the slow-start algorithm that is now a part of the TCP standard. This obviates waiting until the connection is sending a full-rate before passing it to the INIC.

2) Window Probe vs Window Update—an explanation for posterity. A Window Probe is sent from the sending TCB to the receiving TCB, and it means the sender has the receiver in PERSIST state. Persist state is entered when the receiver advertises a zero window. It is thus the state of the transmitting TCB. In this state, he sends periodic window probes to the receiver in case an ACK from the receiver has been lost. The receiver will return his latest window size in the ACK. A Window Update is sent from the receiving TCB to the sending TCB, usually to tell him that the receiving window has altered. It is mostly triggered by the upper layer when it accepts some data. This probably means the sending TCB is viewing the receiving TCB as being in PERSIST state.

3) Persist state: it is designed to handle Persist state on the INIC. It seems unreasonable to throw a TCB back to the host just because its receiver advertised a zero window. This would normally be a transient situation, and would tend to happen mostly with clients that do not support slow-start. Alternatively, the code can easily be changed to throw the TCB back to the host as soon as a receiver advertises a zero window.

4) MSS-sized frames: the INIC code will expect all transmit requests for which it has no TCB to not be greater than the MSS. If any request is, it will be dropped and an appropriate response status posted.

5) Silly Window avoidance: as a receiver, the INIC will do the right thing here and not advertise small windows—this is easy. However it is necessary to also do things to avoid this as a sender, for the cases where a stupid client does advertise small windows. Without getting into too much detail here, the mechanism requires the INIC code to calculate the largest window advertisement ever advertised by the other end. It is an attempt to guess the size of the other end's receive buffer and assumes the other end never reduces the size of its receive buffer. See Stevens, "TCP/IP Illustrated", Vol. 1, pp. 325-326 (1994).

The Utility Processor.

SUMMARY

The following is a summary of the main functions of the utility sequencer of the microprocessor:

1) Look at the event queues: Even13Type & Event23Type (we assume there will be an event status bit for this—USE_EV13 and USE_EV23) in the events register; these are events from sequencers 1 and 2; they will mainly be XMIT requests from the XMT sequencer. Dequeue request and place the frame on the appropriate interface.

2) RCV-frame support: in the model, RCV is done through VinicReceive() which is registered by the lower-edge driver, and is called at dispatch-level. This routine calls VinicTransferDataComplete() to check if the xfer (possibly DMA) of the frame into host buffers is complete. The latter rtne is also called at dispatch level on a DMA-completion interrupt. It queues complete buffers to the RCV sequencer via the normal queue mechanism.

3) Other processes may also be employed here for supporting the RCV sequencer.

4) Service the following registers (this will probably involve micro-interrupts):
   a) Header Buffer Address register:
   Buffers are 256 bytes long on 256-byte boundaries.
   31-8—physical addr in host of a set of contiguous hddr buffers.
   7-0—number of hddr buffers passed.
   Use contents to add to SmallHType queue.
   b) Data Buffer Handle & Data Buffer Address registers:
   Buffers are 4K long aligned on 4K boundaries.
   Use contents to add to the FreeType queue.
   c) Command Buffer Address register:
   Buffers are multiple of 32 bytes up to 1K long (2**5*32).
   31-5—physical addr in host of cmd buffer.
   4-0—length of cmd in bytes/32 (i.e. multiples of 32 bytes).
   Points to host cmd; get FreeSType buffer and move.
   command into it; queue to Xmit0-Xmit3Type queues.
   d) Response Buffer Address register:
   Buffers are 32 bytes long on 32-byte boundaries.
   31-8—physical addr in host of a set of contiguous resp buffers.
   7-0—number of resp buffers passed.
   Use contents to add to the ResponseType queue.

5) Low buffer threshold support: set approp bits in the ISR when the available-buffers count in the various queues filled by the host falls below a threshold.

Further Operations of the Utility Processor.

The utility processor of the microprocessor housed on the INIC is responsible for setting up and implementing all configuration space and memory mapped operations, and also as described below, for managing the debug interface.

All data transfers, and other INIC initiated transfers will be done via DMA. Configuration space for both the network processor function and the utility processor function will define a single memory space for each. This memory space will define the basic communication structure for the host. In general, writing to one of these memory locations will perform a request for service from the INIC. This is detailed in the memory description for each function. This section defines much of the operation of the Host interface, but should be read in conjunction with the Host Interface Strategy for the Alacritech INIC to fully define the Host/INIC interface.

Two registers, DMA hardware and an interrupt function comprise the INIC interface to the Host through PCI. The interrupt function is implemented via a four bit register (PCI_INT) tied to the PCI interrupt lines. This register is directly accessed by the microprocessor.

THE MICROPROCESSOR uses two registers, the PCI_Data_Reg and the PCI_Address_Reg, to enable the Host to access Configuration Space and the memory space allocated to the INIC. These registers are not available to the Host, but are used by THE MICROPROCESSOR to enable Host reads and writes. The function of these two registers is as follows.

1) PCI_Data_Reg: This register can be both read and written by THE MICROPROCESSOR. On write operations from the host, this register contains the data being sent from the host. On read operations, this register contains the data to be sent to the host.

2) PCI_Address_Reg: This is the control register for memory reads and writes from the host. The structure of the register is shown in FIG. 42. During a write operation from the Host the PCI_Data_Reg contains valid data after Data Valid is set in the PCI_Address_Reg. Both registers are locked until THE MICROPROCESSOR writes the PCI_Data_Reg, which resets Data Valid. All read operations will be direct from SRAM. Memory space based reads will return 00. Configuration space reads will be mapped as shown in FIG. 43.

Configuration Space.

The INIC is implemented as a multi-function device. The first device is the network controller, and the second device is the debug interface. An alternative production embodiment may implement only the network controller function. Both configuration space headers will be the same, except for the differences noted in the following description.

Vendor ID—This field will contain the Alacritech Vendor ID. One field will be used for both functions. The Alacritech Vendor ID is hex 139A.

Device ID—Chosen at Alacritech on a device specific basis. One field will be used for both functions.

Command—Initialized to 00. All bits defined below as not enabled (0) will remain 0. Those that are enabled will be set to 0 or 1 depending on the state of the system. Each function (network and debug) will have its own command field, as shown in FIG. 44.

Status—This is not initialized to zero. Each function will have its own field. The configuration is as shown in FIG. 45.

Revision ID—The revision field will be shared by both functions.

Class Code—This is 02 00 00 for the network controller, and for the debug interface. The field will be shared.

Cache Line Size—This is initialized to zero. Supported sizes are 16, 32, 64 and 128 bytes. This hardware register is replicated in SRAM and supported separately for each function, but THE MICROPROCESSOR will implement the value set in Configuration Space (the network processor).

Latency Timer—This is initialized to zero. The function is supported. This hardware register is replicated in SRAM. Each function is supported separately, but THE MICROPROCESSOR will implement the value set in Configuration Space 1 (the network processor).

Header Type—This is set to 80 for both functions, but will be supported separately.

BIST—Is implemented. In addition to responding to a request to run self test, if test after reset fails, a code will be set in the BIST register. This will be implemented separately for each function.

Base Address Register—A single base address register is implemented for each function. It is 64 bits in length, and the bottom four bits are configured as follows: Bit 0-0, indicates memory base address; Bit 1,2-00, locate base address anywhere in 32 bit memory space; and Bit 3-1, memory is prefetchable.

CardBus CIS Pointer—Not implemented—initialized to 0.

Subsystem Vendor ID—Not implemented—initialized to 0.

Subsystem ID—Not implemented—initialized to 0.

Expansion ROM Base Address—Not implemented—initialized to 0.

Interrupt Line—Implemented—initialized to 0. This is implemented separately for each function.

Interrupt Pin—This is set to 01, corresponding to INTA# for the network controller, and 02, corresponding to INTB# for the debug interface. This is implemented separately for each function.

Min_Gnt—This can be set at a value in the range of 10, to allow reasonably long bursts on the bus. This is implemented separately for each function.

Max_Lat—This can be set to 0 to indicate no particular requirement for frequency of access to PCI. This is implemented separately for each function.

Memory Space.

Because each of the following functions may or may not reside in a single location, and may or may not need to be in SRAM at all, the address for each is really only used as an identifier (label). There is, therefore, no control block anywhere in memory that represents this memory space. When the host writes one of these registers, the utility processor will construct the data required and transfer it. Reads to this memory will generate 00 for data.

Network Processor.

The following four byte registers, beginning at location h00 of the network processor's allocated memory, are defined.

00—Interrupt Status Pointer—Initialized by the host to point to a four byte area where status is stored.

04 Interrupt Status—Returned status from host. Sent after one or more status conditions have been reset. Also an interlock for storing any new status. Once status has been stored at the Interrupt Status Pointer location, no new status will be ORed until the host writes the Interrupt Status Register. New status will be ored with any remaining uncleared status (as defined by the contents of the returned status) and stored again at the Interrupt Status Pointer location. Bits are as follows:

Bit 31—ERR—Error bits are set;
Bit 30—RCV—Receive has occurred;
Bit 29—XMT—Transmit command complete; and
Bit 25—RMISS—Receive drop occurred due to no buffers.

08—Interrupt Mask—Written by the host. Interrupts are masked for each of the bits in the interrupt status when the same bit in the mask register is set. When the Interrupt Mask register is written and as a result a status bit is unmasked, an interrupt is generated. Also, when the Interrupt Status Register is written, enabling new status to be stored, when it is stored if a bit is stored that is not masked by the Interrupt Mask, an interrupt is generated.

0C—Header Buffer Address—Written by host to pass a set of header buffers to the INIC.

10—Data Buffer Handle—First register to be written by the Host to transfer a receive data buffer to the INIC. This data is Host reference data. It is not used by the INIC, it is returned with the data buffer. However, to insure integrity of the buffer, this register must be interlocked with the Data Buffer Address register. Once the Data Buffer Address register has been written, neither register can be written until after the Data Buffer Handle register has been read by THE MICROPROCESSOR.

14—Data Buffer Address—Pointer to the data buffer being sent to the INIC by the Host. Must be interlocked with the Data Buffer Handle register.

18—Command Buffer Address XMT0—Pointer to a set of command buffers sent by the Host. THE MICROPROCESSOR will DMA the buffers to local DRAM found on the FreeSType queue and queue the Command Buffer Address XMT0 with the local address replacing the host Address.

1C—Command Buffer Address SMT1.

20—Command Buffer Address SMT2.

24—Command Buffer Address SMT3.

28—Response Buffer Address—Pointer to a set of response buffers sent by the Host. These will be treated in the same fashion as the Command Buffer Address registers.

Utility Processor.

Ending status will be handled by the utility processor in the same fashion as it is handled by the network processor. At present two ending status conditions are defined B31—command complete, and B30—error. When end status is stored an interrupt is generated.

Two additional registers are defined, Command Pointer and Data Pointer. The Host is responsible for insuring that the Data Pointer is valid and points to sufficient memory before storing a command pointer. Storing a command pointer initiates command decode and execution by the debug processor. The Host must not modify either command or Data Pointer until ending status has been received, at which point a new command may be initiated. Memory space is write only by the Host, reads will receive 00. The format is as follows:

00—Interrupt Status Pointer—Initialized by the host to point to a four byte area where status is stored.

04—Interrupt Status—Returned status from host. Sent after one or more status conditions have been reset. Also an interlock for storing any new status. Once status has been stored at the Interrupt Status Pointer location, no new status will be stored until the host writes the Interrupt Status Register. New status will be ored with any remaining uncleared status (as defined by the contents of the returned status) and stored again at the Interrupt Status Pointer location. Bits are as follows:

Bit 31—CC—Command Complete;

Bit 30—ERR—Error;

Bit29—Transmit Processor Halted;

Bit28—Receive Processor Halted; and

Bit27—Utility Processor Halted.

08—Interrupt Mask—Written by the host. Interrupts are masked for each of the bits in the interrupt status when the same bit in the mask register is set. When the Interrupt Mask register is written and as a result a status bit is unmasked, an interrupt is generated. Also, when the Interrupt Status Register is written, enabling new status to be stored, when it is stored if a bit is stored that is not masked by the Interrupt Mask, an interrupt is generated.

0C—Command Pointer—Points to command to be executed. Storing this pointer initiates command decode and execution.

10—Data Pointer—Points to the data buffer. This is used for both read and write data, determined by the command function.

Debug Interface.

In order to provide a mechanism to debug the microcode running on the microprocessor sequencers, a debug process has been defined which will run on the utility sequencer. This processor will interface with a control program on the host processor over PCI.

PCI Interface.

This interface is defined in the combination of the Utility Processor and the Host Interface Strategy sections, above.

Command Format.

The first byte of the command, the command byte, defines the structure of the remainder of the command.

Command Byte.

The first five bits of the command byte are the command itself. The next bit is used to specify an alternate processor, and the last two bits specify which processors are intended for the command.

Processor Bits.

00—Any Processor;

01—Transmit Processor;

10—Receive Processor; and

11—Utility Processor.

Alternate Processor.

This bit defines which processor should handle debug processing if the utility processor is defined as the processor in debug.

0—Transmit Processor; and

1—Receive Processor.

Single Byte Commands.

00—Halt—This command asynchronously halts the processor.

08—Run—This command starts the processor.

10—Step—This command steps the processor.

Eight Byte Commands.

18—Break

| 0 | 1 | 2-3 | 4-7 |
|---|---|---|---|
| Command | Reserved | Count | Address |

This command sets a stop at the specified address. A count of 1 causes the specified processor to halt the first time it executes the instruction. A count of 2 or more causes the processor to halt after that number of executions. The processor is halted just before executing the instruction. A count of 0 does not halt the processor, but causes a sync signal to be generated. If a second processor is set to the same break address, the count data from the first break request is used, and each time either processor executes the instruction the count is decremented.

20—Reset Break

| 0 | 1-3 | 4-7 |
|---|---|---|
| Command | Reserved | Address |

This command resets a previously set break point at the specified address. Reset break fully resets that address. If multiple processors were set to that break point, all will be reset.

28—Dump

| 0 | 1 | 2-3 | 4-7 |
|---|---|---|---|
| Command | Descriptor | Count | Address |

This command transfers to the host the contents of the descriptor. For descriptors larger than four bytes, a count, in four byte increments is specified. For descriptors utilizing an address the address field is specified.

Descriptor
- 00—Register—This descriptor uses both count and address fields. Both fields are four byte based (a count of 1 transfers four bytes).
- 01—Sram—This descriptor uses both count and address fields. Count is in four byte blocks. Address is in bytes, but if it is not four byte aligned, it is forced to the lower four byte aligned address.
- 02—DRAM—This descriptor uses both count and address fields. Count is in four byte blocks. Address is in bytes, but if it is not four byte aligned, it is forced to the lower four byte aligned address.
- 03—Cstore—This descriptor uses both count and address fields. Count is in four byte blocks. Address is in bytes, but if it is not four byte aligned, it is forced to the lower four byte aligned address.

Stand-alone descriptors: The following descriptors do not use either the count or address fields. They transfer the contents of the referenced register.
- 04—CPU_STATUS;
- 05—PC;
- 06—ADDR_REGA;
- 07—ADDR_REGB;
- 08—RAM_BASE;
- 09—FILE_BASE;
- 0A—INSTR_REG_L;
- 0B—INSTR_REG_H;
- 0C—MAC_DATA;
- 0D—DMA_EVENT;
- 0E—MISC_EVENT;
- 0F—Q_IN_RDY;
- 10—Q_OUT_RDY;
- 11—LOCK STATUS;
- 12—STACK—This returns 12 bytes; and
- 13—SENSE_REG.

This register contains four bytes of data. If error status is posted for a command, if the next command that is issued reads this register, a code describing the error in more detail may be obtained. If any command other than a dump of this register is issued after error status, sense information will be reset.

30—Load

| 0 | 1 | 2-3 | 4-7 |
|---|---|---|---|
| Command | Descriptor | Count | Address |

This command transfers from the host the contents of the descriptor. For descriptors larger than four bytes, a count, in four byte increments is specified. For descriptors utilizing an address the address field is specified.

Descriptor
- 00—Register—This descriptor uses both count and address fields. Both fields are four byte based.
- 01—Sram—This descriptor uses both count and address fields. Count is in four byte blocks. Address is in bytes, but if it is not four byte aligned, it is forced to the lower four byte aligned address.
- 02—DRAM—This descriptor uses both count and address fields. Count is in four byte blocks. Address is in bytes, but if it is not four byte aligned, it is forced to the lower four byte aligned address.
- 03—Cstore—This descriptor uses both count and address fields. Count is in four byte blocks. Address is in bytes, but if it is not four byte aligned, it is forced to the lower four byte aligned address. This applies to WCS only.

Stand-alone descriptors: The following descriptors do not use either the count or address fields. They transfer the contents of the referenced register.
- 04—ADDR_REGA;
- 05—ADDR_REGB;
- 06—RAM_BASE;
- 07—FILE_BASE;
- 08—MAC_DATA;
- 09—Q_IN_RDY;
- 0A—Q_OUT_RDY;
- 0B—DBG_ADDR; and
- 38—MAP.

This command allows an instruction in ROM to be replaced by an instruction in WCS. The new instruction will be located in the Host buffer. It will be stored in the first eight bytes of the buffer, with the high bits unused. To reset a mapped out instruction, map it to location 00.

| 0 | 1-3 | 4-7 |
|---|---|---|
| Command | Address to Map To | Address to Map Out |

Hardware Specification.

Features:
1) Peripheral Component Interconnect (PCI) Interface.
   a) Universal PCI interface supports both 5.0V and 3.3V signaling environments;
   b) Supports both 32-bit and 64 bit PCI interface;
   c) Supports PCI clock frequencies from 15 MHz to 66 MHz;
   d) High performance bus mastering architecture;
   e) Host memory based communications reduce register accesses;
   f) Host memory based interrupt status word reduces register reads;
   g) Plug and Play compatible;
   h) PCI specification revision 2.1 compliant;
   i) PCI bursts up to 512 bytes;
   j) Supports cache line operations up to 128 bytes;
   k) Both big-endian and little-endian byte alignments supported; and
   l) Supports Expansion ROM.
2) NETWORK INTERFACE.
   a) Four internal 802.3 and ethernet compliant Macs;
   b) Media Independent Interface (MII) supports external PHYs;
   c) 10BASE-T, 100BASE-TX/FX and 100BASE-T4 supported;
   d) Full and half-duplex modes supported;

e) Automatic PHY status polling notifies system of status change;
f) Provides SNMP statistics counters;
g) Supports broadcast and multicast packets;
h) Provides promiscuous mode for network monitoring or multiple unicast address detection;
i) Supports "huge packets" up to 32 KB;
j) Mac-layer loop-back test mode; and
k) Supports auto-negotiating Phys.

3) MEMORY INTERFACE.
   a) External DRAM buffering of transmit and receive packets;
   b) Buffering configurable as 4 MB, 8 MB, 16 MB or 32 MB;
   c) 32-bit interface supports throughput of 224 MB/s;
   d) Supports external FLASH ROM up to 4 MB, for diskless boot applications; and
   e) Supports external serial EEPROM for custom configuration and Mac addresses.

4) PROTOCOL PROCESSOR.
   a) High speed, custom, 32-bit processor executes 66 million instructions per second;
   b) Processes IP, TCP and NETBIOS protocols;
   c) Supports up to 256 resident TCP/IP contexts; and
   d) Writable control store (WCS) allows field updates for feature enhancements.

5) POWER.
   a) 3.3V chip operation; and
   b) PCI controlled 5.0V/3.3V I/O cell operation.

6) PACKAGING.
   a) 272-pin plastic ball grid array;
   b) 91 PCI signals;
   c) 68 MII signals;
   d) 58 external memory signals;
   e) 1 clock signal;
   f) 54 signals split between power and ground; and
   g) 272 total pins.

General Description.

Figure 46:
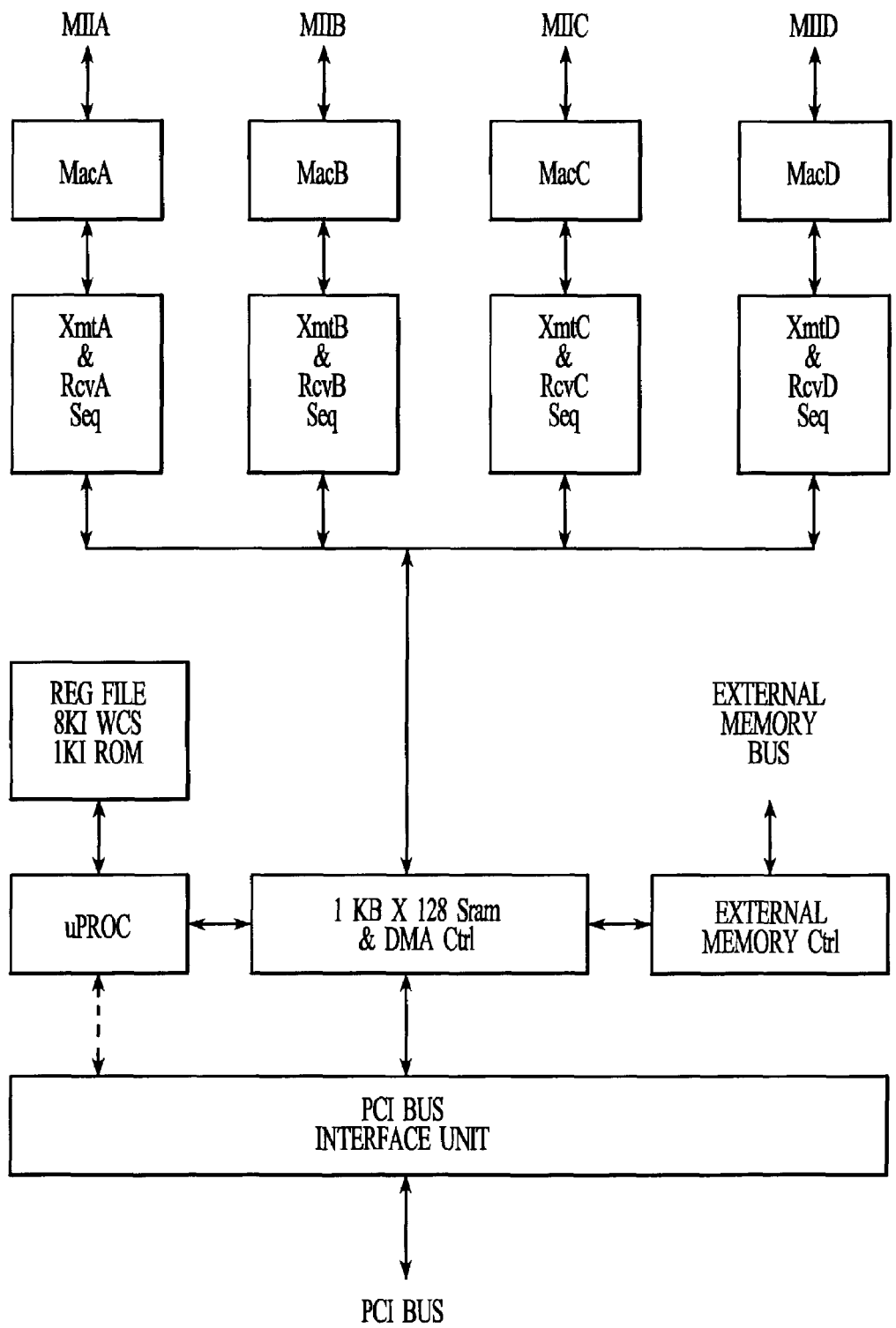

The microprocessor (see FIG. 46) is a 32-bit, full-duplex, four channel, 10/100-Megabit per second (Mbps), Intelligent Network Interface Controller (INIC), designed to provide high-speed protocol processing for server applications. It combines the functions of a standard network interface controller and a protocol processor within a single chip. Although designed specifically for server applications, the microprocessor can be used by PCs, workstations and routers or anywhere that TCP/IP protocols are being utilized.

When combined with four 802.3/MII compliant Phys and Synchronous DRAM (SDRAM), the INIC comprises four complete ethernet nodes. It contains four 802.3/ethernet compliant Macs, a PCI Bus Interface Unit (BIU), a memory controller, transmit fifos, receive fifos and a custom TCP/IP/NETBIOS protocol processor. The INIC supports 10Base-T, 100Base-TX, 100Base-FX and 100Base-T4 via the MII interface attachment of appropriate Phys.

The INIC Macs provide statistical information that may be used for SNMP. The Macs operate in promiscuous mode allowing the INIC to function as a network monitor, receive broadcast and multicast packets and implement multiple Mac addresses for each node.

Any 802.3/MII compliant PHY can be utilized, allowing the INIC to support 10BASE-T, 10BASE-T2, 100BASE-TX, 100Base-FX and 100BASE-T4 as well as future interface standards. PHY identification and initialization is accomplished through host driver initialization routines. PHY status registers can be polled continuously by the INIC and detected PHY status changes reported to the host driver. The Mac can be configured to support a maximum frame size of 1518 bytes or 32768 bytes.

The 64-bit, multiplexed BIU provides a direct interface to the PCI bus for both slave and master functions. The INIC is capable of operating in either a 64-bit or 32-bit PCI environment, while supporting 64-bit addressing in either configuration. PCI bus frequencies up to 66 MHz are supported yielding instantaneous bus transfer rates of 533 MB/s. Both 5.0V and 3.3V signaling environments can be utilized by the INIC. Configurable cache-line size up to 256B will accommodate future architectures, and Expansion ROM/Flash support allows for diskless system booting. Non-PC applications are supported via programmable big and little endian modes. Host based communication has been utilized to provide the best system performance possible.

The INIC supports Plug-N-Play auto-configuration through the PCI configuration space. External pull-up and pull-down resistors, on the memory I/O pins, allow selection of various features during chip reset. Support of an external eeprom allows for local storage of configuration information such as Mac addresses.

External SDRAM provides frame buffering, which is configurable as 4 MB, 8 MB, 16 MB or 32 MB using the appropriate SIMMs. Use of −10 speed grades yields an external buffer bandwidth of 224 MB/s. The buffer provides temporary storage of both incoming and outgoing frames. The protocol processor accesses the frames within the buffer in order to implement TCP/IP and NETBIOS. Incoming frames are processed, assembled then transferred to host memory under the control of the protocol processor. For transmit, data is moved from host memory to buffers where various headers are created before being transmitted out via the Mac.

1) CORES/CELLS.
   a) LSI Logic Ethernet-110 Core, 100Base and 10Base Mac with MII interface;
   b) LSI Logic single port SRAM, triple port SRAM and ROM available;
   c) LSI Logic PCI 66 MHz, 5V compatible I/O cell; and
   d) LSI Logic PLL.

2) DIE SIZE/PIN COUNT.
   LSI Logic G10 process. FIG. 47 shows the area on the die of each module.

3) DATAPATH BANDWIDTH (See FIG. 48).

4) CPU BANDWIDTH (See FIG. 49).

5) PERFORMANCE FEATURES.
   a) 512 registers improve performance through reduced scratch ram accesses and reduced instructions;
   b) Register windowing eliminates context-switching overhead;
   c) Separate instruction and data paths eliminate memory contention;
   d) Totally resident control store eliminates stalling during instruction fetch;
   e) Multiple logical processors eliminate context switching and improve real-time response;
   f) Pipelined architecture increases operating frequency;
   g) Shared register and scratch ram improve inter-processor communication;
   h) Fly-by state-Machine assists address compare and checksum calculation;
   i) TCP/IP-context caching reduces latency;
   j) Hardware implemented queues reduce CPU overhead and latency;

k) Horizontal microcode greatly improves instruction efficiency;

l) Automatic frame DMA and status between Mac and DRAM buffer; and m) Deterministic architecture coupled with context switching eliminates processor stalls.

Processor.

The processor is a convenient means to provide a programmable state-machine which is capable of processing incoming frames, processing host commands, directing network traffic and directing PCI bus traffic. Three processors are implemented using shared hardware in a three-level pipelined architecture which launches and completes a single instruction for every clock cycle. The instructions are executed in three distinct phases corresponding to each of the pipeline stages where each phase is responsible for a different function.

The first instruction phase writes the instruction results of the last instruction to the destination operand, modifies the program counter (Pc), selects the address source for the instruction to fetch, then fetches the instruction from the control store. The fetched instruction is then stored in the instruction register at the end of the clock cycle.

The processor instructions reside in the on-chip control-store, which is implemented as a mixture of ROM and SRAM. The ROM contains 1 K instructions starting at address 0x0000 and aliases each 0x0400 locations throughout the first 0x8000 of instruction space. The SRAM (WCS) will hold up to 0x2000 instructions starting at address 0x8000 and aliasing each 0x2000 locations throughout the last 0x8000 of instruction space. The ROM and SRAM are both 49-bits wide accounting for bits [48:0] of the instruction microword. A separate mapping ram provides bits [55:49] of the microword (MapAddr) to allow replacement of faulty ROM based instructions. The mapping ram has a configuration of 128×7 which is insufficient to allow a separate map address for each of the 1 K ROM locations. To allow re-mapping of the entire 1K ROM space, the map ram address lines are connected to the address bits Fetch[9:3]. The result is that the ROM is re-mapped in blocks of 8 contiguous locations.

The second instruction phase decodes the instruction which was stored in the instruction register. It is at this point that the map address is checked for a non-zero value which will cause the decoder to force a Jmp instruction to the map address. If a non-zero value is detected then the decoder selects the source operands for the Alu operation based on the values of the OpdASel, OpdBSel and AluOp fields. These operands are then stored in the decode register at the end of the clock cycle. Operands may originate from File, SRAM, or flip-flop based registers. The second instruction phase is also where the results of the previous instruction are written to the SRAM.

The third instruction phase is when the actual Alu operation is performed, the test condition is selected and the Stack push and pop are implemented. Results of the Alu operation are stored in the results register at the end of the clock cycle.

Figure 50:
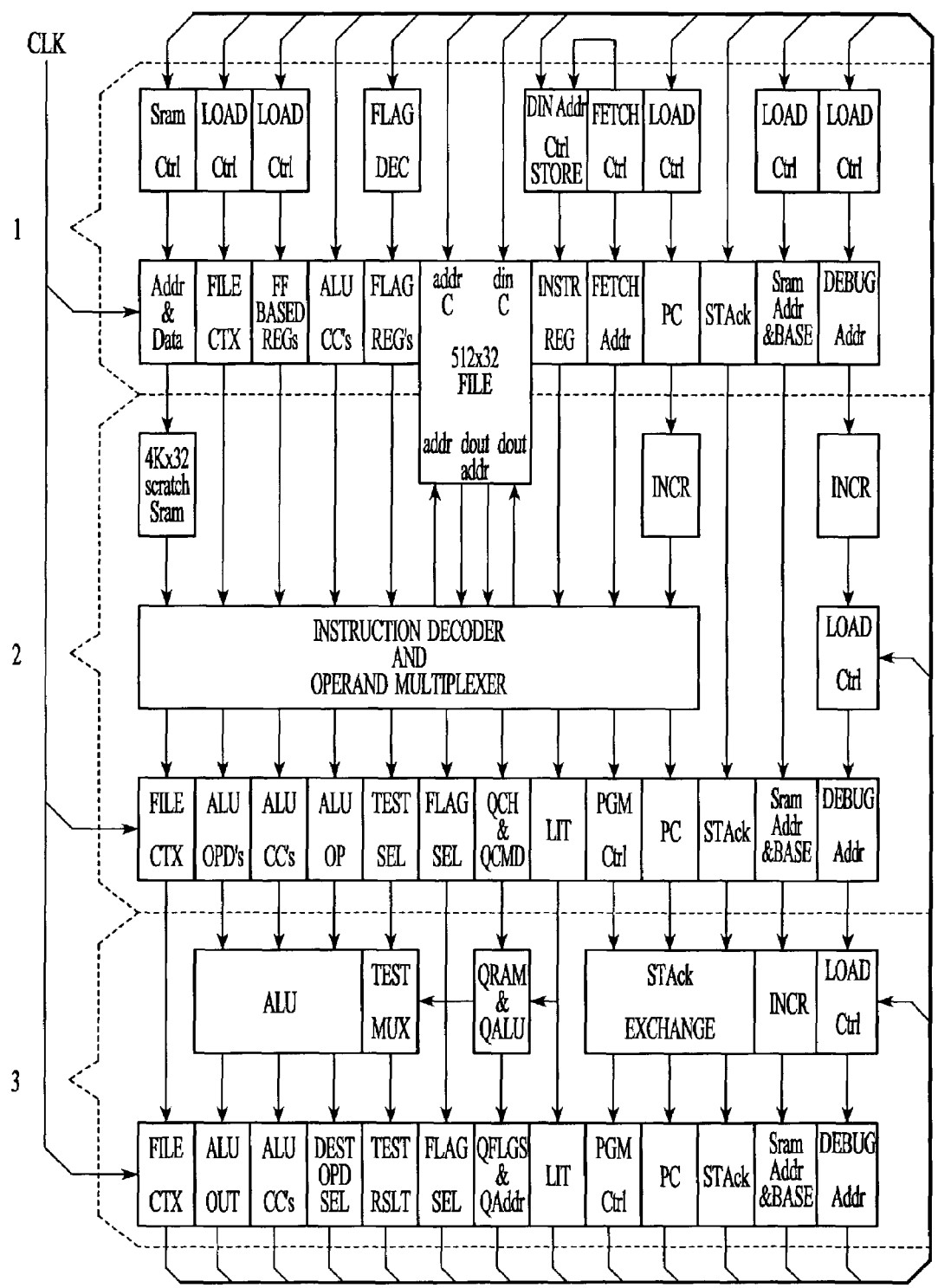

FIG. 50 is a block diagram of the CPU. FIG. 50 shows the hardware functions associated with each of the instruction phases. Note that various functions have been distributed across the three phases of the instruction execution in order to minimize the combinatorial delays within any given phase.

Instruction Set.

The micro-instructions are divided into six types according to the program control directive. The micro-instruction is further divided into sub-fields for which the definitions are dependent upon the instruction type. The six instruction types are listed in FIG. 51.

All instructions (see FIG. 51) include the Alu operation (AluOp), operand "A" select (OpdASel), operand "B" select (OpdBSel) and Literal fields. Other field usage depends upon the instruction type.

The "jump condition code" (Jcc) instruction causes the program counter to be altered if the condition selected by the "test select" (TstSel) field is asserted. The new program counter (Pc) value is loaded from either the Literal field or the AluOut as described in the following section and the Literal field may be used as a source for the Alu or the ram address if the new Pc value is sourced by the Alu.

The "jump" (Jmp) instruction causes the program counter to be altered unconditionally. The new program counter (Pc) value is loaded from either the Literal field or the AluOut as described in the following section. The format allows instruction bits 23:16 to be used to perform a flag operation and the Literal field may be used as a source for the Alu or the ram address if the new Pc value is sourced by the Alu.

The "jump subroutine" (Jsr) instruction causes the program counter to be altered unconditionally. The new program counter (Pc) value is loaded from either the Literal field or the AluOut as described in the following section. The old program counter value is stored on the top location of the Pc-Stack which is implemented as a LIFO memory. The format allows instruction bits 23:16 to be used to perform a flag operation and the Literal field may be used as a source for the Alu or the ram address if the new Pc value is sourced by the Alu.

The "Nxt" (Nxt) instruction causes the program counter to increment. The format allows instruction bits 23:16 to be used to perform a flag operation and the Literal field may be used as a source for the Alu or the ram address.

The "return from subroutine" (Rts) instruction is a special form of the Nxt instruction in which the "flag operation" (FlgSel) field is set to a value of 0hff. The current Pc value is replaced with the last value stored in the stack. The Literal field may be used as a source for the Alu or the ram address.

The Map instruction is provided to allow replacement of instructions which have been stored in ROM and is implemented any time the "map enable" (MapEn) bit has been set and the content of the "map address" (MapAddr) field is non-zero. The instruction decoder forces a jump instruction with the Alu operation and destination fields set to pass the MapAddr field to the program control block.

The program control is determined by a combination of PgmCtrl, DstOpd, FlgSel and TstSel. The behavior of the program control is defined with the "C-like" description in FIG. 52. FIGS. 53-61 show ALU operations, selected operands, selected tests, and flag operations.

SRAM Control Sequencer (SramCtrl).

SRAM is the nexus for data movement within the INIC. A hierarchy of sequencers, working in concert, accomplish the movement of data between DRAM, SRAM, CPU, ethernet and the Pci bus. Slave sequencers, provided with stimulus from master sequencers, request data movement operations by way of the SRAM, Pci bus, DRAM and Flash. The slave sequencers prioritize, service and acknowledge the requests.

Figure 62:
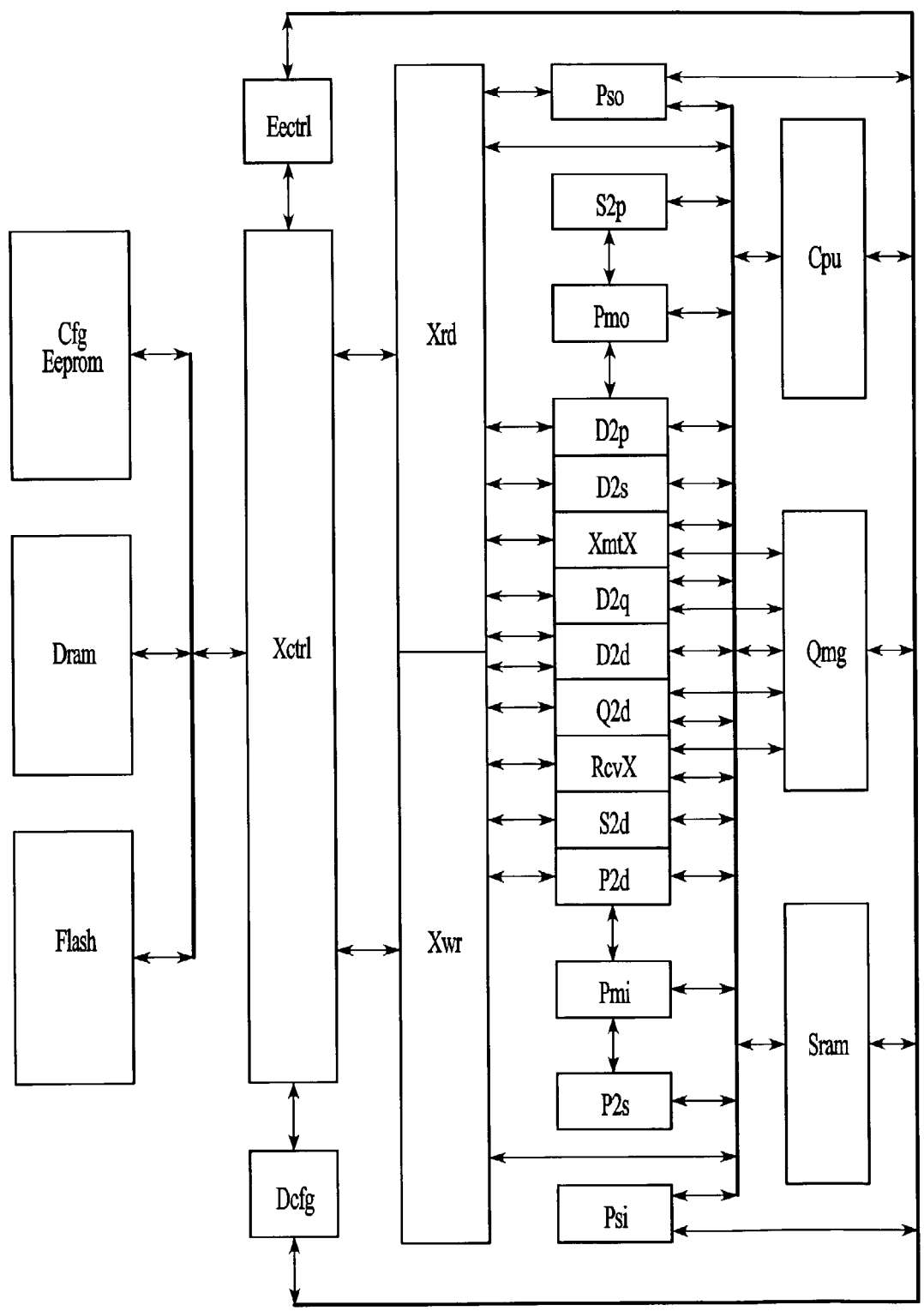

The data flow block diagram of FIG. 62 shows all of the master and slave sequencers of the INIC product. Request information such as r/w, address, size, endian and alignment are represented by each request line. Acknowledge information to master sequencers include only the size of the transfer being acknowledged.

Figure 63:
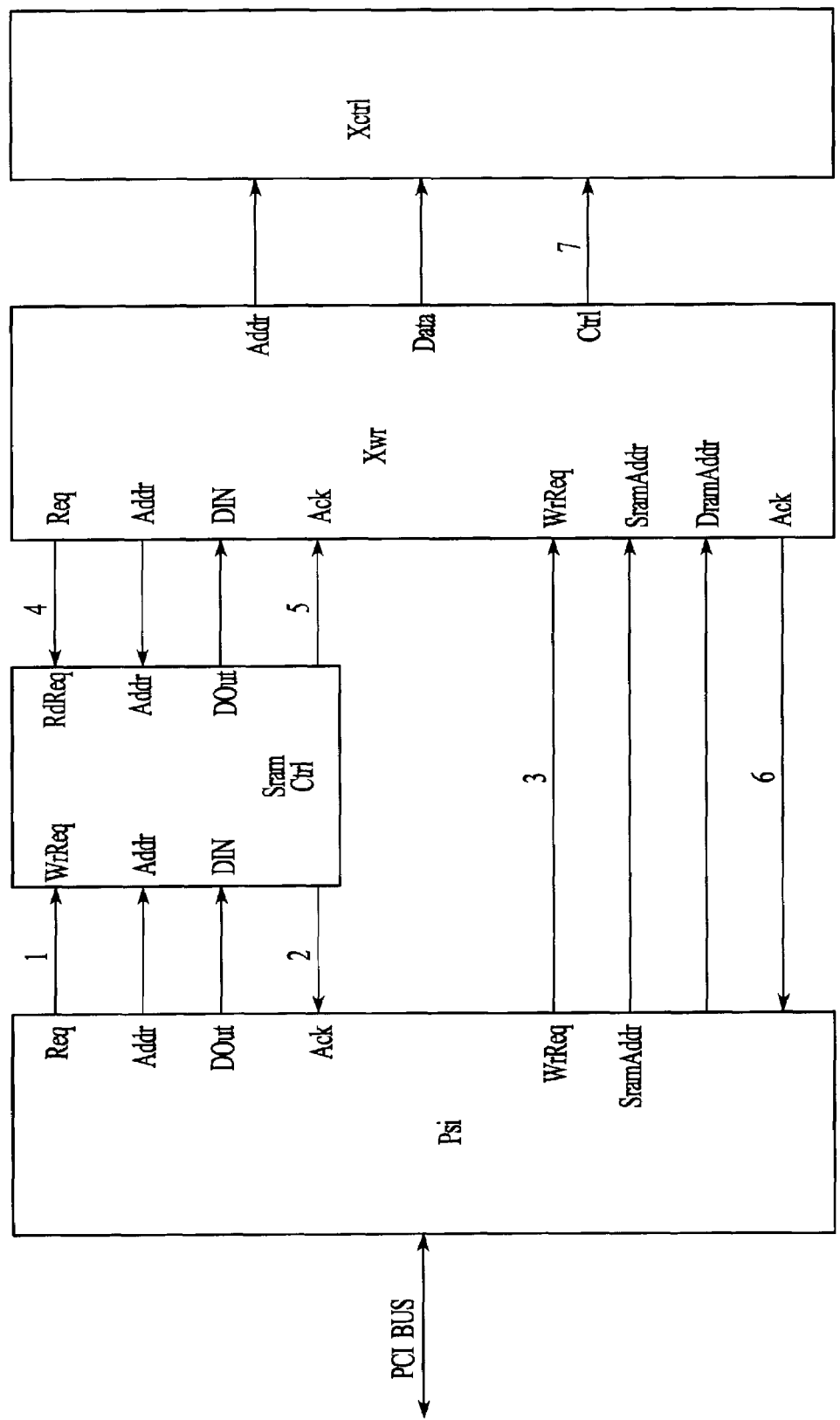

The block diagram of FIG. 63 illustrates how data movement is accomplished for a Pci slave write to DRAM. Note that the Psi (Pci slave in) module functions as both a master sequencer. Psi sends a write request to the SramCtrl module. Psi requests Xwr to move data from SRAM to DRAM. Xwr subsequently sends a read request to the SramCtrl module then writes the data to the DRAM via the Xctrl module. As each piece of data is moved from the SRAM to Xwr, Xwr sends an acknowledge to the Psi module.

The SRAM control sequencer services requests to store to, or retrieve data from an SRAM organized as 1024 locations by 128 bits (16 KB). The sequencer operates at a frequency of 133 MHz, allowing both a CPU access and a DMA access to occur during a standard 66 MHz CPU cycle. One 133 MHz cycle is reserved for CPU accesses during each 66 MHz cycle while the remaining 133 MHz cycle is reserved for DMA accesses on a prioritized basis.

Figure 64:
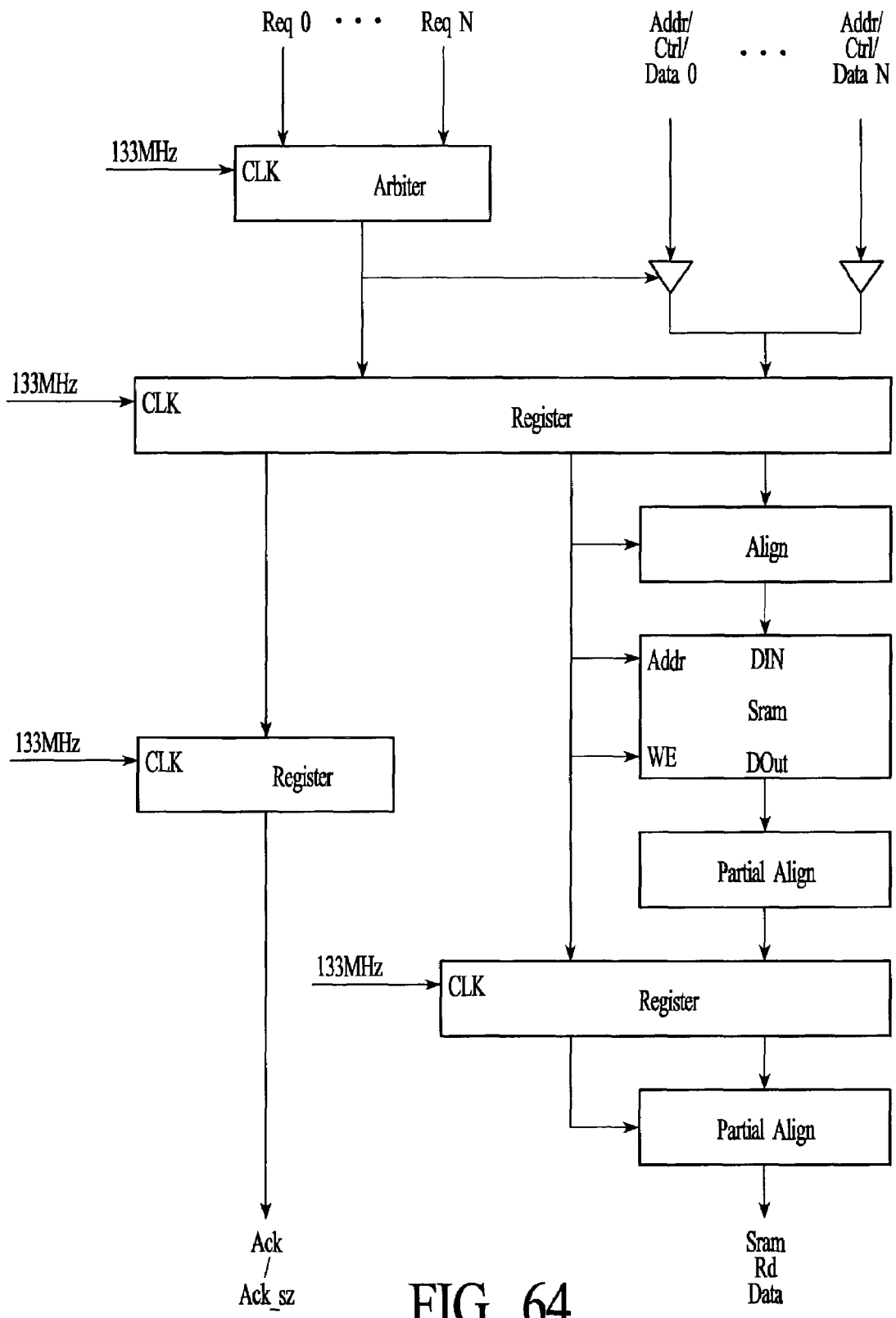

The block diagram of FIG. 64 shows the major functions of the SRAM control sequencer. A slave sequencer begins by asserting a request along with r/w, ram address, endian, data path size, data path alignment and request size. SramCtrl prioritizes the requests. The request parameters are then selected by a multiplexer which feeds the parameters to the SRAM via a register. The requester provides the SRAM address which when coupled with the other parameters controls the input and output alignment. SRAM outputs are fed to the output aligner via a register. Requests are acknowledged in parallel with the returned data.

Figure 65:
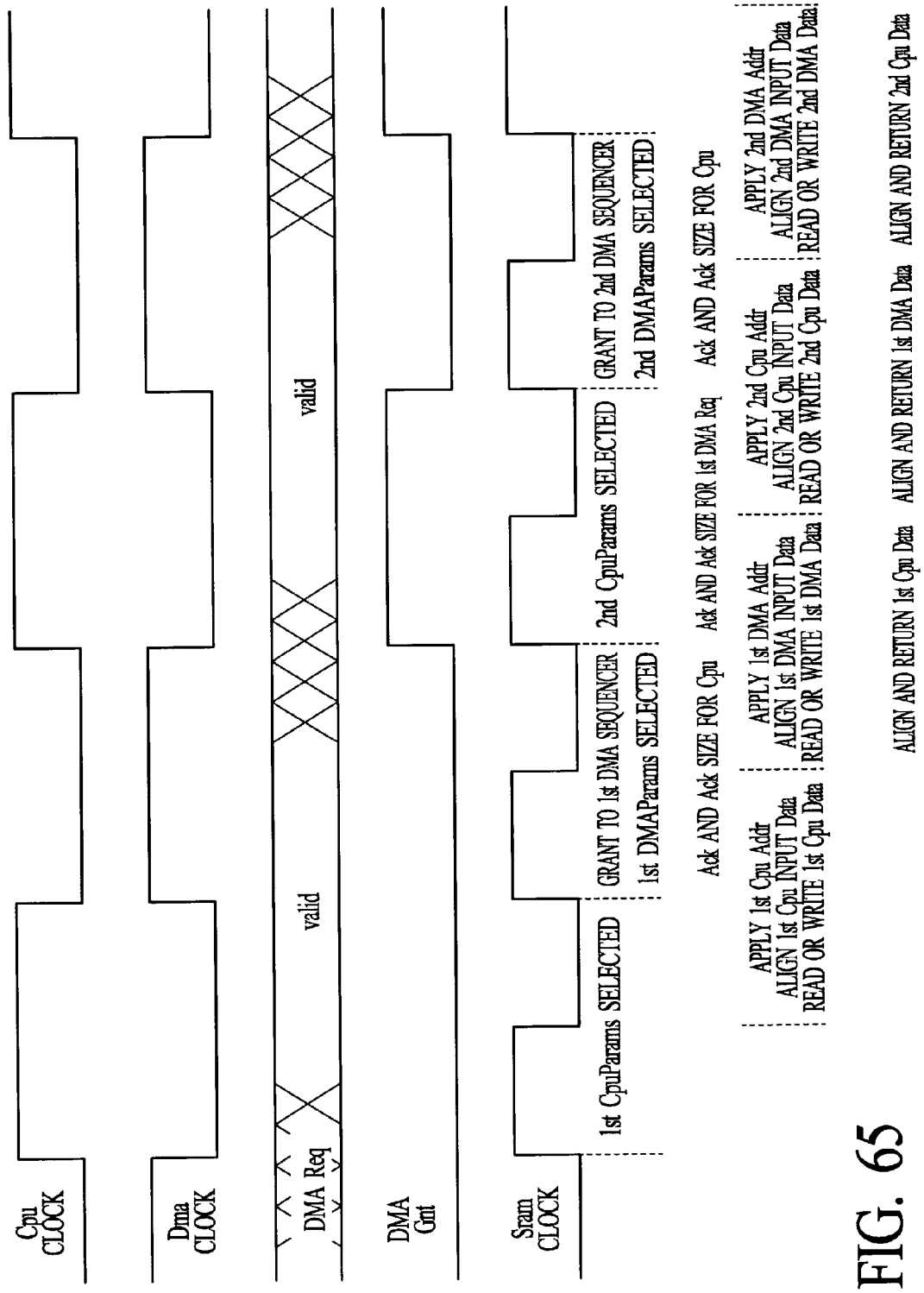

FIG. 65 is a timing diagram depicting two ram accesses during a single 66 MHz clock cycle.

External Memory Control (Xctrl).

Figure 66:
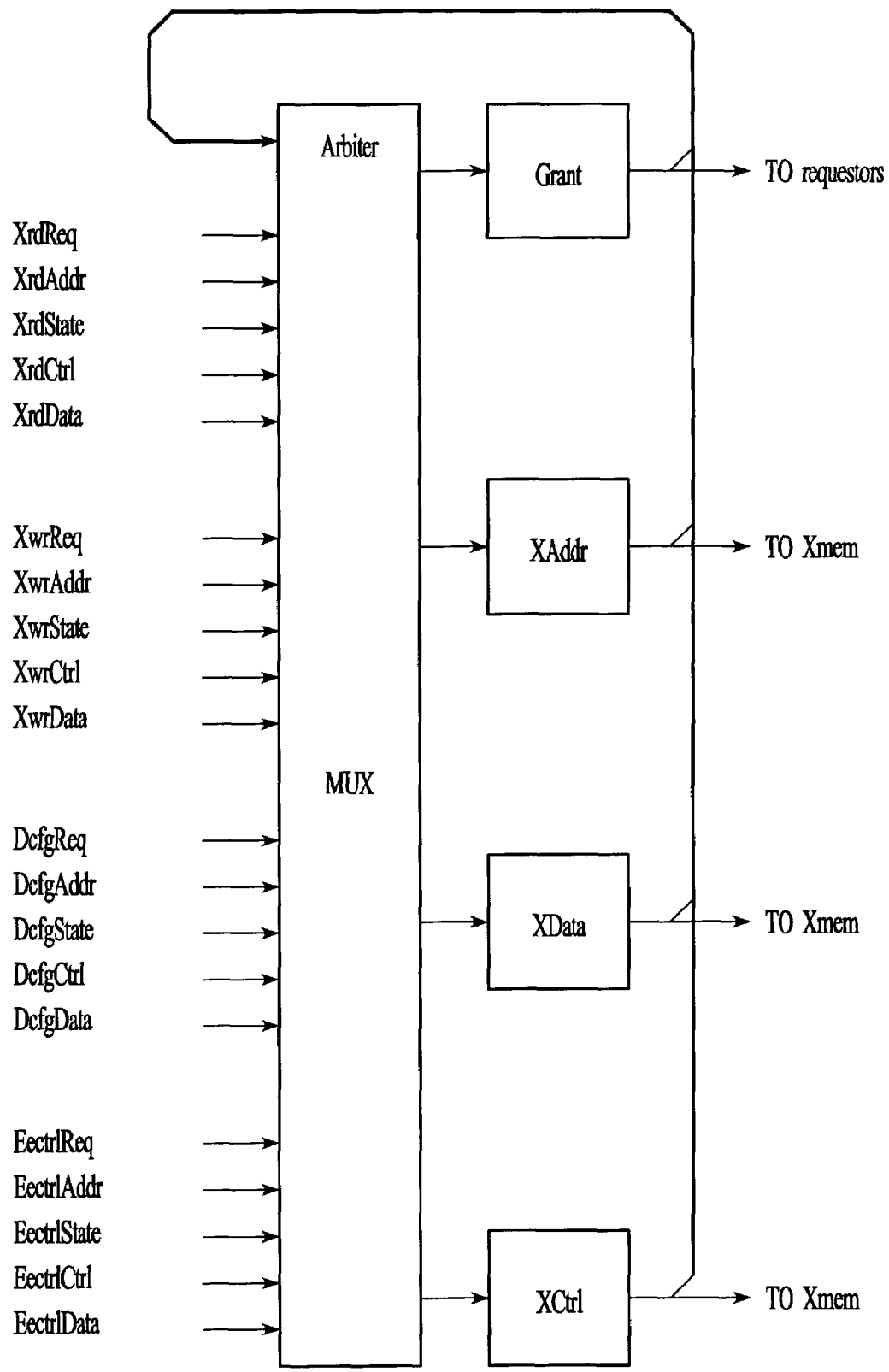

Xctrl (See FIG. 66) provides the facility whereby Xwr, Xrd, Dcfg and Eectrl access external Flash and DRAM. Xctrl includes an arbiter, i/o registers, data multiplexers, address multiplexers and control multiplexers. Ownership of the external memory interace is requested by each block and granted to each of the requesters by the arbiter function. Once ownership has been granted the multiplexers select the address, data and control signals from owner, allowing access to external memory.

External Memory Read Sequencer (Xrd).

The Xrd sequencer acts only as a slave sequencer. Servicing requests issued by master sequencers, the Xrd sequencer moves data from external SDRAM or flash to the SRAM, via the Xctrl module, in blocks of 32 bytes or less. The nature of the SDRAM requires fixed burst sizes for each of it's internal banks with ras precharge intervals between each access. By selecting a burst size of 32 bytes for SDRAM reads and interleaving bank accesses on a 16 byte boundary, we can ensure that the ras precharge interval for the first bank is satisfied before burst completion for the second bank, allowing us to re-instruct the first bank and continue with uninterrupted DRAM access. SDRAMs require a consistent burst size be utilized each and every time the SDRAM is accessed. For this reason, if an SDRAM access does not begin or end on a 32 byte boundary, SDRAM bandwidth will be reduced due to less than 32 bytes of data being transferred during the burst cycle.

Figure 67:
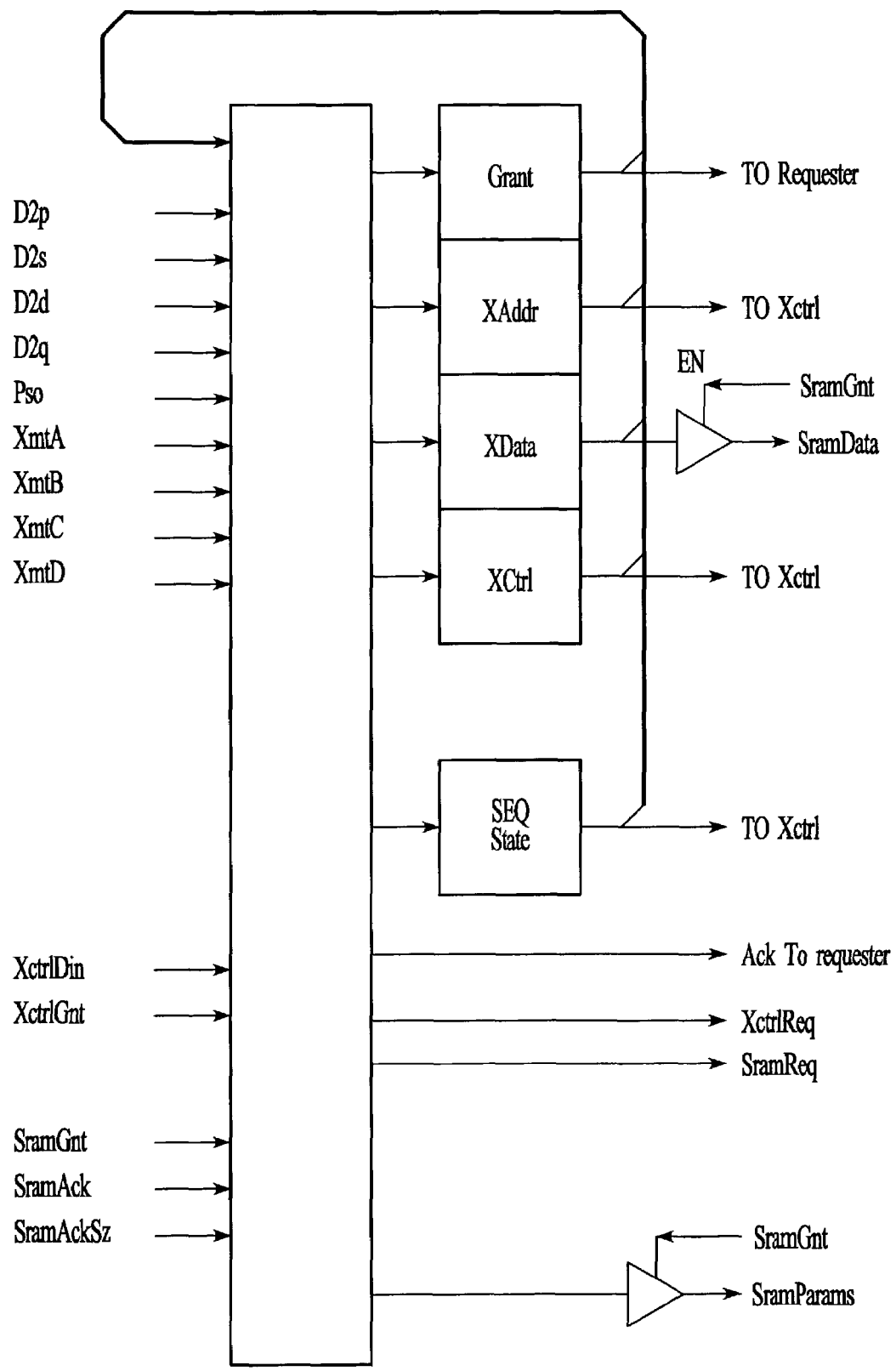

FIG. 67 depicts the major functional blocks of the Xrd external memory read sequencer. The first step in servicing a request to move data from SDRAM to SRAM is the prioritization of the master sequencer requests. Next the Xrd sequencer takes a snapshot of the DRAM read address and applies configuration information to determine the correct bank, row and column address to apply. Once sufficient data has been read, the Xrd sequencer issues a write request to the SramCtrl sequencer which in turn sends an acknowledge to the Xrd sequencer. The Xrd sequencer passes the acknowledge along to the level two master with a size code indicating how much data was written during the SRAM cycle allowing the update of pointers and counters. The DRAM read and SRAM write cycles repeat until the original burst request has been completed at which point the Xrd sequencer prioritizes any remaining requests in preparation for the next burst cycle.

Contiguous DRAM burst cycles are not guaranteed to the Xrd sequencer as an algorithm is implemented which ensures highest priority to refresh cycles followed by flash accesses, DRAM writes then DRAM reads.

Figure 68:
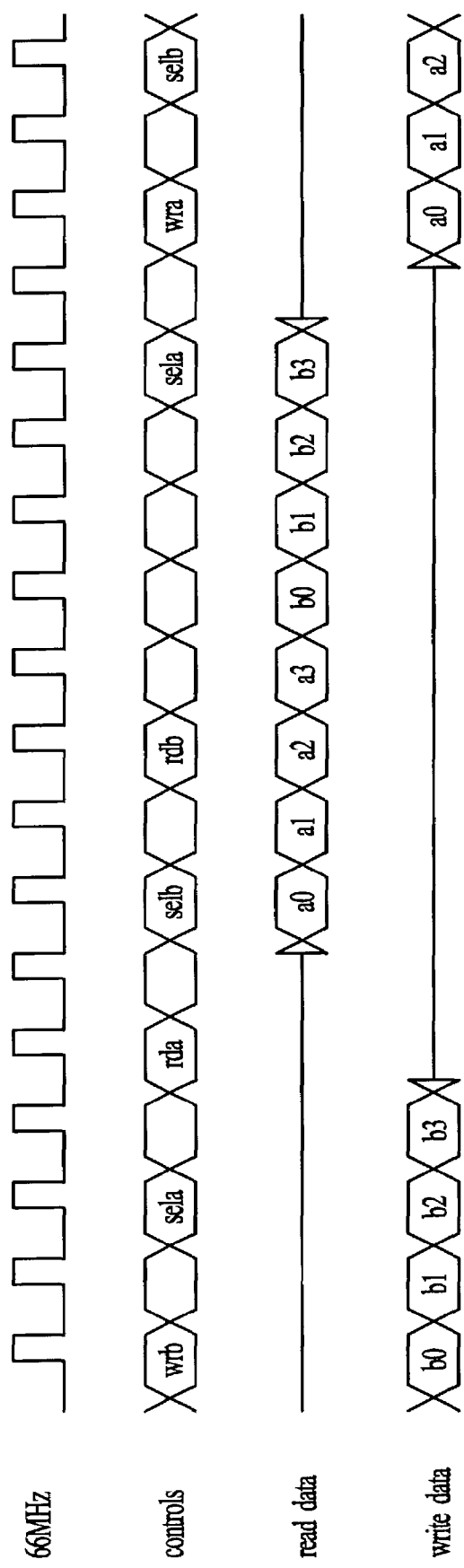

FIG. 68 is a timing diagram illustrating how data is read from SDRAM. The DRAM has been configured for a burst of four with a latency of two clock cycles. Bank A is first selected/activated followed by a read command two clock cycles later. The bank select/activate for bank B is next issued as read data begins returning two clocks after the read command was issued to bank A. Two clock cycles before we need to receive data from bank B we issue the read command. Once all 16 bytes have been received from bank A we begin receiving data from bank B.

External Memory Write Sequencer (Xwr).

The Xwr sequencer is a slave sequencer. Servicing requests issued by master sequencers, the Xwr sequencer moves data from SRAM to the external SDRAM or flash, via the Xctrl module, in blocks of 32 bytes or less while accumulating a checksum of the data moved. The nature of the SDRAM requires fixed burst sizes for each of it's internal banks with ras precharge intervals between each access. By selecting a burst size of 32 bytes for SDRAM writes and interleaving bank accesses on a 16 byte boundary, we can ensure that the ras precharge interval for the first bank is satisfied before burst completion for the second bank, allowing us to re-instruct the first bank and continue with uninterrupted DRAM access. SDRAMs require a consistent burst size be utilized each and every time the SDRAM is accessed. For this reason, if an SDRAM access does not begin or end on a 32 byte boundary, SDRAM bandwidth will be reduced due to less than 32 bytes of data being transferred during the burst cycle.

Figure 69:
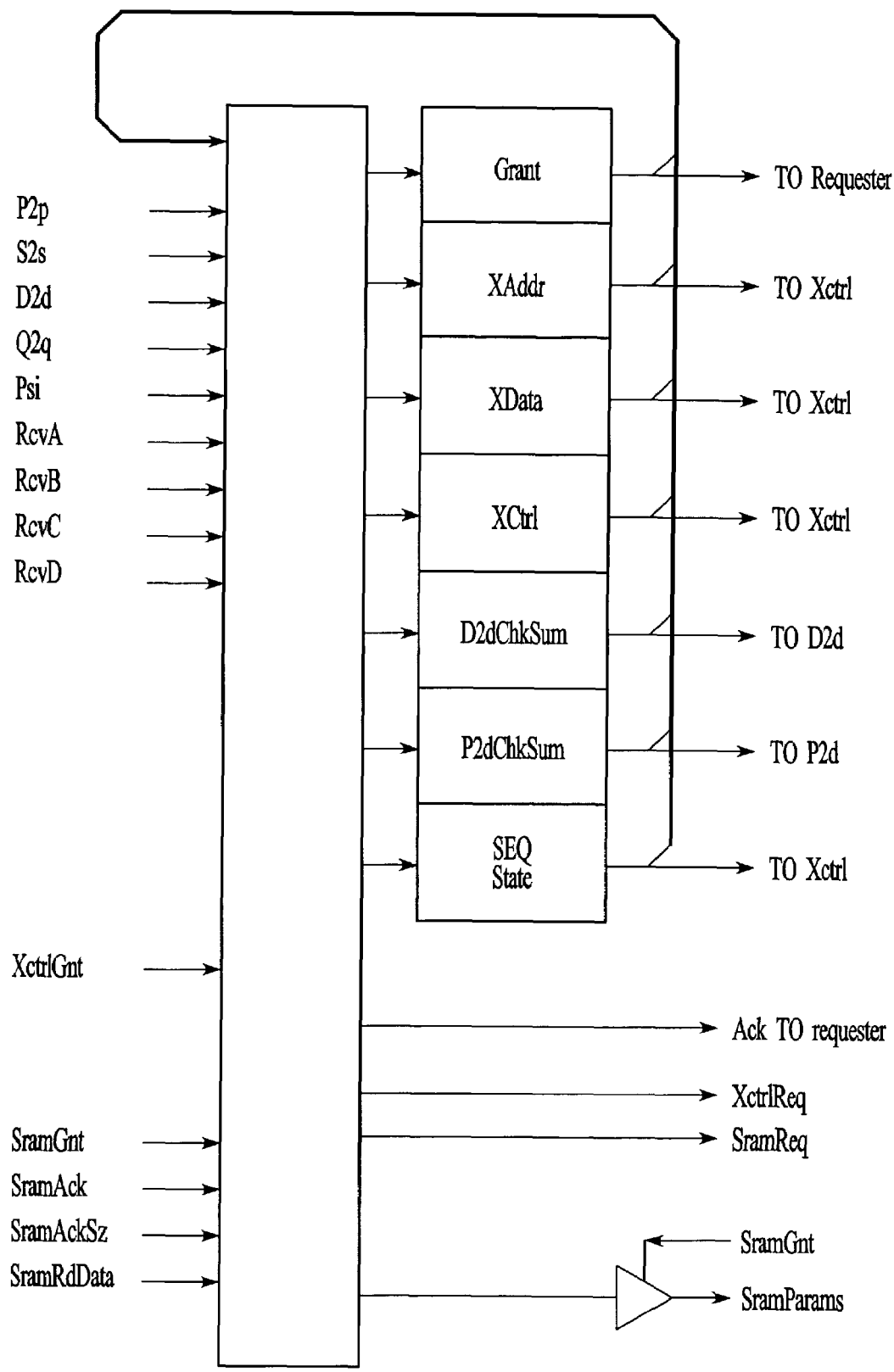

FIG. 69 depicts the major functional blocks of the Xwr sequencer. The first step in servicing a request to move data from SRAM to SDRAM is the prioritization of the level two master requests. Next the Xwr sequencer takes a Snapshot of the DRAM write address and applies configuration information to determine the correct DRAM, bank, row and column address to apply. The Xwr sequencer immediately issues a read command to the SRAM to which the SRAM responds with both data and an acknowledge. The Xwr sequencer passes the acknowledge to the level two master along with a size code indicating how much data was read during the SRAM cycle allowing the update of pointers and counters. Once sufficient data has been read from SRAM, the Xwr sequencer issues a write command to the DRAM starting the burst cycle and computing a checksum as the data flys by. The SRAM read cycle repeats until the original burst request has been completed at which point the Xwr sequencer prioritizes any remaining requests in preparation for the next burst cycle.

Contiguous DRAM burst cycles are not guaranteed to the Xwr sequencer as an algorithm is implemented which ensures highest priority to refresh cycles followed by flash accesses then DRAM writes.

Figure 70:
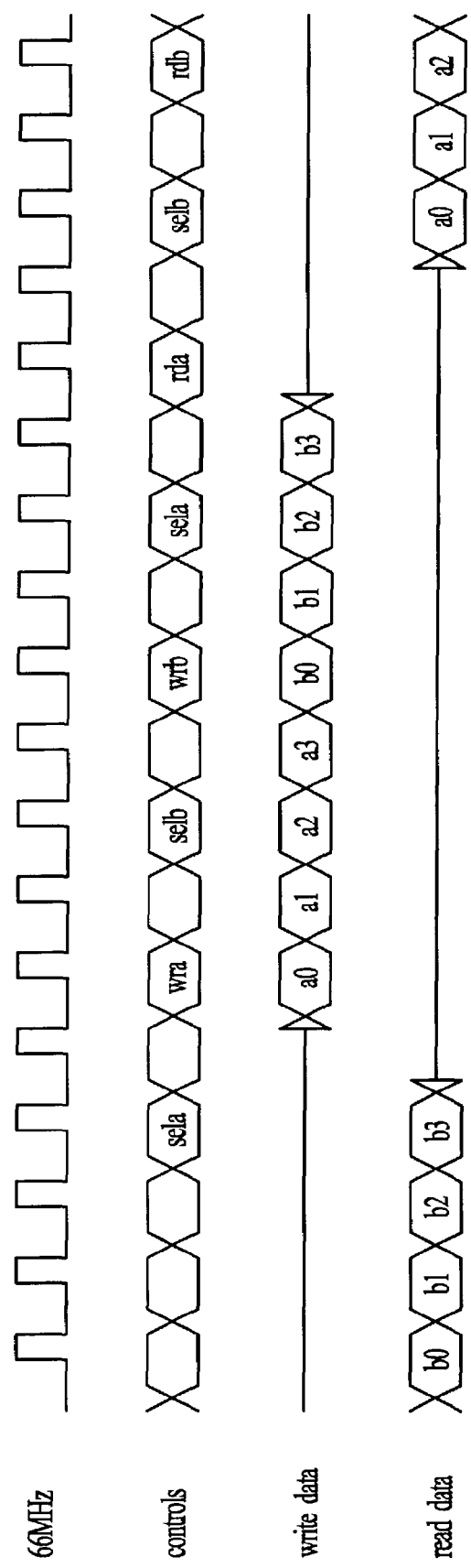

FIG. 70 is a timing diagram illustrating how data is written to SDRAM. The DRAM has been configured for a burst of four with a latency of two clock cycles. Bank A is first selected/activated followed by a write command two clock cycles later. The bank select/activate for bank B is next issued in preparation for issuing the second write command. As soon as the first 16 byte burst to bank A completes we issue the write command for bank B and begin supplying data.

PCI Master-Out Sequencer (Pmo).

Figure 71:
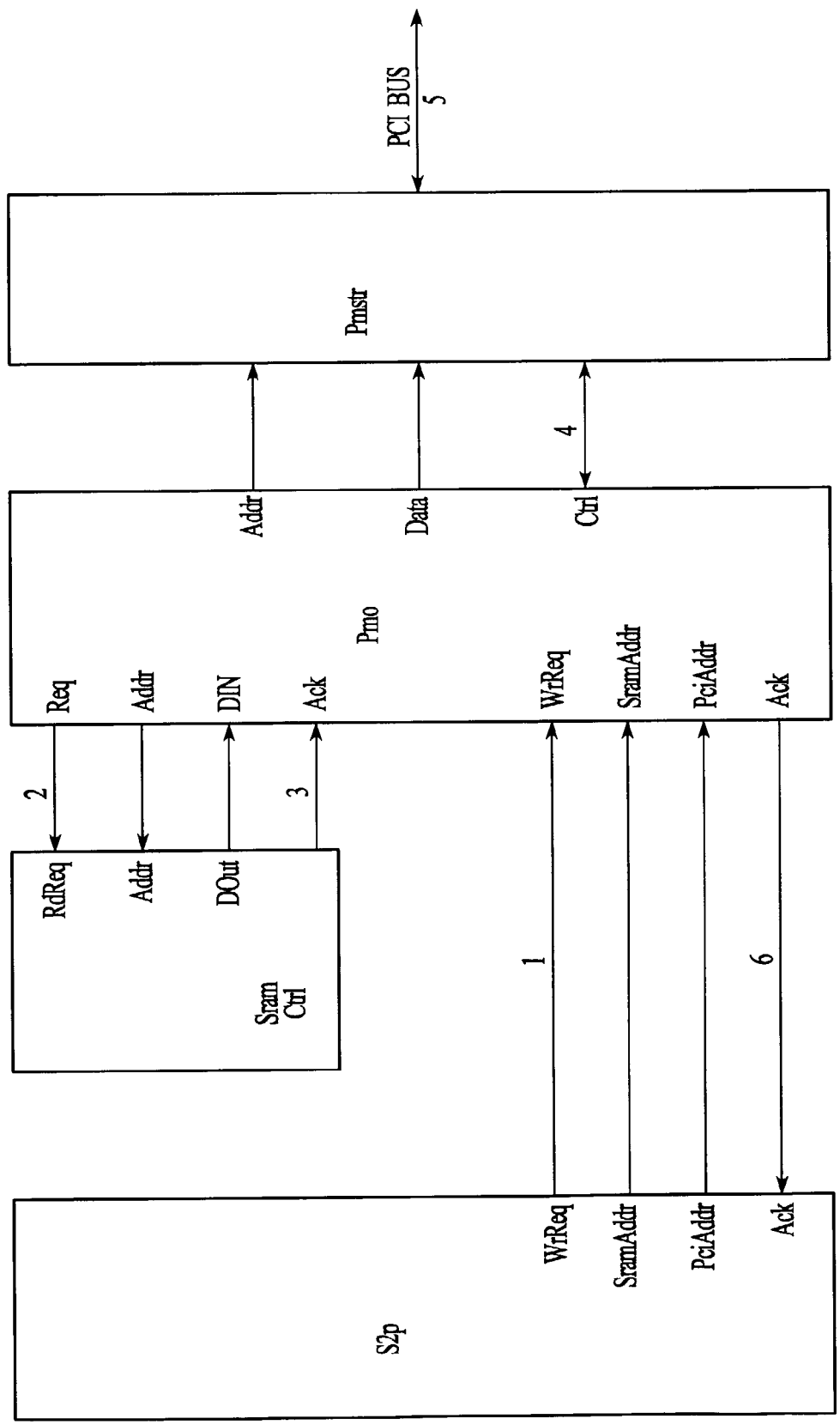

The Pmo sequencer (See FIG. 71) acts only as a slave sequencer. Servicing requests issued by master sequencers, the Pmo sequencer moves data from an SRAM based fifo to a Pci target, via the PciMstrIO module, in bursts of up to 256 bytes. The nature of the PCI bus dictates the use of the write line command to ensure optimal system performance. The write line command requires that the Pmo sequencer be capable of transferring a whole multiple (1×, 2×, 3×, . . . ) of cache lines of which the size is set through the Pci configuration registers. To accomplish this end, Pmo will automatically perform partial bursts until it has aligned the transfers on a cache line boundary at which time it will begin usage of the write line command. The SRAM fifo depth, of 256 bytes, has been chosen in order to allow Pmo to accommodate cache line sizes up to 128 bytes. Provided the cache line size is less than 128 bytes, Pmo will perform multiple, contiguous cache line bursts until it has exhausted the supply of data.

Pmo receives requests from two separate sources; the DRAM to Pci (D2p) module and the SRAM to Pci (S2p) module. An operation first begins with prioritization of the requests where the S2p module is given highest priority. Next, the Pmo module takes a Snapshot of the SRAM fifo address and uses this to generate read requests for the SramCtrl sequencer. The Pmo module then proceeds to arbitrate for ownership of the Pci bus via the PciMstrIO module. Once the Pmo holding registers have sufficient data and Pci bus mastership has been granted, the Pmo module begins transferring data to the Pci target. For each successful transfer, Pmo sends an acknowledge and encoded size to the master sequencer, allow it to update it's internal pointers, counters and status. Once the Pci burst transaction has terminated, Pmo parks on the Pci bus unless another initiator has requested ownership. Pmo again prioritizes the incoming requests and repeats the process.

PCI Master-Out Sequencer (Pmi).

Figure 72:
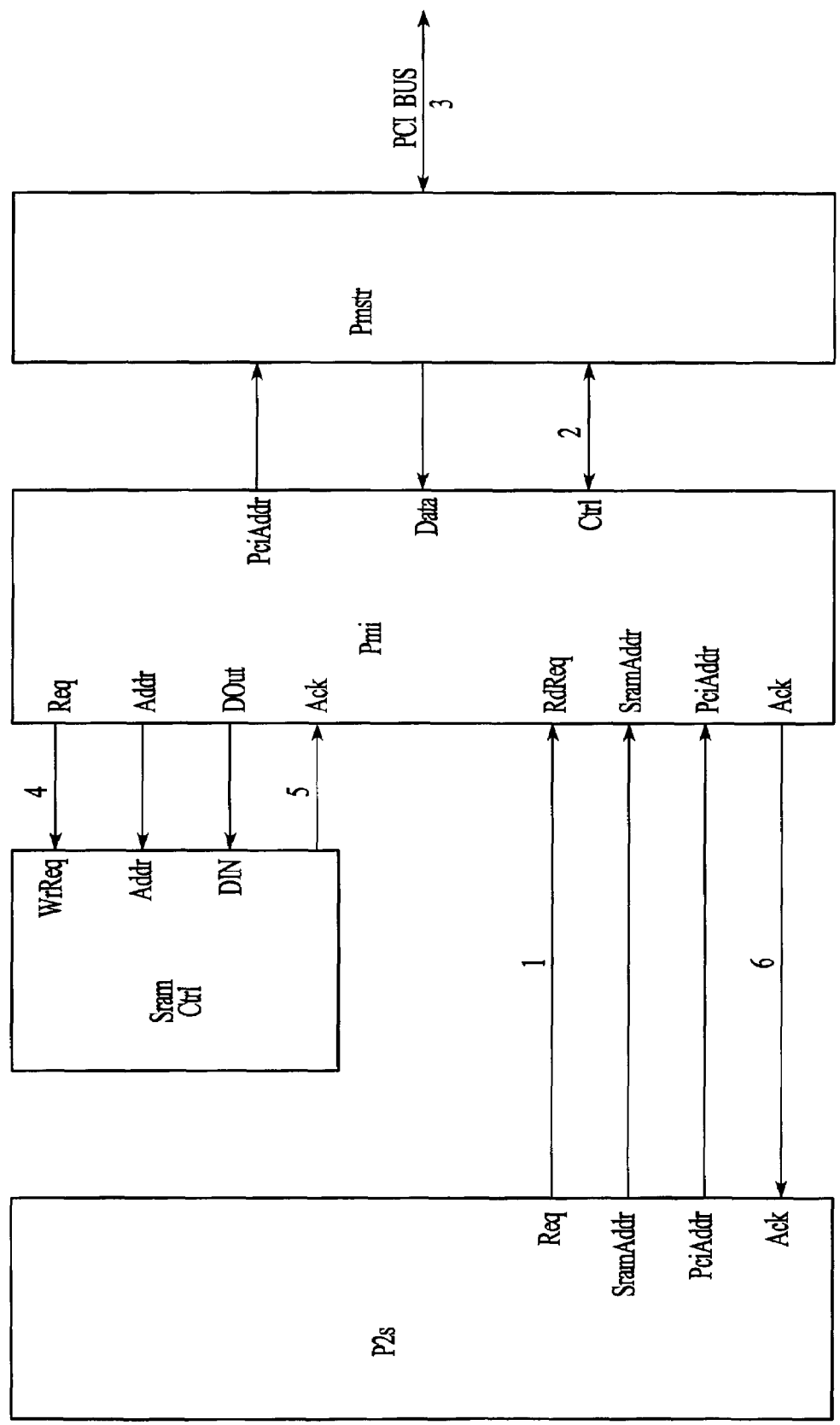

The Pmi sequencer (See FIG. 72) acts only as a slave sequencer. Servicing requests issued by master sequencers, the Pmi sequencer moves data from a Pci target to an SRAM based fifo, via the PciMstrIO module, in bursts of up to 256 bytes. The nature of the PCI bus dictates the use of the read multiple command to ensure optimal system performance. The read multiple command requires that the Pmi sequencer be capable of transferring a cache line or more of data. To accomplish this end, Pmi will automatically perform partial cache line bursts until it has aligned the transfers on a cache line boundary at which time it will begin usage of the read multiple command. The SRAM fifo depth, of 256 bytes, has been chosen in order to allow Pmi to accommodate cache line sizes up to 128 bytes. Provided the cache line size is less than 128 bytes, Pmi will perform multiple, contiguous cache line bursts until it has filled the fifo.

Pmi receive requests from two separate sources; the Pci to DRAM (P2d) module and the Pci to SRAM (P2s) module. An operation first begins with prioritization of the requests where the P2s module is given highest priority. The Pmi module then proceeds to arbitrate for ownership of the Pci bus via the PciMstrIO module. Once the Pci bus mastership has been granted and the Pmi holding registers have sufficient data, the Pmi module begins transferring data to the SRAM fifo. For each successful transfer, Pmi sends an acknowledge and encoded size to the master sequencer, allowing it to update it's internal pointers, counters and status. Once the Pci burst transaction has terminated, Pmi parks on the Pci bus unless another initiator has requested ownership. Pmi again prioritizes the incoming requests and repeats the process.

DRAM to PCI Sequencer (D2P).

Figure 73:
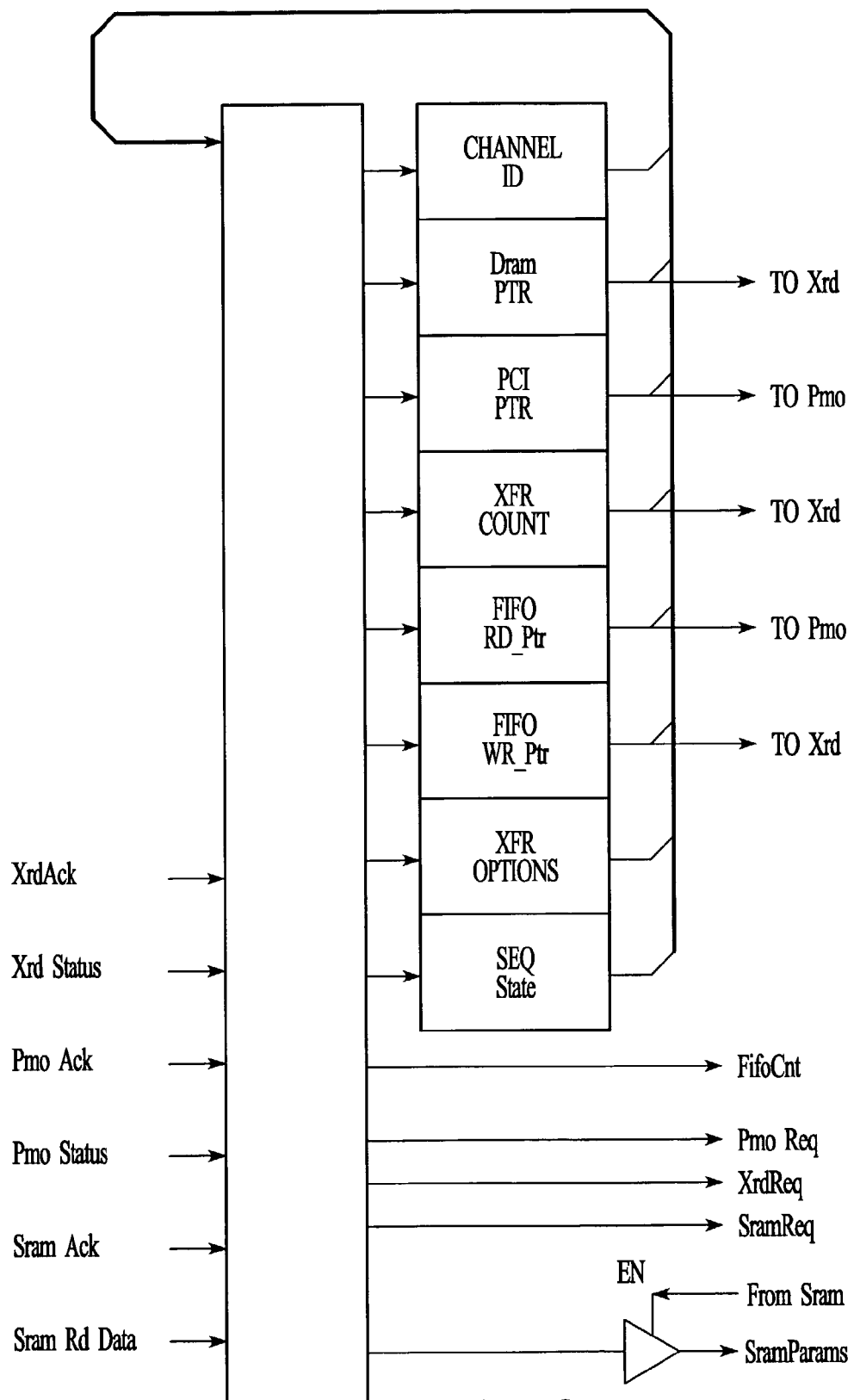

The D2p sequencer (See FIG. 73) acts is a master sequencer. Servicing channel requests issued by the CPU, the D2p sequencer manages movement of data from DRAM to the Pci bus by issuing requests to both the Xrd sequencer and the Pmo sequencer. Data transfer is accomplished using an SRAM based fifo through which data is staged.

Figure 74:
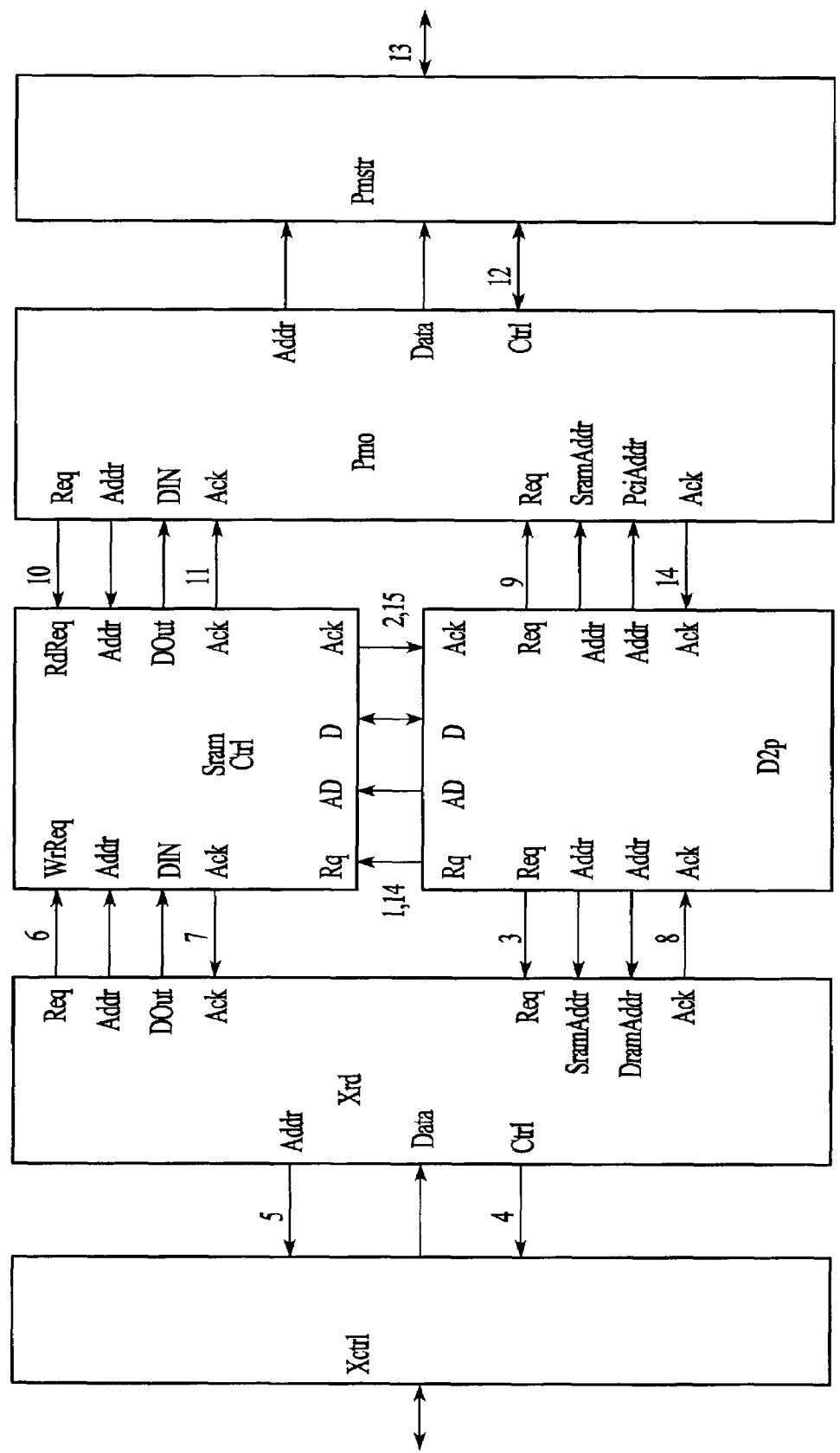

D2p can receive requests from any of the processor's thirty-two DMA channels. Once a command request has been detected, D2p fetches a DMA descriptor from an SRAM location dedicated to the requesting channel which includes the DRAM address, Pci address, Pci endian and request size. D2p then issues a request to the D2s sequencer causing the SRAM based fifo to fill with DRAM data. Once the fifo contains sufficient data for a Pci transaction, D2s issues a request to Pmo which in turn moves data from the fifo to a Pci target. The process repeats until the entire request has been satisfied at which time D2p writes ending status in to the SRAM DMA descriptor area and sets the channel done bit associated with that channel. D2p then monitors the DMA channels for additional requests. FIG. 74 is an illustration showing the major blocks involved in the movement of data from DRAM to Pci target.

PCI to Dram Sequencer (P2d).

Figure 75:
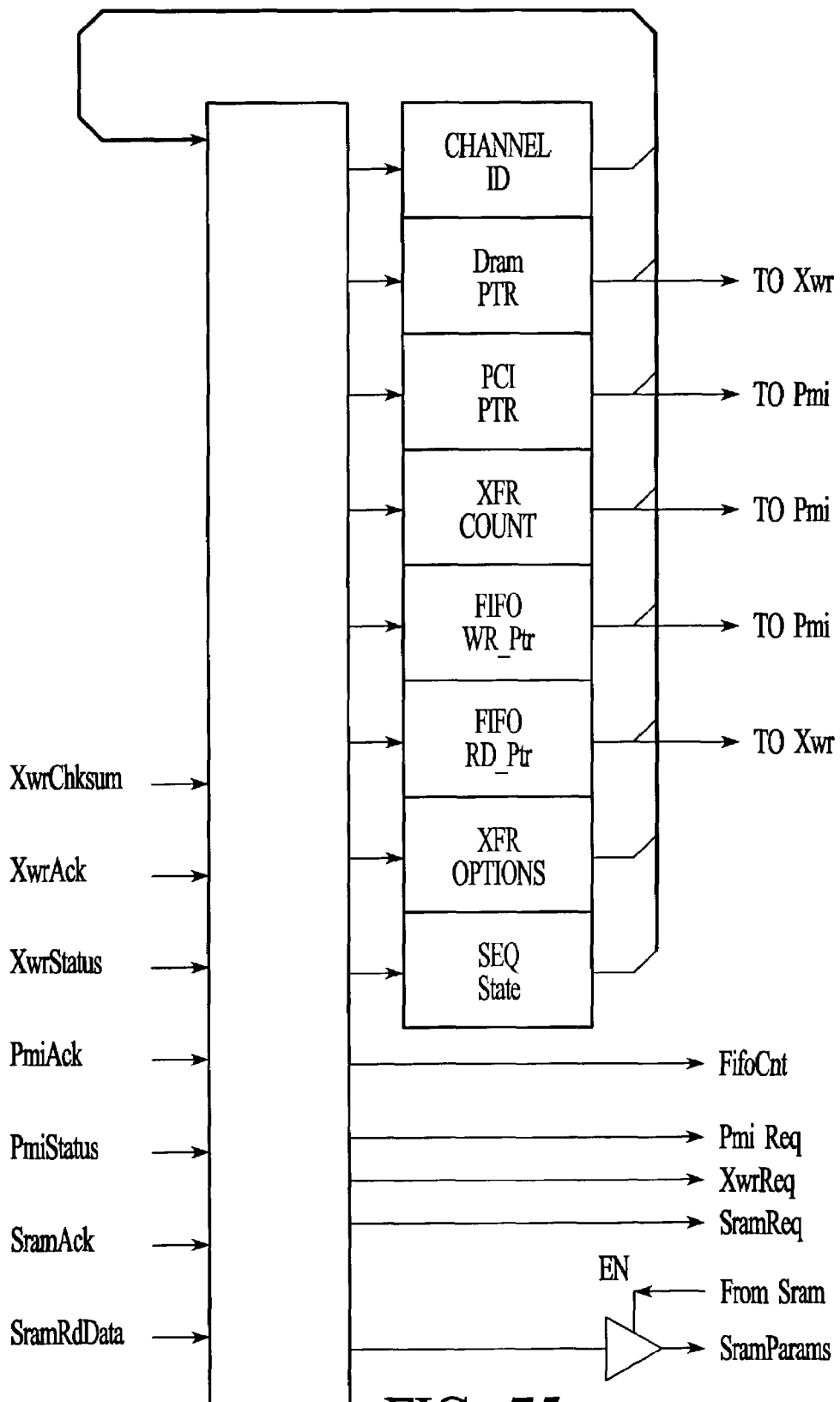

The P2d sequencer (See FIG. 75) acts as both a slave sequencer and a master sequencer. Servicing channel requests issued by the CPU, the P2d sequencer manages movement of data from Pci bus to DRAM by issuing requests to both the Xwr sequencer and the Pmi sequencer. Data transfer is accomplished using an SRAM based fifo through which data is staged.

Figure 76:
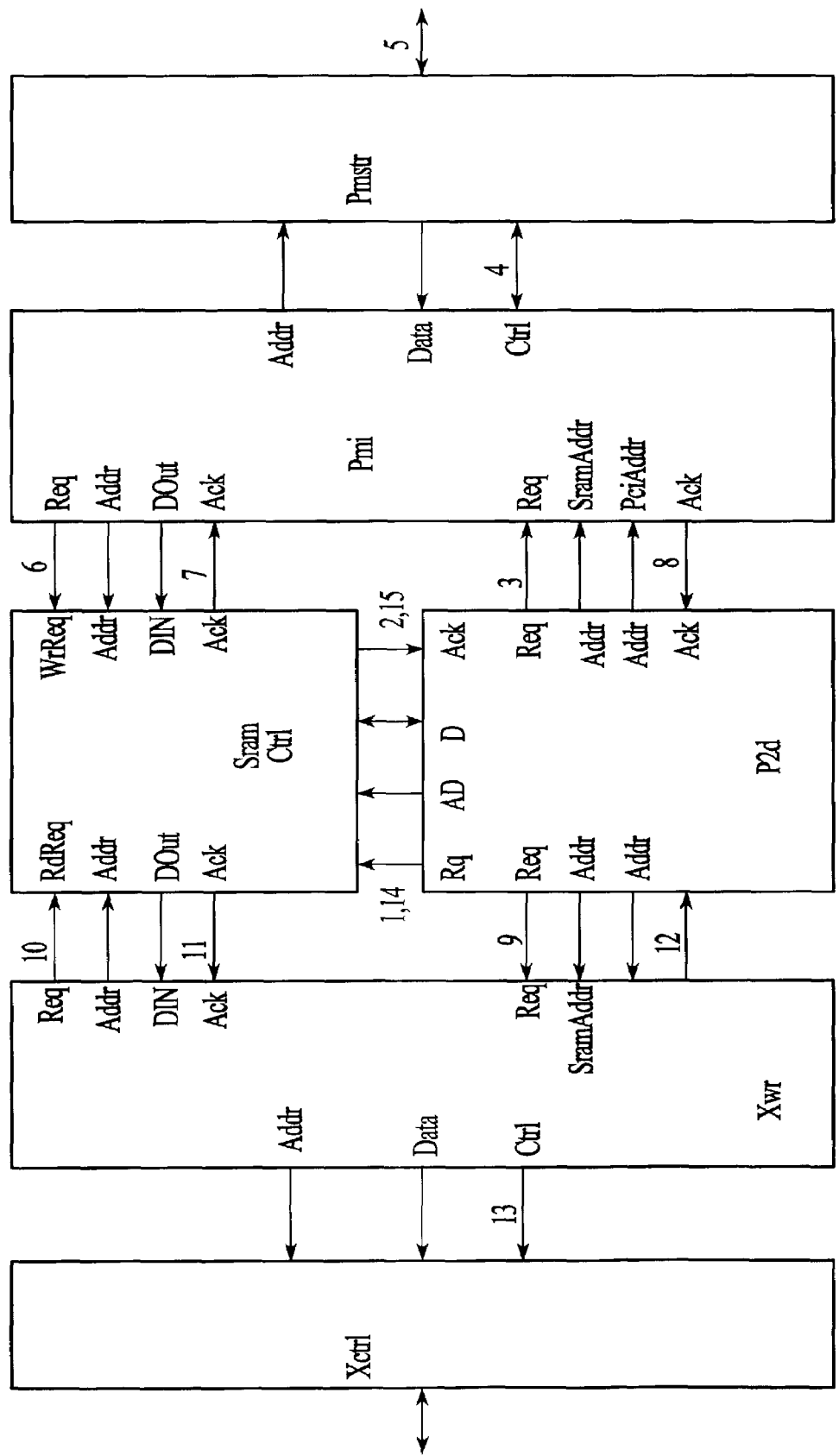

P2d can receive requests from any of the processor's thirty-two DMA channels. Once a command request has been detected, P2d, operating as a slave sequencer, fetches a DMA descriptor from an SRAM location dedicated to the requesting channel which includes the DRAM address, Pci address, Pci endian and request size. P2d then issues a request to Pmo which in turn moves data from the Pci target to the SRAM fifo. Next, P2d issues a request to the Xwr sequencer causing the SRAM based fifo contents to be written to the DRAM. The process repeats until the entire request has been satisfied at which time P2d writes ending status in to the SRAM DMA descriptor area and sets the channel done bit associated with that channel. P2d then monitors the DMA channels for additional requests. FIG. 76 is an illustration showing the major blocks involved in the movement of data from a Pci target to DRAM.

SRAM to PCI Sequencer (S2p).

Figure 77:
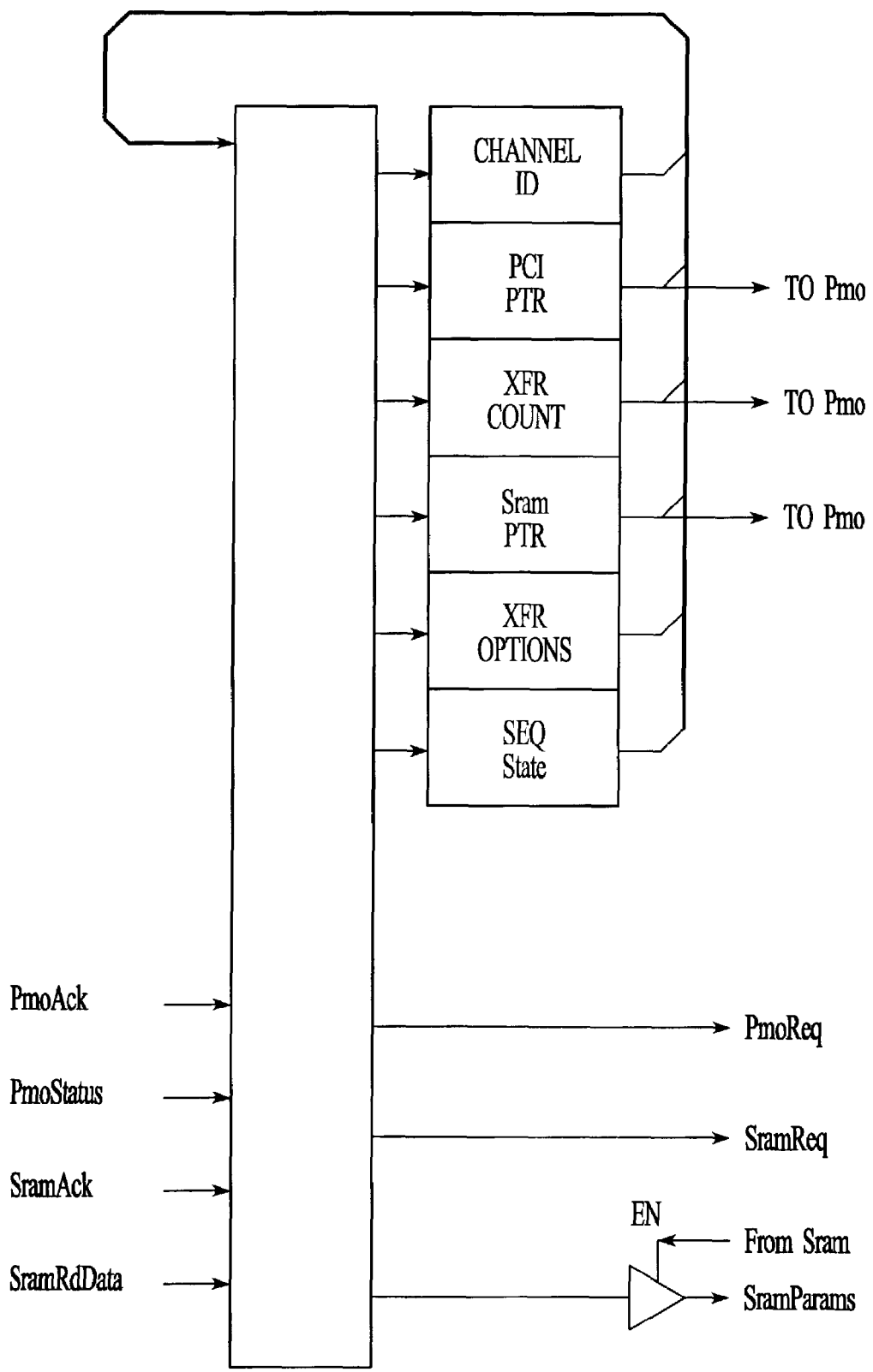
Figure 78:
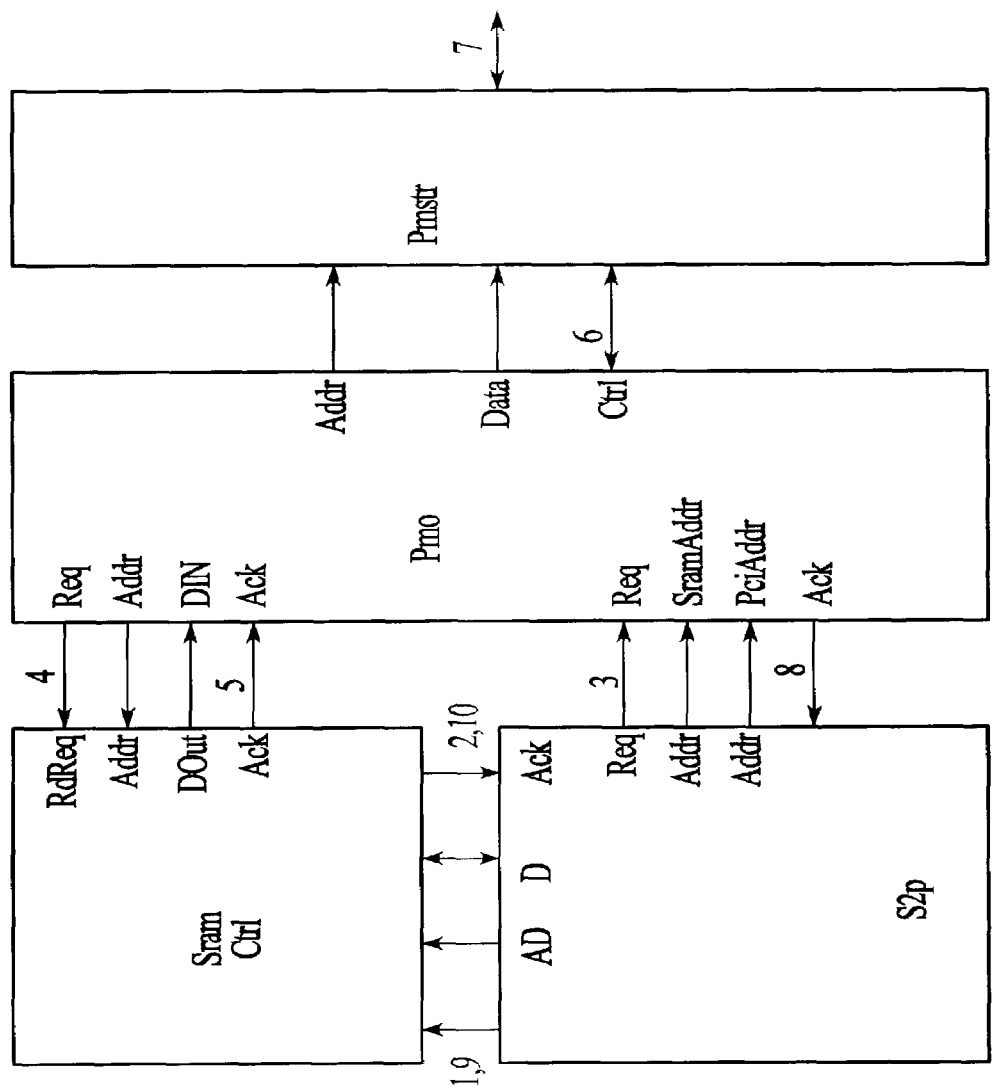

The S2p sequencer (See FIG. 77) acts as both a slave sequencer and a master sequencer. Servicing channel requests issued by the CPU, the S2p sequencer manages movement of data from SRAM to the Pci bus by issuing requests to the Pmo sequencer S2p can receive requests from any of the processor's thirty-two DMA channels. Once a command request has been detected, S2p, operating as a slave sequencer, fetches a DMA descriptor from an SRAM location dedicated to the requesting channel which includes the SRAM address, Pci address, Pci endian and request size. S2p then issues a request to Pmo which in turn moves data from the SRAM to a Pci target. The process repeats until the entire request has been satisfied at which time S2p writes ending status in to the SRAM DMA descriptor area and sets the channel done bit associated with that channel. S2p then monitors the DMA channels for additional requests. FIG. 78 is an illustration showing the major blocks involved in the movement of data from SRAM to Pci target.

PCI to SRAM Sequencer (P2s).

Figure 79:
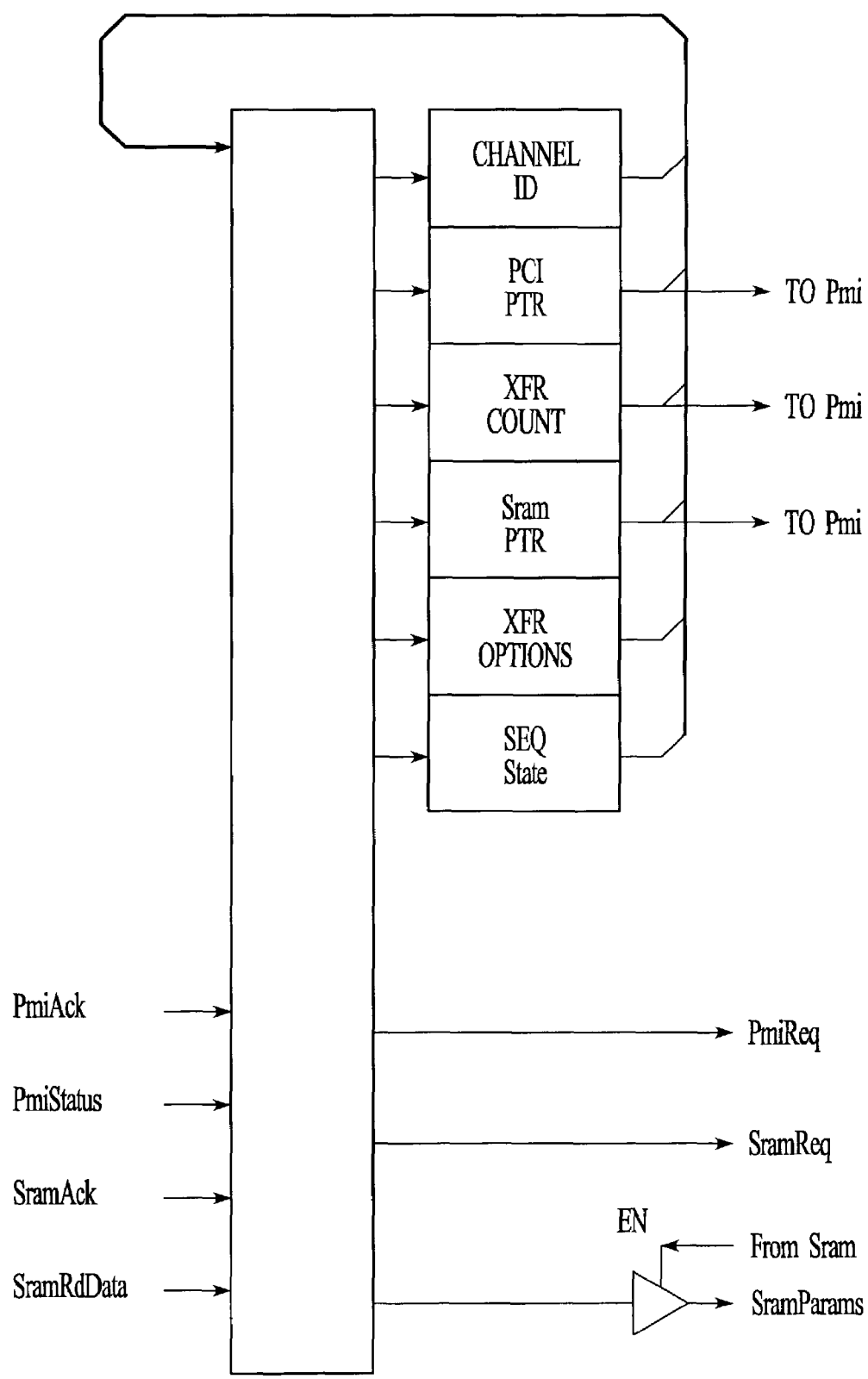

The P2s sequencer (See FIG. 79) acts as both a slave sequencer and a master sequencer. Servicing channel requests issued by the CPU, the P2s sequencer manages movement of data from Pci bus to SRAM by issuing requests to the Pmi sequencer.

Figure 80:
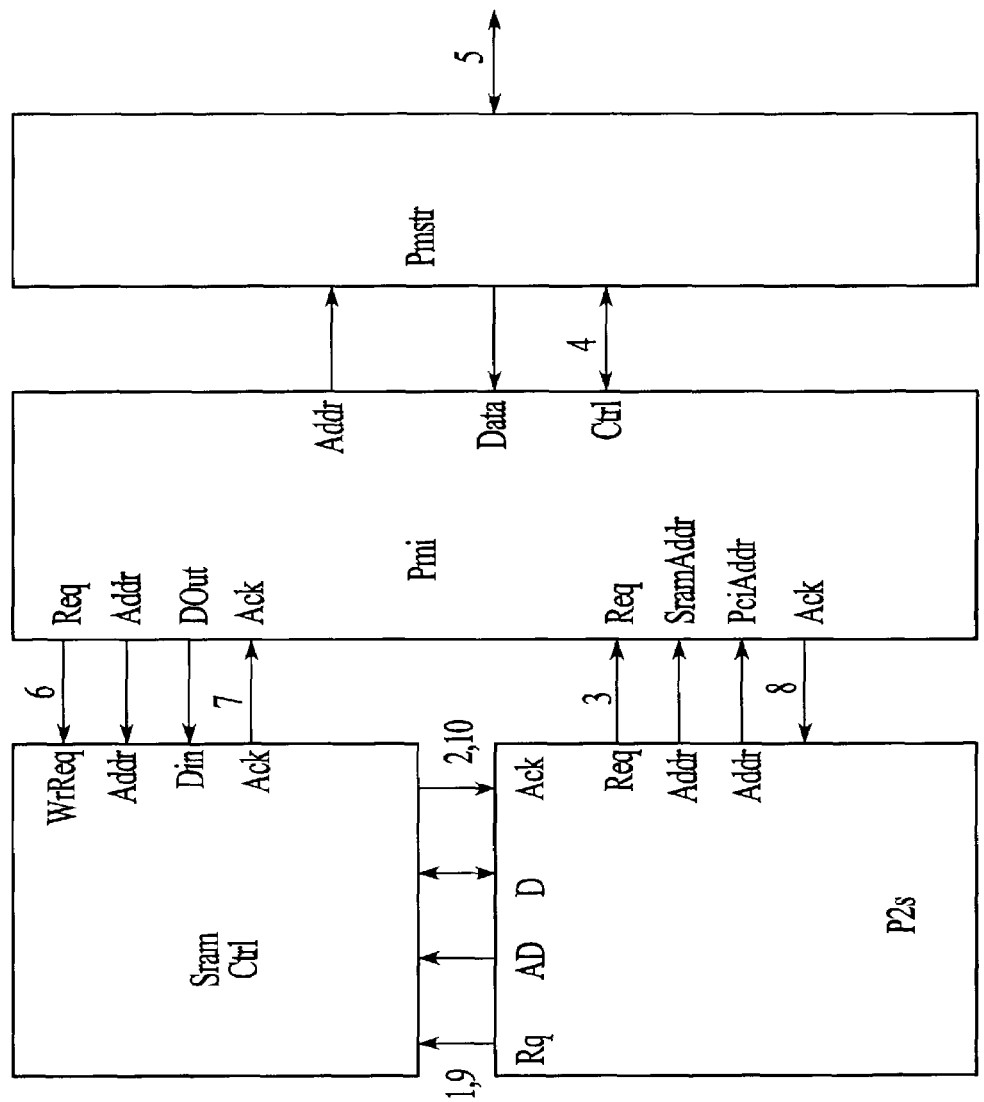

P2s can receive requests from any of the processor's thirty-two DMA channels. Once a command request has been detected, P2s, operating as a slave sequencer, fetches a DMA descriptor from an SRAM location dedicated to the requesting channel which includes the SRAM address, Pci address, Pci endian and request size. P2s then issues a request to Pmo which in turn moves data from the Pci target to the SRAM. The process repeats until the entire request has been satisfied at which time P2s writes ending status in to the DMA descriptor area of SRAM and sets the channel done bit associated with that channel. P2s then monitors the DMA channels for additional requests. FIG. 80 is an illustration showing the major blocks involved in the movement of data from a Pci target to DRAM.

DRAM to SRAM Sequencer (D2s).

Figure 81:
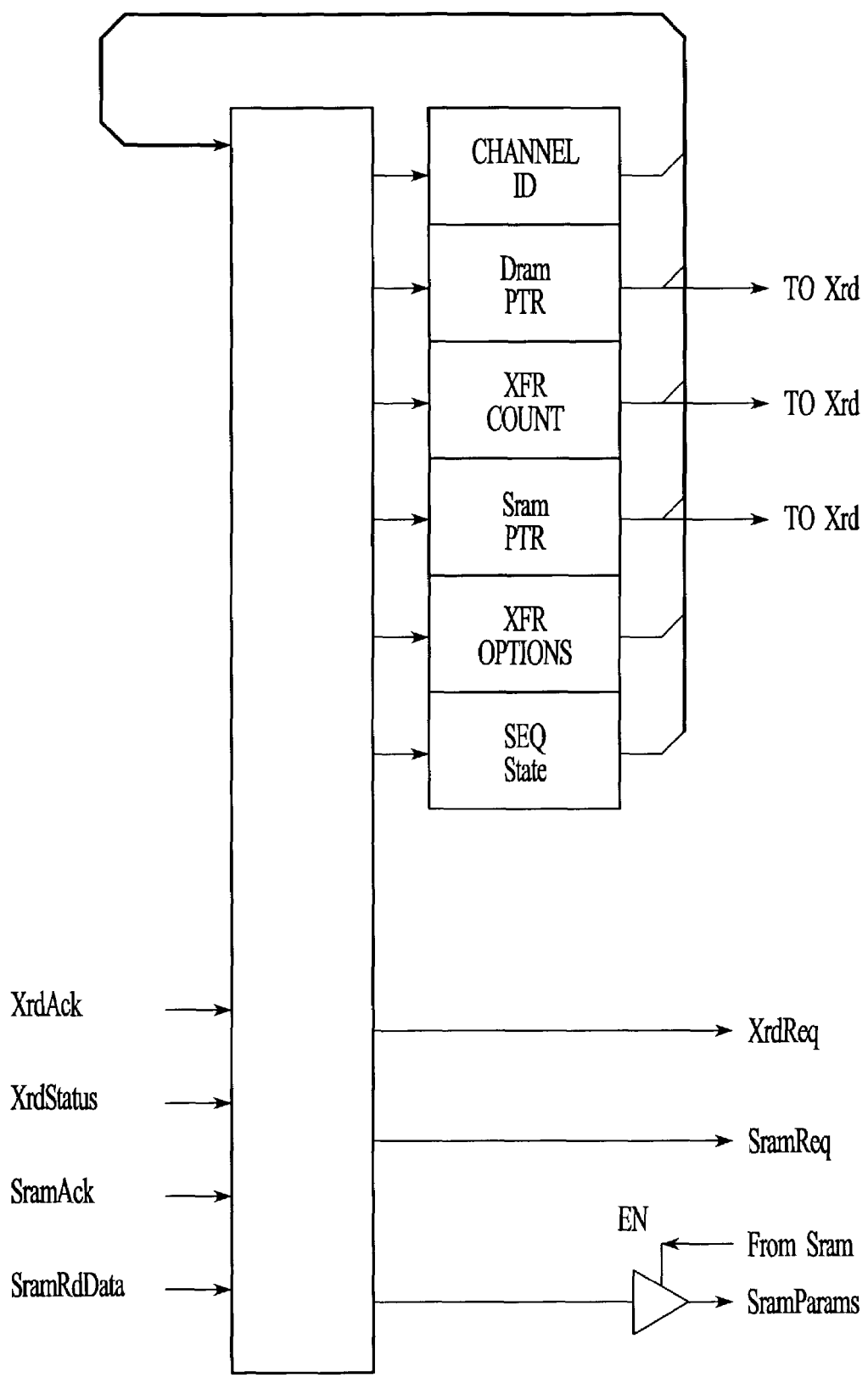

The D2s sequencer (See FIG. 81) acts as both a slave sequencer and a master sequencer. Servicing channel requests issued by the CPU, the D2s sequencer manages movement of data from DRAM to SRAM by issuing requests to the Xrd sequencer.

Figure 82:
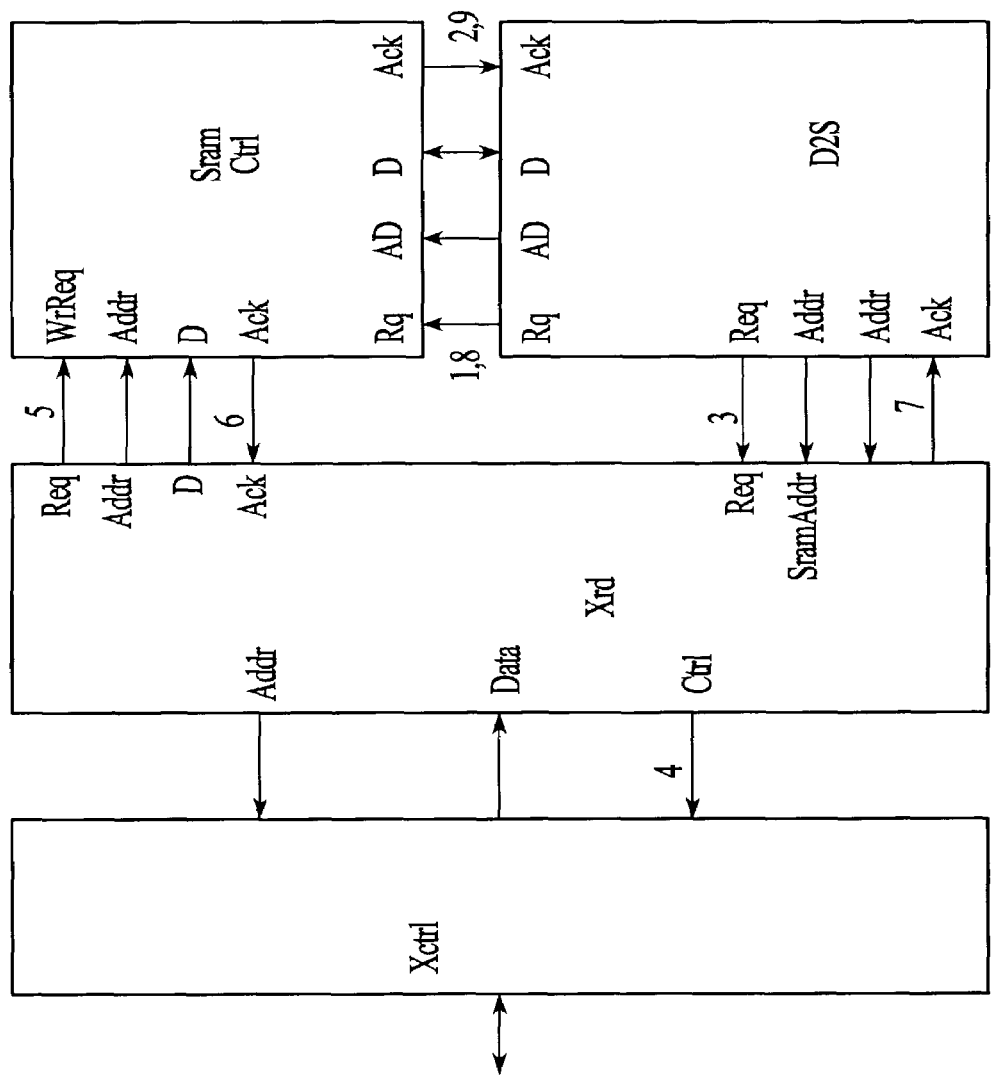

D2s can receive requests from any of the processor's thirty-two DMA channels. Once a command request has been detected, D2s, operating as a slave sequencer, fetches a DMA descriptor from an SRAM location dedicated to the requesting channel which includes the DRAM address, SRAM address and request size. D2s then issues a request to the Xrd sequencer causing the transfer of data to the SRAM. The process repeats until the entire request has been satisfied at which time D2s writes ending status in to the SRAM DMA descriptor area and sets the channel done bit associated with that channel. D2s then monitors the DMA channels for additional requests. FIG. 82 is an illustration showing the major blocks involved in the movement of data from DRAM to SRAM.

SRAM to DRAM Sequencer (S2d).

Figure 83:
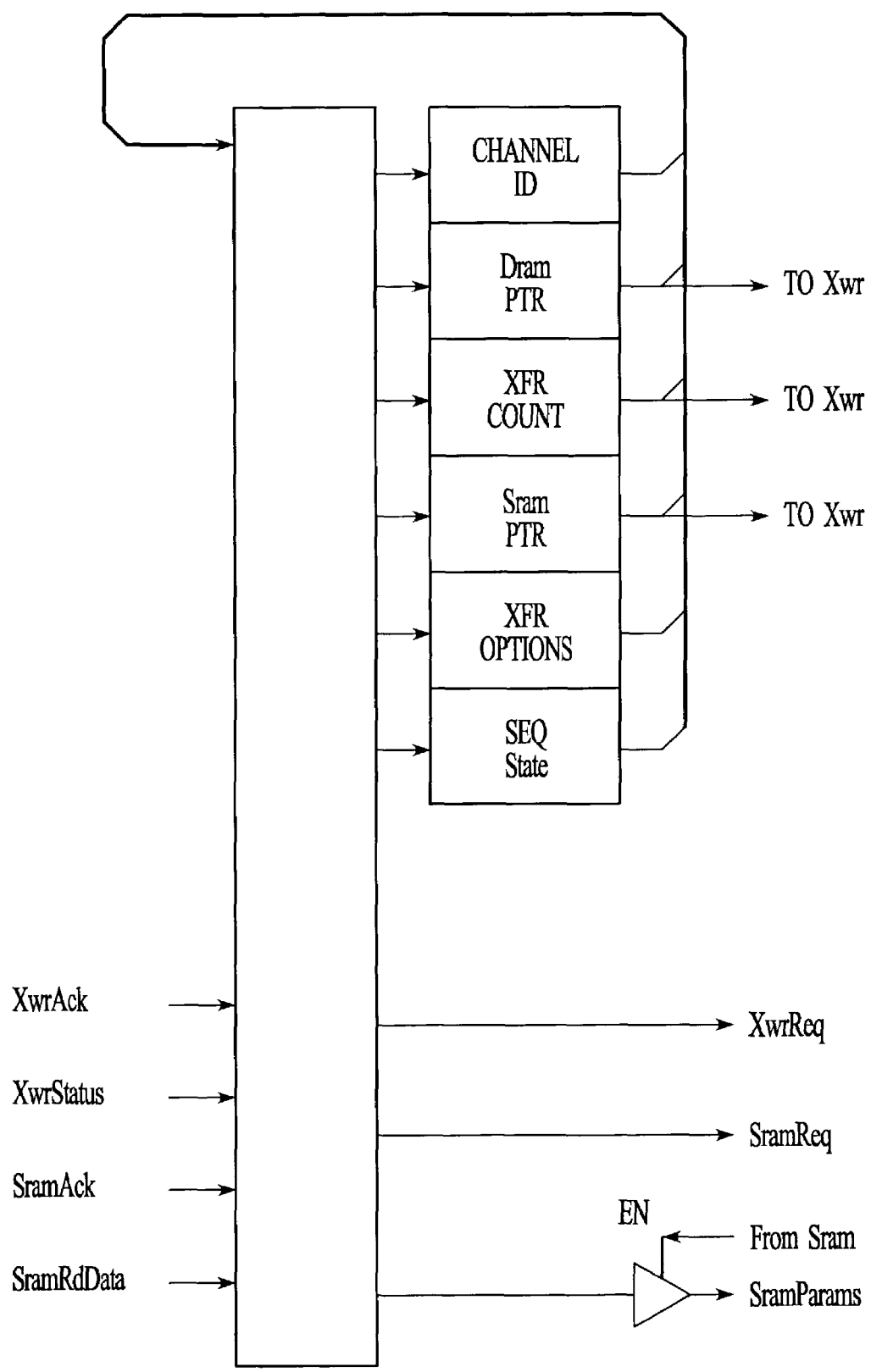

The S2d sequencer (See FIG. 83) acts as both a slave sequencer and a master sequencer. Servicing channel requests issued by the CPU, the S2d sequencer manages movement of data from SRAM to DRAM by issuing requests to the Xwr sequencer.

Figure 84:
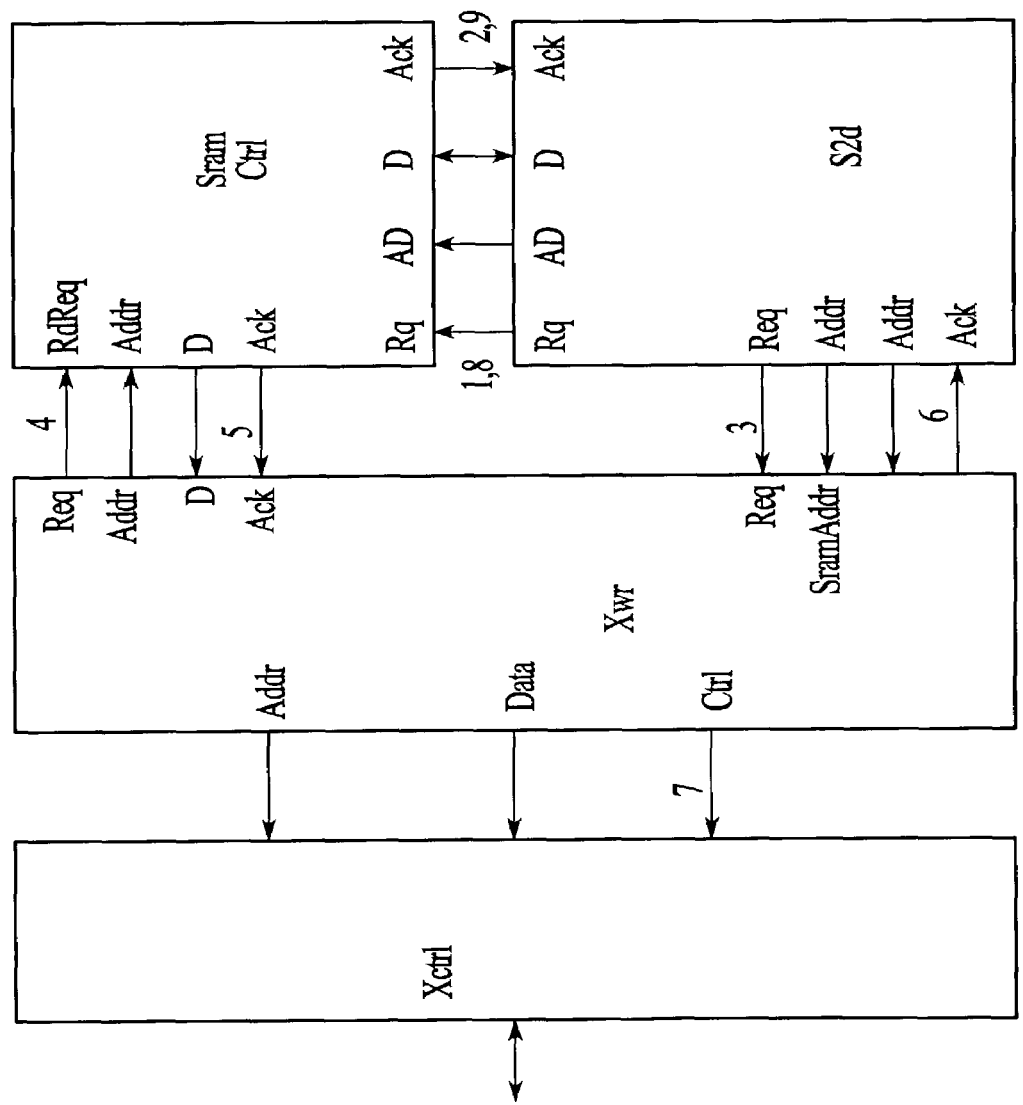

S2d can receive requests from any of the processor's thirty-two DMA channels. Once a command request has been detected, S2d, operating as a slave sequencer, fetches a DMA descriptor from an SRAM location dedicated to the requesting channel which includes the DRAM address, SRAM address, checksum reset and request size. S2d then issues a request to the Xwr sequencer causing the transfer of data to the DRAM. The process repeats until the entire request has been satisfied at which time S2d writes ending status in to the SRAM DMA descriptor area and sets the channel done bit associated with that channel. S2d then monitors the DMA channels for additional requests. FIG. 84 is an illustration showing the major blocks involved in the movement of data from SRAM to DRAM.

PCI Slave Input Sequencer (Psi).

The Psi sequencer (See FIG. 85) acts as both a slave sequencer and a master sequencer. Servicing requests issued by a Pci master, the Psi sequencer manages movement of data from Pci bus to SRAM and Pci bus to DRAM via SRAM by issuing requests to the SramCtrl and Xwr sequencers.

Psi manages write requests to configuration space, expansion rom, DRAM, SRAM and memory mapped registers. Psi separates these Pci bus operations in to two categories with different action taken for each. DRAM accesses result in Psi generating write request to an SRAM buffer followed with a write request to the Xwr sequencer. Subsequent write or read DRAM operations are retry terminated until the buffer has been emptied. An event notification is set for the processor allowing message passing to occur through DRAM space.

All other Pci write transactions result in Psi posting the write information including Pci address, Pci byte marks and Pci data to a reserved location in SRAM, then setting an event flag which the event processor monitors. Subsequent writes or reads of configuration, expansion rom, SRAM or registers are terminated with retry until the processor clears the event flag. This allows the INIC pipelining levels to a minimum for the posted write and give the processor ample time to modify data for subsequent Pci read operations.

Figure 85:
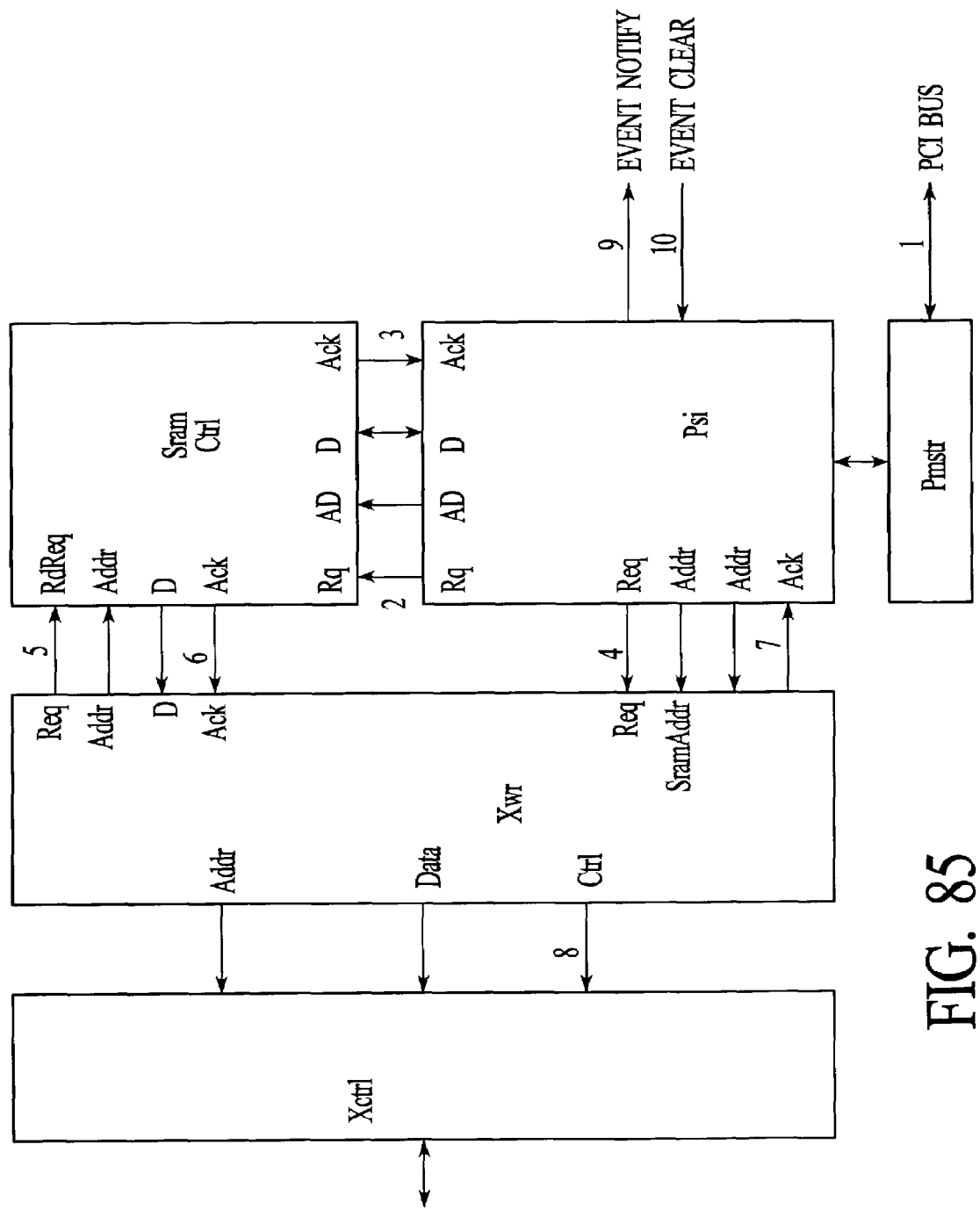

FIG. 85 depicts the sequence of events when Psi is the target of a Pci write operation. Note that events 4 through 7 occur only when the write operation targets the DRAM.

PCI Slave Output Sequencer (Pso).

Figure 86:
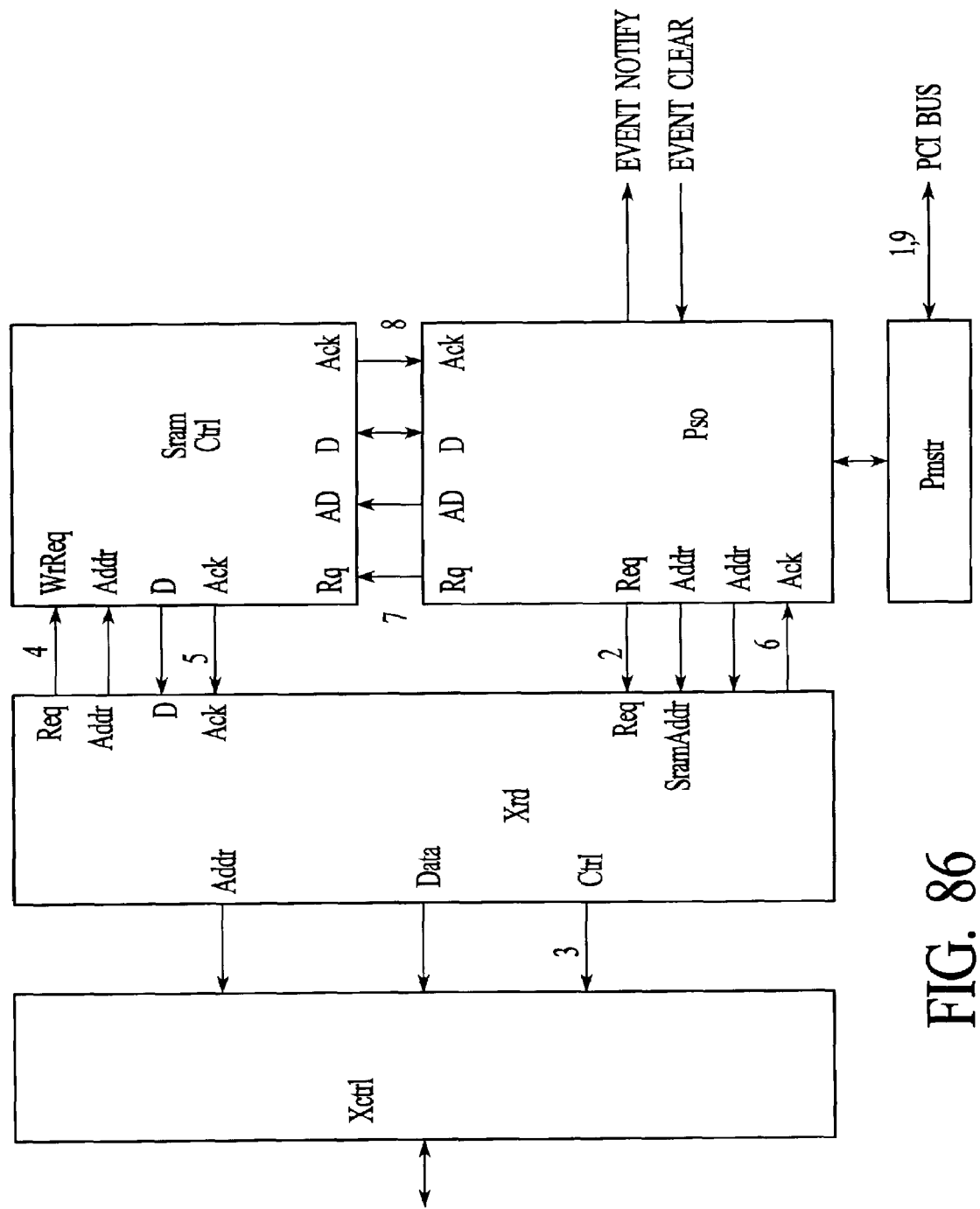

The Pso sequencer (See FIG. 86) acts as both a slave sequencer and a master sequencer. Servicing requests issued by a Pci master, the Pso sequencer manages movement of data to Pci bus from SRAM and to Pci bus from DRAM via SRAM by issuing requests to the SramCtrl and Xrd sequencers.

Pso manages read requests to configuration space, expansion rom, DRAM, SRAM and memory mapped registers. Pso separates these Pci bus operations in to two categories with different action taken for each. DRAM accesses result in Pso generating read request to the Xrd sequencer followed with a read request to SRAM buffer. Subsequent write or read DRAM operations are retry terminated until the buffer has been emptied.

All other Pci read transactions result in Pso posting the read request information including Pci address and Pci byte marks to a reserved location in SRAM, then setting an event flag which the event processor monitors. Subsequent writes or reads of configuration, expansion rom, SRAM or registers are terminated with retry until the processor clears the event flag. This allows the INIC to use a microcoded response mechanism to return data for the request. The processor decodes the request information, formulates or fetches the requested data and stores it in SRAM then clears the event flag allowing Pso to fetch the data and return it on the Pci bus.

FIG. 78 depicts the sequence of events when Pso is the target of a Pci read operation.

Frame Receive Sequencer (RcvX).

Figure 87:
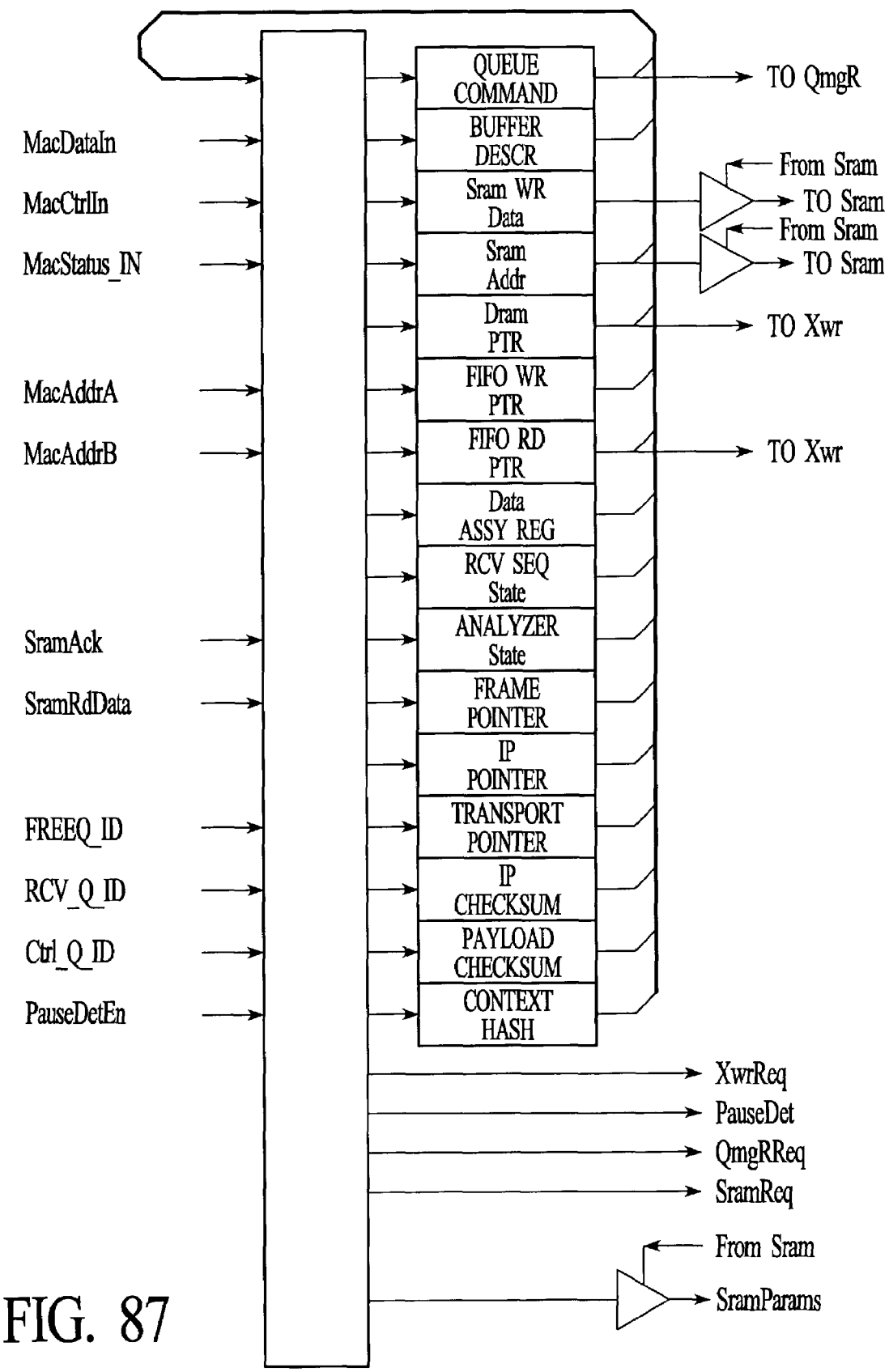

The receive sequencer (See FIG. 87) (RcvSeq) analyzes and manages incoming packets, stores the result in DRAM buffers, then notifies the processor through the receive queue (RcvQ) mechanism. The process begins when a buffer descriptor is available at the output of the FreeQ. RcvSeq issues a request to the Qmg which responds by supplying the buffer descriptor to RcvSeq. RcvSeq then waits for a receive packet. The Mac, network, transport and session information is analyzed as each byte is received and stored in the assembly register (AssyReg). When four bytes of information is available, RcvSeq requests a write of the data to the SRAM. When sufficient data has been stored in the SRAM based receive fifo, a DRAM write request is issued to Xwr. The process continues until the entire packet has been received at which point RcvSeq stores the results of the packet analysis in the beginning of the DRAM buffer. Once the buffer and status have both been stored, RcvSeq issues a write-queue request to Qmg. Qmg responds by storing a buffer descriptor and a status vector provided by RcvSeq. The process then repeats. If RcvSeq detects the arrival of a packet before a free buffer is available, it ignores the packet and sets the FrameLost status bit for the next received packet.

Figure 88:
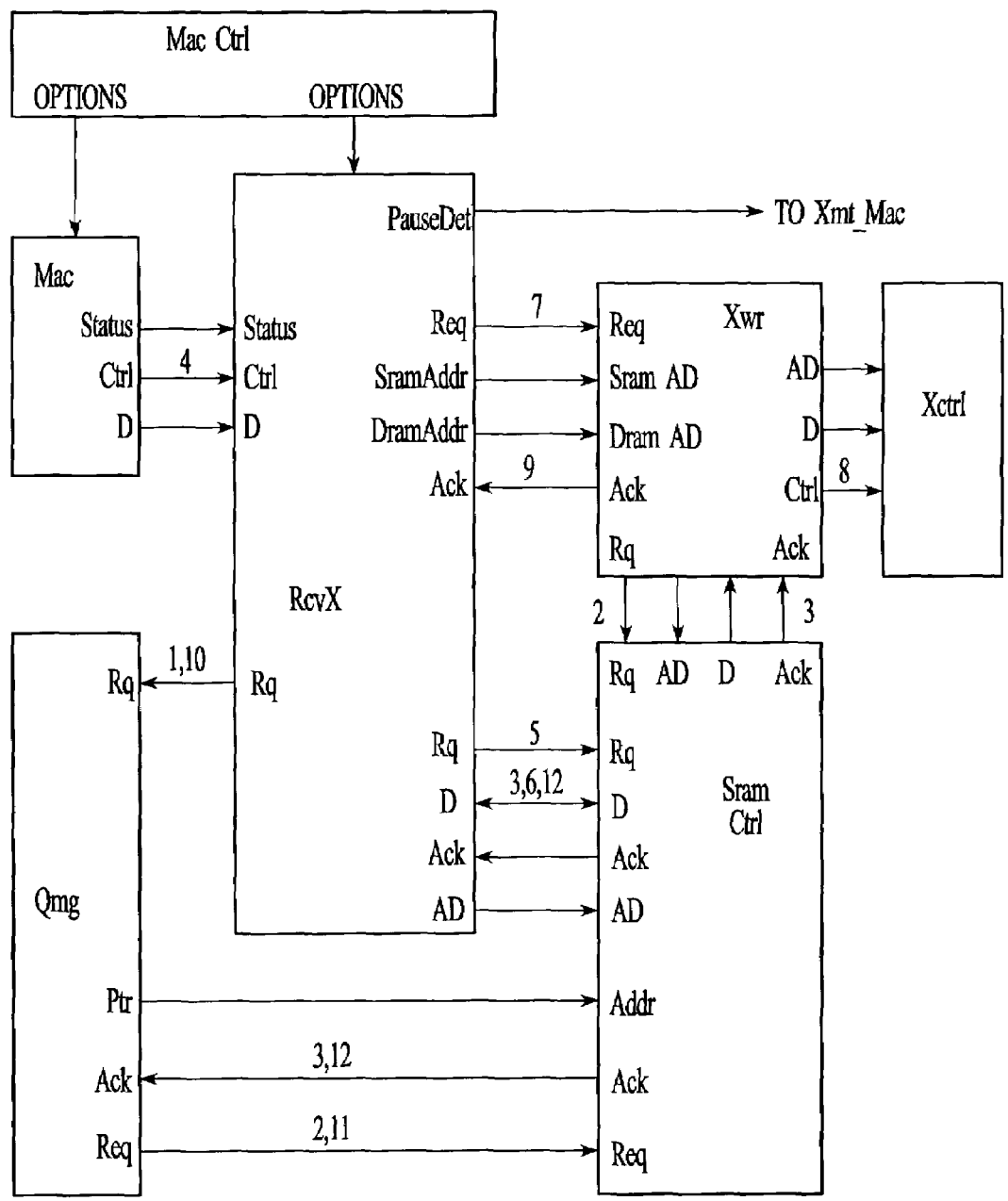

FIG. 88 depicts the sequence of events for successful reception of a packet followed by a definition of the receive buffer and the buffer descriptor as stored on the RcvQ. FIG. 89 shows the Receive Buffer Descriptor. FIGS. 90-92 show the Receive Buffer Format.

Frame Transmit Sequencer (XmtX).

Figure 93:
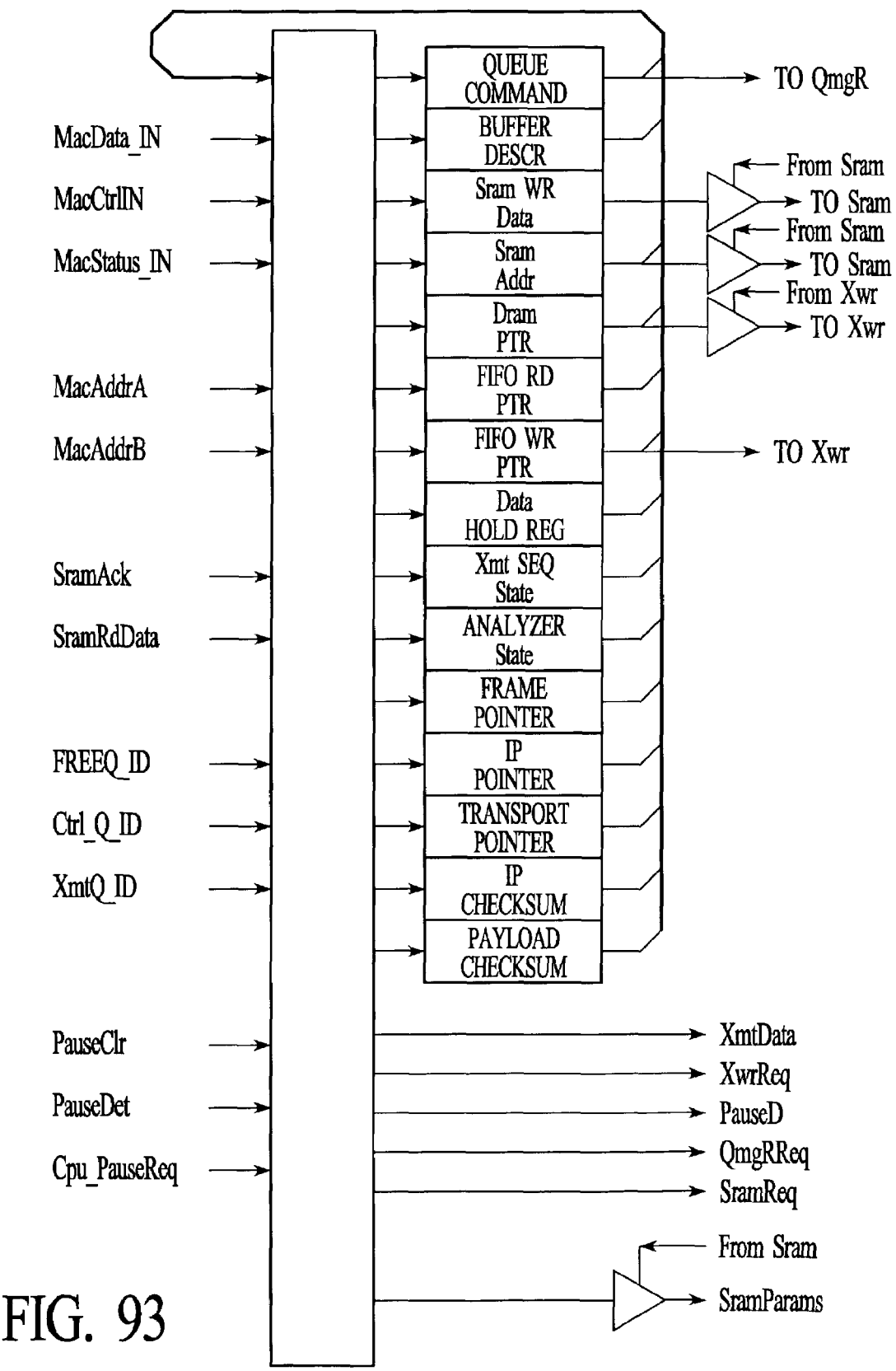

The transmit sequencer (See FIG. 93) (XmtSeq) analyzes and manages outgoing packets, using buffer descriptors retrieved from the transmit queue (XmtQ) then storing the descriptor for the freed buffer in the free buffer queue (FreeQ). The process begins when a buffer descriptor is available at the output of the XmtQ. XmtSeq issues a request to the Qmg which responds by supplying the buffer descriptor to XmtSeq. XmtSeq then issues a read request to the Xrd sequencer. Next, XmtSeq issues a read request to SramCtrl then instructs the Mac to begin frame transmission. Once the frame transmission has completed, XmtSeq stores the buffer descriptor on the FreeQ thereby recycling the buffer.

Figure 94:
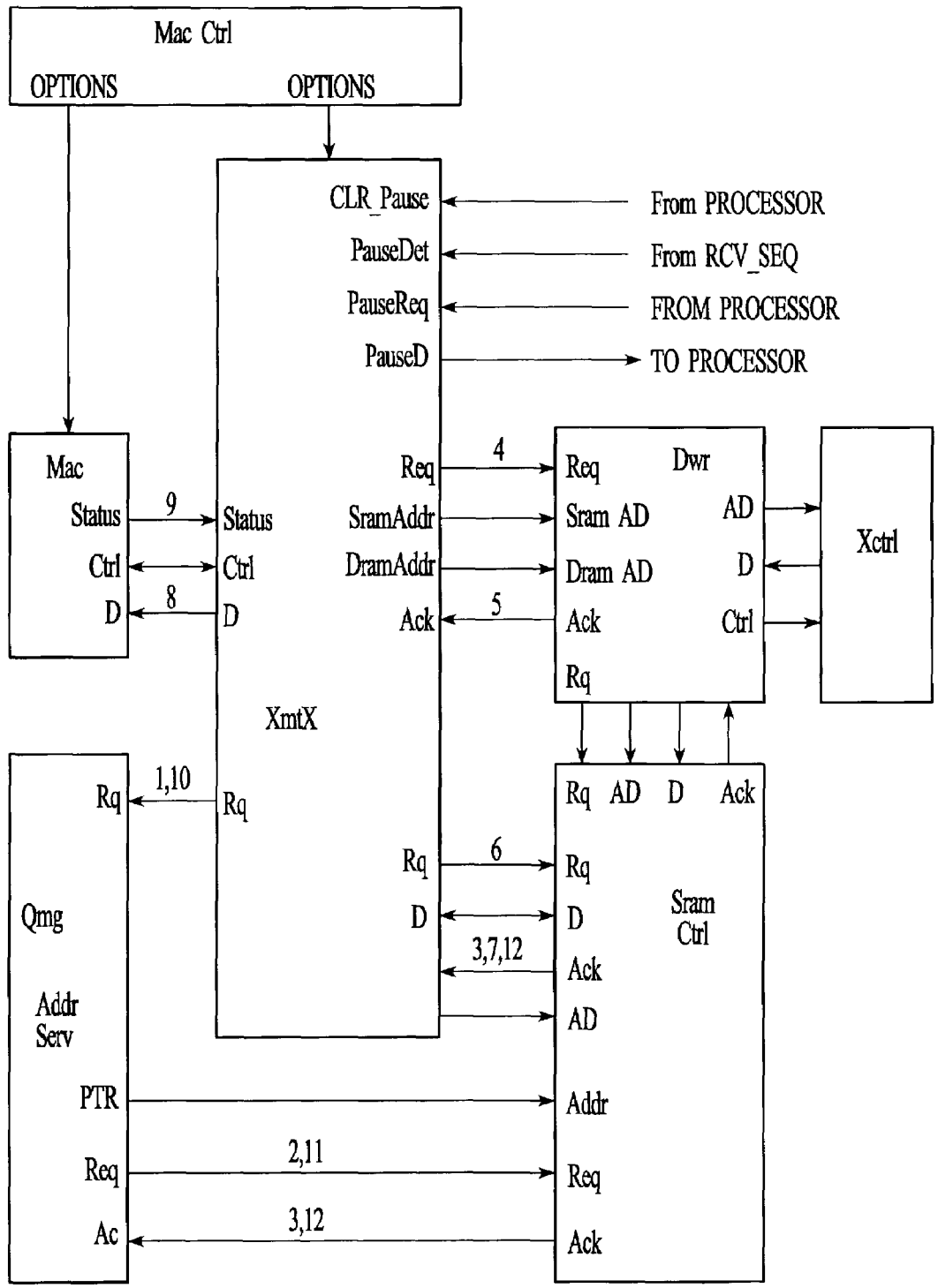

FIG. 94 depicts the sequence of events for successful transmission of a packet followed by a definition of the receive buffer and the buffer descriptor as stored on the XmtQ. FIG. 95 shows the Transmit Buffer Descriptor. FIG. 96 shows the Transmit Buffer Format. FIG. 97 shows the Transmit Status Vector.

Queue Manager (Qmg).

The INIC includes special hardware assist for the implementation of message and pointer queues. The hardware assist is called the queue manager (See FIG. 98) (Qmg) and manages the movement of queue entries between CPU and SRAM, between DMA sequencers and SRAM as well as between SRAM and DRAM. Queues comprise three distinct entities; the queue head (QHd), the queue tail (QTl) and the queue body (QBdy). QHd resides in 64 bytes of scratch ram and provides the area to which entries will be written (pushed). QTl resides in 64 bytes of scratch ram and contains queue locations from which entries will be read (popped). QBdy resides in DRAM and contains locations for expansion of the queue in order to minimize the SRAM space requirements. The QBdy size depends upon the queue being accessed and the initialization parameters presented during queue initialization.

Figure 99:
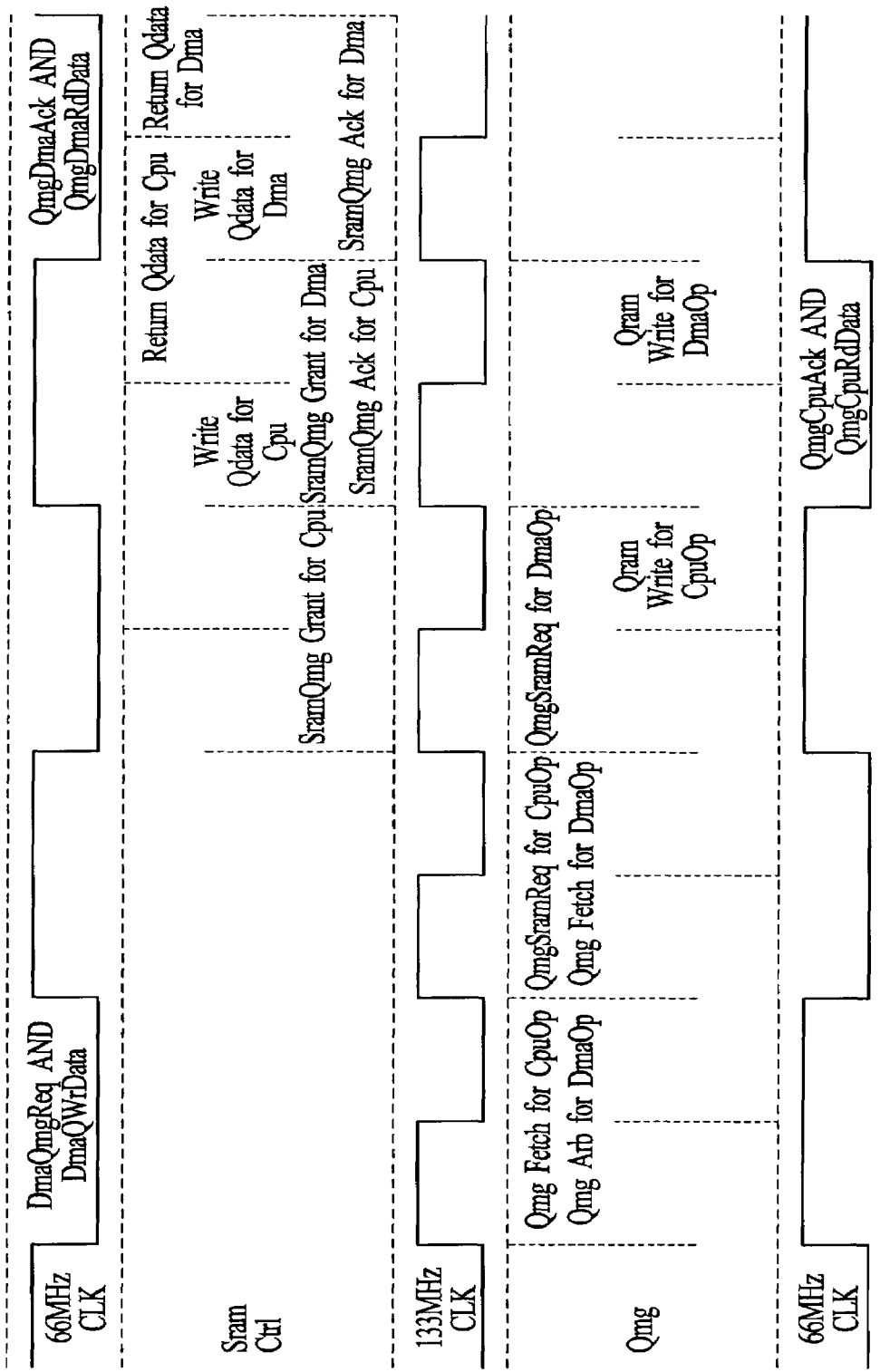

Qmg accepts operations from both CPU and DMA sources (See FIG. 99). Executing these operations at a frequency of 133 MHz, Qmg reserves even cycles for DMA requests and reserves odd cycles for CPU requests. Valid CPU operations include initialize queue (InitQ), write queue (WrQ) and read queue (RdQ). Valid DMA requests include read body (RdBdy) and write body (WrBdy). Qmg working in unison with Q2d and D2q generate requests to the Xwr and Xrd sequencers to control the movement of data between the QHd, QTl and QBdy.

Figure 98:
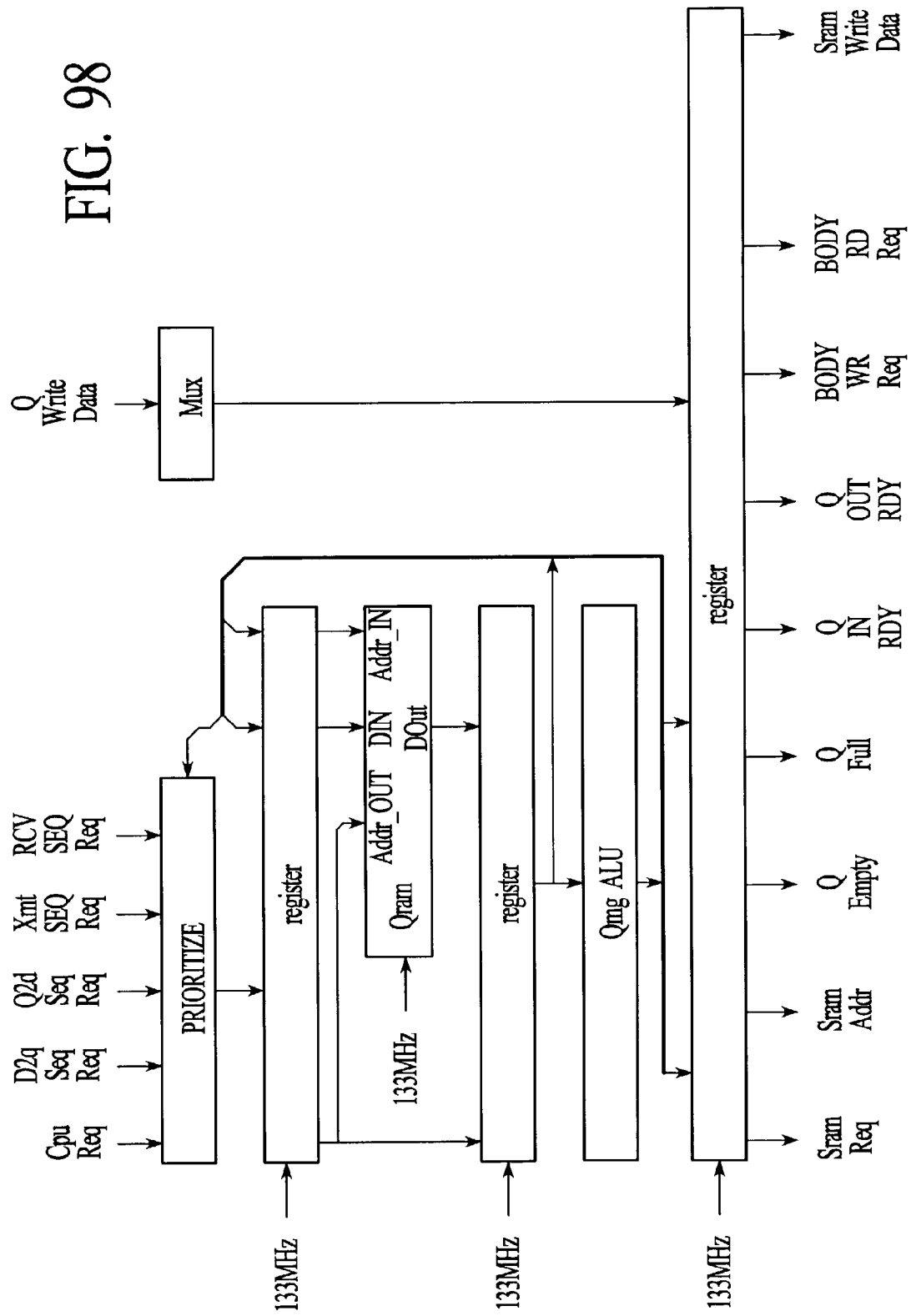

FIG. 98 shows the major functions of Qmg. The arbiter selects the next operation to be performed. The dual-ported SRAM holds the queue variables HdWrAddr, HdRdAddr, TlWrAddr, TlRdAddr, BdyWrAddr, BdyRdAddr and QSz. Qmg accepts an operation request, fetches the queue variables from the queue ram (Qram), modifies the variables based on the current state and the requested operation then updates the variables and issues a read or write request to the SRAM controller. The SRAM controller services the requests by writing the tail or reading the head and returning an acknowledge.

DMA Operations.

DMA operations are accomplished through a combination of thirtytwo DMA channels (DmaCh) and seven DMA sequencers (DmaSeq). Each DMA channel provides a mechanism whereby a CPU can issue a command to any of the seven DMA sequencers. Where as the DMA channels are multi-purpose, the DMA sequencers they command are single purpose as shown in FIG. 100.

The processors manage DMA in the following way. The processor writes a DMA descriptor to an SRAM location reserved for the DMA channel. The format of the DMA descriptor is dependent upon the targeted DMA sequencer. The processor then writes the DMA sequencer number to the channel command register.

Each of the DMA sequencers polls all thirtytwo DMA channels in search of commands to execute. Once a command request has been detected, the DMA sequencer fetches a DMA descriptor from a fixed location in SRAM. The SRAM location is fixed and is determined by the DMA channel number. The DMA sequencer loads the DMA descriptor in to it's own registers, executes the command, then overwrites the DMA descriptor with ending status. Once the command has halted, due to completion or error, and the ending status has been written, the DMA sequencer sets the done bit for the current DMA channel.

The done bit appears in a DMA event register which the CPU can examine. The CPU fetches ending status from SRAM, then clears the done bit by writing zeroes to the channel command (ChCmd) register. The channel is now ready to accept another command.

Figure 107:
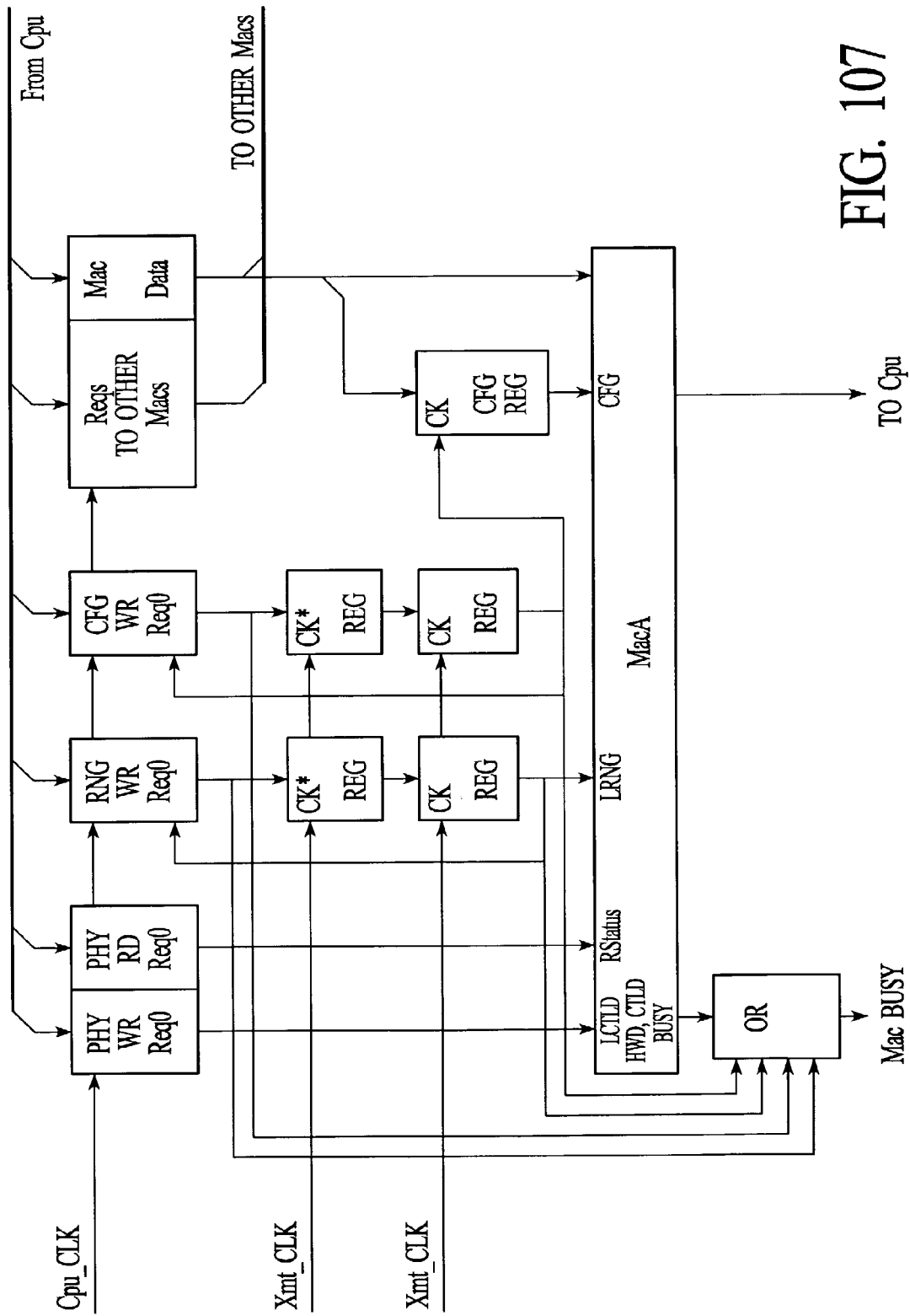

The format of the channel command register is as shown in FIG. 101. The format of the P2d or P2s descriptor is as shown in FIG. 102. The format of the S2p or D2p descriptor is as shown in FIG. 103. The format of the S2d, D2d or D2s descriptor is as shown in FIG. 104. The format of the ending status of all channels is as shown in FIG. 105. The format of the ChEvnt register is as shown in FIG. 106. FIG. 107 is a block diagram of MAC CONTROL (Macctrl).

Load Calculations.

The following load calculations are based on the following basic formulae:

N=X*R (Little's Law) where:
   N=number of jobs in the system (either in progress or in a queue),
   X=system throughput,
   R=response time (which includes time waiting in queues).

U=X*S (from Little's Law) where:
   S=service time,
   U=utilization.

R=S/(1−U) for exponential service times (which is the worst-case assumption).

A 256-byte frame at 100 Mb/sec takes 20 usec per frame.

4*100 Mbit ethernets receiving at full frame rate is:
   51200 (4*12800) frames/sec @ 1024 bytes/frame,
   102000 frames/sec @ (512 bytes/frame,
   204000 frames/sec @ 256 bytes/frame.

The following calculations assume 250 instructions/frame, 45 nsec clock. Thus

S=250*45nsecs=11.2usecs.

| Av Frame Size | Thruput (X) | Utilization (U) | Response (R) | Nbr in system (N) |
|---|---|---|---|---|
| 1024 | 51200 | 0.57 | 26 usecs | 1.3 |
| 512 | 102000 | >1 | — | — |
| 256 | 204000 | >1 | — | — |

Lets look at it for varying instructions per frame assuming 512 bytes per frame average.

| Instns Per Frame | Service Time (S) | Thruput (X) | Utilization (U) | Response (R) | Nbr in system (N) |
|---|---|---|---|---|---|
| 250 | 11.2 usec | 102000 | >1 | — | — |
| 250 | 11.2 | 85000 (*) | 0.95 | 224 usecs | 19 |
| 250 | 11.2 | 80000 (**) | 0.89 | 101 | 8 |
| 225 | 10 | 102000 | 1.0 | — | — |
| 225 | 10 | 95000 (*) | 0.95 | 200 | 19 |
| 225 | 10 | 89000 (**) | 0.89 | 90 | 8 |
| 200 | 9 | 102000 | 0.9 | 90 | 9 |
| 150 | 6.7 | 102000 | 0.68 | 20 | 2 |

(*) shows what frame rate can be supported to get a utilization of less than 1.
(**) shows what frame rate can be supported with 8 SRAM CCB buffers and at least 8 process contexts.

If 100 instructions/frame is used, S=100*45 nsecs=4.5 usecs, and we can support 256 byte frames:

| | | | | | |
|---|---|---|---|---|---|
| 100 | 4.5 | 204000 | 0.91 | 50 | 10 |

Note that these calculations assume that response times increase exponentially as utilization increases. This is the worst-case assumption, and probably may not be true for our system. The figures show that to support a theoretical full 4*100 Mbit receive load with an average frame size of 512 bytes, there will need to be 19 active "jobs" in the system, assuming 250 instructions per frame. Due to SRAM limitations, the current design specifies 8 SRAM buffers for active TCBs, and not to swap a TCB out of SRAM once it is active. So under these limitations, the INIC will not be able to keep up with the full frame rate. Note that the initial implementation is trying to use only 8 KB of SRAM, although 16 KB may be available, in which case 19 TCB SRAM buffers could be used. This is a cost trade-off. The real point here is the effect of instructions/frame on the throughput that can be maintained. If the instructions/frame drops to 200, then the INIC is capable of handling the full theoretical load (102000 frames/second) with only 9 active TCBs. If it drops to 100 instructions per frame, then the INIC can handle full bandwidth at 256 byte frames (204000 frames/second) with 10 active CCBs. The bottom line is that all hardware-assist that reduces the instructions/frame is really worthwhile. If header-assist hardware can save us 50 instructions per frame then it goes straight to the throughput bottom line.

What is claimed is:

1. A first device for communication between a network and a second device, the first device being coupled to the network and being coupled to the second device, the second device having a protocol stack, wherein packets of a first type and packets of a second type are received onto the first device from the network, wherein the packets of the first type include TCP headers and wherein the packets of the second type do not contain TCP headers, the first device performing all TCP transport layer processing on the packets of the first type such that the protocol stack of the second device does no TCP transport layer processing on the packets of the first type, the first device transferring data portions of the packets of the first type to the second device such that the data portions of the packets of the first type are stored in a destination on the second device, the first device passing packets of the second type to the second device such that the protocol stack of the second device does transport layer and network layer processing on the packets of the second type.

2. The first device of claim 1, wherein the first device comprises protocol processing hardware and wherein the second device comprises a central processing unit (CPU), and wherein the protocol processing hardware is integrated with the CPU.

3. The first device of claim 1, wherein the first device is a network interface card (NIC) and wherein the second device is a host computer.

4. The first device of claim 1, wherein the first device is a communication processing device (CPD) that is integrated into a host computer.

5. The first device of claim 1, wherein the first device comprises:
   hardware that generates an indication of whether an incoming packet is of the first type; and
   a processor that receives the indication and that performs TCP transport layer processing on the packets of the first type.

6. The first device of claim 5, wherein the indication of whether an incoming packet is of the first type is pushed onto a queue along with a buffer descriptor, the buffer descriptor indicating where in a memory on the first device a corresponding packet of the first type is stored.

7. The first device of claim 5, wherein the hardware is a fly-by sequencer.

8. The first device of claim 5, wherein the processor executes a single state machine that performs both IP and TCP protocol processing.

9. The first device of claim 5, wherein the processor executes a finite state machine from within one of a plurality of processes, wherein the processor has zero-cost overhead for switching from one of the processes to another of the processes, the switching involving reloading a base register of the processor.

10. The first device of claim 5, wherein the packets of the first type are received from the network at a rate, and wherein the data portions of the packets of the first type are transferred into the destination on the second device at the rate.

11. The first device of claim 1, wherein the first device comprises:
    hardware that generates an indication of whether an incoming packet is of the first type;
    a first processor that performs TCP protocol processing on packets of the first type; and
    a second processor that performs TCP protocol processing on packets of the first type.

12. The first device of claim 1, wherein the first device receives an indication of the destination from the second device, the destination being a location in memory on the second device that is determined by an application level program executing on the second device, and wherein the data portions of the packets of the first type are transferred directly from the first device and into the destination on the second device.

13. The first device of claim 1, wherein the first device performs all TCP transport layer processing on the packets of the first type such that the protocol stack of the second device does no TCP transport layer processing on the packets of the first type,
    and wherein other packets of the first type are received onto the first device from the network, the first device passing the other packets of the first type to the second device such that the protocol stack of the second device does transport layer and network layer processing on the other packets of the first type.

14. The first device of claim 13, wherein the packets of the first type that the protocol stack of the second device does no TCP transport layer processing on are fast-path packets, and wherein the other packets of the first type are fast-path candidate packets.

15. A system, comprising:
    a processor that executes a protocol processing stack including a transport protocol processing layer, an application layer program executing on the processor identifying a destination in a memory; and
    means for receiving a multi-packet session layer message from a network, the multi-packet session layer message being communicated across a TCP connection, the means performing all TCP protocol processing on all but the first of the packets of the multi-packet session layer message, the means transferring a data payload of the multi-packet session layer message directly into the destination identified by the application layer program.

16. The system of claim 15, wherein the means for receiving comprises:
    fly-by hardware logic that analyzes the packet of the multi-packet session layer message as the packets pass through the fly-by hardware logic; and
    a processor that performs TCP protocol processing on the packets of the multi-packet session layer message.

17. The system of claim 15, wherein the means for receiving comprises:
    means for analyzing the packets of the multi-packet session layer message at a bit rate that the packets are received from the network.

18. The system of claim 16, wherein the means for receiving further comprises:
    a DMA controller that transfers the data payload of the multi-packet session layer message directly into the destination.

19. A method, comprising:
    using hardware to determine whether a packet received from a network does not meet a plurality of criteria, the packet comprising a data portion and a header portion;
    wherein if the hardware determines that the packet does not meet the plurality of criteria then performing transport layer protocol processing on the packet by a first processor, the first processor being coupled to a memory and executing a program of a protocol layer higher than the transport layer; and
    wherein if the first processor does not perform said transport layer protocol processing on the packet then transport layer protocol processing is performed on the packet by a second processor such that the first processor does no transport layer protocol processing on the packet, and wherein the program executing on the first processor identifies a destination in the memory, and wherein the data portion of the packet is transferred into the destination without the header portion being transferred into the destination and without the first processor moving the data portion.

20. The method of claim 19, wherein the packet includes a TCP header, and wherein the second processor performs TCP protocol processing on the packet such that the first processor performs no TCP protocol processing on the packet.

21. The method of claim 20, wherein the first processor executes a protocol processing stack, wherein a protocol layer higher than the transport layer is an application layer, and wherein a data payload of a multi-packet session layer message is transferred into the destination without the first processor doing TCP protocol processing on a plurality of packets of the multi-packet session layer message, the multi-packet session layer message being communicated across the network over a TCP connection.

22. The method of claim 19, wherein the hardware is a sequencer.

23. The method of claim 19, wherein one of the plurality of criteria is a requirement that the transport layer protocol be the TCP protocol.

24. The method of claim 19, wherein the hardware is fly-by hardware logic.

25. The method of claim 19, wherein the hardware processes the header portion of the packet as the header portion of the packet passes through the hardware.

26. The method of claim 19, wherein the packet is received from the network at a bit rate, the hardware processing the header portion of the packet at the bit rate.

27. The method of claim 19, wherein the packet has a TCP header and wherein at least a part of the packet is stored in a memory buffer, the memory buffer being identified by a buffer descriptor, the hardware causing the buffer descriptor to be pushed onto a queue, the second processor using the buffer descriptor to retrieve said at least a part of the packet from the memory buffer.

* * * * *